US012039477B1

(12) United States Patent
Powers et al.

(10) Patent No.: US 12,039,477 B1
(45) Date of Patent: Jul. 16, 2024

(54) DYNAMIC GENERATION OF GUIDED PAGES

(71) Applicant: Dimensional Insight Incorporated, Burlington, MA (US)

(72) Inventors: Frederick A. Powers, Sudbury, MA (US); Stanley R. Zanarotti, Cambridge, MA (US); James Clark, Andover, MA (US)

(73) Assignee: Dimensional Insight Incorporated

( * ) Notice: Subject to any disclaimer, the term of this patent is extended or adjusted under 35 U.S.C. 154(b) by 0 days.

(21) Appl. No.: 18/424,784

(22) Filed: Jan. 27, 2024

Related U.S. Application Data

(63) Continuation of application No. 18/224,236, filed on Jul. 20, 2023, now Pat. No. 11,922,349, which is a continuation of application No. 17/869,619, filed on Jul. 20, 2022, now Pat. No. 11,755,972, which is a continuation of application No. 16/807,867, filed on Mar. 3, 2020, now Pat. No. 11,429,914, which is a continuation of application No. 15/164,546, filed on May 25, 2016, now Pat. No. 10,671,955.

(60) Provisional application No. 62/168,339, filed on May 29, 2015.

(51) Int. Cl.
*G06Q 10/06* (2023.01)
*G06F 16/26* (2019.01)
*G06F 16/955* (2019.01)
*G06Q 10/0631* (2023.01)
*G06Q 10/0633* (2023.01)
*G06Q 10/067* (2023.01)

(52) U.S. Cl.
CPC ....... *G06Q 10/06316* (2013.01); *G06F 16/26* (2019.01); *G06F 16/955* (2019.01); *G06Q 10/0633* (2013.01); *G06Q 10/067* (2013.01)

(58) Field of Classification Search
CPC ......... G06Q 10/06316; G06Q 10/0633; G06Q 10/067; G06F 16/26; G06F 16/955
USPC ............................................................ 707/7
See application file for complete search history.

(56) References Cited

U.S. PATENT DOCUMENTS

| | | | | |
|---|---|---|---|---|
| 2009/0171813 A1* | 7/2009 | Byrne | ................ | G06Q 30/0623 707/999.005 |
| 2012/0259882 A1* | 10/2012 | Thakur | ................ | G06F 16/954 707/E17.074 |
| 2018/0005149 A1* | 1/2018 | Dhingra | ............. | G06Q 10/0633 |

* cited by examiner

*Primary Examiner* — Hicham Skhoun
(74) *Attorney, Agent, or Firm* — NextWave IP Legal Services, LLC; Leon Fortin, Jr.

(57) ABSTRACT

Automated discovery of dimensions of a data set that are relevant to continuing a plurality of business workflows may include generating guided navigation pages from data sources representing a plurality of domains organized by a set of dimensions for continuing the plurality of business workflows. The pages include actionable elements that correspond to one or more dimension of the set of dimensions. Each dimension of the set of dimensions is common across at least two domains of the plurality of domains. At least one dynamic dimension may be discovered based on an aspect of use of the dimensions for generating the guided navigation pages. In response to interaction by a user with an actionable element that represents the dynamic domain, a semantic request response play may be used to generate a set of page data for a new guided navigation page representing the dynamic dimension.

20 Claims, 101 Drawing Sheets

| Central Dimension | # of Cases YTD | # of Cases LYTD | # of Accounts Sold YTD | # of Accts sold LYTD | # of New Accounts sold YTD | # of Lost Accounts YTD | total New Cases ytd | Total Cases Lost YTD | Sales Velocity YTD | Sales Velocity LYTD | Case Goals YTD | # of PODS YTD | # of Accounts Kept | # of Brands Sold | # of brands not sold |
|---|---|---|---|---|---|---|---|---|---|---|---|---|---|---|---|
| Brand | account or state or distributor | account or state or distributor | pops up with accounts | pops up with accounts | pops up with accounts | pops up with accounts | account or state or distributor | account or state or distributor | pops up with accounts | pops up with accounts | account or state or distributor | pops up with accounts | pops up with accounts kept | NA | NA |
| Account | brands or varietals | brands or varietals | NA | NA | NA | NA | brands or varietals | brands or varietals | brands or varietals | brands or varietals | brands or varietals | brands or varietals | NA | pops down to brands bought | pops down to brands not bought |
| State | brands or license or chain | brands or license or chain | pops up with accounts | pops up with accounts | pops up with accounts | pops up with accounts | brands or license or chain | brands or license or chain | pops up with accounts | pops up with accounts | brands or license or chain | pops up with accounts | pops up with accounts kept | pops down to brands bought | pops down to brands not bought |

FIG. 15

| REGION | # Sales person | # prods | amount | # customers |
|---|---|---|---|---|
| East | 5 | 18 | 26,198.44 | 51 |
| South | 7 | 24 | 29,143.90 | 43 |
| North | 9 | 7 | 19,630.66 | 72 |
| West | 4 | 45 | 22,234.98 | 17 |

FIG. 20

South

| Product | Time | Amount | Volume (cases) |
|---|---|---|---|
| Merlot | 1Q12 | 4,318.11 | 288 |
| Malbec | 1Q12 | 1,984.54 | 104 |
| Chardonnay | 1Q12 | 7,412.55 | 611 |
| Pino Noir | 1Q12 | 3,123.88 | 277 |
| Cabernet | 1Q12 | 2,498.65 | 193 |
| ... | ... | | |

FIG. 21

'Go Mobile' with Diver

- Native application for the iPad available June 2011
  - Leverages core Diver infrastructure
  - Allows for disconnected usage
  - Empower users with anywhere, anytime access to critical KPIs
- Easily design 'mobile' views in DivePort then publish views out to Smartphone users Page Types
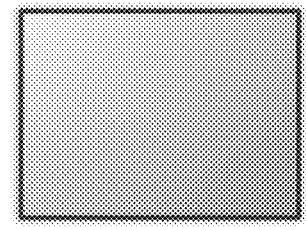
List
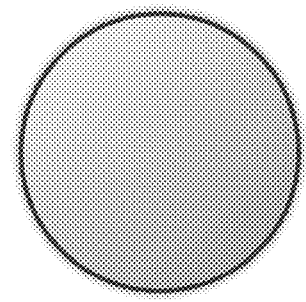
Central
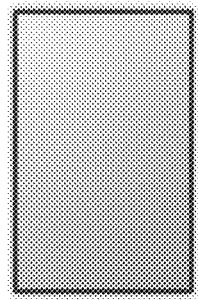
Overview
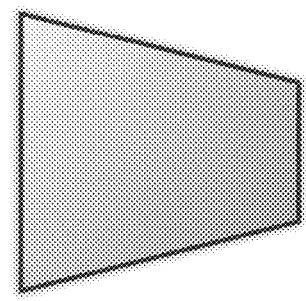
Access
FIG. 28

State

Virginia

State Facts

| | |
|---|---|
| Admission to Union | 1788-06-25 |
| Region | South |
| Abbreviation | VA |
| State Capital | Richmond |
| Land Size | 42.8K SqMiles |

State Statistics

| | | Rank | Years of Data |
|---|---|---|---|
| Population (2011) | 7.9m | 12 | 22 |
| Hospitals (2011) | 78 | 34 | 1 |
| Medically Uninsured (2010) | 5% | 35 | 1 |
| HS Graduation Rate (2009) | 71.3% | 30 | 15 |
| State Unemployment (2011) | 6.1% | 40 | 36 |
| Lottery Revenue (2010) | $67.12 | 15 | 16 |
| Family Income (2009) | 64.0K | 43 | 1 |
| Poverty Rate (2010) | 10.7% | 11 | 31 |
| Child Poverty (2010) | 14% | 45 | 1 |
| Electoral Votes | 13 | | |

Elected Officials

| | |
|---|---|
| Governor | Bob McDonnell |
| State Senator | Jim Webb |

FIG. 34

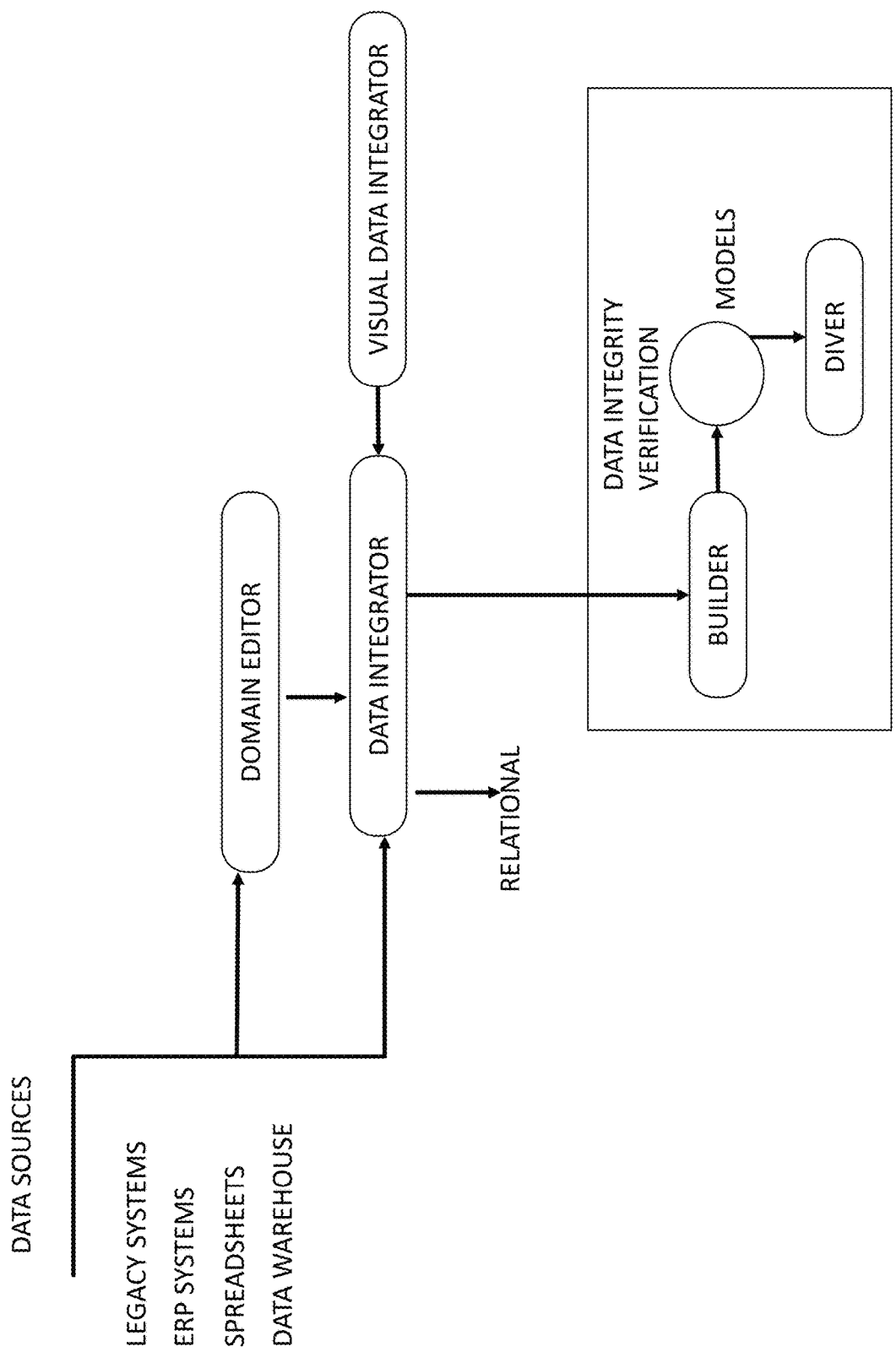

EMPLOYEE FILE — 50

| NAME | EMPLOYEE ID | NAME | SEX | ZIPCODE | ADDRESS | SALARY | AGE | DEPT ID | DATA DICTIONARY 18 |
|---|---|---|---|---|---|---|---|---|---|
| FIELD TYPE | DIMENSION | NON-SUMMARY | DIMENSION | DIMENSION | NON-SUMMARY | SUMMARY | SUMMARY | DIMENSION | RECORD 48 |
| ASSOCIATED DIMENSION | — | DETAIL | — | — | DETAIL | — | — | — | |
| | 204 | SMITH, JOHN | M | 01776 | 11 ELM ST. | 72800 | 48 | ADMIN | |
| | 208 | JONES, DAVE | M | 01890 | 77 MAIN ST. | 25600 | 26 | ADMIN | |
| | 225 | TAYLOR, JANE | F | 01779 | 18 TREMONT | 32500 | 30 | FIN | |
| | 210 | LEE, SCOTT | M | 02046 | 131 BEACON | 18700 | 21 | SHIP | |
| | 320 | FUCHS, MARY | F | 01890 | 2013 MAPLE | 31800 | 27 | R&D | |
| | 234 | BOWLER, STAN | M | 02046 | 170 CAMBRIDGE | 28800 | 26 | R&D | |
| | 221 | DALTON, ANDRE | M | 02139 | 300 VASSAR | 23300 | 21 | R&D | |
| | ** | ** | ** | ** | ** | ** | ** | ** | |

FIELD 46

DEPARTMENT FILE — 52

| NAME | DEPT ID | DEPT NAME | MANAGER |
|---|---|---|---|
| FIELD TYPE | DIMENSION | NON-SUMMARY | NON-SUMMARY |
| ASSOCIATED DIMENSION | — | — | DEPT ID |
| | ADMIN | ADMINSTRATION | SMITH, JOHN |
| | FIN | FINANCE | TAYLOR, JANE |
| | R&D | RES. &DEVL. | WOOD, JOSEPH |
| | SHIP | SHIPPING | FOX, SEAN |

EXAMPLE OF DOMAIN EDITOR/DATA INTEGRATOR OUTPUT

FIG. 36

MOBILE OPPORTUNITY

- NEXT GENERATION BI & KNOWLEDGE DISSEMINATION
- DELIVER BUSINESS & MARKET INTELLIGENCE TO THE POINT OF CUSTOMER INTERACTION
- CREATE AN ENVIRONMENT OF SELF-SUFFICIENCY & SELF-SERVICE
- NEAR REAL-TIME ACCESS TO INFORMATION
- ENHANCE EFFECTIVENESS & PRODUCTIVITY OF MOBILE TEAMS
- INCREASE REVENUES & SERVICE LEVELS

Text Options

| | Value 1 | Value 2 |
|---|---|---|
| Assil | 28,038 | 515,009.16 | USD586,428.86 |
| Austin | 32,730 | 704,739.60 | USD710,521.42 |
| Bailey | 65,732 | 1,352,535.40 | USD1,448,321.87 |
| Baker | 16,207 | 340,316.15 | USD363,759.76 |
| Braun | 23,622 | 460,997.94 | USD503,123.83 |
| Burritt | 77,017 | 1,586,940.48 | USD1,687,293.87 |
| Carroll | 37,372 | 758,207.76 | USD790,489.45 |
| Clark | 29,132 | 602,891.78 | USD635,232.48 |
| Colin | 40,540 | 800,768.64 | USD884,364.87 |

FIG. 53

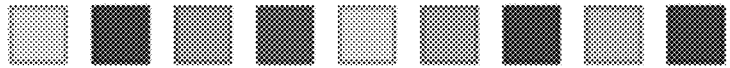
FIG. 54

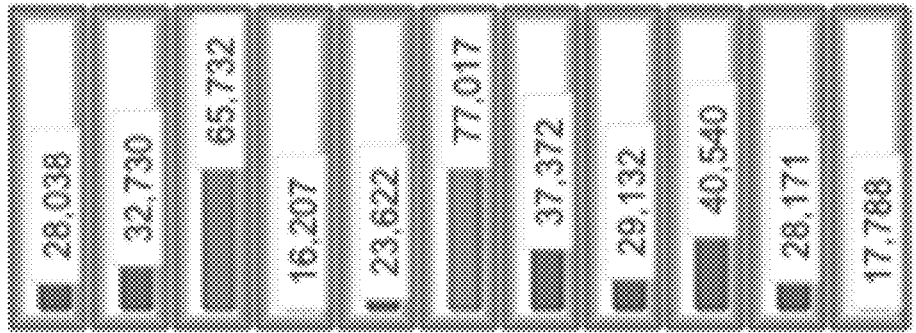
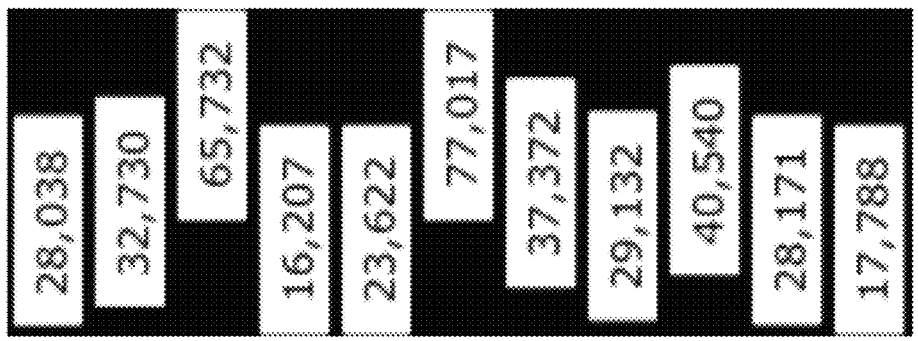
FIG. 57

| Slope | Assil | Austin | Bailey | Baker | Braun | Burritt | Carroll | Clark | Colin | Connolly | Daniels |
|---|---|---|---|---|---|---|---|---|---|---|---|
| | 28,038 ↗ 20k-30k | 32,730 ↑ 30k-40k | 65,732 ← 50k+ | 16,207 → 20k- | 23,622 ↗ 20k-30k | 77,017 ← 50k+ | 37,372 ↑ 30k-40k | 29,132 ↗ 20k-30k | 40,540 ↑ 40k-50k | 28,171 ↗ 20k-30k | 17,788 → 20k- |
| | 586,429 ↗ 400k-600k | 710,521 ↑ 600k-800k | 1,448,322 ← 1M+ | 363,760 → 400k- | 503,124 ↗ 400k-600k | 1,687,293 ← 1M+ | 790,489 ↑ 600k-800k | 635,232 ↗ 600k-800k | 884,365 ← 800k-1M | 593,397 ↗ 400k-600k | 393,254 → 400k- |

FIG. 61

Healthcare

| State | Hospitals # » | Populations » in Millions | % Uninsured » |
|---|---|---|---|
| Alabama | 95 | 20 | 4.7 | 16.0% |
| Alaska | 9 | 13 | 0.7 | 18.0% |
| Arizona | 86 | 10 | 6.6 | 19.1% |
| Arkansas | 48 | 17 | 2.9 | 18.9% |
| California | 312 | 8 | 36.9 | 19.4% |
| Colorado | 45 | 9 | 5.0 | 13.8% |
| Connecticut | 33 | 9 | 3.5 | 11.1% |
| Delaware | 6 | 7 | 0.9 | 12.2% |
| Florida | 173 | 9 | 18.4 | 21.3% |
| Georgia | 107 | 11 | 9.7 | 20.1% |
| Hawaii | 12 | 10 | 1.2 | 7.7% |
| Idaho | 14 | 9 | 1.5 | 17.2% |
| Illinois | 131 | 10 | 12.8 | 14.5% |
| Indiana | 87 | 14 | 6.3 | 13.6% |
| Iowa | 34 | 11 | 3.0 | 11.6% |
| Kansas | 56 | 21 | 2.7 | 12.9% |
| Kentucky | 86 | 15 | 4.3 | 15.4% |
| Louisiana | 102 | 23 | 4.4 | 17.3% |
| Maine | 20 | 16 | 1.3 | 9.7% |
| Maryland | 45 | 8 | 5.7 | 13.2% |

FIG. 62

| State | Hospitals # » | Populations » | % Uninsured » |
|---|---|---|---|
| Alabama | | | .0% |
| Alaska | | | .0% |
| Arizona | | | .1% |
| Arkansas | | | .9% |
| California | | | .4% |
| Colorado | | | .8% |
| Connecticut | | | 11.1% |
| Delaware | 6 | 0.9 | 12.2% |
| Florida | 173 | 18.4 | 21.3% |
| Georgia | 107 | 9.7 | 20.1% |
| Hawaii | 12 | 1.2 | 7.7% |
| Idaho | 14 | 1.5 | 17.2% |
| Illinois | 131 | 12.8 | 14.5% |
| Indiana | 87 | 6.3 | 13.6% |
| Iowa | 34 | 3.0 | 11.6% |
| Kansas | 56 | 2.7 | 12.9% |
| Kentucky | 88 | 4.3 | 15.4% |
| Louisiana | 102 | 4.4 | 17.3% |
| Maine | 20 | 1.3 | 9.7% |
| Maryland | 45 | 5.7 | 13.2% |

Menu options: Sort Up / Sort Down / Graph Column / Expand

Healthcare

Sections  Sync  Settings

FIG. 63

| MENU > ON PREMISE | | SUPER SUPPLIER LIST | | | | | |
|---|---|---|---|---|---|---|---|
| Premise: ON PREMISE | | | | | | | |
| Corporate Supplier | Cases YTD >> | Net Sales YTD | Gross Prof YTD LYTD | Gross Prof YTD DIFF | Gross Prof YTD % DIFF | Cases >> MTD | Net Sales MTD |
| Supplier 1 | 2,059.73 | 402,758.35 | 107,669.44 | 100,722.87 | 6,838.57 | 6.79 | 508.81 | 102,484.75 |
| Supplier 2 | 3,014.89 | 811,185.06 | 156,163.02 | 160,882.16 | 5,180.86 | 3.43 | 736.07 | 146,151.80 |
| ... | | | | | | | |
| ... | | | | | | | |
| Supplier 6 | | | | | | | |

| SECTIONS | SYNC | LAST SYNC MM/DD/YY TT:TT | SETTINGS |

FIG. 70

| Net Sales YTD | Expand: Prior Year | | | | | | | | | | | | | | | | | | | | | | |
|---|---|---|---|---|---|---|---|---|---|---|---|---|---|---|---|---|---|---|---|---|---|---|---|
| | Net Sales LYTD | | | | | | | | | | | | | | | | | | | | | | |
| | Net Sales YTD Diff | | | | | | | | | | | | | | | | | | | | | | |
| | Net Sales YTD % Diff | | | | | | | | | | | | | | | | | | | | | | |
| | Expand: Cost | | | | | | | | | | | | | | | | | | | | | | |
| | Cost YTD | | | | | | | | | | | | | | | | | | | | | | |
| | Cost LYTD | | | | | | | | | | | | | | | | | | | | | | |
| | Cost YTD Diff | | | | | | | | | | | | | | | | | | | | | | |
| | Cost YTD %Diff | | | | | | | | | | | | | | | | | | | | | | |
| | Expand: Depletion Allowance | | | | | | | | | | | | | | | | | | | | | | |
| | Depletion Allowance YTD | | | | | | | | | | | | | | | | | | | | | | |
| | Depletion Allowance LYTD | | | | | | | | | | | | | | | | | | | | | | |
| | Depletion Allowance YTD Diff | | | | | | | | | | | | | | | | | | | | | | |
| | Depletion Allowance YTD %Diff | | | | | | | | | | | | | | | | | | | | | | |
| | Expand: Gross Profit | | | | | | | | | | | | | | | | | | | | | | |
| | Gross Profit YTD | | | | | | | | | | | | | | | | | | | | | | |
| | Gross Profit LYTD | | | | | | | | | | | | | | | | | | | | | | |
| | Gross Profit YTD Diff | | | | | | | | | | | | | | | | | | | | | | |
| | Gross Profit YTD % Diff | | | | | | | | | | | | | | | | | | | | | | |
| | Expand: Discount | | | | | | | | | | | | | | | | | | | | | | |
| | Discount YTD | | | | | | | | | | | | | | | | | | | | | | |
| | Discount LYTD | | | | | | | | | | | | | | | | | | | | | | |
| | Discount YTD Diff | | | | | | | | | | | | | | | | | | | | | | |
| | Discount YTD %Diff | | | | | | | | | | | | | | | | | | | | | | |

FIG. 71

| | | | | | | | |
|---|---|---|---|---|---|---|---|
| A. RODET | | 9,439.17 | 10,047.71 | 5,023.86 | 13,062.03 | 5,011.12 | 120 | 41 |
| A.B.C. BEER | | | 28.29 | 33.29 | 16.65 | 43.28 | 53.90 | 1 | 2 |
| AALBORG | | | 0.00 | 0.00 | 0.00 | 0.00 | 0.00 | 0 | 0 |
| ABSOLUT | | 436,638.63 | 447,711.55 | 223,855.77 | 582,025.01 | 455,203.41 | 2,103 | 2,129 |
| ACHAIA CLAUSS | | 1,996.25 | 2,186.25 | 1,093.13 | 2,842.13 | 189.74 | 38 | 3 |
| ADE/SCOTT | | | 0.00 | 0.00 | 0.00 | 0.00 | 49.98 | 0 | 2 |

FIG. 72

| Brand | sales | goals | min | max | last sales | Cases |
|---|---|---|---|---|---|---|
| Mobile Menu (14) | 62.94 | 67.94 | 33.97 | 88.32 | 0.00 | 1 |
| Mobile Menu (10) | 515,342.52 | 391,077.52 | 195,538.76 | 508,400.78 | 295,455.15 | 15,147 |
| BackButtonTest | 39,577.61 | 44,427.61 | 22,213.81 | 57,755.89 | 28,325.41 | 970 |
| SliderTest | 0.00 | 0.00 | 0.00 | 0.00 | 0.00 | 0 |
| Multiple Dims | 2,018.87 | 2,133.87 | 1,066.93 | 2,774.03 | 1,810.29 | 17 |
| Mobile List Diver | 10,204.78 | 12,589.78 | 6,294.89 | 16,366.71 | 0.00 | 477 |
| ColumnLabelTest | 369.09 | 379.92 | 189.96 | 493.90 | 409.90 | 2 |
| ClickActionImage | 8,026.69 | 9,521.27 | 4,760.64 | 12,377.66 | 7,009.33 | 73 |
| Click Action Test | 0.00 | 0.00 | 0.00 | 0.00 | 45.98 | 0 |
| SubMenu Test | 42,616.56 | 55,701.56 | 27,850.78 | 72,412.03 | 63,411.84 | 2,617 |
| pDFPresentation | 89,369.81 | 94,624.83 | 47,312.42 | 123,012.28 | 73,758.14 | 741 |
| State Info | 9,141.39 | 9,388.89 | 4,694.44 | 12,205.56 | 18,670.28 | 45 |
| Document Display | 35.64 | 55.64 | 27.82 | 72.33 | 0.00 | 4 |
| Brand | 28.29 | 33.29 | 16.65 | 43.28 | 512.05 | 1 |
| Review Pending Uploads | 523.50 | 553.08 | 276.54 | 719.01 | 0.00 | 3 |
| | 0.00 | 0.00 | 0.00 | 0.00 | 8,552.18 | 0 |
| | 0.00 | 0.00 | 0.00 | 0.00 | 1,273.20 | 0 |
| | 185,963.66 | 214,388.44 | 107,194.22 | 278,704.97 | 184,443.01 | 1,491 |
| | 5,981.29 | 7,226.29 | 3,613.15 | 9,394.18 | 8,171.54 | 249 |
| | 1,801.80 | 1,956.80 | 978.40 | 2,543.84 | 0.00 | 31 |
| | 40,813.54 | 143,406.66 | 71,703.33 | 186,428.66 | 149,005.36 | 442 |

FIG. 74

| | | | | | | | |
|---|---|---|---|---|---|---|---|
| A.B.C. BEER | 28.29 | 33.29 | 16.65 | 43.28 | 53.90 | 1 | 2 |
| AALBORG | 0.00 | 0.00 | 0.00 | 0.00 | 0.00 | 0 | 0 |
| ABSOLUT | 436,638.63 | 447,711.55 | 223,855.77 | 582,025.01 | 455,203.41 | 2,103 | 2,129 |
| ACHAIA CLAUSS | 1,996.25 | 2,186.25 | 1,093.13 | 2,842.13 | 189.74 | 38 | 3 |
| ADE/SCOTT | 0.00 | 0.00 | 0.00 | 0.00 | 49.98 | 0 | 2 |
| ADRIANO RAMOS - PINTIO | 186.85 | 204.35 | 102.18 | 265.66 | 413.78 | 3 | 6 |

FIG. 87

Position QVs Above TOC When Same For Every Page

Supplier Demo

< Back    Home                                Ship Cur/Last

Current Date 2014-Sept  Dist.State All Values (48)  Distributor All Values (212)  Sales Rep All Values (48)
Summary   9L Cases      Region  All Values (6)      Brand    All Values (52)      Varietal  All Values (26)
Period    YTD           Item    All Values (271)    Go       Reset Ship Cur/Last | Ship by Month | Goals | Diver | Top 25 | Bottom 25 | 2 Dimension Supplier Demo < Back    Home                                Ship by Month Current Date 2014-Sept  Dist.State All Values (48)  Distributor All Values (212)  Sales Rep All Values (48)
Summary   9L Cases      Region  All Values (6)      Brand    All Values (52)      Varietal  All Values (26)
Period    YTD           Item    All Values (271)    Go       Reset Ship Cur/Last | Ship by Month | Goals | Diver | Top 25 | Bottom 25 | 2 Dimension Supplier Demo < Back    Home                                Goals Current Date 2014-Sept  Dist.State All Values (48)  Distributor All Values (212)  Sales Rep All Values (48)
Period    YTD           Region  All Values (6)      Brand    All Values (52)      Varietal  All Values (26)
                        Item    All Values (271)    Go       Reset Ship Cur/Last | Ship by Month | Goals | Diver | Top 25 | Bottom 25 | 2 Dimension

| Components | Steps | Placement | Grid System | Summary |

FIG. 88 iPad ⚡ 9:35 PM 94% 🔋

Menu      Corporate Chain

Resp Salesperson

| Resp Salesperson | Corporate Chain | TD Trade Channel | TD Sub Channel | Corporate Chain Priority Code | Customer | Corporate Brand | Cases YTD » | Net Sales YTD » |
|---|---|---|---|---|---|---|---|---|
| | | | | | | | 61,236.66 | 12,209,862.60 |
| Ama| Sort Up | | 4 | 2 | 63 | 3 | 290.77 | 59,367.55 |
| And| Sort Down | | 1 | 1 | 1 | 1 | 3.60 | 635.65 |
| Chri| Add MultiColumn | 3 | 3 | 2 | 45 | 10 | 341.56 | 63,011.25 |
| Cyr| Rank Column | | 1 | 1 | 9 | 4 | 57.00 | 13,340.40 |
| Davi| Percent Column | | 9 | 2 | 282 | 44 | 8,247.73 | 1,657,791.30 |
| Dou| Graph Column | | 8 | 2 | 135 | 22 | 648.38 | 131,747.95 |
| Edw| | | 2 | 1 | 2 | 2 | 6.92 | 1,704.65 |
| Fred | 1 | 1 | 1 | 1 | 1 | 2 | 8.42 | 1,643.30 |
| George | 27 | 12 | 9 | 2 | 846 | 130 | 22,274.96 | 4,450,292.05 |
| Ginny | 1 | 1 | 1 | 1 | 1 | 3 | 241.35 | 43,040.55 |
| Hannah | 28 | 16 | 11 | 2 | 806 | 86 | 5,130.51 | 1,020,454.10 |
| Jack | 2 | 3 | 1 | 2 | 3 | 3 | 14.31 | 2,990.10 |
| James | 5 | 6 | 3 | 2 | 53 | 3 | 202.89 | 39,757.05 |
| Jeff | 1 | 1 | 1 | 1 | 2 | 2 | 4.65 | 1,140.35 |
| John | 36 | 13 | 9 | 2 | 1,013 | 125 | 14,490.41 | 2,895,071.15 |
| Kathy | 1 | 2 | 1 | 1 | 2 | 1 | 11.17 | 2,218.90 |
| Keith | 2 | 5 | 2 | 2 | 18 | 14 | 694.37 | 131,692.50 |

FIG. 90 iPad 9:35 PM 94%

Menu

Corporate Chain

Resp Salesperson  Corporate Chain

| Resp Salesperson | Corporate Chain | TD Sub Channel | Corporate Chain Priority Code | Customer | Corporate Brand | Cases YTD » | Net |
|---|---|---|---|---|---|---|---|
| | | | | | | 61,236.66 | 1 |
| Amanda | APPLEBEES NEIGHBORHOOD GRILL | 1 | 1 | 1 | 1 | 1.71 | |
| Amanda | CHAIN NOT ASSIGNED | 4 | 1 | 59 | 2 | 276.23 | |
| Amanda | MOOSE, THE FAMILY FRATERNITY | 1 | 1 | 2 | 2 | 10.33 | |
| Amanda | RAMADA HOTELS | 1 | 1 | 1 | 1 | 2.50 | |
| Andy | CHAIN NOT ASSIGNED | 1 | 1 | 1 | 1 | 3.60 | |
| Chris | ALL STAR CAFE | 1 | 1 | 1 | 1 | 3.29 | |
| Chris | CHAIN NOT ASSIGNED | 3 | 1 | 43 | 10 | 331.44 | |
| Chris | RED LOBSTER RESTAURANT | 1 | 1 | 1 | 1 | 6.83 | |
| Cyrus | CHAIN NOT ASSIGNED | 1 | 1 | 9 | 4 | 57.00 | |
| David | AMERICAN LEGION | 1 | 1 | 1 | 1 | 2.13 | |
| David | AMF BOWLING CENTERS | 1 | 1 | 2 | 4 | 381.50 | |
| David | ANNABELLES | 1 | 1 | 1 | 1 | 1.27 | |
| David | APPLEBEES NEIGHBORHOOD GRILL | 1 | 1 | 1 | 5 | 553.56 | |
| David | BEST WESTERN INN | 1 | 1 | 2 | 1 | 3.17 | |
| David | BRUNOS | 1 | 1 | 1 | 1 | 6.68 | |
| David | CHAIN NOT ASSIGNED | 9 | 1 | 261 | 37 | 6,928.33 | |
| David | ELKS LODGE | 1 | 1 | 1 | 1 | 2.04 | |

FIG. 91

← Menu

Resp Salesperson

Salesrep

| Resp Salesperson | Resp Territory | Resp Team | Customer | Corporate Brand | Corporate Item | Cases YTD » | Net Sales YTD » | Cases MTD » |
|---|---|---|---|---|---|---|---|---|
| | | | | | | 61,236.66 | 12,209,862.60 | 15,297.31 |
| Amanda | 1 | 1 | 63 | 3 | 3 | 290.77 | 59,367.55 | 71.82 |
| Andy | 1 | 1 | 1 | 1 | 1 | 3.60 | 635.65 | 2.68 |
| Chris | 1 | 1 | 45 | 10 | 11 | 341.56 | 63,011.25 | 48.44 |
| Cyrus | 1 | 1 | 9 | 4 | 4 | 57.00 | 13,340.40 | 13.54 |
| David | 1 | 1 | 282 | 44 | 67 | 8,247.73 | 1,657,791.30 | 2,026.43 |
| Doug | 1 | 1 | 135 | 22 | 23 | 648.38 | 131,747.95 | 196.42 |
| Edward | 1 | 1 | 2 | 2 | 2 | 6.92 | 1,704.65 | 1.82 |
| Fred | 1 | 1 | 1 | 2 | 2 | 8.42 | 1,643.30 | 1.42 |
| George | 1 | 1 | 846 | 130 | 260 | 22,274.96 | 4,450,292.05 | 5,774.20 |
| Ginny | 1 | 1 | 1 | 3 | 3 | 241.35 | 43,040.55 | 54.69 |
| Hannah | 1 | 1 | 806 | 86 | 132 | 5,130.51 | 1,020,454.10 | 1,209.53 |
| Jack | 1 | 1 | 3 | 3 | 3 | 14.31 | 2,990.10 | 4.12 |
| James | 1 | 1 | 53 | 3 | 3 | 202.89 | 39,757.05 | 64.93 |
| Jeff | 1 | 1 | 2 | 2 | 2 | 4.65 | 1,140.35 | 1.33 |
| John | 1 | 1 | 1,013 | 125 | 228 | 14,490.41 | 2,895,071.15 | 3,479.03 |
| Kathy | 1 | 1 | 2 | 1 | 1 | 11.17 | 2,218.90 | 6.58 |
| Keith | 1 | 1 | 18 | 14 | 14 | 694.37 | 131,692.50 | 156.38 |
| Lenna | 1 | 1 | 8 | 1 | 1 | 72.10 | 13,634.95 | 13.43 |

| Salesrep Menu | Customer : DOREL BAR (8565) | | |
|---|---|---|---|
| Customer ID | 8565 | TD Trade Channel | BAR & GRILL/TAVERN/LOUNGE |
| Customer Status | Current | TD Sub Channel | N/A |
| Customer Address 1 | 9203 ASTORIA BLVD | TD PRI Food Type | N/A |
| Customer City | LANSING | | |
| Customer Zip | 14882 | | Survey |
| Phone Number | (212) 368-4882 | | |
| Customer County | Tompkins | | |
| City/State/Zip | LANSING/NY/14882 | | |
| Customer Contact | | | |
| Special Premise | 0 | | |
| Corporate Chain | CHAIN NOT ASSIGNED | | |
| Corporate Chain Priority Code | Indep | | |

Info     Analysis

FIG. 98

DYNAMIC GENERATION OF GUIDED PAGES

CROSS-REFERENCE TO RELATED APPLICATIONS

This application is a continuation of U.S. patent application Ser. No. 18/224,236 (DMSL-0002-U01-C03) filed Jul. 20, 2023.

U.S. patent application Ser. No. 18/224,236 is a continuation of U.S. patent application Ser. No. 17/869,619 (DMSL-0002-U01-C01-C01), filed Jul. 20, 2022, now U.S. Pat. No. 11,755,972.

U.S. patent application Ser. No. 17/869,619 is a continuation of U.S. patent application Ser. No. 16/807,867 (DMSL-0002-U01-C01), filed Mar. 3, 2020, now U.S. Pat. No. 11,429,914.

U.S. patent application Ser. No. 16/807,867 is a continuation of U.S. patent application Ser. No. 15/164,546 (DMSL-0002-U01), filed May 25, 2016, now U.S. Pat. No. 10,671,955.

U.S. patent application Ser. No. 15/164,546 claims the benefit of U.S. Provisional Patent Application No. 62/168,339 (DMSL-0002-PO1) filed May 29, 2015.

Each of the foregoing applications is incorporated herein by reference in its entirety for all purposes.

BACKGROUND

Field

The present invention is related to tablet-based business intelligence methods and systems.

Description of the Related Art

Business intelligence systems require custom programming and maintenance by professional systems analysts, leaving the executive or employee with little direct control over the means of data discovery. Dynamic linking of data is on-line business intelligence systems tends to be limited to diving vertically within a data domain, thereby preventing a user for readily viewing related data in other data domains without a cumbersome regeneration process. Also tablet-based business intelligence systems are in high demand and no business intelligence solutions exist to effectively utilize a tablet-based device.

SUMMARY

Methods and systems disclosed herein may include a method for automated discovery of dimensions of a data set that are relevant to continuing a plurality of business workflows. The method may include configuring a columnar array of data sourced from data sources representing a plurality of domains, the data in the columnar array organized by a set of dimensions for continuing the plurality of business workflows, wherein each dimension of the set of dimensions is common across at least two domains of the plurality of domains. The method may also include generating sets of data from the columnar array for configuring guided navigation pages that include actionable elements that correspond to one or more dimension of the set of dimensions. Yet further the method may include monitoring use of dimensions in the set of dimensions for generating guided navigation pages from the sets of data. Also, the method may include determining at least one dynamic dimension of the set of dimensions based on an aspect of the monitored use. The method may further include configuring a semantic request response plan that facilitates generating a guided navigation page for the at least one dynamic dimension. In example embodiments, in response to a user selection of an actionable element in a first guided navigation page associated with the at least one dynamic dimension, the method may include generating a set of guided navigation page configuration data for continuing a corresponding business workflow by automatically activating the semantic request response plan that corresponds to the at least one dynamic dimension, wherein generating the set of guided navigation page configuration data is further based on domains of the data sources indicated by the user-selected actionable element in the first guided navigation page. Yet further the method may include determining at least one dynamic dimension includes use of a machine learning system to identify a set of candidate dimensions. In example embodiments, the set of dimensions may include core dimensions for which summaries are automatically generated and dynamic dimensions for which summaries are generated responsive to a user selection thereof.

A method described herein may include generating a plurality of target guided navigation pages responsive to user interaction with a plurality of guided navigation page-disposed interactive elements configured to link a second domain of the plurality of domains to a first domain of the plurality of domains by a dimension that is common to the first and second domains. Further, an aspect of monitored use may reflect user interaction with actionable elements in the set of guided navigation pages. Also, an aspect of monitored use may be an indication that a dimension used for generating guided navigation pages is an industry-specific data dimension. Yet further, the semantic request response plan may calculate data summaries based on the dynamic dimension.

Methods and systems disclosed herein may include a method for automated discovery of dimensions of a data set that are relevant to continuing a plurality of business workflows. The method may include organizing data from data sources representing a plurality of domains in the data set based on a set of dimensions for continuing the plurality of business workflows, wherein each dimension of the set of dimensions is common across at least two domains of the plurality of domains. The method may also include monitoring use of dimensions in the set of dimensions in a set of guided navigation pages that include actionable elements that correspond to one or more dimension of the set of dimensions. Additionally, the method may include determining at least one dynamic dimension of the set of dimensions based on an aspect of the monitored use. A method may also include configuring a semantic request response plan that facilitates generating a guided navigation page for the at least one dynamic dimension. In an example in response to a user selection, in a first guided navigation page in the set of guided navigation pages, of an actionable element associated with the at least one dynamic dimension, the method may include automatically generating, through application of the semantic request response plan, a set of guided navigation page configuration data that is based on domains of the data sources presented in the first guided navigation page.

In the method, determining at least one dynamic dimension may include use of a machine learning system to identify a set of candidate dimensions. Further the set of dimensions may include core dimensions for which summaries are automatically generated and dynamic dimensions for which summaries are generated responsive to a user selection thereof.

A method disclosed herein may include generating a plurality of target guided navigation pages responsive to user interaction with a plurality of guided navigation page-disposed interactive elements configured to link a second domain of the plurality of domains to a first domain of the plurality of domains by a dimension that is common to the first and second domains.

Further, am aspect of monitored use may reflect user interaction with actionable elements in the set of guided navigation pages. Also, the aspect of monitored use may be an indication that a dimension used for generating guided navigation pages is an industry-specific data dimension. Additionally, the semantic request response plan may calculate data summaries based on the dynamic dimension.

Methods and systems disclosed herein may include a system for automated discovery of dimensions of a data set that are relevant to continuing a plurality of business workflows. In example embodiments, the system may include a columnar array of data sourced from data sources representing a plurality of domains, the data in the columnar array organized by a set of dimensions for continuing the plurality of business workflows, wherein each dimension of the set of dimensions is common across at least two domains of the plurality of domains. The system may further include a set of guided navigation pages that include actionable elements that correspond to one or more dimension of the set of dimensions. The system may also include a set of instructions that when executed by a computer processor cause the processor to monitor use of dimensions in the set of dimensions in the set of guided navigation pages. The set of instructions may further cause the processor to determine at least one dynamic dimension of the set of dimensions based on an aspect of the monitored use. The set of instructions may further cause the processor to configure a semantic request response plan that facilitates generating a guided navigation page for the at least one dynamic dimension. Also, the set of instructions may further cause the processor to respond to a user selection, in a first guided navigation page in the set of guided navigation pages, of an actionable element associated with the at least one dynamic dimension, by automatically generating, through application of the semantic request response plan, a set of guided navigation page configuration data that is based on domains of the data sources presented in the first guided navigation page.

In the system, an aspect of monitored use may reflect user interaction with actionable elements in the set of guided navigation pages. However, the aspect of monitored use may be an indication that a dimension used for generating guided navigation pages is an industry-specific data dimension. In an embodiment, the semantic request response plan may calculate data summaries based on the dynamic dimension. Also, an aspect of monitored use may include a count of unique dimensions in the set of dimensions. Further, the aspect of monitored use may include an impact of a dimension for continuing at least one of the plurality of business workflows.

BRIEF DESCRIPTION OF FIGURES

FIGS. 15-18 depict guide navigation page features and a guided page navigation engine.

FIGS. 19-25 depict features of tablet based guided page generation, updating, and storage.

FIG. 28-34 depict different page types available to the user that are described herein and how they relate to each other.

FIG. 35 depicts exemplary data collection features.

FIG. 36 depicts an exemplary domain editor/data integrator output.

FIGS. 53-61 depict various presentations of indicators.

FIGS. 62-71 depict various column expansion capabilities and scenarios.

FIGS. 72-77 depict user interface capabilities related to capturing and associating a photograph with data dimensions.

FIGS. 87 and 88 depict guided page table of content positioning;

FIGS. 89-91 depict multi-column capabilities described herein;

FIGS. 92-97 depict subset generation and handling capabilities described herein; and FIGS. 98-101 depict multi-view/filtered/multi-tab guided pages.

DETAILED DESCRIPTION

Figure 1:
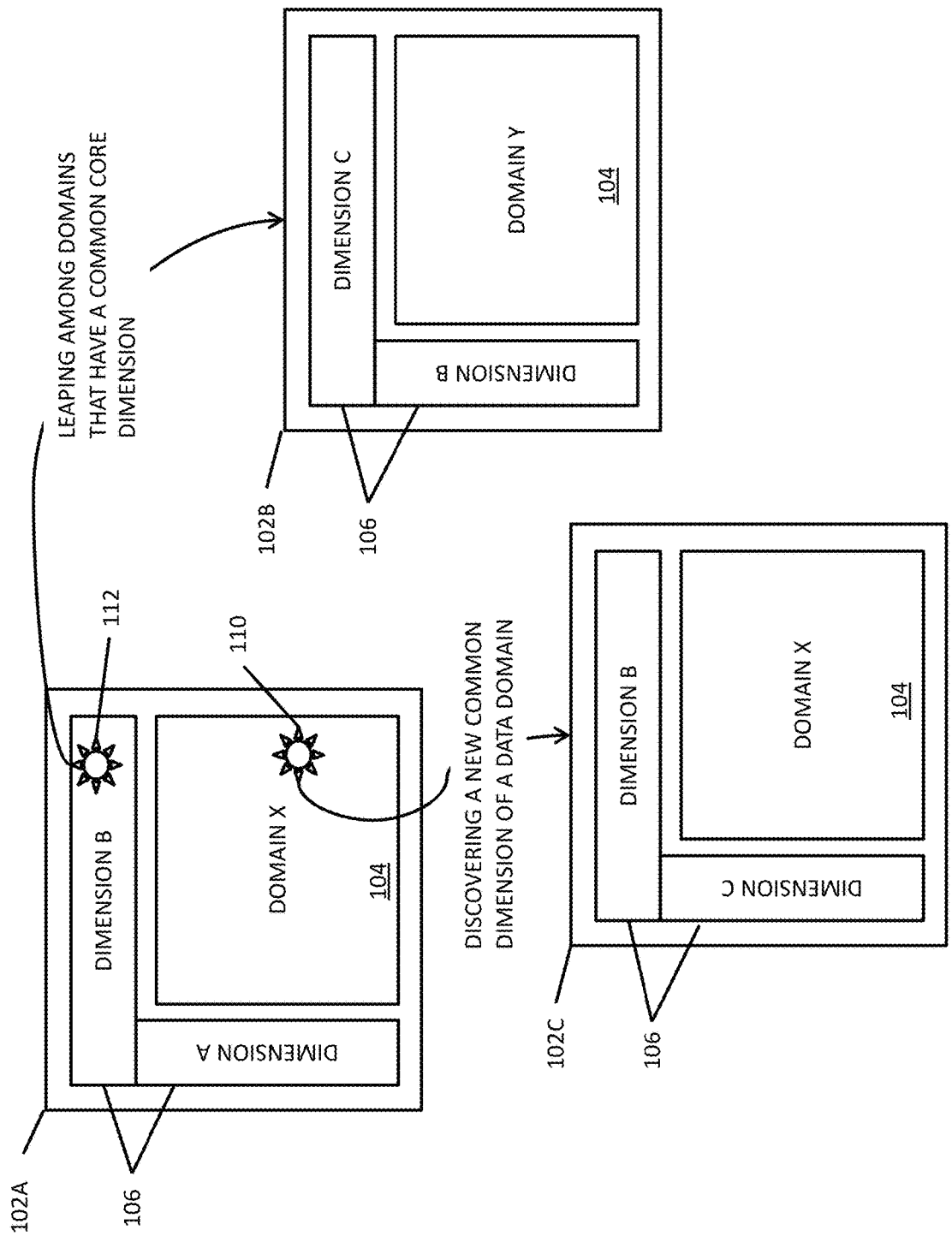
FIG. 1 depicts a functional diagram of guided page navigation.

FIG. 1 depicts domain and data discovery and leaping among a plurality of guided pages 102A, 102B, and 102C. Each guided page 102 may display a data structure containing domain specific data 104 associated with one or more core dimensions 106. The core dimensions 106 may be industry specific. Within a guided page 102 there are one or more display actionable elements 110 and/or points of entry 112. Interacting with a display actionable element 110 in a referring guided page 102A results in the display of a new guided page 102B. The new guided page 102B may display domain specific data 104 common with that of the referring guided page 102A but one or more of the core dimensions 106 may be different from the core dimensions 106 on the referring guided page 102A. Interacting with a point of entry 112 in a referring guided page 102A also results in a new guided page 102C being displayed. The new guided page 102C may show domain specific data 104 associated with a domain which is different from that of the referring guided page 102A. However, at least one of the two industry-specific core dimensions 106 may be in common with the industry-specific core dimensions 106 on the referring guided page 102A.

Figure 2:
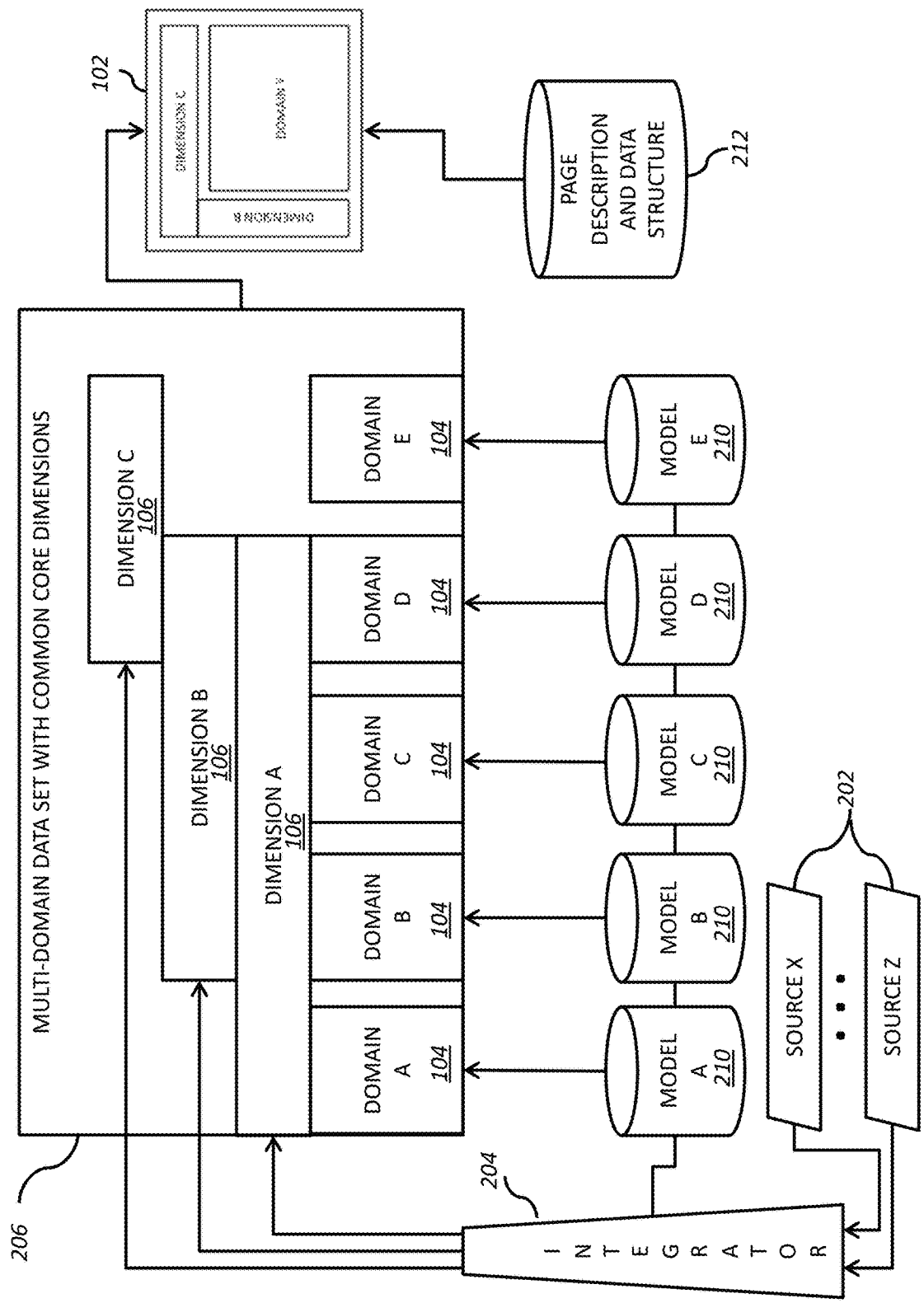
FIG. 2 depicts an architectural diagram of guided page navigation.

FIG. 2 represents a data integration and display system for the creation of multi-domain data sets 206 that are used to build guided pages 102. A plurality of data sources 202 are provided to and processed by the integrator 204. The integrator 204 facilitates determining core dimensions 106 from the gathered data. Some of the core dimensions will be industry specific. In addition, the integrator 204 facilitates associating the different domain specific data sets 104 with the identified core dimensions 106 to determine industry-specific core dimensions 106. Of the plurality of core dimensions 106 identified, a portion will be common across two or more domain specific data sets 104. In addition, the integrator 204 may facilitate calculating time-based summaries of the gathered data associated with each industry-specific core dimension 106. The source data and optionally the time-based summaries are organized into a plurality of model-based data repositories 210 that feed the multi-domain data set 206. The multi-domain data set 206, together with a page description and data structure data 212 are used to facilitate creating the guided pages 102.

Figure 3:
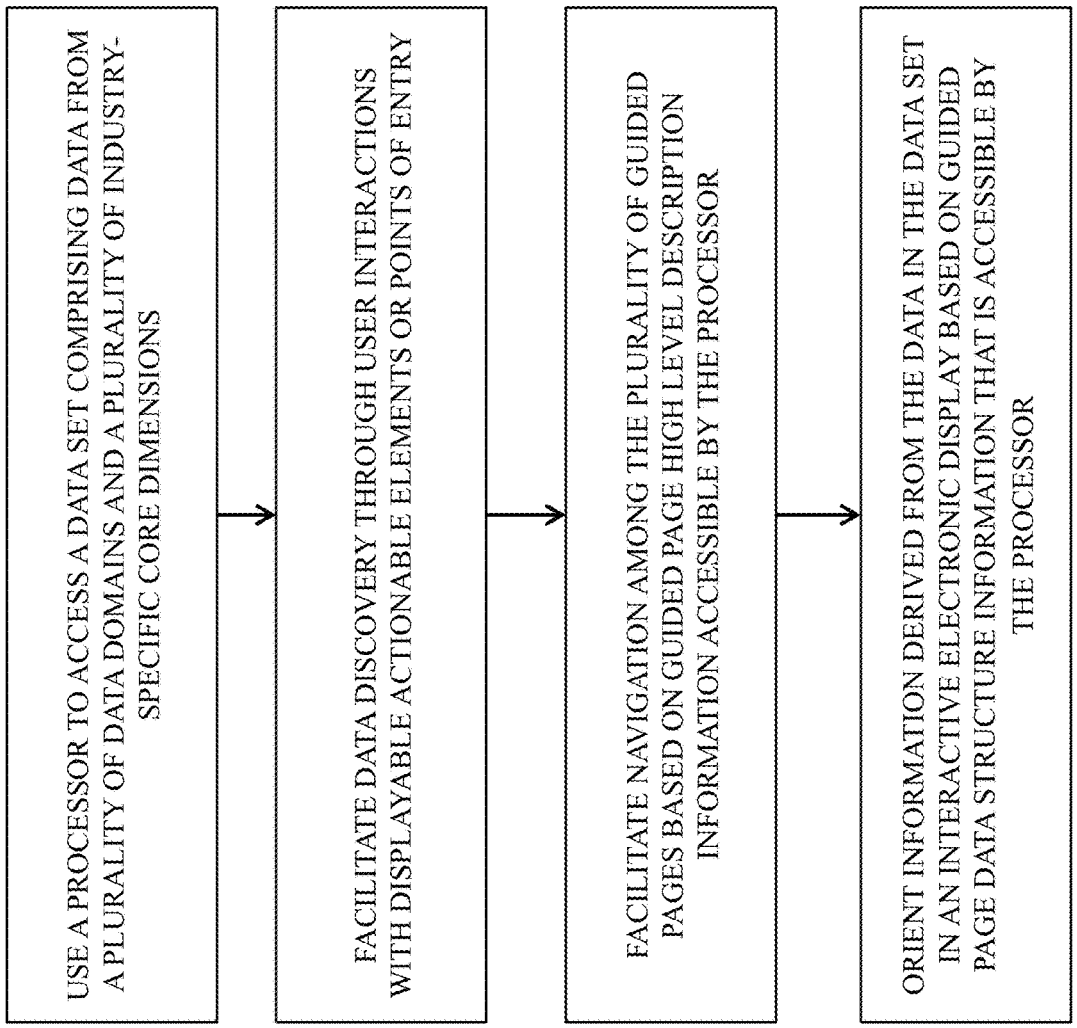
FIG. 3 depicts a flow chart of guided page navigation.

FIG. 3 depicts a flow chart for a method for guided page navigation. The method may include using a processor to access a data set comprising data from a plurality of data domains and a plurality of industry-specific core dimensions. The method may further facilitate data discovery through user interactions with displayable actionable elements or points of entry. The method may further facilitate navigation among the plurality of guided pages based on guided page high level description information accessible by the processor. The method may conclude with orienting information derived from the data in the data set in an interactive electronic display based on guided page data structure information that is accessible by the processor.

Figure 4:
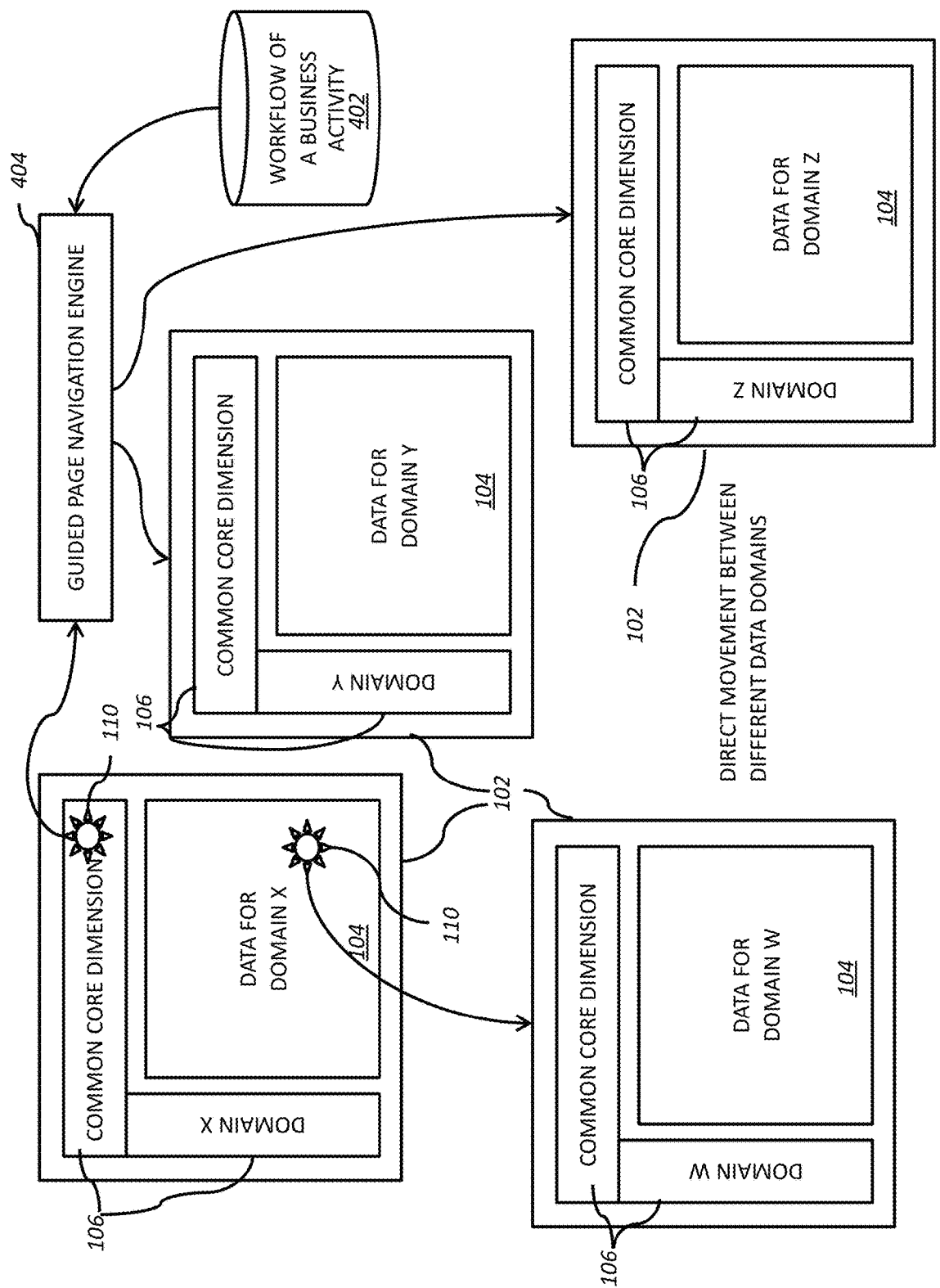
FIG. 4 depicts a functional diagram of navigation among guided pages.

FIG. 4 represents a system for navigation among a set of guided pages 102. Each guided page 102 displays a data structure containing domain specific data 104 associated with one or more core dimensions 106. Within a guided page 102 there are displayed actionable elements 110. When a displayed actionable element 110 is selected the guided page navigation engine 404 identifies a next guided page 102 to display. The next guided page 102 displays a data structure where one or more of the core dimensions 106 is common with that of the referring guided page 102 but the domain of the domain specific data 104 may be different from that of the referring guided page 102. An industry expert develops rules for configuring the guided pages 102 and their interrelationship based on information that the expert determines to be pertinent to the operation of a particular business activity. The navigation flow between guided pages 102 for different business activities may be impacted by a workflow of a business activity 402 associated with source data used in the guided pages, such as source data 202. The guided page navigation engine 404 uses the workflow of a business activity 402 together with the referring guided page 102 to determine the next guided page 102 to display. In this way direct movement within and between different sets of domain specific data 104 is quickly accomplished.

Figure 5:
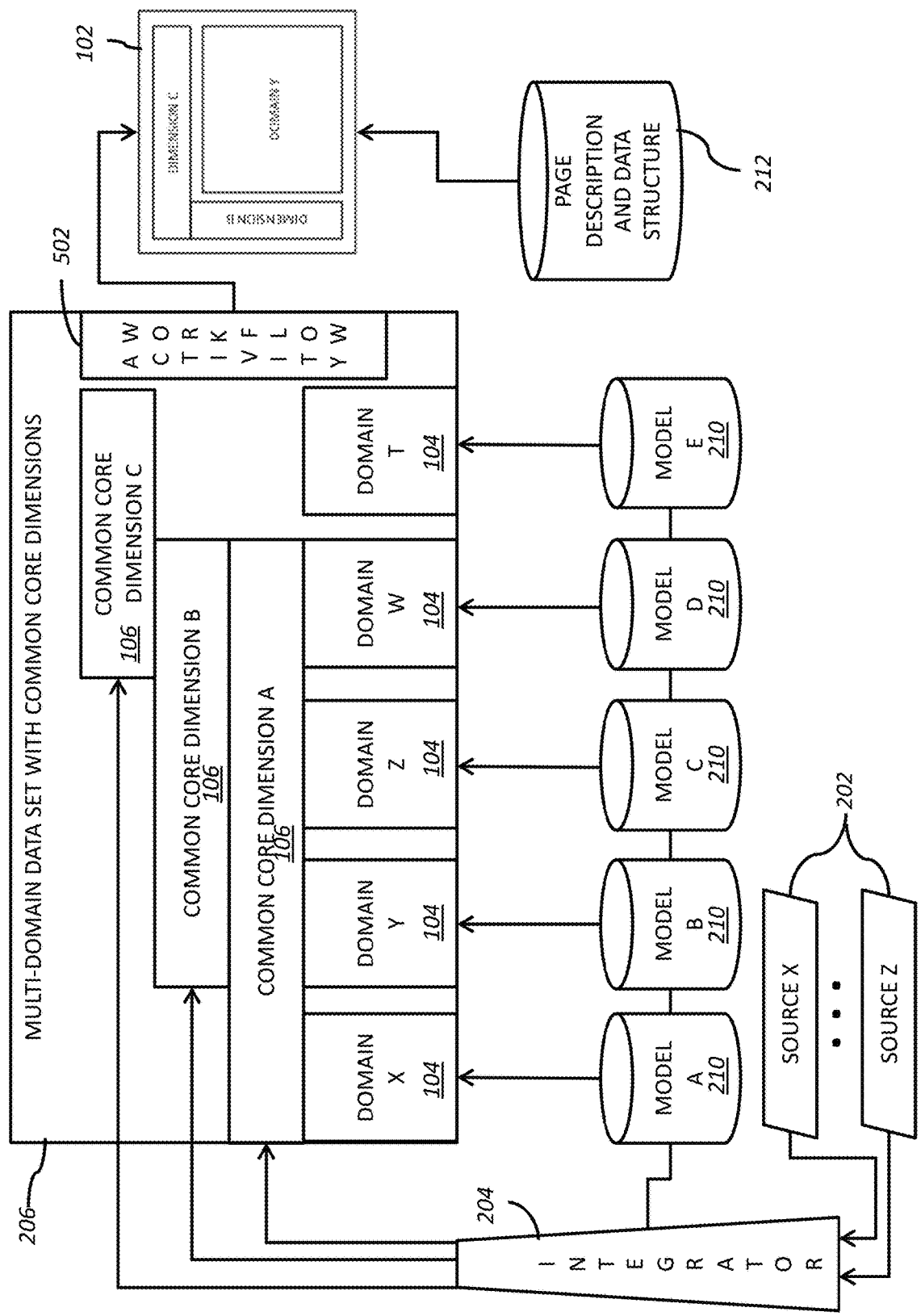
FIG. 5 depicts an architectural diagram of navigation among guided pages.

FIG. 5 represents a data integration and display system for the creation of multi-domain data sets 206 that are used to build guided pages 102. The multi-domain data sets 206 are comprised of data from a plurality of industry specific data models 210, core dimensions 106, and domain specific data sets 104. A plurality of data sources 202 are provided to and processed by the integrator 204. The integrator 204 facilitates determining industry-specific core dimensions 106 from the gathered data. In addition, the integrator 204 facilitates associating the different domain specific data sets 104 with the identified industry-specific core dimensions 106 to determine core dimensions 106 that are common across more than one domain specific data set 104. In addition, the integrator 204 facilitates calculating time-based summaries of the gathered data associated with each industry-specific core dimension 106. The source data 202 and optionally the time-based summaries are organized into a plurality of industry specific model-based data repositories 210 that feed the multi-domain data set 206. The multi-domain data set 206, together with the workflow activity 502 and the page description and data structure data 212 may be used to facilitate creating the guided pages 102.

Figure 6:
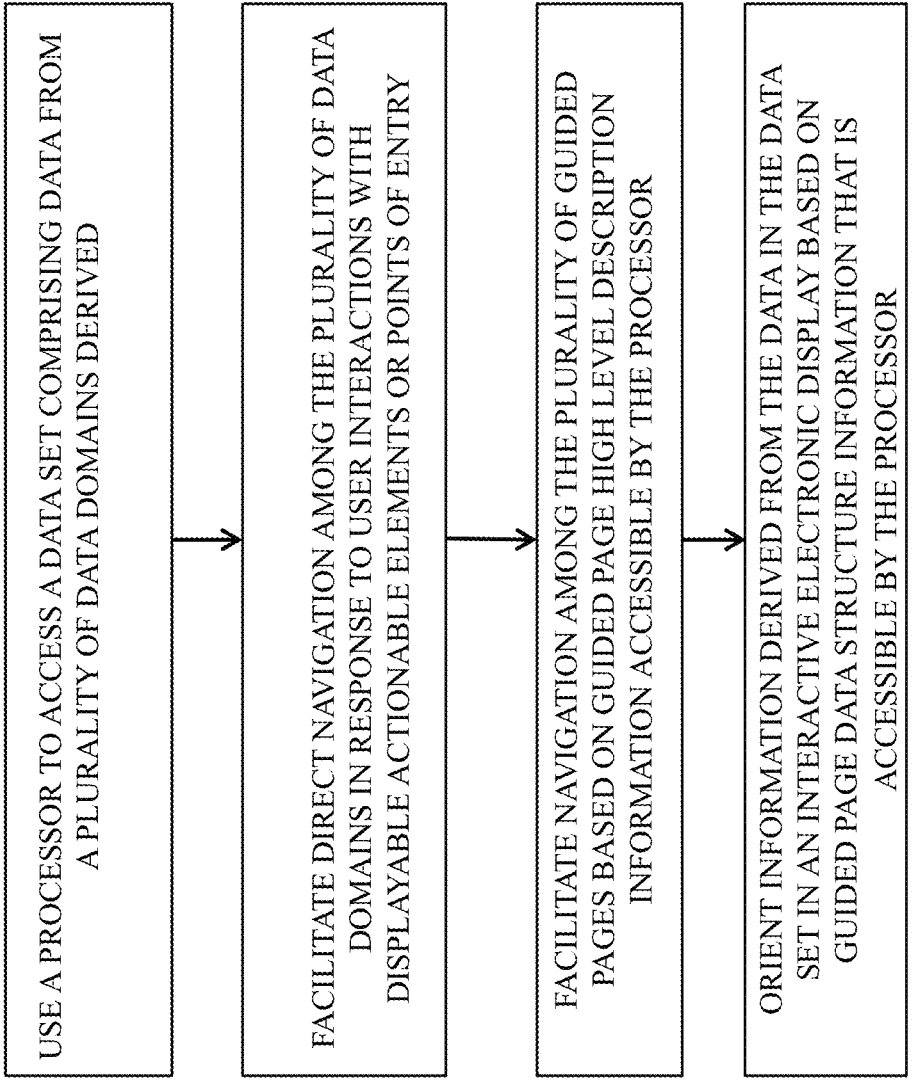
FIG. 6 depicts a flow chart of navigation among guided pages.

FIG. 6 depicts a flow chart of a method of navigation among a plurality of guided pages. The method may use a processor to access a data set comprising data from a plurality of data domains derived. The method may further facilitate direct navigation among the plurality of data domains in response to user interactions with displayable actionable elements or points of entry. The method may further facilitate navigation among the plurality of guided pages based on guided page high level description information accessible by the processor. The method may conclude by orienting information derived from the data in the data set in an interactive electronic display based on guided page data structure information that is accessible by the processor.

Figure 7:
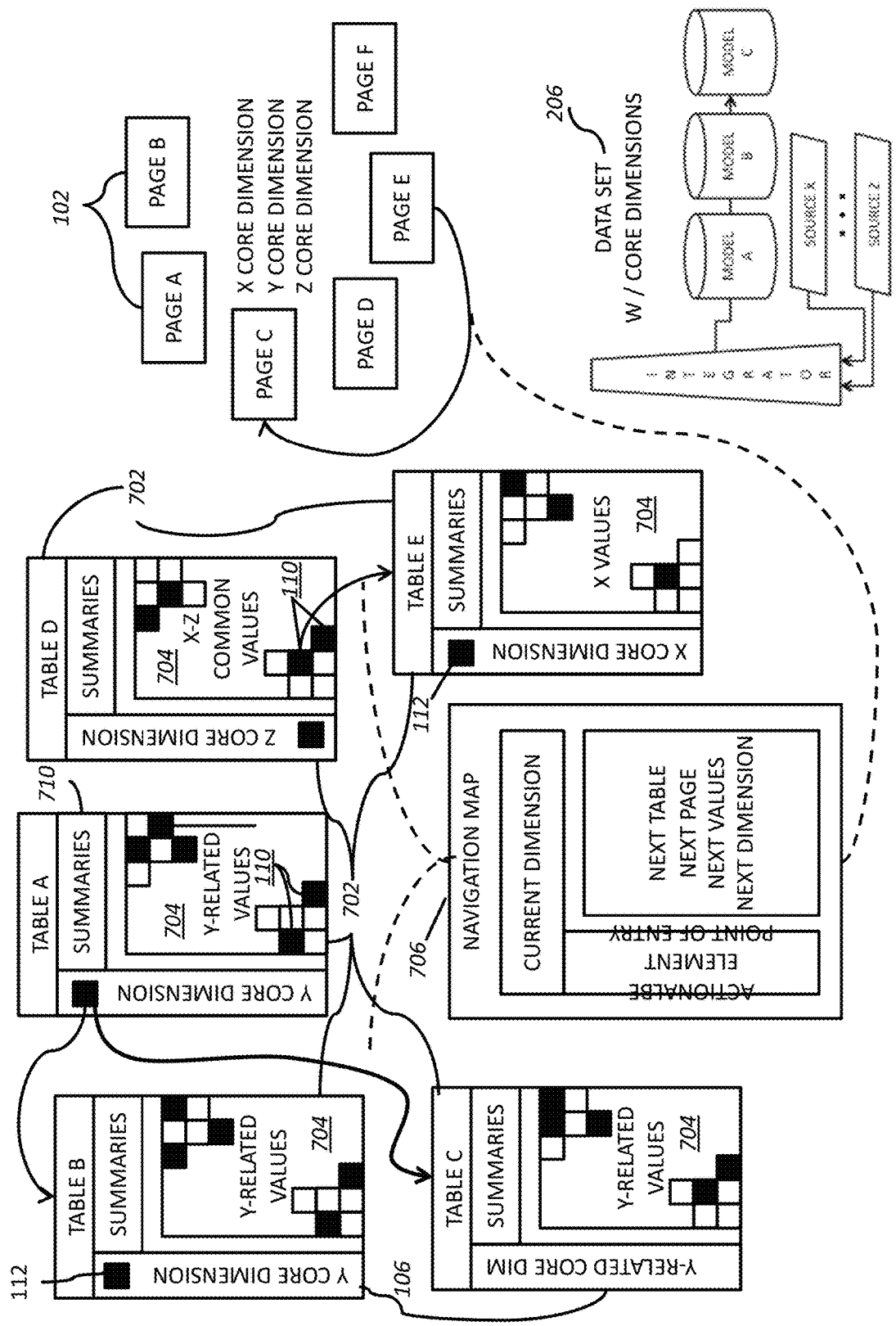
FIG. 7 depicts a block diagram of navigation map based navigation among a plurality of tables.

FIG. 7 shows a portion of the infrastructure supporting guided pages 102, including a plurality of tables 702, a navigation map 706 and a multi-domain data set 206 with common core dimensions 106. The tables 702 are comprised of one or more of core dimensions 106 that are present in the data set 206, data values 704 that correspond to domain data sets 104, and summaries 710. Within a table 702, a subset of the displayed data values 704, as represented by the black squares, are actionable element data values 110. The selection of one of the actionable element data values 110, results in the automatic display of a pre-selected table that includes at least one additional dimension 106 that is related to the selected actionable element data value 110 and data values 704 that are associated with the at least one other dimension 106. An exemplary flow may be seen from Table D 702 showing Dimension Z 106 where the data values 704 correspond to both Dimension X 106 and Dimension Z 106. Upon the selection of an actionable element data value 110 there was a transition to Table E showing Dimension X 106 and the data values 704 are those associated with X, of which a subset might also be associated with Dimension Z 106. Within a table 702 there may also be points of entry 112 associated with a dimension 106. Selection of a point of entry 112 results in the display of a table that includes at least one of the data values 704 in the referring table and another dimension 104 that is related to the dimension associated with the point of entry 112. This is illustrated in the flow from Table A 702 to Table B 702 or Table C 702. The data values 704 in Table B 702 and Table C 702 correspond to Table A 702. The dimension 106 is either the same as Table A 702 or a dimension 106 related to the dimension 106 of the referring point of entry 112. Also shown in FIG. 7 is the navigation map 706. The navigation map 706 facilitates sequencing to the next table 702, guided page 102, new data values 704 or dimension 106 based on the current table 702, current dimension 106, current guided page 102 and the actionable element 110 or point of entry 112 selected.

Figure 8:
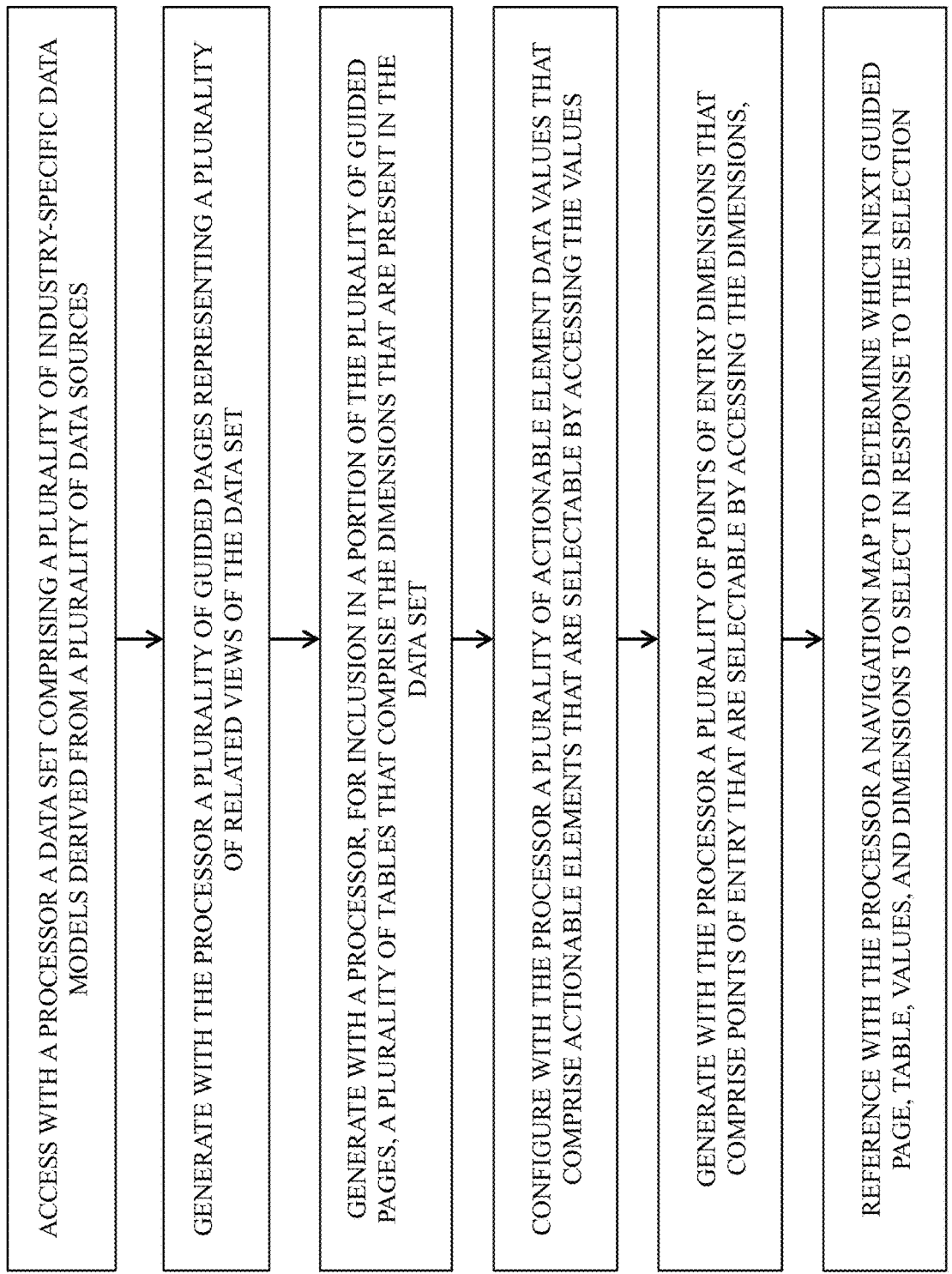
FIG. 8 depicts a flow chart of navigation map based navigation among a plurality of tables.

FIG. 8 depicts a method flow chart of navigation map based navigation among a plurality of tables. The method may access with a processor a data set comprising a plurality of industry-specific data models derived from a plurality of data sources. The method may further generate with the processor a plurality of guided pages representing a plurality of related views of the data set. The method may further generate with a processor, for inclusion in a portion of the plurality of guided pages, a plurality of tables that comprise the dimensions that are present in the data set. The method may further configure with the processor a plurality of actionable element data values that comprise actionable elements that are selectable by accessing the values. The method may further generate with the processor a plurality of points of entry dimensions that comprise points of entry that are selectable by accessing the dimensions. The method may conclude with referencing with the processor a navigation map to determine which next guided page, table, values, and dimensions to select in response to the selection.

Figure 9:
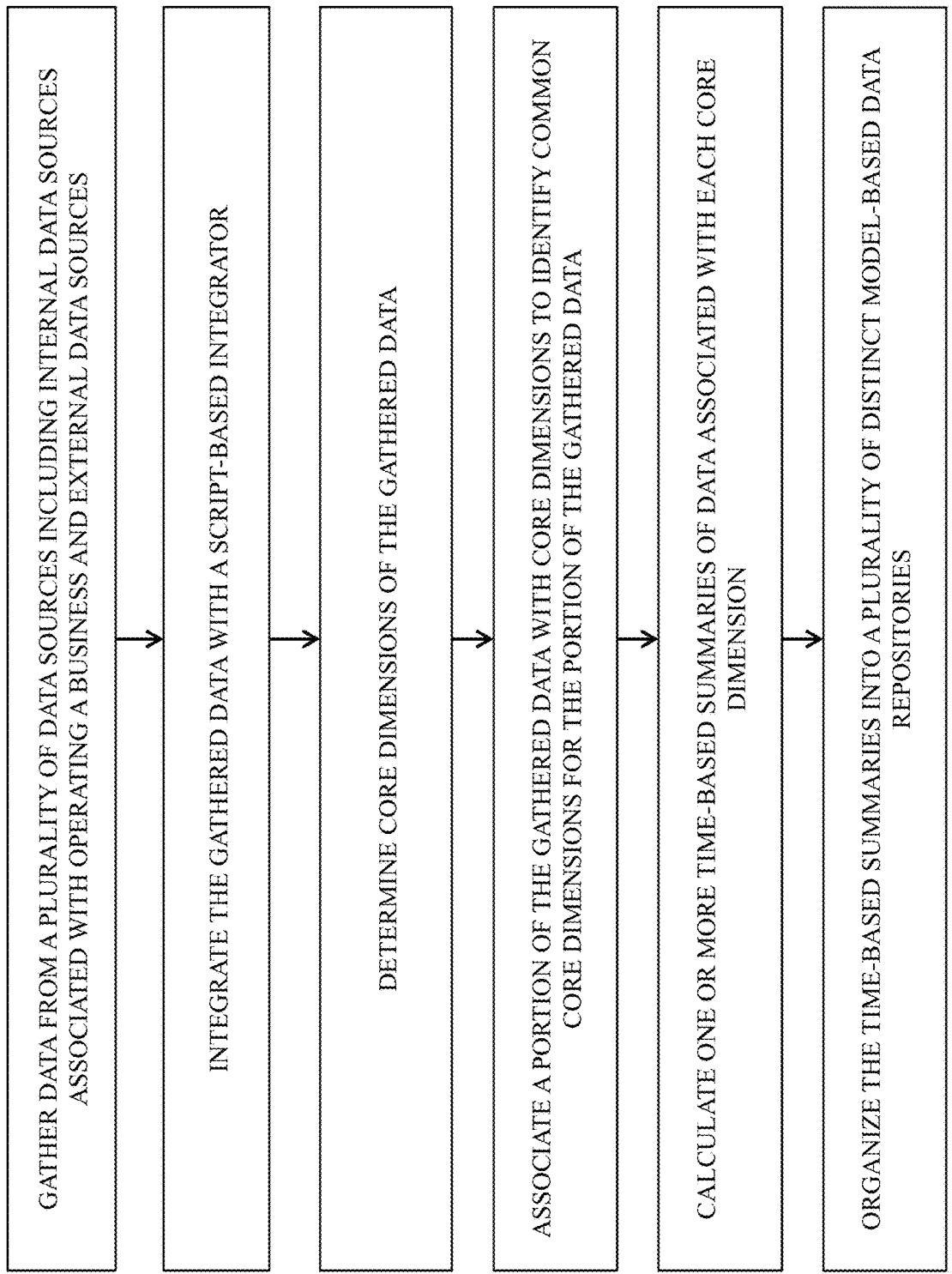
FIG. 9 depicts a flow chart of generating a time series object.

FIG. 9 depicts a method flow chart of generating a time series object. The method may gather data from a plurality of data sources including internal data sources associated with operating a business and external data sources; integrate the gathered data with a script-based integrator; determine core dimensions of the gathered data; associate a portion of the gathered data with core dimensions to identify common core dimensions for the portion of the gathered data; calculate one or more time-based summaries of data associated with each core dimension; and the method may conclude by organizing the time-based summaries into a plurality of distinct model-based data repositories.

Figure 10:
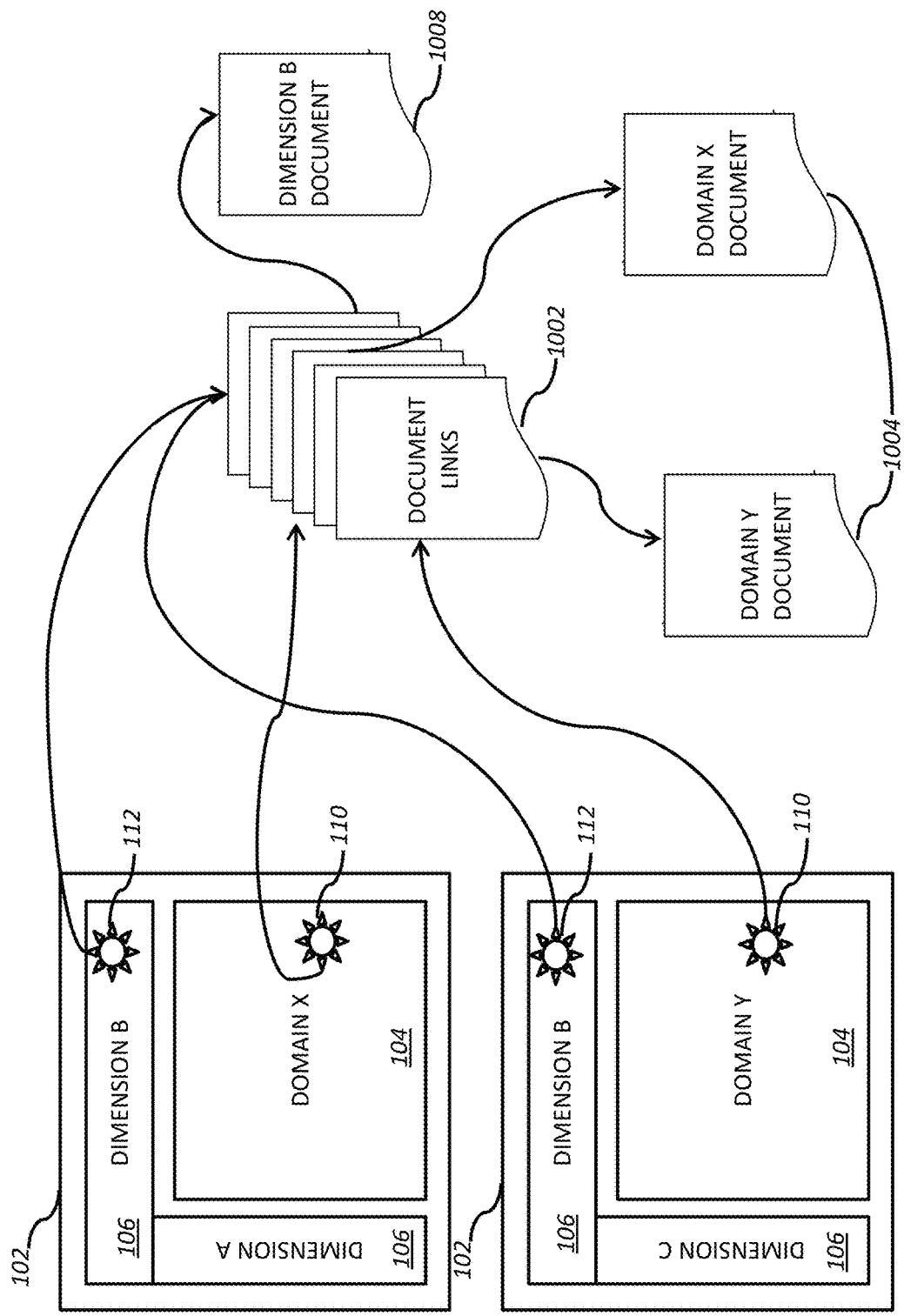
FIG. 10 depicts a functional diagram of navigation among a set of documents.

FIG. 10 illustrates a system for rapidly accessing documents in a tablet-based user interface where the documents are associated with at least one core dimension 106 or data domain 104. Each guided page 102 displays a data structure containing domain specific data 104 associated with core dimensions 106. The core dimensions 106 may be industry specific. Within a guided page 102 there may be one or more display actionable elements 110 associated with domain specific data 104 and one or more points of entry 112 associated with core dimensions 106. Interacting with a display actionable element 110 results in accessing a document link 1002 that facilitates presenting a document 1004 that is related to the same data domain 104 with which the actionable element 110 is associated. Interacting with one of the displayed points of entry 112 results in accessing a document link 1002 that facilitates presenting a document 1008 that is related to an industry-specific core dimension 106 common with that which the point of entry 112 is associated. The document presented may be any type of document, such as videos, manuals, sell sheets, images of hard copy documents including purchase orders, shipping documents, product images, and the like.

Figure 11:
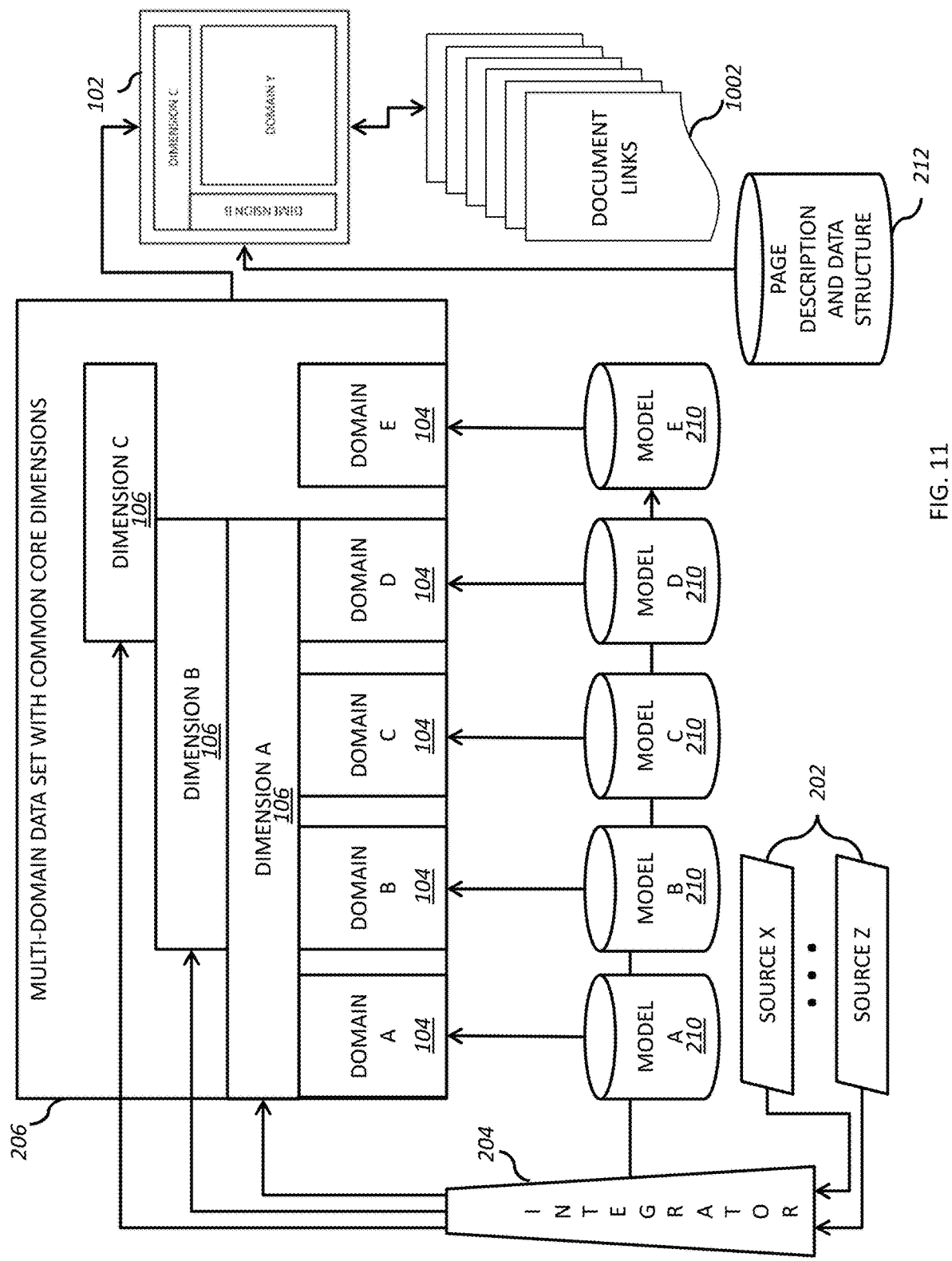
FIG. 11 depicts an architectural diagram of navigation among a set of documents.

FIG. 11 illustrates a data integration and display system for the creations of multi-domain data sets and associating document links with an appropriate guided page 102. A plurality of data sources 202 are provided to and processed by the integrator 204. The integrator 204 facilitates determining core dimensions 106 from the gathered data. Some of the core dimensions may be industry specific. Of the plurality of core dimensions 106 identified, some portion may be common across two or more domain specific data sets 104. In addition, the integrator 204 facilitates associating the different domain specific data sets 104 with identified core dimensions 106 to determine industry-specific core dimensions 106 that are common across more than one domain specific data set 104. In addition, the integrator 204 facilitates calculating time-based summaries of the gathered data associated with each industry-specific core dimension 106. The source data and optionally the time-based summaries are organized into a plurality of model-based data repositories 210 associated with domain specific data sets 104. The multi-domain data set 206, together with the page description and data structure data 212 facilitate creating the guided pages 102.

Figure 12:
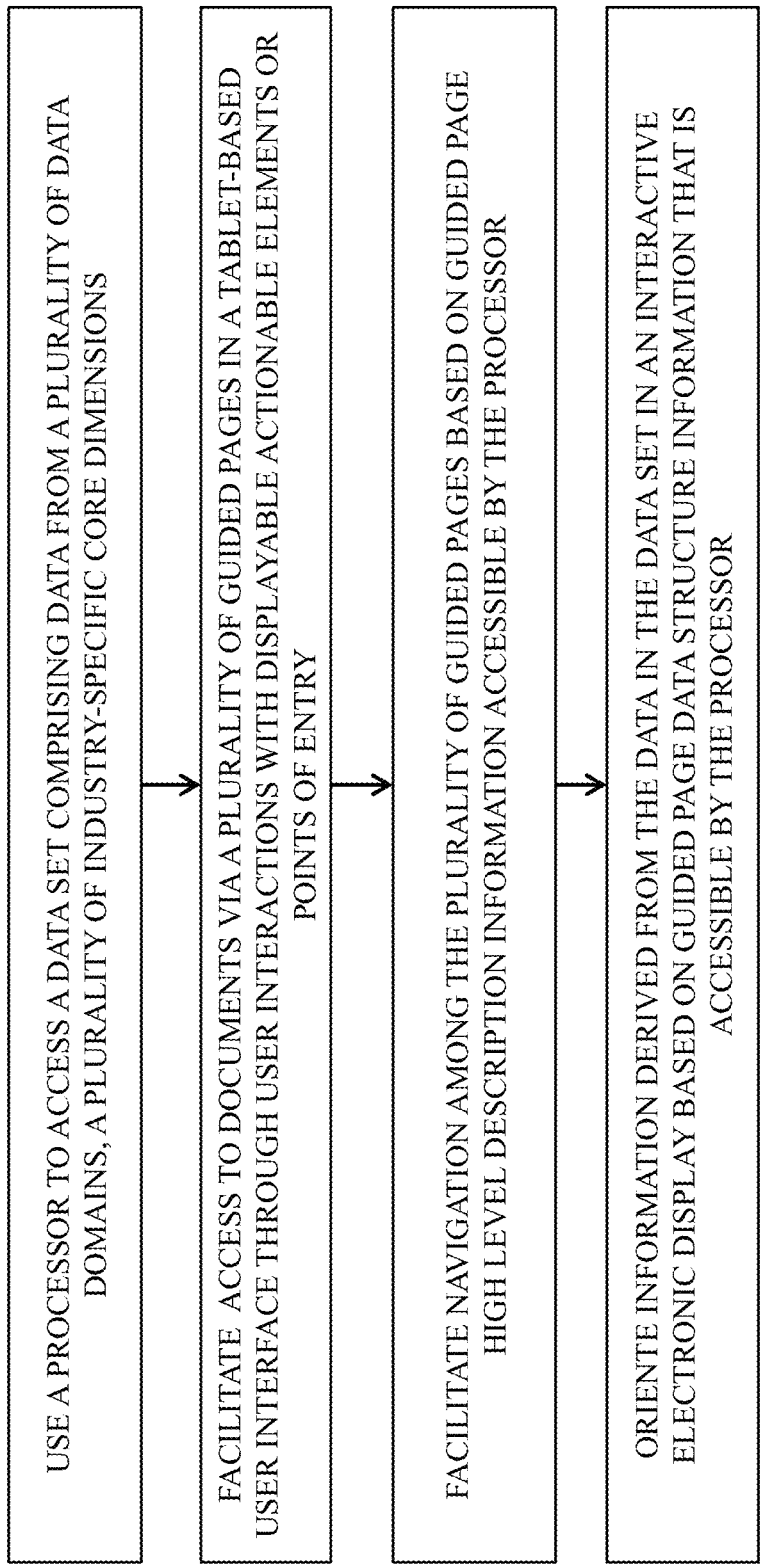
FIG. 12 depicts a flow chart of navigation among a set of documents.

FIG. 12 depicts a method flow chart of navigation among a set of documents. The method may use a processor to access a data set comprising data from a plurality of data domains, a plurality of industry-specific core dimensions; facilitate access to documents via a plurality of guided pages in a tablet-based user interface through user interactions with displayable actionable elements or points of entry; facilitate navigation among the plurality of guided pages based on guided page high level description information accessible by the processor; and the method may conclude with orienting information derived from the data in the data set in an interactive electronic display based on guided page data structure information that is accessible by the processor.

Figure 13:
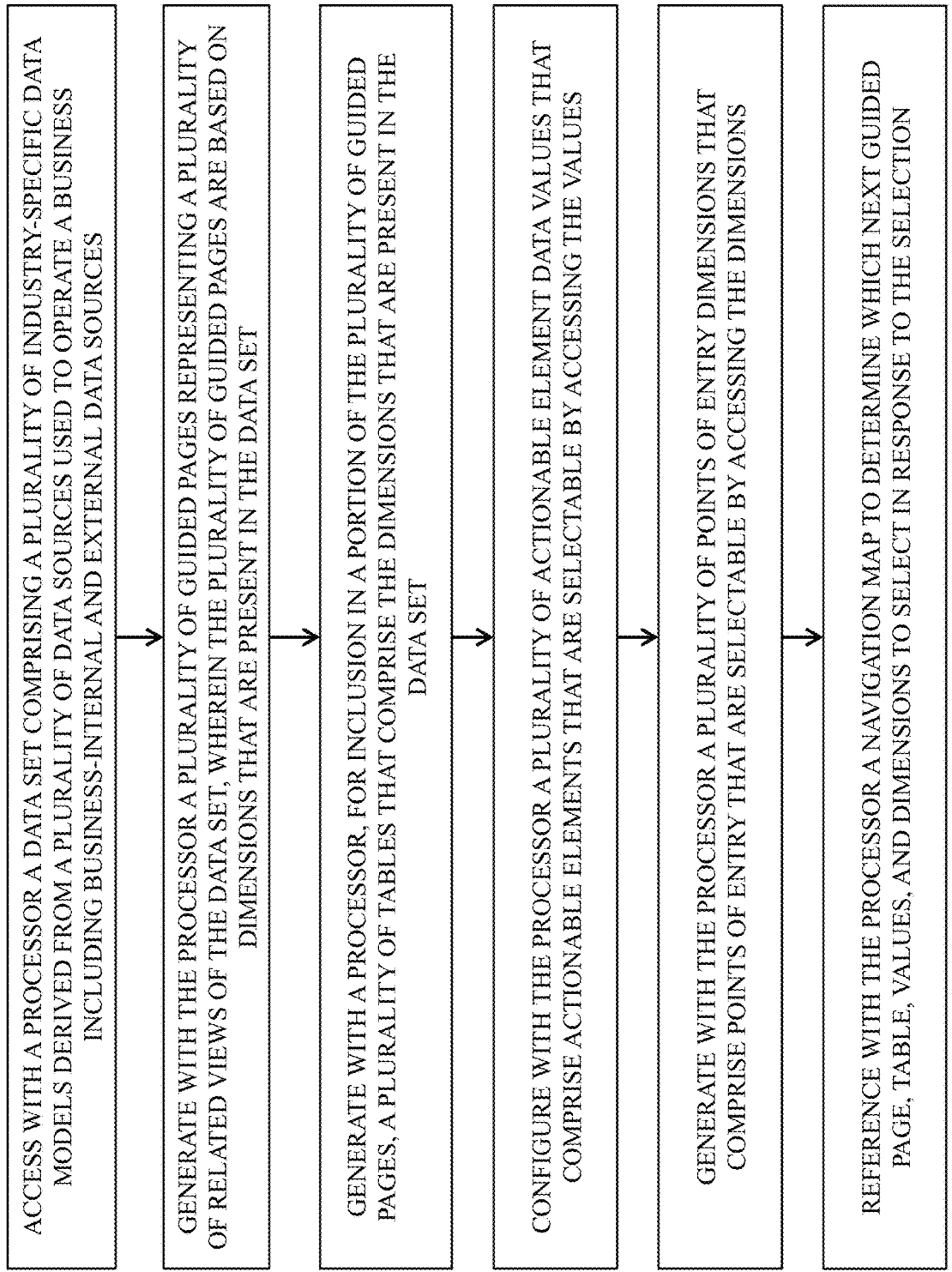
FIG. 13 depicts a flow chart of synchronizing guided pages between a tablet and a sever.

FIG. 13 depicts a method flow chart of synchronizing guided pages between a tablet and a server. The method may access with a processor a data set comprising a plurality of industry-specific data models derived from a plurality of data sources used to operate a business including business-internal and external data sources; generate with the processor a plurality of guided pages representing a plurality of related views of the data set, wherein the plurality of guided pages are based on dimensions that are present in the data set; generate with a processor, for inclusion in a portion of the plurality of guided pages, a plurality of tables that comprise the dimensions that are present in the data set; configure with the processor a plurality of actionable element data values that comprise actionable elements that are selectable by accessing the values; generate with the processor a plurality of points of entry dimensions that comprise points of entry that are selectable by accessing the dimensions; the method may conclude by referencing with the processor a navigation map to determine which next guided page, table, values, and dimensions to select in response to the selection.

Figure 14:
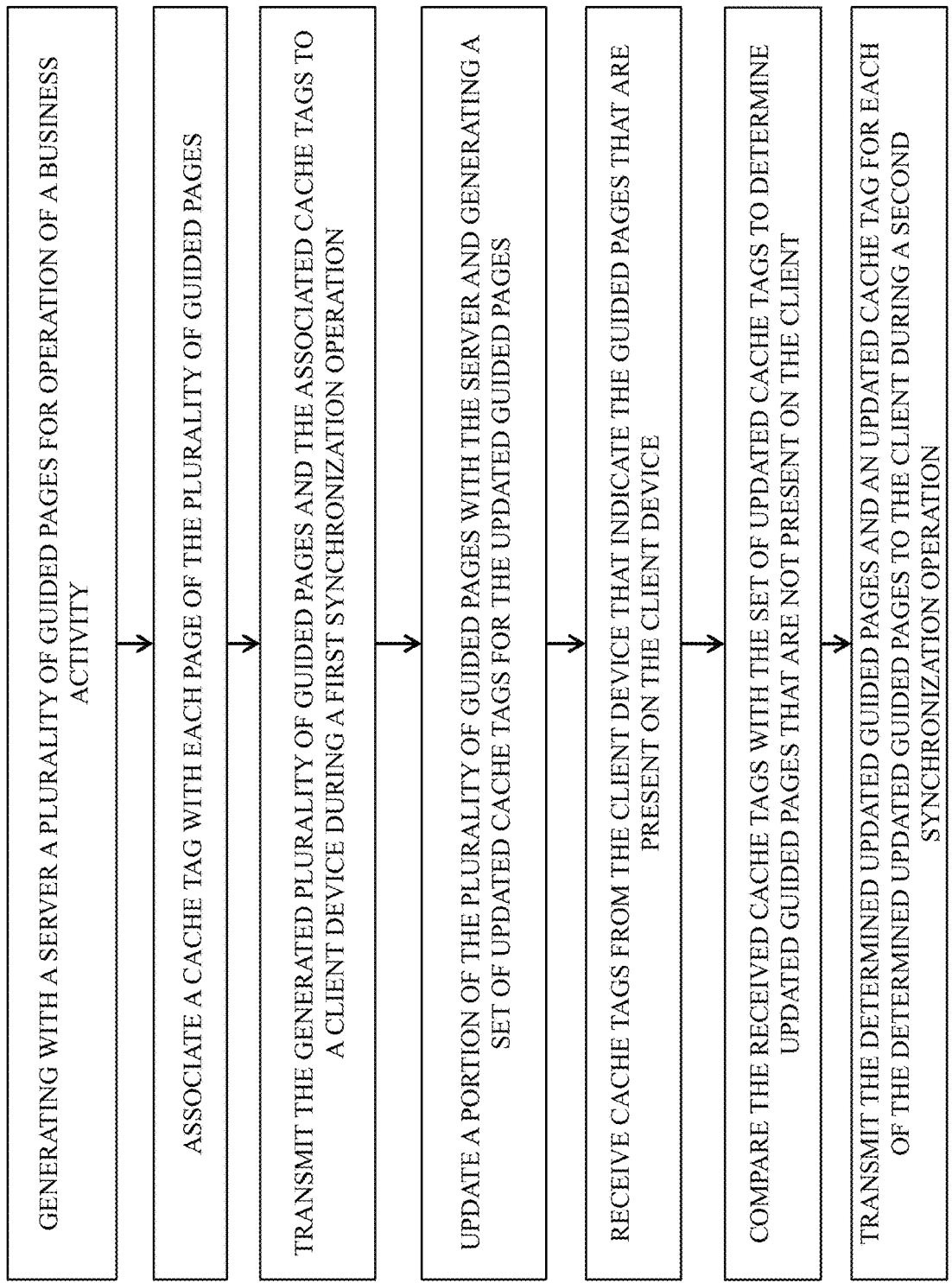
FIG. 14 depicts a flow chart of column expansion.

FIG. 14 depicts a method flow chart of column expansion. The method may generate with a server a plurality of guided pages for operation of a business activity; associate a cache tag with each page of the plurality of guided pages; transmit the generated plurality of guided pages and the associated cache tags to a client device during a first synchronization operation; update a portion of the plurality of guided pages with the server and generating a set of updated cache tags for the updated guided pages; receive cache tags from the client device that indicate the guided pages that are present on the client device; compare the received cache tags with the set of updated cache tags to determine updated guided pages that are not present on the client; and the method may conclude with transmitting transmit the determined updated guided pages and an updated cache tag for each of the determined updated guided pages to the client during a second synchronization operation.

FIG. 15 depicts a table that includes a first column of core dimensions generally as described herein. In the example of FIG. 15, the core dimensions may include brand, account, state, license type, distributor, sales person district, region, chain, supplier sales person, varietal, size, channel, etc. Although this table includes a first column of core dimensions and a first row of summary fields, it may not depict a guided page as described herein because it is intended to show how selecting a cell in a guided page for each dimension listed in the first column (e.g. brand, account, etc.) may result in directing a user to a new guided page, such as to show data for different dimensions related to the selected data. Further in FIG. 15 the column headings may be summary field labels, such as number of cases of current year to date (YTD), number of cases of YTD for last year (LYTD), number of accounts sold in YTD, number of accounts sold in LYTD, new accounts sold in YTD, accounts lost in YTD, total new cases in YTD, total cases lost, sales velocity of YTD, sales velocity of LYTD, case goals of YTD, number of accounts kept for YTD, number of brands sold YTD, number of brands not sold YTD, etc.

Also, it is noted that selecting a cell, a row heading, or a column heading will result in the methods and systems of guided page navigation presenting a new page of data that is related to the item selected. The information depicted in the intersecting cells indicates possible dimensions for presenting in the new page. A page generation engine may generate data for one of these possible dimensions based on contextual and other information. In particular, selecting the cell at the intersection of the "brand" row and the "#of Cases YTD" column may result in presenting a new guided page for an account, state, or distributor dimension. Another example is selecting the cell at the intersection of the "account" row and the "#of Cases YTD" column may result in presenting a new guided page for one of dimensions, brands, or varietals. It is noted that the possible destination dimensions for any given cell in a dimension row may depend on the column heading (e.g. what data is summarized). Therefore, although the possible destination dimensions of the intersection of "brand" and "#of Cases YTD" include account, state, and distributor, the destination dimension of the intersection of "brand" and "#of Accts sold YTD" is account.

Figure 16:
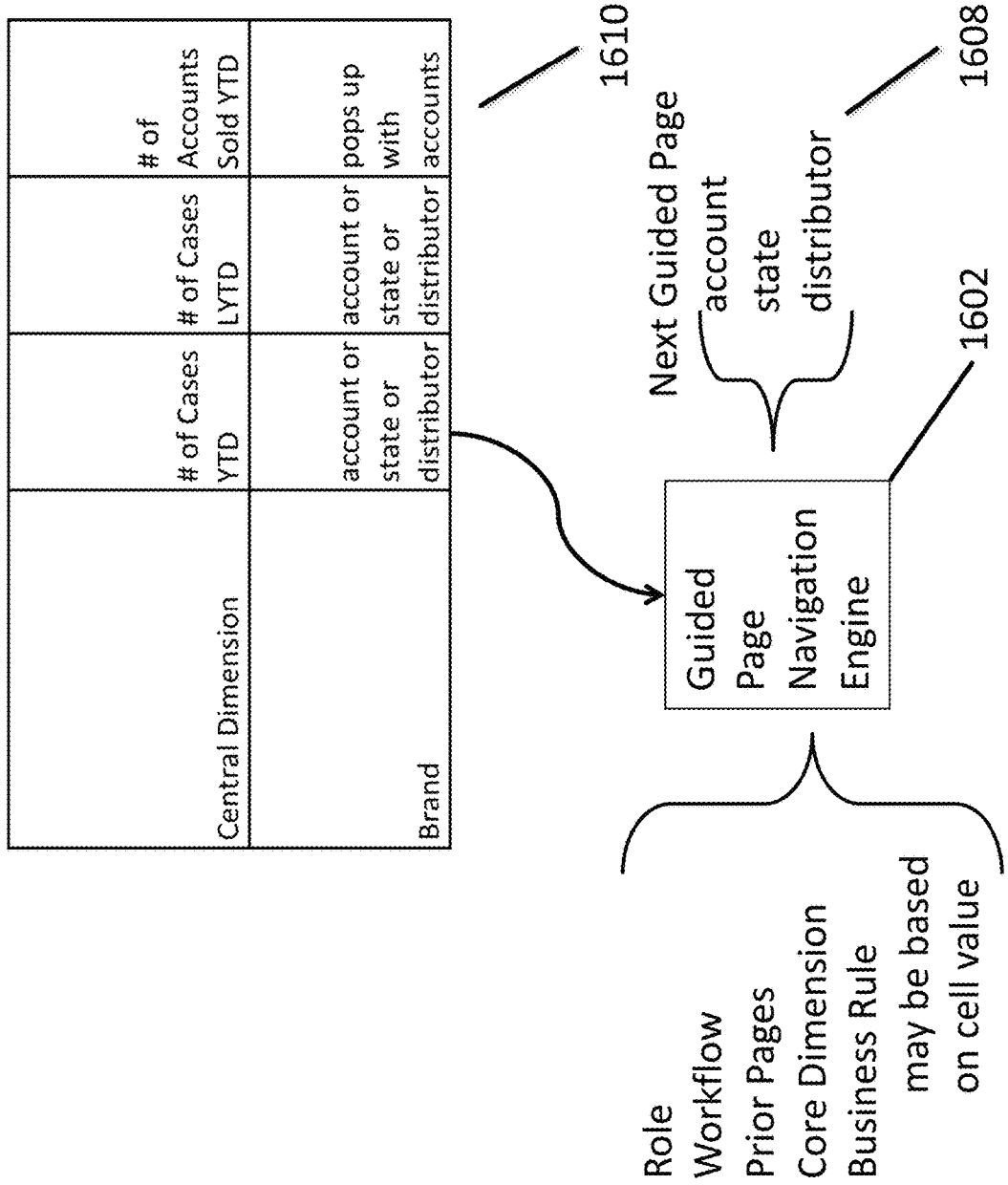

FIG. 16 depicts one embodiment of how the selection of a new page as described in FIG. 15 may be determined. A guided page generation engine may include a guided page navigation engine 1602. A guided page 1610 with underlying metadata is depicted for the core dimension "brand" and for three summary columns as shown. The guided page navigation engine 1602 may be operably coupled to a user interface in which the guided page 1610 is presented so as to capture user selections and metadata associated with the guided page 1610. Additionally, the guided page navigation engine 1602 may be configured to receive information about the role of the user, one or more workflows of the user, prior guided page selections (e.g. a history of this and any other guide page user), at least one core data dimension, business rule(s) that may be embodied as a diveplan. The guided page navigation engine 1602 may analyze all available information, including the current guided page, current dimension, current selected element on the guided page, metadata of the page and cell, candidate next domains (e.g. taken from metadata for the current page and/or selected cell), and the like to identify which guided page should be generated or accessed for the user.

The guided page navigation engine 1602 may indicate the next dimension 1608 to be used in the next page and a page generation engine may generate or provide a pointer to a page for the indicated dimension 1608. The page navigation engine 1602 may facilitate filtering of the candidate next dimensions based at least in part on prior actions of the user in the user interface. In the embodiment of FIG. 16, such filtering may result in only one of the three candidate dimensions (account, state, distributor) being selected.

Figure 17:
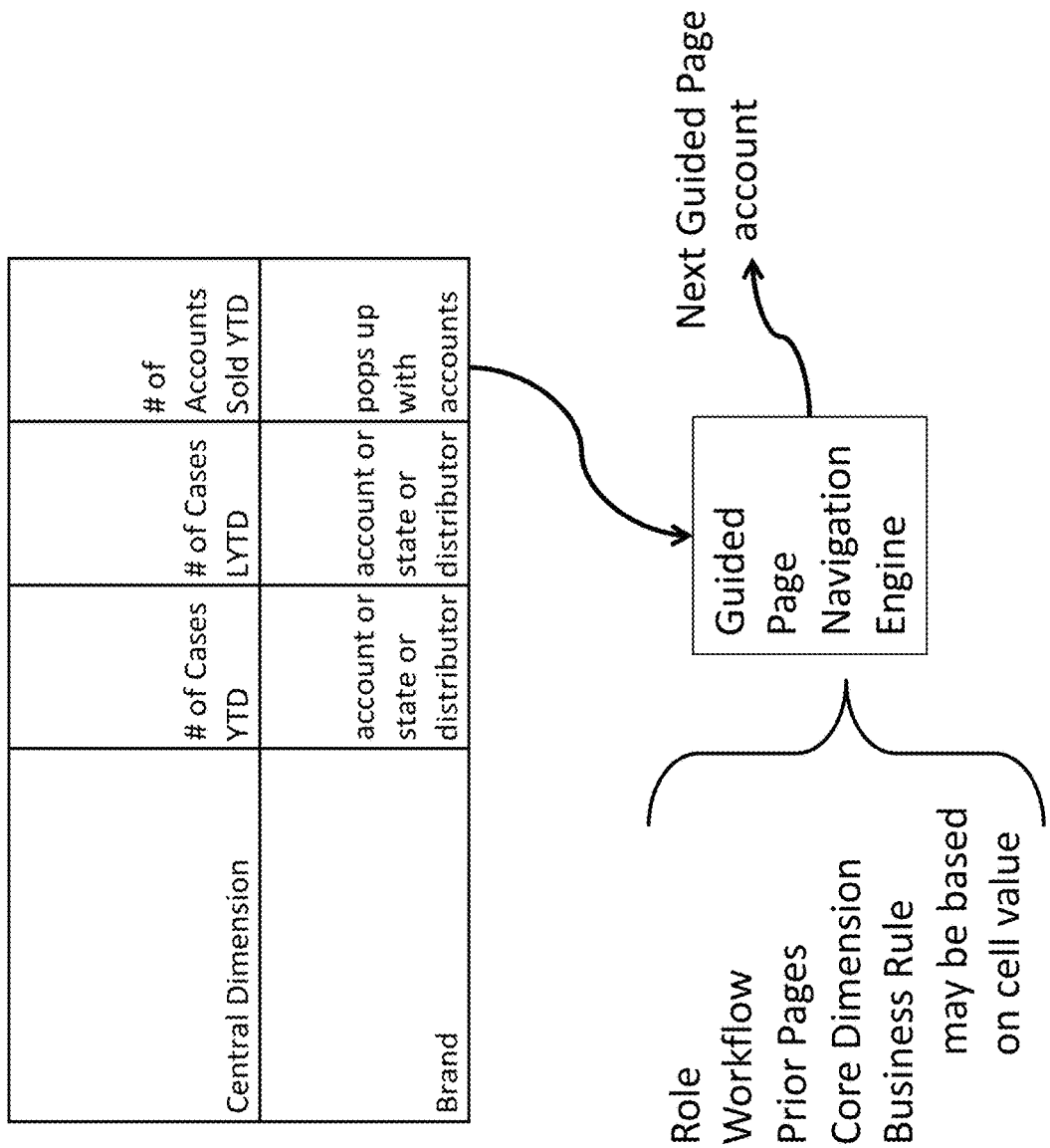

FIG. 17 illustrates selection of a dimension for a next guided page based on input from a user selection in a guided page 1610. In this embodiment, the cell selected by the user (intersection of "brand" and "#of Accounts Sold YTD") may be defined to only offer one candidate next dimension (accounts). Therefore, the guided page navigation engine 1602 may be able to identify the next guided page dimension without requiring analysis of information such as role, workflow, prior pages, core dimension, and the like. However, this information may be captured and tracked for purposes of adjusting algorithms of a page generation engine.

Figure 18:
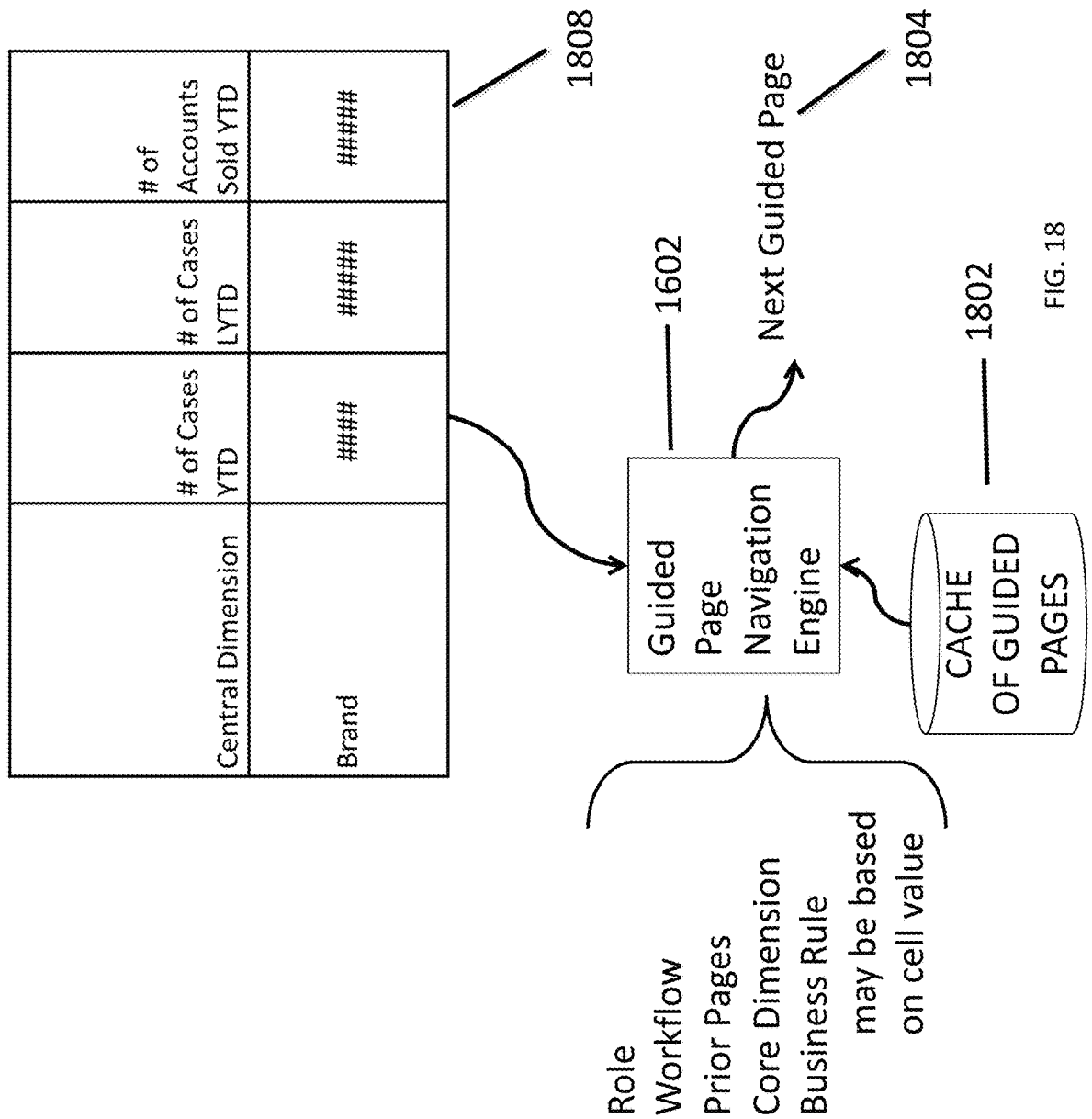

FIG. 18 illustrates selection or identification of a next guided page 1804 that may be retrieved from a cache of guided pages 1802. The cache of guided pages 1802 may include a large number of reports for a data set. The reports may represent a wide range of possible views of the data set based on dimensions of data that may be present or available in the data set. The reports may have one or more tables 408 that have dimensions that may be calculated or dynamic, and values or summaries that may correspond to those dimensions. In the example of FIG. 18, the table 1808 has a "brand" dimension and various year-to-date summaries. The guided page navigation engine 1602 may use cross-report dimension information (e.g. that may be related to the table 1808) to facilitate determining what is the next guided page 1804 to be pulled from the cache of guided pages 1802.

Learning Techniques for Improving Guided Page Navigation

Existing technologies that facilitate user access to data models may require the user to choose the "right" path so that the next presentation of data is a highly beneficial page of information. In contrast, the inventive methods and systems of guided page navigation present only one screen for each user selection that is likely to be of high relevance to the user. However, the screen that is presented in response to user selection may vary based on context and other factors of the user environment. Therefore, it may be advantageous to use information about a user's actions once a new page is presented to help a guided page navigation learning facility to learn which path is more likely to provide highly beneficial information to a specific user. By applying learning techniques that incorporate user actions, the facility may allow the user to participate in determining the right path among the different paths.

In an unguided interface it is a challenge for the user is to choose the right path for achieving a particular point in a chain of different potential paths because there may be several paths that end up in a particular point, yet some may require several interim steps that may appear to disassociate the end result from the initial objective. In a user interface of guide pages, a guided page navigation facility may present data to the user to allow the user to navigate. In an example of a guided page display of a matrix of data, a user may view the data as having greater significance from a row perspective than from a column perspective and may rely on the row data to determine where to go next. Therefore, if selecting a cell in the matrix (which may be viewed by the navigation facility as an equally weighted intersection of a row and column) presents information that is not driven predominantly by the row data, the user may choose to go back (invoke a "back" function of the interface) to the previous page. By collecting this information across many users and many instances of use by each user, the user actions may help to determine the next navigation steps for the user (e.g. for example, new row, or column, or combination thereof). As noted above, a user action after having navigated to a particular page may be informative of the perceived value of the particular page to the user at a point in the navigation chain.

Each type of user interface (e.g. an unguided interface or a guided interface) may be useful for learning how the user uses data discovery tools and therefore can be used to facilitate system learning for generating high relevance guided page navigation links. Each type of interface may be configured to track user actions and may pass them to one or more servers such that the system may reconfigure or refine guided page navigation based on those interactions. Learning may leverage legacy products that may include a rich history of user actions, such as markers that are created and accessed by the user.

Learning may include automation based on learned data for page generation or click action definition. Information about one or more users' activities in a free navigation product (e.g. for example diveplan/DivePort) may be used to guide the selection of a preferred path in the constrained (e.g. guided) navigation product. This type of technique may support automated identification of navigation among pages across distinct models and data domains.

In an example, if the user creates a marker or report in a legacy product (e.g. the unconstrained product), then the system may determine the parameters and/or data items for which a page may need to be generated. The system may be configured to use the pages generated by business analysts as a guide or a library of pages and may use the navigation of those markers as a guide to click actions or navigation among those pages. In an aspect, the system may be configured to present visualization of a process of clicking on a cell to navigate to a guided page. The inputs used by a page generation engine may be based on industry expertise such as dimensional information of the user, business rules, user intervention to generate a page, and the like.

Navigation Across Distinct Data Domains

In an aspect, a system for facilitating data discovery for operating a business via guided page navigation across multiple models or data domains is disclosed. In an aspect, the user may be on a dimension that may relate to more than models. For example, the salesperson appears in the file or the model, which may also appear elsewhere. If the user clicks on sales person, the user may be navigated to a different data source and different model. The system may be configured to allow the user to hop from model to model or data source to data source. Therefore, the system may not be constrained by a mere "drill down" hierarchy within one of the models. The system may be configured to automate navigation within a domain to a degree such as navigate to the other dimensions in that domain and the system may be configured to create those displays within that domain through that automation. This domain information may be used as an input into the page generation engine.

Describing a Guided Page Tablet-Based User Interface

Aspects of methods and systems for converting data from data models as described herein to guide pages for facilitating data discovery for operating a business via guided page navigation is now described. In the inventive methods and systems described herein, a guided page preparation and navigation facility may determine inter-relationships of data (e.g. in the models) so that the facility ensures that users are directed to a highly beneficial guided page each time a user selects a element in a guided page. In this way, the facility leverages these relationships to guide the user to stay within the boundaries of the relationships. Learning from user actions of current and legacy products may contribute to improving the guided page navigation actions.

In an embodiment, core technologies for accessing data models as described herein may be configured to facilitate implementing a guide page navigation environment. The core technologies may be configured to create an array of pages that may be available in a tablet portlet. The pages may be created based on measures portlet that may be configured to define the rows and columns. Core technologies such as a "marker" may be used to define parent dimensions, quick views, and things that the user may want to vary (e.g. dimensions to vary), dimensions as columns, summary and information columns, a diveplan for merging multiple data models, and the like. Markers and similar definitions may act as a specification for generating pages for the portlet. In addition, click actions or menus that may be associated with points of entry in each guided page may define the user navigation from one page to another.

Figure 19:
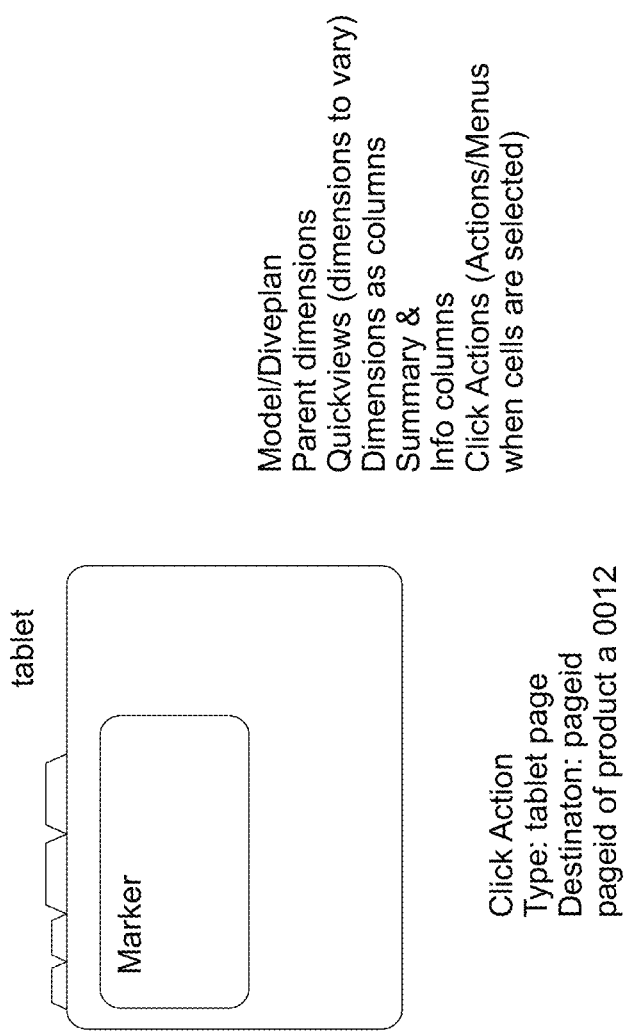

Referring to FIG. 19, the tablet interface may include sections such as a column or tabs of "main menu", "tablet documents", and the like. These sections may describe top-level tabs in a DivePort. The sections may include the information about the top-level menu items and may include links to information related to the dimensions. For example, the system may be configured to extract information out of a marker to define measures to generate pages for the tablet portlet. In this way the core technologies can generate a data repository of the summary and information columns that may be stored in the form of a set of java arrays on the disk or java objects. Information columns may include web links, such as links to documents or web pages.

FIG. 20 depicts an example of a tablet matrix of cells that may be presented in a guided navigation page user interface. The first row of the matrix may display an element of the dimension (e.g. region, sales person, product, and customer). The cells below the dimension element in a particular column may represent details of the dimension element. For the region column region details North (N), South (S), East (E), and West (W) are presented. In an example, some summary numbers are provided in the matrix (e.g. for example East: 5 sales people, selling 18 products to 51 customers, and the like). If a user clicks on the number "24" cell, then the user's current position on the matrix will be at "products" and "South". As this cell represents the product dimension (based on the column header), the next presented guided page will be a "product" page with information about the 24 products. If the number of product is 24, the user may view 24 rows in the next guided page. In an example, when the user clicks on the cell with the value of "24" such as shown in FIG. 20, the user may view a new screen that may be a list of products with information (e.g. time, sales, volume) about each product for the south region such as shown in FIG. 21.

Figure 22:
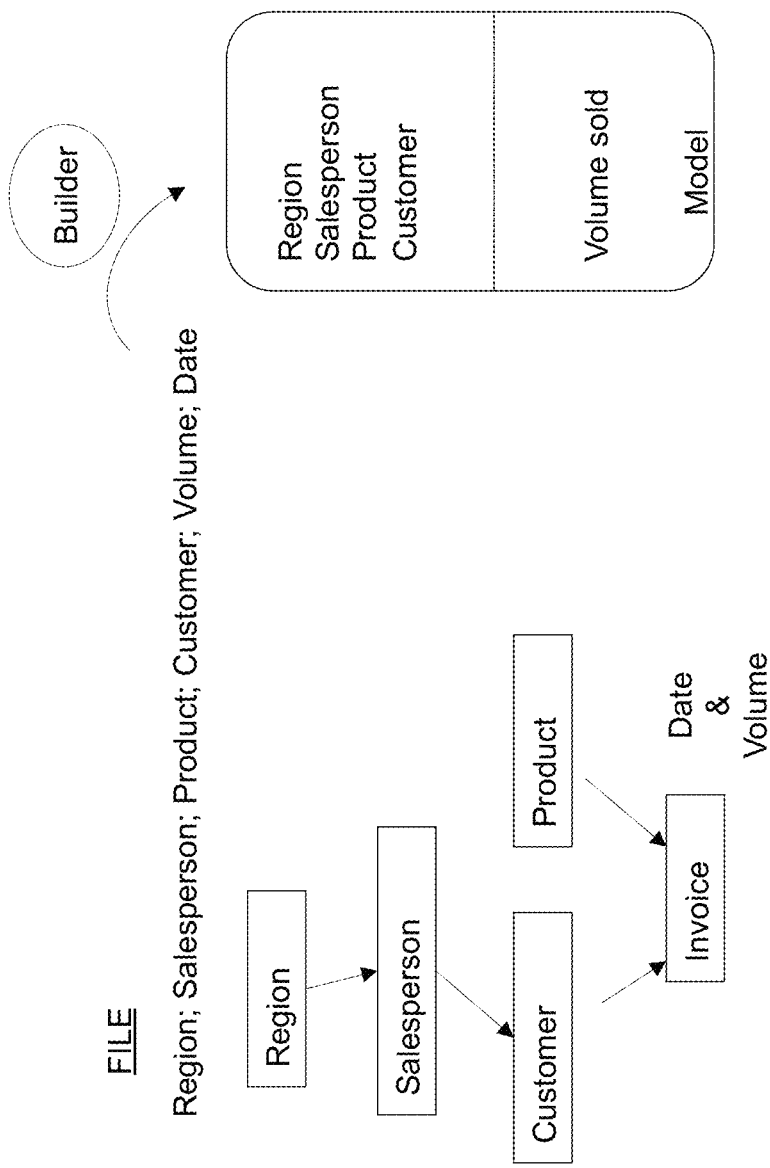

In an aspect, the system may be configured to store a flat file in which each record is self-defining as described elsewhere herein. FIG. 22 depicts an example of a portion of one entry in such a flat file. The file described herein may be configured to consolidate hierarchal or relational database functionality through the flattening process to provide information to the builder. The builder may be configured to use the flat file to create a model. The file may be configured to include information about the region, the salespersons, the products, and the number of customers. In an aspect, the information may be spread across multiple files. Further, the file may be configured to include information, such as "number of cases", "dollars", and the like. A single record in such as flat file may preserve complex links among data items. These links may include: the customer may be linked to a salesperson, which in turn may be linked to a region; the customer and product might be linked to an invoice (e.g. some value like dollars); the invoice described herein may contain things like date, dollar, volume, and the like of the product. Such information may be provided from one or more order entry systems, and the like.

Figure 23:
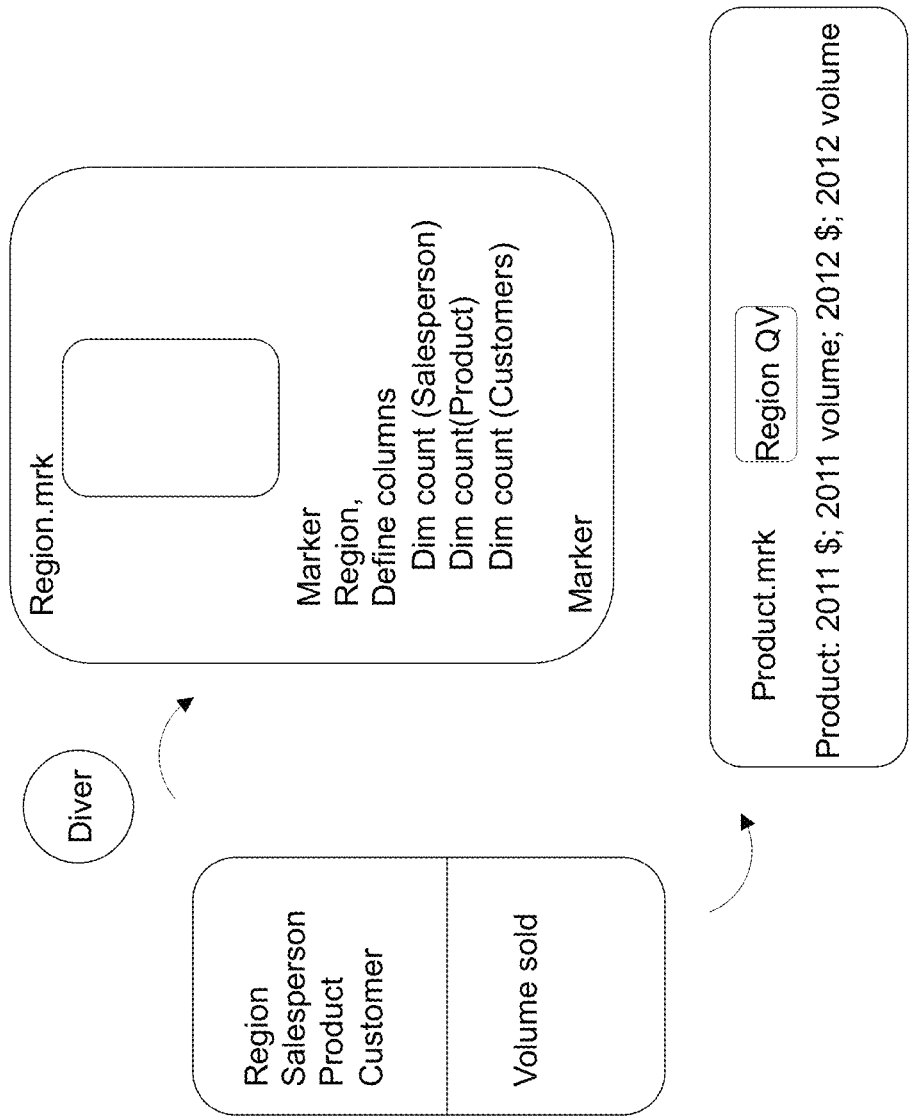

FIG. 23 depicts an example of using the diver to facilitate generating the guided pages shown in FIGS. 20 and 21, for example. The model created from the flat file by the builder may be opened in the diver. The diver described herein may be configured to use the model to create a marker. In an example, the user may dive into the region or may define some columns such as for example "add in a dimensional count of sales person", "add in a dimensional count of product", "add in dimensional count of customers", and the like. The result may be a marker which is a text file with attributes, such as: region, define columns, dimensional count of salesperson, dimensional count of product, dimensional count of customers, and the like.

Click actions may be defined in the DivePort to set up guided page navigation paths. A click action may have a type (e.g. for example tablet page) and a destination, which may be a page ID of a unique page. The destination page may also inherit some variables that are passed from the initiating page (e.g. region). In addition, click actions could point to web pages, documents, and other resources, including other tools and products described herein, including legacy general purpose data discovery tools such as DIVER and the like. Such functionality may be enabled through a click action pointing to a back-end server platform. Authentication may also be provided through click actions to facilitate access to secure resources. Click actions could also be parameterized based on aspects of a cell with which the click action is associated (e.g. the cell or row/column heading) such as a core dimension, dynamic dimension, data domain, and the like.

In DivePort, the user may create a page such as by using "add page" objects. The user may create a new portlet such as a "measures" portlet. Once the user creates the new portlet, the system may user allow the user to define and open up the marker. The order of operations in setting up successive guided pages that link to each other may include: defining the region page; defining the product detail page; going back to the region page and setting up the click actions. The click actions may include, for example, jumping from a product dimension count in the region page to the product detail page so that when a user selects a product dimension count in a region page he is directed to a product detail page.

While the above describes a user defining each page and the navigation guided paths among the pages, it is envisioned that a software application may be used to automatically generate the guided pages for the user. Such an application may automate the design process for related pages by generating a collection of matrixes (e.g. by region, by sales person, by customers, by products, and the like) and then automatically generating all the possible paths. The learning techniques described herein, as well as industry-expert guidance may be incorporated into generating specific guided page links from all of the possible paths.

Page generation and formation capabilities may be extended to the tablet so that information about rows and columns (e.g. for a column heading of "salesperson" a list of salespersons might be available on the tablet. Through association of one core dimension with a second core dimension, the software capabilities of the tablet may include generating guided pages based on existing guided pages. In an example of tablet page generation, presuming that branch sales data rolls up to a region's sales data, a page of region sales data can be generated by aggregating branch sales data for all branches in a region. In an alternate example, a guided page that contains data for a plurality of dimensions, portions of the page can be extracted to generate a page that is focused on one dimension.

Figure 24:
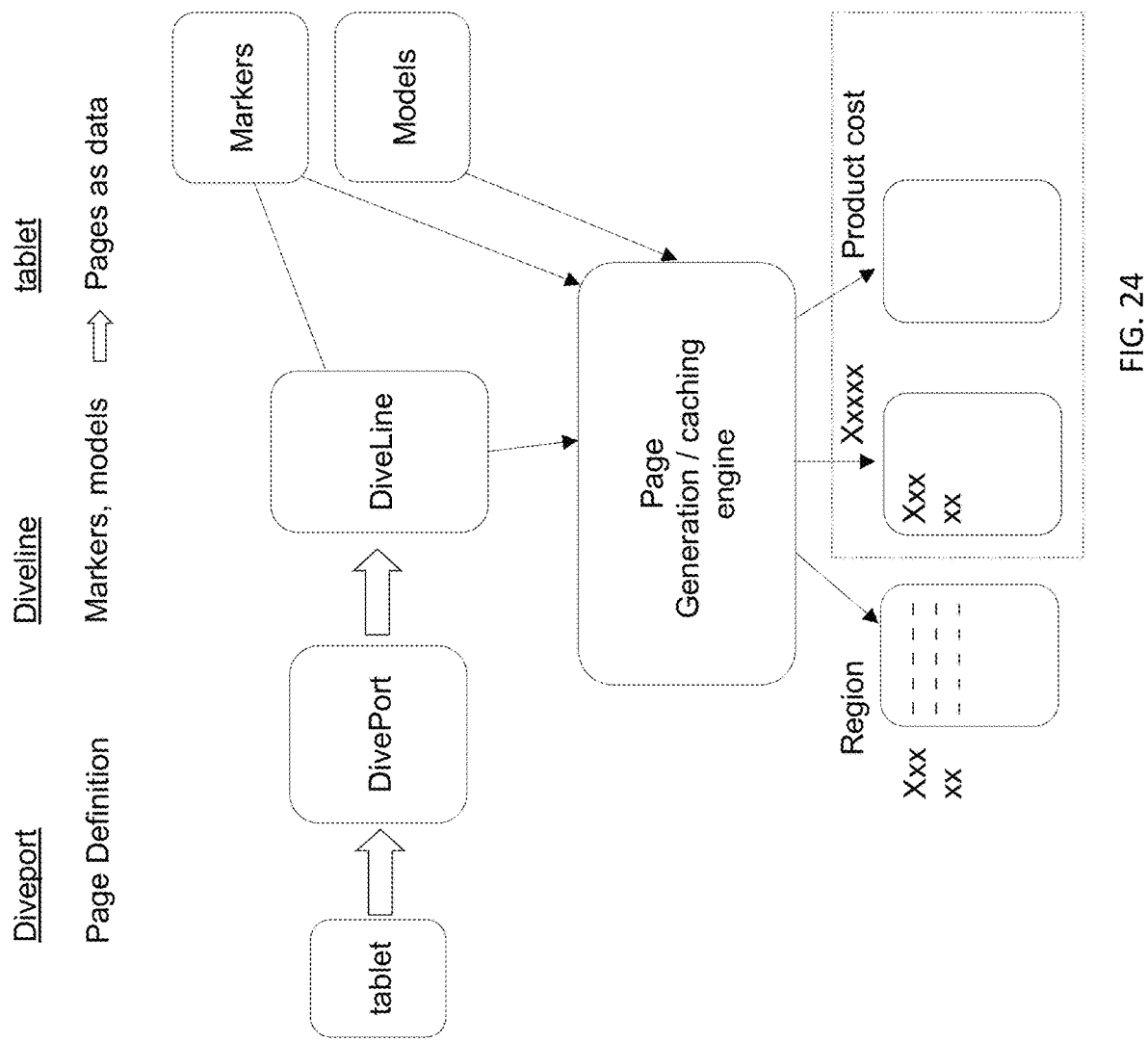

FIG. 24 depicts data flow among several tools and features described herein to facilitate generating guide pages for a guided page interface. An objective of the methods and systems described herein is to generally allow the user to click on an item in a page and view the next page without waiting for long page generation or download times. There may be a feature of the guided page user interface that enables updating the pages. When such a feature is activated for the first time, core technologies may be invoked to generate the pages for upload to the tablet device. Updating may include configuring a saved marker for each page, generating each page and caching the generated pages. Core technology components may include the DivePort for defining pages, DiveLine to support access to markers and the models, and the like. The result may be that the tablet or other user interface device may be configured to get the generated pages as data to be displayed.

In the example of FIG. 24, the tablet may connect to the DivePort, which in turn may connect to the DiveLine (e.g. to bring in the markers and the models). The DiveLine including the markers and the models may be connected to a page generation and caching engine. The page generation engine may be configured to generate and cache data. The cached data may include user-personalized information to present the user specific views on the tablet. The system may be configured to allocate a time stamp and a unique number for each generated page. Using the example of region and product described for FIGS. 15 through 17, one product page per region may be generated (e.g. product east, product west, product south, and product north). These individual region-specific pages may include amounts calculated on a region-specific basis.

Although the system may take time on the first update (e.g. 10 minutes, 20 minutes, or the like) because the system may open up markers and models to generate the pages, the page generation and caching engine maintains a list of cached pages that can significantly reduce recurring page update times. As new data is processed through updates to the source data (e.g. through a nightly production run), or as changes to the page definitions are made in the backend (e.g. by a systems analyst) because the system is configured to cache the pages, it is possible to determine which pages need to be generated based on the update and to generate these new pages even before the pages need to be uploaded to the tablet device. Further, the system may be configured to retrieve pre-calculated information and deliver updates to the tablet. In an aspect, the system may be configured to regenerate the pages in anticipation of the tablet connecting up again based on the data present on the system. The tablet may just need to download the pages and select among the pages based on the user requirement.

A collection of pages that may differ by one or more parameters (e.g. quickview variable) is indicated by the dotted lines in FIG. 24. In an example, if the product is based on region and sub-region or region and salesperson, then the system may be configured to generate pages by iterating through the combinations of the region and sales person. Therefore, such iterating may result in an exponential number of pages being generated. Consequently, some computation may occur at the user interface device (e.g. tablet) to select the pages, such as through filters or navigation. The tablet may use a select and pass technique (e.g. to send along "region" as the quickview parameter to define the marker such that the system may deliver the pages) for selecting a page for display from based on the quickview variable.

The page generation and caching engine may facilitate generation of a large number of pages in advance of any need for the pages. However, to improve responsiveness, the page generation and caching engine may execute a proprietary ETL language that allows for "last minute" ETL processing that is nonetheless extremely fast in generating a required page or set of pages. One example is in the generation of tabs, cross-tabs, multi-tabs and the like. These are quite complex and could involve a large number of pages. One solution is to embed the ETL for generating cross-tabs, multi-tabs and the like into the page generation and caching engine. As a result only common inherited variables need be processed ahead of time, thereby reducing the workload needed for complex solutions.

Although it is depicted in FIG. 24 that markers and models appear to be connected to the page generation engine directly, it is as likely that markers and models may go through DiveLine, DivePort, and the like to reach the page generation and caching engine.

Figure 25:
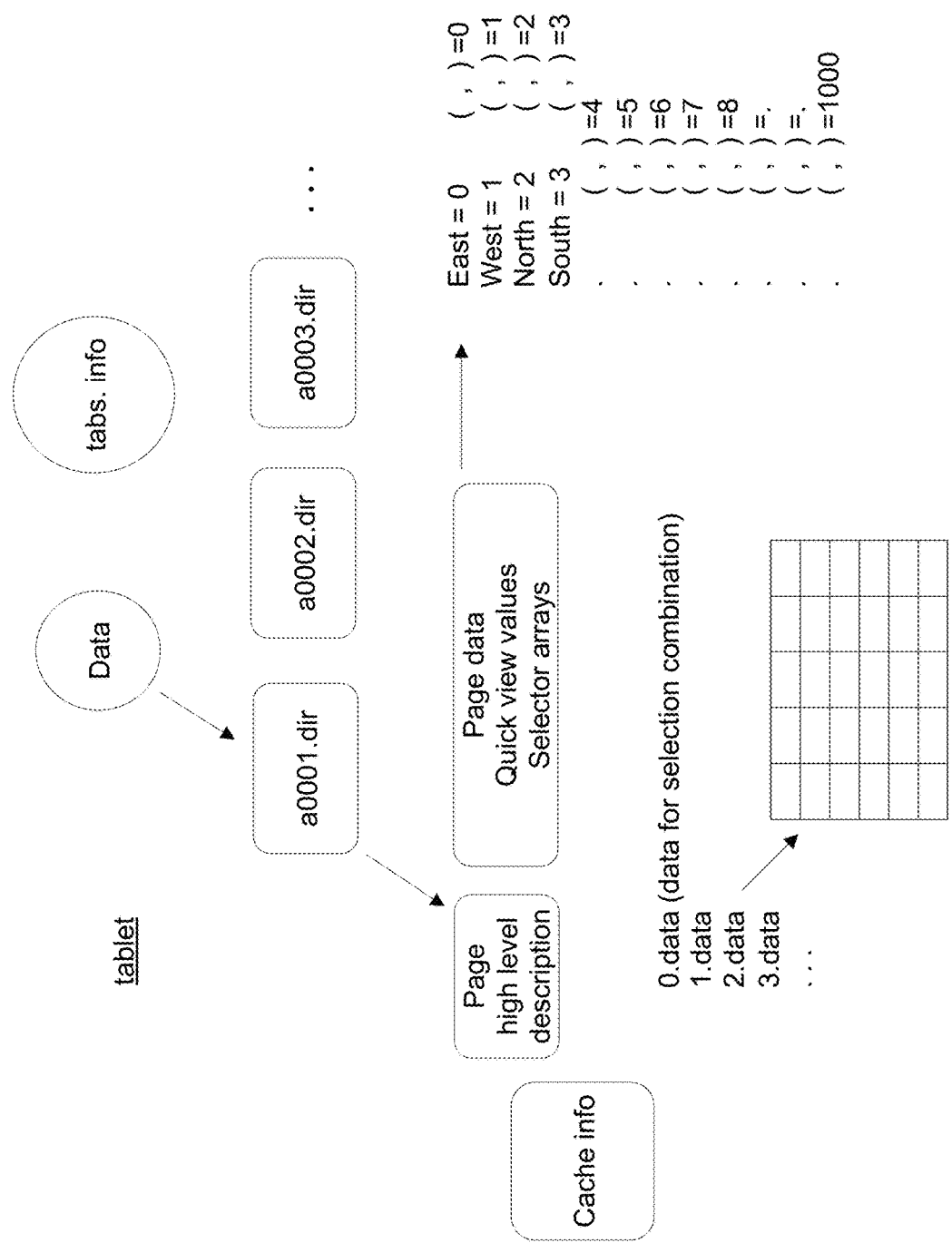
Figure 26:
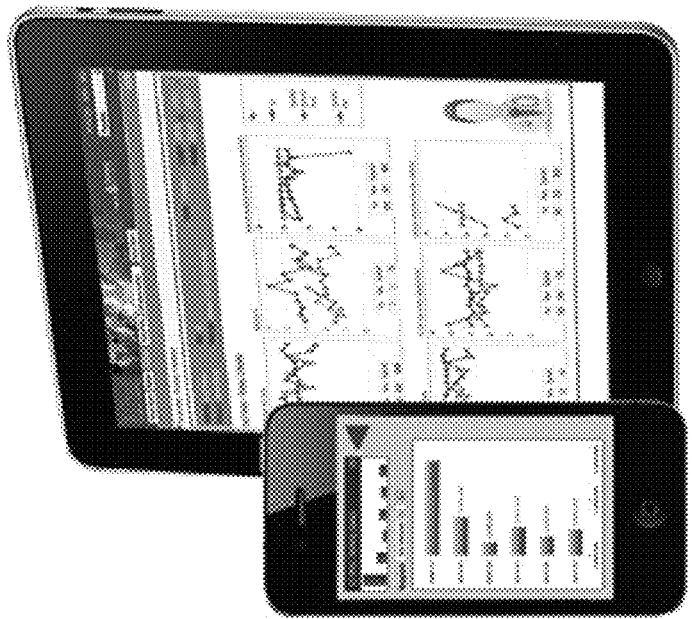
FIG. 26 depicts aspects related to a mobility module of a system for facilitating data discovery for operating a business via guided page navigation.

FIG. 25 shows an example of guided page storage for facilitating data discovery for operating a business via guided page navigation. The data storage on a tablet, server, laptop, and the like of guided pages and parameters may facilitate rapid and reliable access to guided pages.

The guided page storage may be configured to include a directory structure and a data directory. A directory for data may be included in the data directory for each page. In addition, information for sections menus (e.g. tabs.info or sections.info) is stored for ready access. Each page may be configured to include page information (e.g. high level description of the page) and page data structure (quickview values, selections array such as the page data array with things like: East=1; south=2 such that the system may find the right page within the data pages). The system may be configured to include the cache information and other page information such as data pages O.data (data for a page that you would see for that selection), 1.data, 2.data, and the like as shown in FIG. 24.

The cache information described herein may be useful for determining the pages that need to be updated such as when the guided pages are updated or when the tablet is connected to the Internet. Each page may be associated with a cache token that may be exchanged between a user interface device (e.g. a table) and a server to keep track of the pages on the tablet or other user interface device. The tokens may then be accessed when new data has been produced into the data models to determine which pages are impacted. Alternatively, a timestamp may be generated for each page so that pages generated before a particular update may be identified for being updated. In either case, a unique number may be created and associated with a particular view of the data to facilitate managing cached data to ensure accuracy, timely updates, and the like. Cache tokens may be attached to presentations, images, data tables, files, documents, and configuration information and other objects handled by the methods and systems disclosed herein. During a synchronize operation, the client and the server can send each other cache tokens to describe what data is available on each side. If the client is missing certain data that it or the server decides it needs to have, the server may send the client the data and the cache token that identifies it. The cache tokens can be used to identify stale information that needs to be updated during a synchronize operation. The cache tokens can also be used to identify fresh information that needs to be transferred during a synchronize operation, such as, for example, information entered by a user on a client device, photos or videos taken by a client device, or the like.

The system may include the ability to synchronize data on the server with data on the client. This allows data to be stored locally, and available even when the client is not connected on the network. By storing it locally, the data can be displayed quickly.

Guided Page Navigation

As described herein, a system for facilitating data discovery for operating a business via guided page navigation among and between dimensions and domains of data for operating the business may be used to facilitate gathering data from various sources. The source data ingestion or data collection may include data from customer data sources and external data sources. The customer data sources may include flat files, spreadsheets, data warehouse, SQL databases, variously formatted or sourced data, legacy systems, transactional systems, and Enterprise Resource Planning (ERP) systems. The external sources may include third party feeds, market or demo data. Data collection and ingestion are described elsewhere herein at least in regards to FIG. 35.

In addition, the system for facilitating data discovery for operating a business via guided page navigation may facilitate data integration using various tools and facilities of the system including a domain editor. Integrator scripts may enable the data integration that is part associated with the domain editor. A visual data integrator tool that may facilitate designing data integrator scripts. The integrator scripts may include various business rules, calculations, filtering, and the like that may be applied to the data. The output may be a de-normalized dataset that may be described as comprising a set of single records that are self-defining. The domain editor tool set may facilitate discovering data in the sources (e.g. in an SQL database). The domain editor may also facilitate extracting data from SQL and other databases, among other things.

An industry expert may typically explore source data associated with operating a business with the use of the domain editor to figure out what information may be available and tag or define the data during one or more exploration steps. This may involve defining data types/fields (e.g. "core data dimensions"), which may be the most important types of data for operating the business. An industry expert may ask questions about operating a business to help determine the core data dimensions. As noted above, the domain editor may include a visual data integrator tool for designing scripts for the data integrator.

The domain editor data integrator script engine uses a novel script based language. The script-based data integrator is configured to generate denormalized data sets that results in highly efficient "joining" of data from various types such as supplier data, product related data, sales person related data, and the like. The result is also accomplished at a much faster rate with the use of the data integrator than may be done with or in a relational database (RDB).

As large source data sets may be required to be processed quite frequently (e.g. nightly production runs) to have updated data available for users daily, the time and computing power required to process the data may require careful planning and management. One way that this may be done is that an industry-expert may provide guidance to the tools of such a production system. The expert may create business rules that can be used during the nightly production model update process to seek to achieve a balance between pre-calculated summaries (that may require computation during production) and raw data generation (that may require processing in near-real time in response to user selections).

The expert may need to tradeoff computing data during the production run versus having to compute data in near real-time when the user selects a data element which produces a new guided page of data. Also of important consideration, if production is not complete in the time allotted for a given production run, then the data from that production run may not be available to be used the next day. In addition, if production is adjusted so that it leaves much of the most popular data in non-summarized form, a tablet user interface may operate too slowly. Therefore, a tradeoff between computation during the production run and computation needed in real-time may be required so as to maintain an equitable balance. In general, source data may be organized into dimensions, summary fields, information fields, and the like.

Dimensions of Data

The dimensions of data associated with the data models described herein may be classified into core dimensions and dynamic dimensions. The number of core dimensions may be limited to 32 because as the number of core dimension increases, the processing time that may be required for data discovery may increase exponentially. This is due to a process that involves calculating summaries of all relevant data from all other core dimensions for each core dimension.

In some cases, large databases may be limited to 12 or fewer core dimensions to ensure that data will be completely processed in a predefined time period or a specific time period such as overnight. For example, the processing of the data may be complete between 1 AM to 6 AM, thereby enabling users to get updated data in the morning.

The dynamic dimensions may be significant because they may not increase production processing time while allowing for views of data from a dimension perspective in a way that may be similar to how data for core dimensions may be viewed. In some cases, the dynamic dimensions may be viewed by requiring some additional processing at the front end when the user wants to view the data.

Another type of dimension is a central dimension. A central dimension does not directly relate to the organization of data for data modeling as described above. Rather, a central dimension is a user-centric concept that descriptively represents a higher level or 'gathering' of data into an organization that is familiar to a user. Generally the term "central dimension" or "central data dimension" used herein refers to a logical grouping of data, such as a plurality of core dimensions, that can be represented to a user as a dimension around which other dimension and data domains can be clustered. This may be presented to the user as a high-level tab or high-level entry in a hierarchy, although other such representations are possible. Therefore, a central dimension may be a core dimension; however a central dimension may represent a logical grouping of more than one core dimension. Also, a central dimension may indicate a logical grouping of data that represents a subset of data associated with a core dimension.

Summary Fields

Also of important consideration are the summary fields that may be tagged as fields that may be summarized or fields that may include data that may be put into a summarized format for rapid access during guided page generation.

Information Fields

Information fields are also important considerations at least because data in information fields may be non-summarizable. Information field examples include customer attributes, such as customer phone number/information, category, region, and other similar information related to a customer.

The system for facilitating data discovery for operating a business via guided page navigation may facilitate using various tools and facilities of the system to identify and organize source data into distinct data domains. The organization of data into these distinct data domains may be a part of the model building process that may result in distinct data models for each distinct data domain. In particular, a separate data model may be built by for each distinct data domain. Therefore, there may be more than one model, which may help improve access speed within and across the data domains.

The system for facilitating data discovery for operating a business via guided page navigation may facilitate creating and applying business rules to the models. Tools such as diver, ProDiver, and the like to access or view the data domain models may use the business rules. Access to the distinct data domains may be further guided by system capabilities including markers, diveplans, and the like. Dive plans may be used to save a business-rules-based view of the models and in general have been described elsewhere herein at least in regards to FIG. 41. A marker may be used to attach rules to the data and to save intermediate results and has been described elsewhere herein with reference to FIGS. 27, 40, and 41.

The system for facilitating data discovery for operating a business via guided page navigation may include a tablet application (app). The system may include DivePort functionality described herein at least with reference to FIG. 41 to help with the delivery of distinct domain data from the data models to a tablet page generation subsystem. In particular a tablet page generation subsystem may include or connect with a page generation engine may be used to generate/adjust pages suitable for tablet or other touchscreen device presentation. In addition to page generation, a page generation subsystem may consider and factor in location of data for generation of the pages, such as tablet storage versus server storage of data Has the data for generation of the tablet-compatible page been cached (e.g. in the tablet device) to allow off-line page generation and navigation?

Navigation within and among the distinct data domains may be impacted by industry expert knowledge, such as in the form of various configurations of the system including dimensions, summary fields, page points of entry, pathways to areas of interest from those points of entry, selection of data types to be presented in guided pages, and the like.

The system for facilitating data discovery for operating a business via guided page navigation may include solutions for various industries including, without exception: healthcare-specific apps for various roles in healthcare for example nurse data, intake data, ER tech, and the like; winery-specific apps for suppliers, distributors, retailers, and the like; distribution-specific apps for products such as liquor, wine, automotive parts, financial services, or any other product or service.

The system for facilitating data discovery for operating a business via guided page navigation may provide benefits through tablet-based dashboards that may facilitate visibility into key business processes thereby replacing "gut-feel" decisions with "fact-based" decisions that can be based on 'one version of the truth' rather than on each user's own spreadsheet view. Additionally it may facilitate greater timeliness and accuracy in aligning business activity with company goals/strategy.

A system for facilitating data discovery for operating a business via guided page navigation may further provide the benefit of navigating through distinct data domains that are clustered around and across central dimensions in a way that may give the sense of being intuitive to a user. The user may perceive the possession of an ability to 'freely' navigate about the data, even though each selectable cell or row or column heading may lead the user to another contextually relevant guided page.

In addition to accessing data and summaries, the methods and systems described herein may also provide access to documentation, videos, manuals, sell sheets, images of hard copy documents including purchase orders, shipping documents, images of product, and the like using similar guided navigation techniques. Therefore, access to documentation may be handled logically in a very similar way to assess to the data described herein. In an example, the documentation may be linked document by document to the data, and in particular to the core data dimensions so that each document may be accessed in a proper business context.

For example, if a user reviews sales figures for a specific brand of product such as a wine, the user may have access to invoices for the sales of that wine. The user may also have access to images of the wine bottle label, a marketing sheet provided by the wine maker, and the like. In this context, the user may not likely have direct access to the invoices for product variants such as scotch or other different products because these documents would not be contextually relevant to the sales figures of the specific brand of the wine. Therefore, the system for facilitating data discovery for operating a business via guided page navigation may be used by an organization where document access requirements may be different for different personnel depending upon role business objective, project, requirement, and the like. The system for facilitating data discovery for operating a business via guided page navigation may be configured so that a single application may be able to cater to different access needs of different users. Access of different users may be limited by a user's authentication level.

The system described herein may include a complete document management system that may be organized in a variety of ways. In addition, the complete document management system may be organized by industry for example wine industry, liquor industry, automotive parts industry, healthcare industry, and the like. The complete document management system may be organized by activities or roles of a specific user for example, sales, support, planning, regulatory activities, and the like. The complete document management system may be organized based on company specific requirements for example, business plans, goals, procedures, contacts, invoices. For example, the requirements may include user interest at selecting bill data, orders or user interest in order data, product images or labels or user interest in selecting product data. The complete document management system may be organized based on product placement such as store images, signage, floor plan and the like.

The system for facilitating data discovery for operating a business via guided page navigation may be configured so that the system may link up access permissions to other contextually relevant data and automatically grant access to the data. The contextual relevancy may be different based on industry requirements and may be configured by an expert or contextual relevancy using markers, diveplans, and the like.

In an example where the tablet based version of the system is used, a user interface may be included through which the user may select any element in a matrix (including a row or heading column) and the next screen may appear as a particular destination that will include a view of data that is related to the selected element. Such an example is described below.

A user may choose a dimension to present in a left column (row headings) and the user may have an option to switch the choice to a different dimension. Each dimension value (in the left column) may be selected to view details of that dimension (e.g. selecting a "sales person" dimension may present a list of sales persons in a "sales person" column). Column headers may represent summary fields, time ranges, and the like as described above. The values in each cell may represent a summary of the selected data (e.g. sales) for each entry (dimension value) shown in the left hand column (row headers). The cells in the example below may be filled with summary data values.

| Dimension | Summary 1 | Summary 2 | Summary 3 | Summary 4 | Summary 5 |
|---|---|---|---|---|---|
| Dim Val (domain 1) | Summary 1 of domain 1 | | | | |
| Domain 2 | | Summary 2 of domain 2 | | | |
| Domain 3 | Summary 1 of domain 3 | | | | |

The tablet solution may allow selection of a cell value which points to a data structure that defines the next table of data to display. This next table may be related to the row/column heading of the selected cell and may be filtered thereby to present the subset of the type of page. The industry expertise/knowledge/guidance as stated above may be applied in determining summaries to be present along the column headings and new summaries to be present when a cell is selected, thereby circumventing a need for presenting menus or a selection of destinations when a value is selected. The industry expertise may be used to generate the summaries and to determine the summaries and new dimensions to be presented in the next page view.

In a further example, an executive may want to start his day with "news" about details of a business. The news may include a new product, new presentation, or the like information. The executive may want to view and download these new items. The executive may want to look at data (e.g. in a tabular view) to navigate among a set of guided pages that provide key high-level summary data. The executive may want to get a list of things to do (the list maybe driven by the data), or people to see (again driven by the data). The executive may want to be able to enter new information (e.g. a contact note). This function may be carried out by a single tablet-based application of the system for facilitating data discovery for operating a business via guided page navigation.

Workflow may be an important aspect of the information that is displayed to the user in each successive screen. As may be noted in the executive example above, the executive's workflow at the start of a day may involve several non-data items that are mostly driven off of the data. For example, if the executive views sales data is considered and it shows an unexpectedly sharp change, the executive may want to schedule a conference with the director in charge of the unit that experienced the change. If the summary data indicates that the quarterly sales goals may be exceeded, the executive may want to discuss sales goals for the next quarter. Similarly, various other scenarios may be possible.

Therefore, although guided page navigation may be keying off of the technology and the expertise off of the industry, such navigation may also need to incorporate and key off of the workflow. For example, it may consider what the users may need to do in order to carry out their daily activities and may combine the results in a set of guided pages.

The system and methods described herein for facilitating data discovery for operating a business via guided page navigation may be useful in a variety of applications including product management or operations, or distribution or retailing such as for example winery management, hospital operations, wine or liquor distributor, retail store, monitoring sales progress or for promotional activities, presentations and the like.

Exemplary markets or environment may include wineries, healthcare, liquor distribution, automotive parts, financial services, and the like. Some of the exemplary deployment scenarios in various exemplary environments are presented below.

In an exemplary scenario, sales representatives may visit to a retail store. The system for facilitating data discovery for operating a business via guided page navigation may be used by the sales representatives for monitoring sales progress or for promotional activities, and the like in a retail store. For example, the sales representatives may track down available inventory at a customer request for a particular commodity or may fetch discount or promotional offer data for customers using the application.

In an exemplary scenario, suppliers may analyze sales data. The system for facilitating data discovery for operating a business via guided page navigation may be used by the suppliers or sales experts of an organization for tracking and monitoring sales data. This may be useful in checking company progress and may serve as an indicator that may be used in sales forecasting, inventory management, production forecasting and the like activities. The tablet may be configured to be linked to company forecasting data that may get updated on its own based on data fed into the system for facilitating data discovery for operating a business via guided page navigation.

An exemplary scenario may include operating a professional services business. In such cases, the system for facilitating data discovery for operating a business via guided page navigation may be used by such as law firms, consulting firms for project management, sales activity, team work sharing, and the like.

In an example, a data analyst may use the system for facilitating data discovery for operating a business via guided page navigation in extracting reports, uploading results and may fetch related data contextually relevant to a single record thereby increasing efficiency and reducing time required for analysis.

Figure 31:
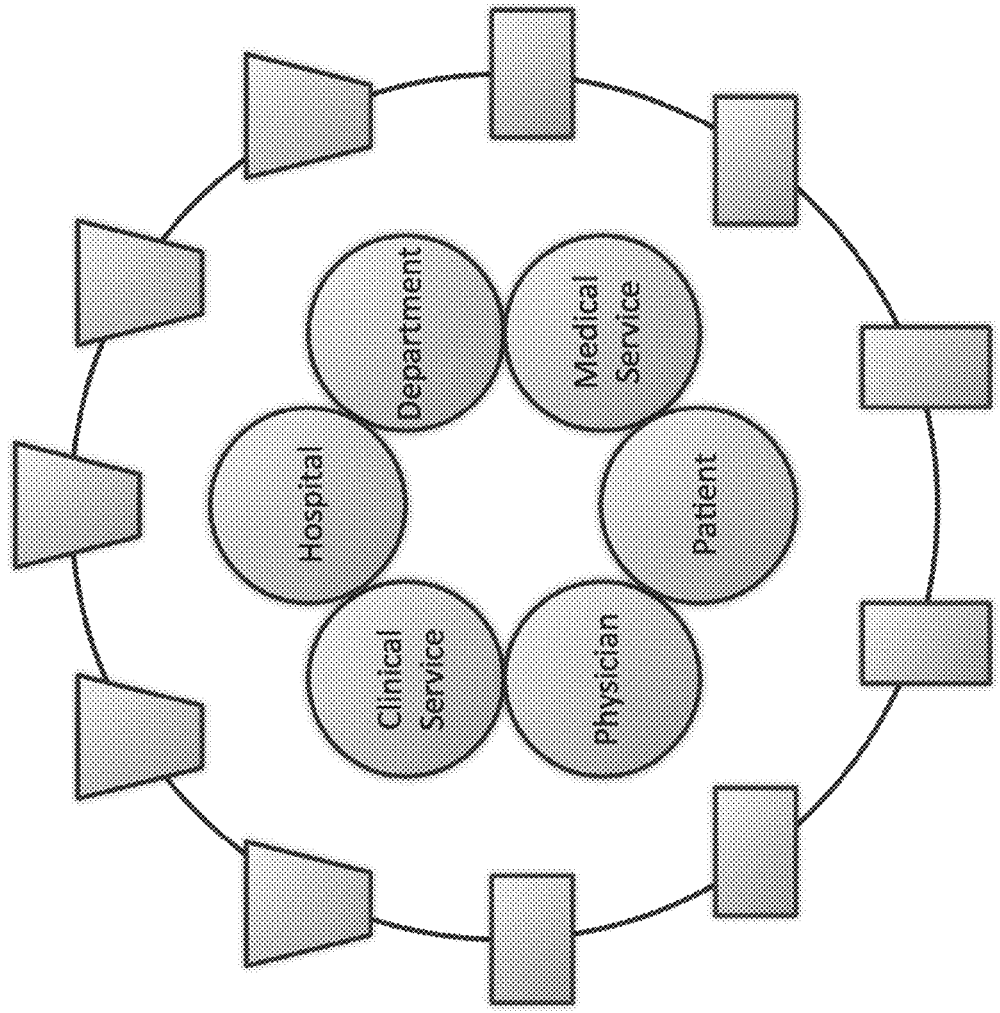
Figure 32:
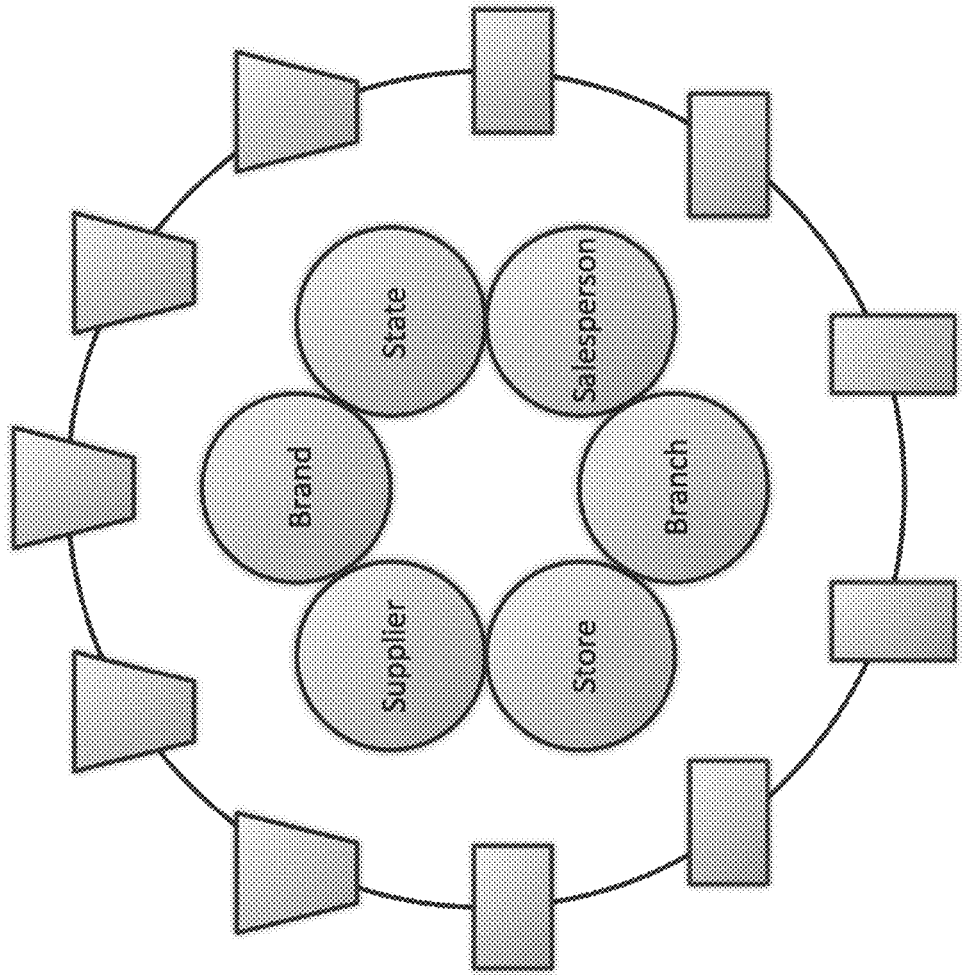
Figure 33:
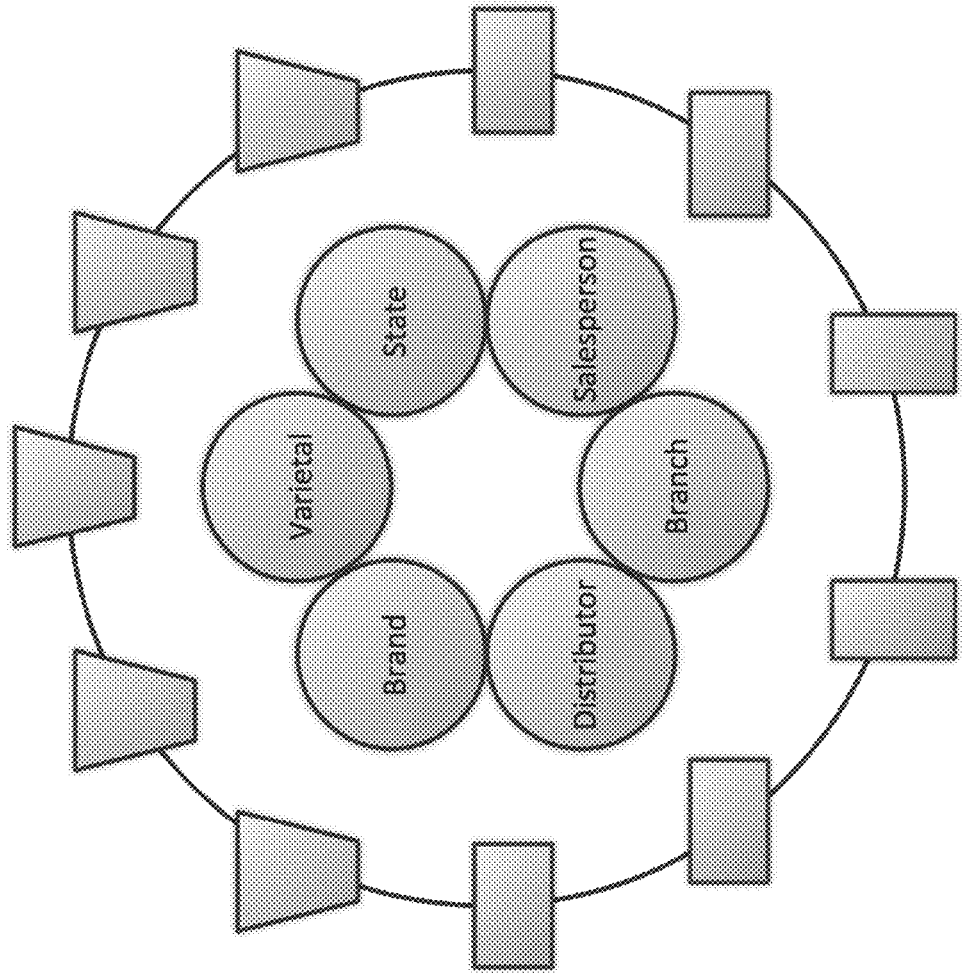

FIG. 31 depict aspects related to mobility module of the system for facilitating data discovery for operating a business via guided page navigation. The system may be configured to allow the user to access the model data from anywhere (e.g. via the diver). A native tablet-type device application may be used to allow the user such access from anywhere by including some data (e.g. a canister model) on the tablet device. In an example, the mobility module may leverage core diver infrastructure to access the system from anywhere. The system may allow off-line (disconnected) use to the user. For example, the user may access the data off-line without getting connected to the network. The mobility module may allow access to the critical Key Performance Indicators (KPIs) from anywhere or anytime. A DivePort facility may facilitate easy design of the mobile views and then publish views for mobile devices such as smart phone, tablets, and the like.

In an example, NetDiver module of a system may be used to facilitate data discovery for operating a business via guided page navigation. The NetDiver module may provide browser-based zero-footprint ad hoc analytics interface. The NetDiver module described herein is provided for general and advanced users. The NetDiver module may be configured to allow access and analyze data via the Web. The NetDiver module may reside on a Web app server and may act as a bridge between user's web browser and DI models. The NetDiver module enables a user to dive, focus, summarize, create calculators, save work, and the like.

Further to an example depicted in FIG. 31, budget, planning, and forecasting module of the system may be provided for facilitating data discovery for operating a business via guided page navigation. The budget, planning, and forecasting module may include head planner leads, collaborative effort aggregating user's own slices of the data. The budget, planning, and forecasting module may include flexible toolkit approach such as to expect a custom planning development cycle to meet business process requests. The budget, planning, and forecasting module may include an integrated solution that sources final plan through diver while using DiveLine for access control and role-based security. The budget, planning, and forecasting module may include planner uses of a component interface (e.g. Console, Toolbar) to edit the administration capabilities.

In an example, a cell diver module of the system may be provided for facilitating data discovery for operating a business via guided page navigation. The cell diver module may act such as an add-in to an MS Excel® file. The cell diver module may allow diving from MS excel® based console. The cell diver module may pull data directly from DiveLine into an Excel file. The cell diver module may allow opening models, markers, DivePlans, Tunnel files, and the like. The cell diver module may allow to dive further into data and apply MS Excel® based functions.

The ProDiver or diver module of the system may facilitate data discovery for operating a business via guided page navigation.

In an example, various aspects related to technology components such as DivePort of the system may facilitate data discovery for operating a business via guided page navigation.

In an example, dashboards module of the system may be provided for facilitating data discovery for operating a business via guided page navigation.

In an example, a scorecard module of the system may be provided for facilitating data discovery for operating a business via guided page navigation.

In an example, an indicator module of the system may be provided for facilitating data discovery for operating a business via guided page navigation.

In an example, a compound indicator module of the system may be provided for facilitating data discovery for operating a business via guided page navigation.

In an example, a measure module of the system may be provided for facilitating data discovery for operating a business via guided page navigation.

In an example, maps module of the system may be provided for facilitating data discovery for operating a business via guided page navigation.

In an example, a production module of the system may be provided for facilitating data discovery for operating a business via guided page navigation.

Overview Figure

Figure 27:
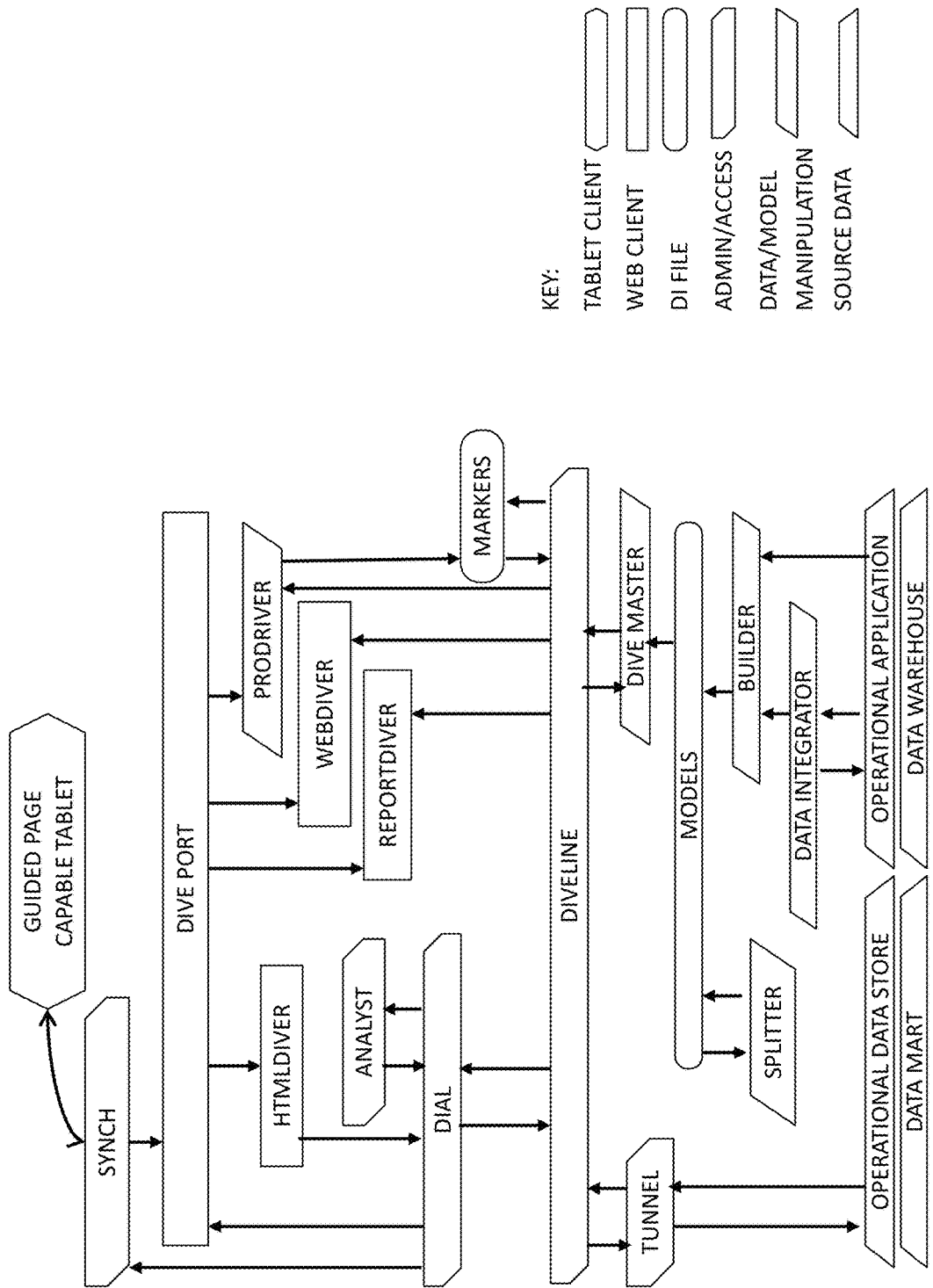
FIG. 27 depicts an overview of core technologies described herein.

FIG. 27 describes structural components of a system for facilitating data discovery for operating a business via guided page navigation. The components presented in FIG. 27 may provide functionality related to data ingestion, integration, summarization, analysis, access, and user level presentation. These components may be described herein and may include Builder, Diver, Marker, Data Integrator, DiveLine, ProDiver, WebDiver, Report Diver, Model Splitter (Personalized Models), Detail Builder (Detail Row Access), DI-Broadcast and Analyst (Delivery Automation), Dimensional Insight Access Language (DIAL), Diveport, htmlDiver, Tunnel such as to access back to a data warehouse, Page Generation Engine, Canister Models, and the like.

Page Types that Support Information Leaping

Figure 29:
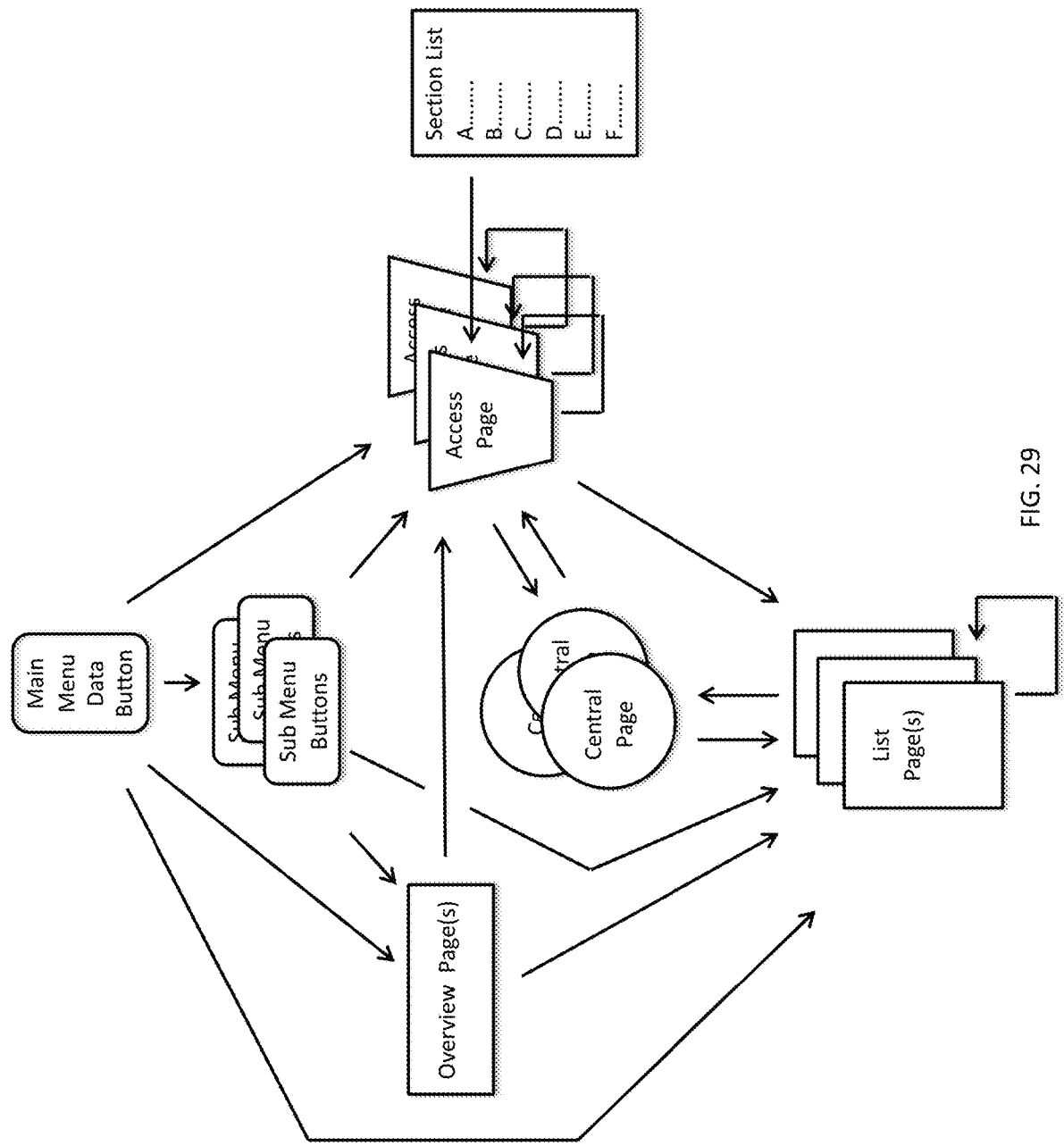

Page types that may facilitate information leaping in presentation type environments may include access pages, central pages, overview page, list pages, and others. Page types are depicted in FIGS. 28 through 34. FIG. 28 depicts different page types. FIG. 29 depicts different page types that facilitate leaping and how they relate to each other. FIGS. 30-33 depict examples of different page types for various industries. FIG. 34 depicts a central page for a "State" dimension.

Access pages may alternatively be referred to as "entry" pages that may be the first page or first few pages to be displayed in response to a user selecting a menu item. While access pages may include selectable data items (for guided page navigation) access through the selectable data items may be done via a "central page" that is described herein after. Access pages may provide basic viewing capabilities including sorting, and the like. Each menu item may be linked to an access page and additional access pages may be linked through selectable items on an access page. Each central dimension of the dataset that is being explored through the information leaping capabilities described herein may be accessed via one or more access pages. Access pages may facilitate access to other page types such as central pages, list pages, and overview pages. In an example, an access page may provide direct access to a central page type and/or to an overview page type and indirect access to a list page type as depicted in FIG. 29.

Figure 30:
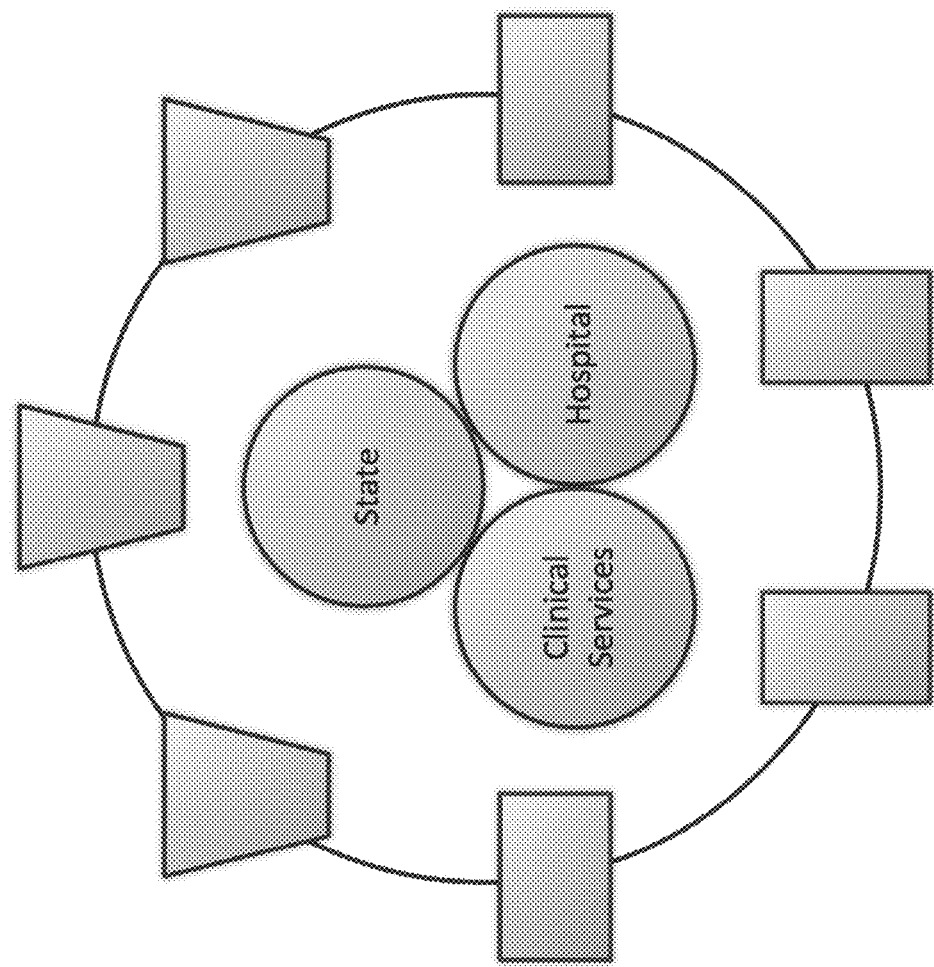

A second page type is a central page that may be associated with a central dimension as described herein. Generally a central page is accessed through an access page when a central dimension is selected on the access page. In a dataset about U.S. states, the data item "state" would be a central dimension. Therefore, clicking on a state name (e.g. Georgia) or the like in an access page may leap to a central page based on the state central dimension value Georgia. Within the Georgia central page attributes about the item may be displayed (number of hospitals, demographics, health care data, infant mortality, education, etc.). By selecting attribute item, such as hospitals on the Georgia central page, a new central page for the central dimension Hospitals might be presented. An exemplary central page is depicted in FIG. 30. Central pages may facilitate access to other page types, such as access, list, and overview page types. In an example depicted in FIG. 29, a central page may provide direct access to access type pages and list type pages while providing indirect access to overview type pages.

A third page type is a list page that may show details of a selected item. In an example, selecting a count of hospitals in the Georgia central page might leap to information about hospitals and may result in a list of all of the hospitals in the state of Georgia. List pages may provide access to other pages, such as access, central and overview page types. In an example depicted in FIG. 29, a list page may provide direct access to central and overview page types while providing indirect access to access type pages.

A fourth page type is an overview page that may be used to combine top-level information from different business areas to provide an overview and entry to other business information. An overview page may be accessed from a main menu. An overview type page may facilitate access to other page types, such as access type pages, list type pages, and central type pages. In an example depicted in FIG. 29, an overview page type may provide direct access to a list page type and an access page time while providing indirect access to a central page type.

An Example of Information Leaping

In an example of information leaping, a list page of states and hospitals per state might be displayed. Selecting a count of hospitals in a specific state (e.g. select 95 next to Alabama) may display the 95 hospital names along with various data items for each hospital. One such various data item might be in the category of gross patient revenue. Selecting this item might provide sort options for the entries in this item (sort the list of hospital names by gross patient revenue). The result is an ordered list of the 95 hospital names and other data (e.g. location) based on gross patient revenue. Selecting a location (e.g. city name) from this list may result in an information leap from hospital specific data to location specific data. This changed data domain may show a count of clinical services available in the selected location. By selecting this count, a listing of the clinical services may be presented along with a count of hospitals that offer each clinical service. The methods and systems described herein that enable information leaping may facilitate such leaping from state to hospital to location to clinical services, and the like with a minimum of selections.

Data Sources

FIG. 35 depicts aspects related to data collection and a data collection module of a system for facilitating data discovery for operating a business via guided page navigation. Data collection may include data sources such as for example, but not limited to, legacy systems, ERP systems, spreadsheets, data warehouses, suppliers, distributors, government such as local, state, federal, and the like such as shown in FIG. 35. Data collection may further consider and support various types of information such as product information, state laws and regulations, federal laws and regulations, local laws and regulations, customer information, purchase history, news, industry guidelines, business plans, customer information such as name, address, city, zip, consumes liquor on or off premises, purchase history, and the like.

The data sources may further include product information. The product information may be obtained from any of the data sources, such as a supplier or distributor product database that may include the information about a distributor of a product. Suppliers constantly develop new product and distributors constantly update their supply of products. Therefore, the product information may be obtained from one or more feeds of a supplier (e.g. creator of the product), distributor, or the like. The product information may for example include UPC codes, PAN number of the supplier, alcohol content, color, sell sheets, videos, marketing materials, and the like. Therefore, solutions described herein for facilitating data discovery for operating a business via guided page navigation may address diverse and detailed product information.

The sales chain of liquor and wine is complex primarily due to complying with regulations for distribution of liquor, beer, and wine. For example, a winery or distillery typically sells to a supplier who may aggregate products from a wide range of small wineries. The supplier primarily sells to a distributor, who sells to a retailer who further sells to a retail consumer. Solutions for data discovery for operating a business via guided page navigation may include this tiered system. Therefore, solutions for data discovery for operating a business via guided page navigation for suppliers may focus on different data (different dimensions of the data) than solutions for distributors, retailers, and the like.

The data sources may further include supplier information. For example, the winery or distillery may be a supplier or can use a second part supplier to sell its products. Using the example above such a supplier sells to a distributor; the distributor sells to a retailer; the retailer sells to a customer who may be a restaurant (on-site) or a consumer (take home). Therefore, the supplier information or data described herein may include data from the winery and/or from the second part supplier. As noted above, this information may include product attributes (such as for example alcohol content of each product, color, and the like). However, it may also include sell sheets (marketable, positioning of the products, videos, differentiators from other products or competitors, displays, incentive items, and the like) and the like. The supplier information may further include vintage, beer shelf life, and the like. The supplier information described herein may further include cost of the product (such as deals volume based business, tiered pricing, and the like). For example, if a product or set of products is lagging in sales, a supplier may provide compensation to the distributor for each product that is distributed over a period of time. The supplier information may further include discount participation for sale to the customers that may be volume based (from the customer's perspective) or may be based on a pure discount level. The supplier information may further include product sales history, supplier sales history, and the like. In an example, industry consolidation results in distributors or suppliers merging or otherwise changing in a variety of ways including changing distributors. Such changes may impact a customer of a supplier or distributor so the supplier may provide information that helps the customer in gauging the business for a new supplier to set expectations. In some situations, sales may be tracked and provided as sales history for a new supplier. The suppliers may target or fix goals across most of the products for sales over a time frame (goals or quotas) that may be distributed down to the sales person level. Therefore, solutions for data discovery for operating a business via guided page navigation may support functionality such as to identify if a sales person meets these quotas or goals.

Further, the supplier information may include wholesale price or cost information for the product (such as recommended prices, tiered pricing, and the like). The suppliers may tend to offer financial support such as to generate higher sales. Such support may come in the way of sales support, financial incentives (e.g. give a distributor 50 cents per case cash in a bank for each case that are sold) and the like. A solution for data discovery for operating a business via guided page navigation for suppliers may focus on financial support return on investment that is meant to generate higher sales. In an aspect, there may be a notion of discount participation that impacts pricing that a supplier can expect to charge. For example, if a customer buys ten products, then the customer may have to pay a price P1 per product, while if the customer buys 100 such products, then the cost may be discounted and the customer may for example have to pay P2 per product, which is almost assuredly less than price P1. Similarly, for even higher volume purchases, the customer may get an even steeper discount. In an aspect, there may also be another notion of receiving some financial support based on the level of discount. For example if a customer sells at discount level X, the customer may receive an incentive, and if the customer sells at discount level 2X, then the customer may receive greater incentive. In an aspect, the solution for data discovery for operating a business via guided page navigation for the supplier may focus on a discount participation dimension of the data.

The data sources may further include sales person information. The solutions for data discovery for operating a business via guided page navigation for a sales person may focus or depend on the nature and type of customers associated with a specific sales person. For example, the sales person of a supplier may sell to distributors or directly to end buyers (e.g. wine collectors, large retailers, and the like). The sales person of a distributor may sell to retailers (e.g., restaurants, hotel chains, package stores, grocery stores, and the like). The sales person of a retailer may sell to consumers or entities such as businesses, individuals, and the like. In this aspect, the term "customer" described herein, may have different meanings for a supplier, a distributor, a retailer, and the like. The distributor or supplier may have its own database of files that may control the salesperson team structure. The solutions for data discovery for operating a business via guided page navigation for any portion of the wine and liquor sales chain (supplier, distributor, retailer, and the like) may focus on being able to look at any level of hierarchy and dive down all the way to an individual salesperson.

Sales person data may be characterized by at least two data elements such as customer and product type (e.g. wine or liquor). Sales person data may also be tied to the customer and/or the sales person. For example, each customer may be assigned at least two salespersons (such as for example wine sales person and liquor sales person). Alternatively, a distributor may have a dedicated sales force selling a particular supplier's products. This may happen when the suppliers are quite large. The result may be that a customer may be associated with both a dedicated sales team and one or two other sales persons for other products all from the same distributor. For example, there may be a regular wine salesperson and a special supplier wine salesperson such that the customer may be associated with regular liquor salesperson, regular wine salesperson, and regular supplier salesperson. Therefore, solutions for data discovery for operating a business via guided page navigation may include support for complex salesperson-customer arrangements.

The data sources may further include distributor data, which may be similar to a supplier data (such as for example, the distributors may have their own salesperson that may be selling to the retailers, and the like). In addition, the distributor may also deal with an inventory that the distributor may need to manage (such as product mix, inventory, stock management, lead time for ordering, future sales plans, and the like). Therefore, solutions for data discovery for operating a business via guided page navigation for the distributors may therefore be focused on inventory management considerations.

As noted above, pricing may be a bit complex for distributors due to customer pricing matrix requirements. In an example, a customer pays a defined price PO for a product when purchased in a particular quantity, and another customer may pay price P2 for the same product at the same quantity. Likewise, a customer's store in state S1 may purchase product at a different price than that same customer's store in state S2 due to a variety of factors, such as state-by-state distribution cost differences, state imposed minimum purchase fees, and the like). The solutions for data discovery for operating a business via guided page navigation for the distributors may focus on managing the customer pricing matrix considerations. One such consideration is to comply with state regulations, a sale by a supplier to an end consumer may need to be transacted through a distributor (as if the distributor were buying the product from the supplier and then selling it to the end consumer) even though the product merely gets received and then forwarded by the distributor. Alternatively, a distributor may buy the product from the supplier, and the product may be shipped to a warehouse, held there, and then sold in a separate transaction or transactions.

In an aspect, the data sources may also include retail customer data and consumer data. The access to the data sources described herein may be by using an Open Database Connectivity (ODBC) database and the like. A non-standard file may be accessed by using an FTP server (such as FTP data source). The database may include flat files or text, MS Excel® files or MS Access® files and the like.

FIG. 36 shows an example of a domain editor or a data integrator of the system for facilitating data discovery for operating a business via guided page navigation output. The figure describes a sample input data that may be used as an input to a builder program. The input to the builder program may be modeled as a set of flat files. Each flat file 50, 52 may consist of a number of records 48, each of which may describe a single entity. The records 48 may be divided up into different fields 48, which may represent different attributes of the entity. Multiple files may be related by using a common field such as to perform a standard relational database join operation to produce a single logical file, with one record for each entity.

The system for facilitating data discovery for operating a business via guided page navigation may be used to describe the fields in the input files, and assign a type to each of the fields. The data dictionary may contain three pieces of information about each field: a field name 40, a field type 42, and an associated dimension 44. The field name 40 may be used to identify the information contained in the field. The field type 42 may identify the field as either a dimension, a summary field, or a non-summary field. The dimension field may be a search key along which the data that may be organized and summarized. The summary field may be a numeric quantity that provides useful information when summed and averaged. The non-summary field may contain information that may be associated with each input record, or with a value of the dimension field. The non-summary field may be a field that may not be important enough to be a dimension field, or a field that may directly be related to an existing dimension field. The associated dimension 44 may be used for non-summary fields to identify the dimension field that the information is associated with or "Detail" if the non-summary information is unique for each input record.

The example in FIG. 36 illustrates a personnel database, where each record 48 in an employee file 50 represents an employee of a company. The input files may consist of the employee file 50, which may contain data about each employee, and the department file 52, which may contain information about the different departments. The department file 52 may be joined to the employee file 50 using a common department Identifier (ID) field. The data dictionary may describe various fields of the input files, and may identify the fields as dimension fields, summary fields, and non-summary fields. The department name and manager fields may be non-summary fields associated with a Dept. ID dimension field. The address and name fields may be non-summary fields associated with each input record. Alternatively, the address and name fields may be associated with the employee ID dimension field, since the employee ID field is unique for each record.

There may be several challenges associated with database management, and record keeping. For example, in an aspect, item number for the same product may be different in different states such as in Florida versus in Missouri. In an aspect, it may be required to summarize products together because total sales of a particular brand such as "Johnny Walker Red" may be required to be determined in a business. Therefore, it may be required to denormalize the data. The single denormalized data record for different product numbers, descriptions may be created such as e.g. the record may hold a "Florida item number" field and a "Missouri item number field." A cross-reference table may be provided that may act as a link to pull in the data. The link may exist in the lowest level record, which links to a cross-reference table in the data source. For example, if the lowest level is invoice line item level for a product P, then product information about the item P such as suppliers, cost, size, taste, packages per case, cases per pack, and the like, customer information about the sale such as state, county, tax, link to regulations, license, and the like, sales related information for a sale such as salesman information, and the like, or any other representation of the line item such as for the same product that can have different item numbers in different states may be retrieved. Alternatively, a cross-reference table may be linked such as to allow aggregated reporting across states that may include different data for the same field. This link may be in the lowest level record. The cross reference may be made to a non-data content item such as an image of a distributor's license tied to the license and the like.

Figure 37:
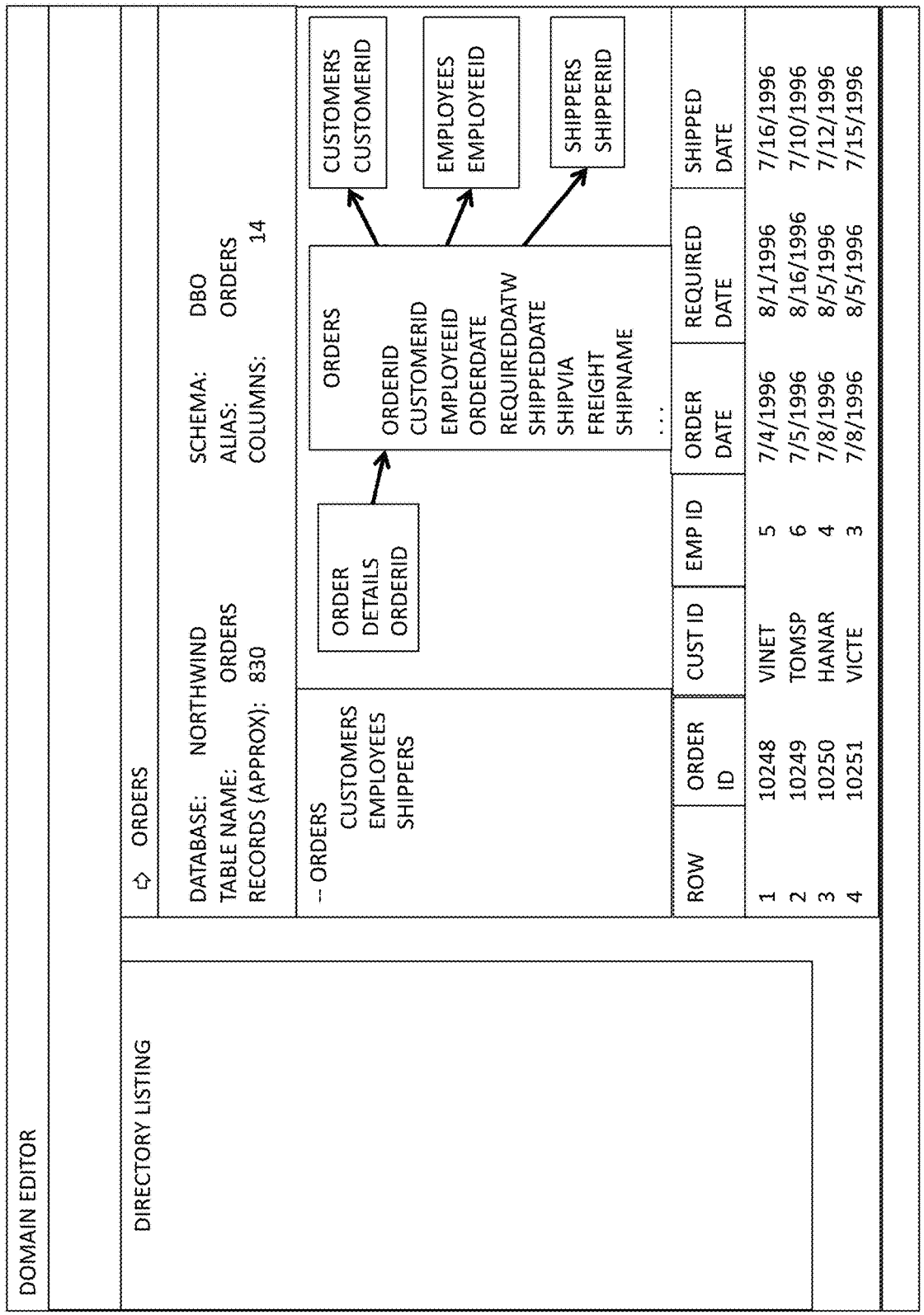
FIG. 37 depicts a domain editor interface.

FIG. 37 describes a domain editor such as to discover data and establish domains of data. The domain editor described herein may be configured to facilitate data discovery and further facilitate ingestion, integration of data, and the like. The domain editor may be used to convert data from various data sources or types into a format and content that may be used by the model-building engine. In an aspect, an expert may configure the domain editor to create a single record for each relevant item. A dataset may be created to facilitate the ingestion of data from a range of disparate sources to generate models that may facilitate fast, guided page generation and dimension-specific data discovery. The dataset described herein may include at the lowest level a single record that completely defines itself for example, an invoice line item level in a sales or distribution industry. The line item in the invoice may define the item, its price, quantity, and the like. The dataset may have enough information in a single record so that all products related information (bottles, pack, price, product, case, and the like), the customer information (such as for example name, city, state, zip, on or off premise, and the like), salesperson information for that sale, and the like can be pulled. The lowest level of detail may be denormalized data stored in one record. In contrast, a normalized database data may have a star schema with tables for each different type of information (such as for example one for product, one for customer, and the like) connected to each other with database joins.

In an aspect, the domain editor may be configured to generate data in a format and organization that may facilitate a variant of data discovery for operating a business via guided page navigation based on models generated from domain editor data output. It is important to guide data discovery on a daily basis such as to know the performance. The important aspects of a business may be product (relationship to the products), customer (relationships to the customers), and the like. The data discovery phase may enable these aspects such as to provide guided page navigation. In an aspect, the information that is not important at a particular time period may be important later for the business. In an aspect, various industry experts may participate and know what to prompt the customer. For example, varying shelf life versus beneficial aging is unique to the wine/beer business. The unique distribution rules (such as exclusive versus non-exclusive that may be allowed to handle something or to handle different customer licensing from state to state, such as determining customers' preferences towards products, ways and methods of purchases by customers, dry counties within a state, restricted licenses within a state, county, town, or the like). The rules may take care of and consider several aspects such as government reporting (such as imports), process for bonded product and pulling it out of bond. For example, every state may have different ways of reporting wine and liquor sales. The customer part of the lowest level record may have a license number in a state or county location and there may be a link to a regulatory requirement in a business.

An industry expert may ask or prompt a client about customer aspects that may be important about the customer, product aspects that may be important about the product, and the like. A user of the methods and systems for operation of a business through data discovery via guided page navigation may be required to take on license for a product that is different from state to state. This may reflect highly regulated supply chain requirements that may be encoded into and/or impact customer preferences related to which product to buy in which state and through which channel, region (e.g. dry county, limits, food sales related), and the like. The rules may take care of and consider several aspects such as government reporting (such as imports), process for bonded product and pulling it out of bond. Other aspects such as time frame or measures (day, week, month, summarizing data, and detailed data) under consideration, and ways of comparing data (Year-to-Date (YTD), month-to-month, quarter-to-quarter) may also be considered.

In an aspect, the domain editor may be configured to determine the time based on the sales periods, days, weeks, months, type of calendar, and the like. In an aspect, the domain editor may be configured to summarize the things such as by week, month, quarter, half, year, and the like. In an aspect, the data discovery phase may determine the vintage (such as price-sensitivity), product's conditions (such as freshness level of beer, as an example), and the like. In an aspect, the system for operating a business via guided page navigation may consider and facilitate data discovery related to First In, First Out (FIFO) sales process such as to keep things or products fresh. In an aspect, certain issues may be found during the data discovery such as the supplier may drop the customers from a master customer list if sales targets are not met. Similar issues may also be found during data discovery for salesman, product, and the like.

The data discovery tool or phase of data integration supported by the domain editor and associated functions may be configured to provide a cycle where detection that a supplier/distributor may have dropped one or more customers off the suppliers/distributors master customer list if they hadn't been sold to in a particular time (e.g. more than one year), to compare annual records of sales and services (e.g. current and prior time periods), to determine relationships among the customers, and the like.

The data discovery tool may be configured to provide the information of the products that may no longer exist in the database and salesperson information that may be no longer associated with current sales activity or a salesperson that may no longer exist in the current business entity. This may allow an industry expert operating the domain editor related tools for suppliers and/or distributors to balance with the numbers that such a customer thinks may be accurate. The data discovery tool may be configured to use Year-to-Date (YTD) sales and the historical sales (such as last year sales), go through the data and manipulate it (such as add it all up with the relationships and tools) to consider for any association or link or match. In an aspect, the customers may often have special logic in totaling reports where they may skip, substitute, or hard code items, and the like. Such customers may provide a hard copy of the report from their source system. The data domain editor module may be configured to use the data from such reports and databases to compare the data (hard copy of reports sent by the customers) against their own internal reports (collected from various sources) to allow the distributors or the suppliers to keep a balance among the products and customer requirements. In an aspect, the thoughts of the supplier and the distributor may also be compared such as to determine their needs and maintain as close as substantially 100% balance. In an aspect, the number of products and customer requirements may be balanced based on the customer thoughts (such as what the customer thinks that are accurate to the actual data they provide). These data may be compared against the distributor database data such to identify if one more match exists.

Figure 38:
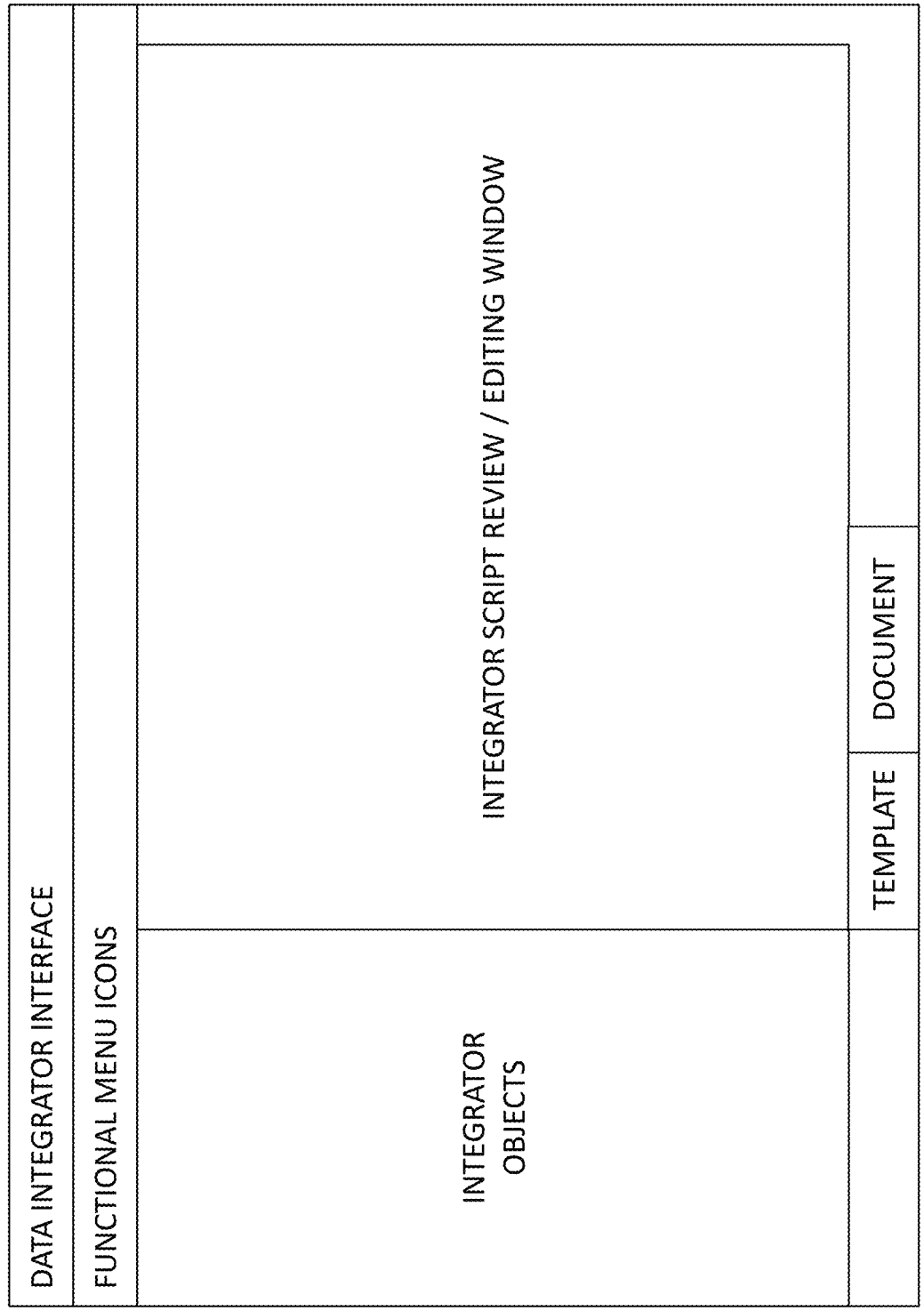
FIG. 38 depicts a data integrator interface.

FIG. 38 depicts aspects related to a data integration module of a system for facilitating data discovery for operating a business via guided page navigation. The data integration module may be configured to use the dimensions and other information determined during data discovery. The data integration module described herein may be a form of an Extract, Transform, and Load (ETL) Tool. The data integration module may be configured to extract data from multiple source types, transforms with joins, lookups, filters, calculations, and the like, and loads to flat file format for builder or other uses. The data integration module may be configured to control scripts written in DI Object Language. The data integration module may be configured to include command-line execution and Visual GUI (such as Visual Data Integrator) available.

Figure 39:
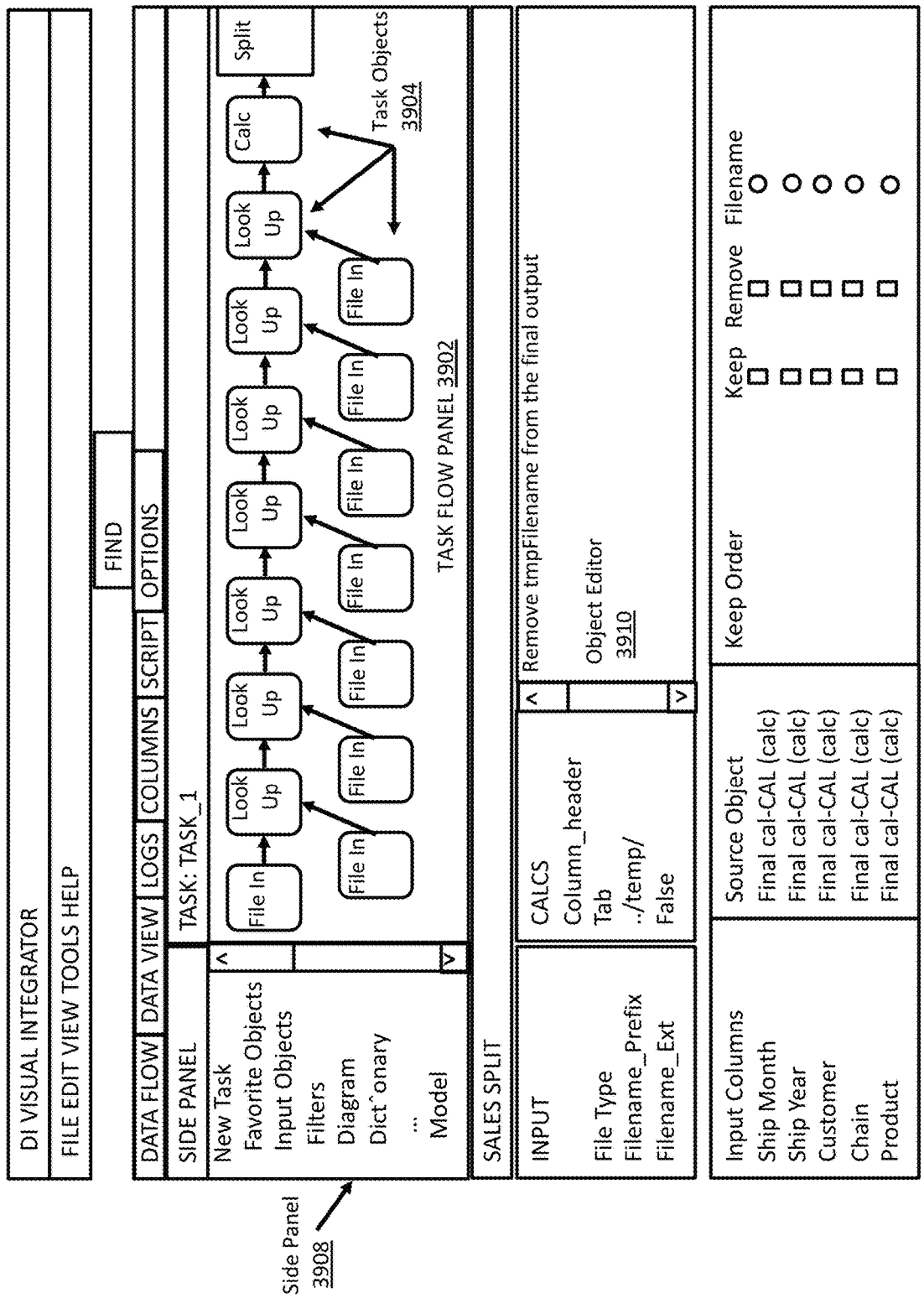
FIG. 39 depicts a visual integrator interface.

FIG. 39 depicts aspects related to a visual data integration module of a system for facilitating data discovery for operating a business via guided page navigation. The visual data integration module may be configured to include a Graphical User Interface (GUI) for data integrator and application to create and manage data flow. FIG. 39 shows one embodiment of the visual data integration module during the creation of a data integration control script. Within the task flow panel 3902 the user may arrange task objects 3904, which are graphical representations of processes, inputs, and outputs, and create connections between said task objects 3904. A side panel 3908 allows the user to add new task objects 3904 to the task flow panel 3902 for inclusion in the data integration module. The attributes for the different task objects 3904 may be altered. A task object 3904 is selected and highlighted and the attribute values of the task object 3904 are displayed in the object editor 3910 shown below the task flow panel 3902. Within the object editor 3910 the values of the different attributes may be altered. The visual data integration module may further be configured to facilitate examination of data files, generate or supply script syntax to underlying control scripts, support testing and review of results, and the like.

In an example as depicted in FIG. 39, various aspects related to a builder or visual builder module of a system may facilitate data discovery for operating a business via guided page navigation. The builder or visual builder module may be configured to summarize and preprocess the source data, transform the data into a model, and the like. The builder or visual builder module may be configured to include proprietary data structure optimized for rapid access by "Diver Solution" clients, command-line production builder available, visual builder which is a GUI tool, and the like. Further, the visual builder module may be configured to be controlled by build description files, run-time parameters, command line execution options, and the like.

Figure 40:
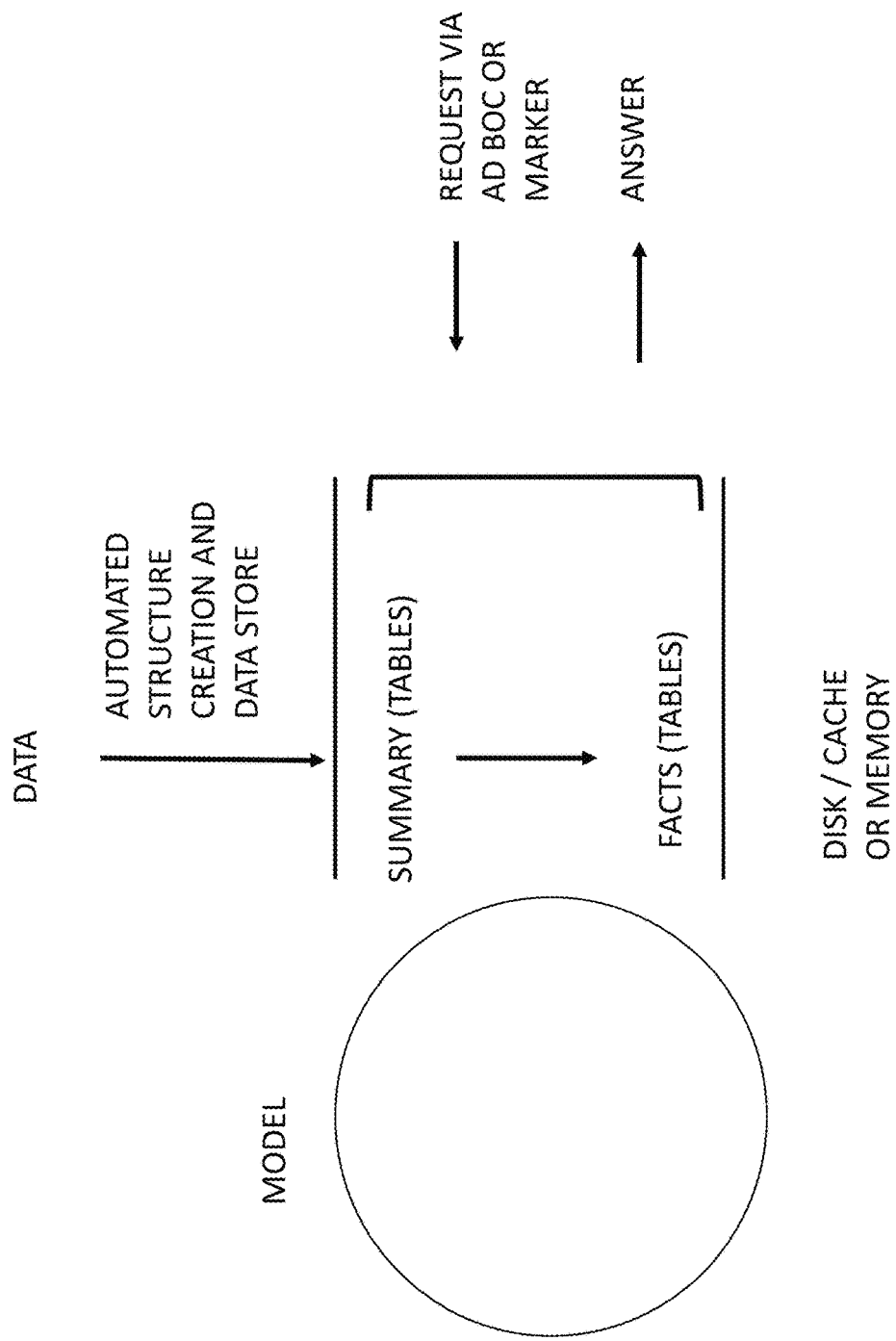
FIG. 40 depicts flow a data related to modeling described herein.

FIG. 40 depicts aspects related to models of a system for facilitating data discovery for operating a business via guided page navigation. The system may be configured to create industry-specific models that may have certain data summarized based on an expert review of the data conducted during data domain editor operation and use. The data may be processed through an automated structuring facility that may be guided by scripts generated by the visual domain editor. The result may be the creation of a model optimized to comply with relevant data store needs. In an example, portions of a model or a subset of a set of models may be stored on a server, on a client device such as a tablet device, and the like. The model(s) described herein may include summary tables that may render down to fact tables. The data requests may be sent to the model(s) as ad hoc or marker (saved reference) with answers being returned from the model(s). The model(s) may be stored on or be accessible in disk, cache, or other types of memory. The models(s) described herein may be memory models, multi-models, and the like. A model may consist of a column-based or row-based database or table mapped into memory for providing fast access of subsets of data and summarized data.

In an aspect, business rules may be layered onto the models or may be integrated into the models such as to facilitate access to the data in the models. This may include information about how data in the models should be used or interpreted. The business rules can set values for the variables or definitions that may be dealt with in the business. For example, "Tiers" can be defined such as to differentiate between a tier 1 versus a tier 2 customer. Similarly, "New placements" or "New products" can also be defined such as for a new product to decide if a customer purchased the product within a defined period of time or later. Business rules may also be associated with or embodied in a diveplan that may provide further guidance to access and presentation of data from the data models. A diveplan is described in further detail elsewhere herein.

Divers of a system may facilitate data discovery for operating a business via guided page navigation. In an aspect, a tool called the diver may be used to access the models. The diver described herein may be a fully free-form data access tool that may be aware of critical data dimensions, and the like found during data discovery. The diver may be configured to add multiple data at any location and in anytime. The diver may be configured to open up a model directly and see core dimensions. Further, the diver may be configured to enable point-and-click GUI, support viewing and analysis of model(s), displays, saves, prints data, and the like. The diver may be configured to enable various output formats such as tabular, report, graph, live data views, and the like to view the data. The diver may be configured to support unstructured diving, facilitate creating "Markers" for use in DivePort, desktop (DI-Diver), client-server (ProDiver), and the like.

Application Development

Figure 41:
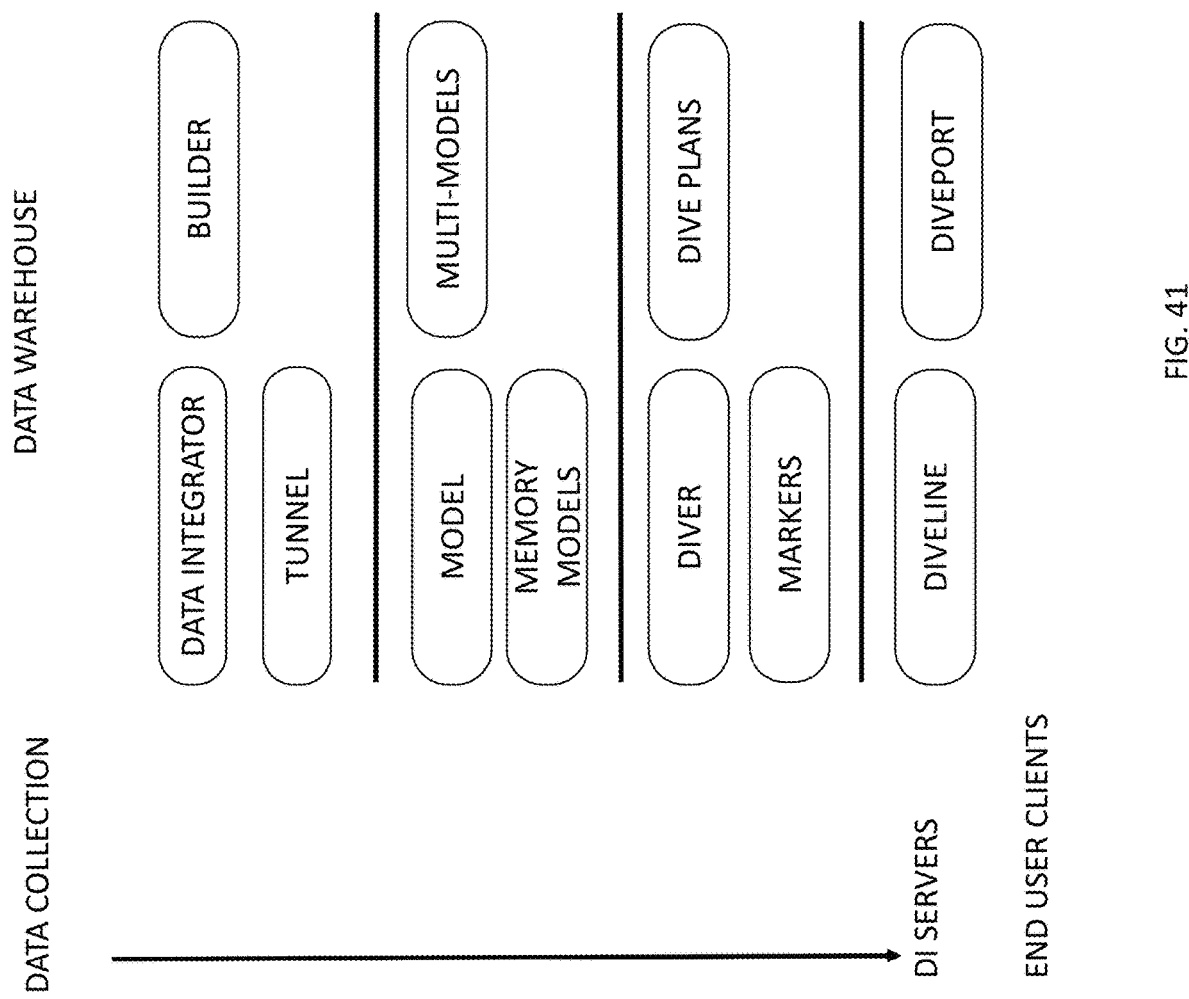
FIG. 41 depict exemplary application development features.

FIG. 41 depicts aspects related to an application development module of the system for facilitating data discovery for operating a business via guided page navigation. The FIG. 41 depicts aspects related to an application that delivers information from data collection or a data warehouse. Delivery of data from a data collection or warehouse may be facilitated by data Integrator, Builder, Modeling (such as models, memory models, multi-models), Data access (such as Diver, DivePlans, Markers), Application-based data access (such as Diveline and Diveport), and the like, which are described herein and elsewhere.

In an example, the diveplans of the system may facilitate data discovery for operating a business via guided page navigation. The model and data warehouse may have a direct "tunnel" connection to enable linking anything in a model to relevant source data. The dive plan described herein may be a presentation vehicle diveplan that may be similar to business rules while substantively extending them. The diveplan may be configured to present default columns that may be viewed when the customer dives. For example, the diveplan may facilitate the customer, distributor, or supplier to view the sales, cases, or gross profit of the products. The diveplan described herein may be configured to help the customer, distributor, or supplier get access to the data. The diveplans help to set up a structure (a group called "item" or "customer" so that the customer can open it up and view all of the things that may be dived on). The diveplan may allow controlling the presentation of the dynamic dimensions (have "type" show up in the customer area even though it is not a core dimension). The diveplan may pick dynamic dimensions that should be presented for each core dimension.

In an aspect, one or more things that may be tied together in a diveplan may include, for example, Florida sales, Florida (FL) annual revenue (A/R), and the like such that the customer, distributor, or supplier may dive on sales and A/R in Florida.

In an aspect, the diveplan may be configured to control how core dimensions are presented. For example, it may control dynamic dimensions for a core dimension. The diveplan may be configured to embed a tax table or rate based on a state, define definitions for the gross profit, define new placements (such as product sales time frames to define a new placement), and define discounting tiers (such as product and quantity).

To accommodate different users' needs regarding viewing sales, products, profit, and the like when a diver application is first opened by the customer, a diveplan may provide an initial view for each type of customer and/or for each unique user. Even though there may be many other dimensions or summaries, there may be an initial focal point such as initial columns to be shown. The desire of viewing the initial focus of point may be different for different functions (such as a sales representative, executive, manager, retailer, and the like may view them differently) and a diveplan may be configured for each such function.

As noted above, the wine and spirits industries have differing requirements across states. To accommodate such differing requirements, separate models may be created for different states such as one for Florida (FL) and another for California (CA). Alternatively, different models may be created for business functions such as FL sales or FL accounts receivable (A/R). A diveplan may be used to link individual models seamlessly so that they may be presented to a user as if there was a single corporate level model. In an example, the diver may be used to open a model directly to facilitate access to the core dimensions that may be related to customer or distributor or supplier. The diver technology may be used along with the business rules and diveplan(s) such as to create useful, direct links among data elements in a tablet-based user interface.

Another aspect of the invention is related to canister model of the system for facilitating data discovery for operating a business via guided page navigation. If an end result is to create some special pages instead of ad hoc diving, then the system may migrate from such as a 150 Gig model to a tablet, or the like such that the user may have a different kind of model. The different kinds of models described herein may include a "canister", and others. The domain editor and/or integration module may be used to pre-calculate time-based columns. This is a function that may normally be left to a user using the diver function.

Viewing data in a canister model may require a user to select at least one time frame for viewing data. Essentially a canister model may define time (or time frames) as core dimension(s). While this may contribute to some constraining of navigation within the data model, it significantly increases response speed while reducing memory storage requirements, both of which are highly desirable for a tablet-based embodiment of the methods and systems described herein. In an example, the system may guide a user to pick a month (e.g. a time frame), and in response to picking a particular month, the user may be presented a matrix of a list of customers and time frames based on the selected month (e.g. Month to date dollars, YTD dollars, Quarter-to-Date (QTD) dollars, and the like) for the customer. In this aspect, the month is a dimension, customer is a dimension, but the other items are pre-determined. The canister model may be configured to combine the customer-month and hard code such as to configure the model.

In an aspect, the domain editor may be used to configure an integration module that may be used to create a canister model. The integration module may be configured to define the data to be summarized, the data to be displayed when a user selects a dimension or dimension combination, and the like. For example, the month by customer canister model may be time-based summaries of certain aspects such as Month-to-Date (MTD), YTD, QTY, Year over Year (YoY), Quarter on Quarter (QoQ), Quarter to Quarter (QtoQ), and the like. The integration module may pre-calculate the time-based data rather than allowing the diver to pre-calculate using a time core dimension. In the tablet interface, jumping from screen to screen may be limited by these time-based summaries. In order to create a canister model (before the time series software was developed), the user may had to undergo eight or nine steps along with having an extensive knowledge of data integration such as to generate the time-series summarized data.

In an example, various aspects related to technology components such as DiveLine of a system may facilitate data discovery for operating a business via guided page navigation. The DiveLine may include server applications. The DiveLine described herein may include a service that manages connections, authenticates named users and groups, centralizes access to model data, and the like. The service described herein may be flexible and scalable to use.

In an example, various aspects related to technology components such as DivePort of the system may facilitate data discovery for operating a business via guided page navigation. The DivePort may include JAVA server app that may reside on a Web App Server. The DivePort may be accessed via a Web browser such as to provide an information-delivery app (such as portal) based on portlet web technology. The Portal consists of pages that may contain portlet instances. The system may create and configure both the pages and their portlet instances. The presentation of data from multiple data sources may be customized. Usually, the user may use full data model when using the diver and the ProDiver. In an aspect, when a user uses DivePort, then the user may use the canister model. The DivePort may be configured to determine that a user selects a time dimension and then accesses the data based on the selection.

FIG. 41 also depicts aspects related to user access to the system for facilitating data discovery for operating a business via guided page navigation.

Figure 42:
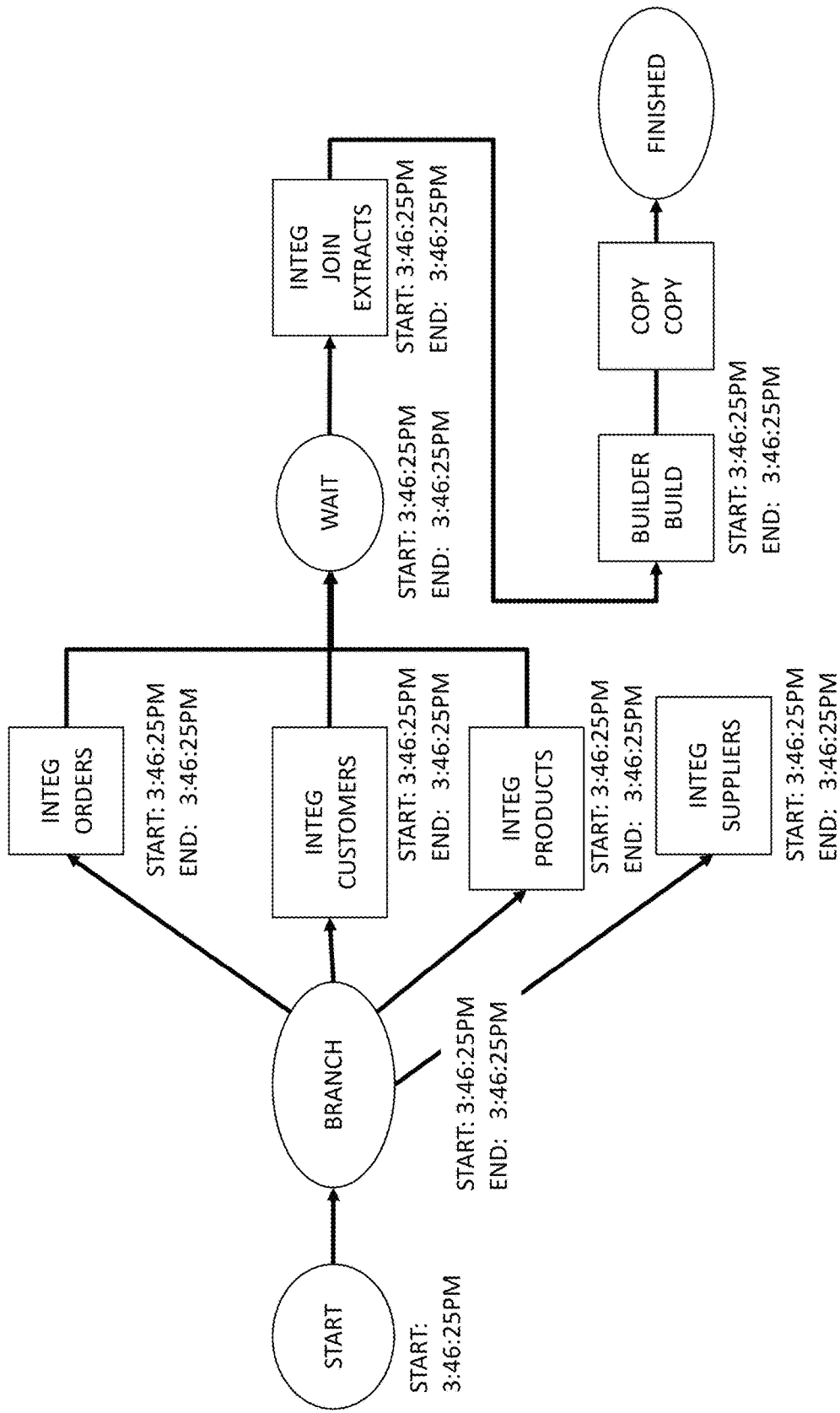
FIG. 42 depicts an exemplary production flow for updating guided pages.

FIG. 42 depicts aspects related to a configuration module of the system for facilitating data discovery for operating a business via guided page navigation.

In an example, in conjunction with the modules of FIG. 42, a controller module of the system for facilitating data discovery for operating a business via guided page navigation may be provided. The controller module may include a DiveLine client and window-based user Interface such as to access users and model activity information and control the user access based on using a "Model". In an aspect, the controller module may disconnect the entire user or disconnect those users who are using the model.

In an example, in conjunction with the modules of FIG. 42, a scheduler module of the system for facilitating data discovery for operating a business via guided page navigation may be provided. The scheduler module may include a client app such as to create and automate events related to the DI products. The scheduler module may be configured to manage jobs, events, tasks, and the like. The scheduler module may also be configured to review current status and history.

In an example, in conjunction with the modules of FIG. 42, a broadcast module of the system may be provided for facilitating data discovery for operating a business via guided page navigation. The broadcast module may be configured to include window-based user interface(UI) such as to schedule or event-driven delivery of Diver Markers via email. Further, the broadcast module may be configured to include DiveLine Admin Tool and Power user tool.

In an example, in conjunction with the modules of FIG. 42, an auditing module of the system may be provided for facilitating data discovery for operating a business via guided page navigation. The usage-auditing module may be configured to include scripts to select and manipulate Dive-Line Logs and build models of the Log data. Further, the usage-auditing module may be configured to examine triggers, DivePaths, columns, user sessions, and the like.

In an example, in conjunction with the modules of FIG. 42, a DIAL module of the system may be provided for facilitating data discovery for operating a business via guided page navigation. The DIAL module described herein is a high-level programming language that may include Java-based command line program. The DIAL module may be configured to process, analyze, and distribute Model information. The DIAL module may get connected via the DiveLine. The DIAL module may be configured to find and flag exceptional data values and send results as email or saved files.

Conventional audio/video presentation systems operate on a principle that information in the presentation will be delivered linearly which necessitates that access to the information is linear. The result is that accessing information that is more than one "slide" apart requires traversing through slides to get to the desired information. The result is a visually distracting race through a sequence of slides of information that might have already been presented or has not yet been presented. Both of these scenarios may cause confusion for the audience as well as the presenter. Designers have attempted to alleviate these problems through techniques such as providing access to certain slides that might start a sequential section of slides or establishing a checkpoint in the linear sequence of slides.

The methods and systems described herein for generating and navigating through guided pages enables unparalleled flexibility for the preparation of and delivery of audio/visual presentations. These methods and systems allow a presenter (or simply a viewer) to dynamically choose a path for presenting material, even when the material is configured as individual screen-sized "slides" that may be similar in appearance to a conventional presentation slide. By enabling dynamic path selection, a presenter may be able to quickly change the presentation view to one that is pertinent to a viewer's questions and just as quickly return to the previously selected path.

Unlike linear presentations, presentations based on the methods and systems of guided page navigation described herein can also take on hierarchical characteristics. Much like navigating between guided pages uses context and relevance for determining which page to present next, hierarchical characteristics of presentations may facilitate selection of sub-presentations from higher-level groupings. In this way, any of a number of slides or groups of slides can be selected by moving up one or more levels in the presentation hierarchy. In addition, at any given level in a hierarchy, slide selection features in each of the slides may allow direct access to any of the other slides at that level. These slide selection features may be similar to points of entry on the guided pages described herein that may allow a user to access information from related dimensions directly from each guided page.

The result is a substantially different man-machine interface for delivering presentations than is available with conventional presentation systems.

Other features of the methods and systems of guided page navigation that may be beneficial for the dynamic path presentation techniques described herein may include impact of a workflow on presentation preparation. In an example, a salesperson may be planning a visit to a customer that includes delivering a presentation. A workflow for that salesperson, along with identification of the customer and customer sales history and the like, may result in relevant information being uploaded to the salesperson's computer (e.g. tablet device) and organized with guided links that facilitate dynamic presentation path selection. Further in the example, the salesperson may be presenting information about a product that competes with a product that the customer currently sells. The salesperson could switch the presentation view in response to a question by the customer regarding the sales details of the current product quickly because the guided page navigation methods and systems would have configured the salesperson's computer (e.g. tablet) with a set of presentation slides that have guided navigation links to the information that is relevant to the salesperson's workflow (selling) and customer (sales history by product). However, rather than simply providing all of the relevant information and documents to the salesperson, each document and data element would be coherently linked using the techniques described herein for generating guided pages from data models based on core dimensions and the like.

The guided page type, dynamic path selection presentation capabilities described herein may also be leveraged for specific users, departments, and the like. Corporations often generate information, news, press releases, and the like. In addition, corporations often require disseminating information to select users while broadcasting other information to a wider audience. The guided page navigation methods and systems described herein that incorporate user roles, workflow, hierarchy, and the like can be leveraged by the presentation methods and systems herein to facilitate delivery and broadcasting of news and the like. In an example of a marketing manager desiring to present news to the marketing staff and present only a portion of that news to the entire company. A "news" module of the guided page systems described herein may access the marketing news and provide links among the news items that are determined based on the user viewing this news so that marketing staff can link to information that others in the company cannot.

Similarly, presentation information can be associated with core dimensions as described herein in such a way as to allow access based on connections among dimensions. Presentations may therefore be dynamically adjusted based on a dimension such as customer. While a general sales presentation may be generated, by a user selecting an entry in a dimension (e.g. a specific customer in a "customer core dimension") the presentation may dynamically adjust to only include slides that are associated with the selected dimension and specific entry.

In another example, a sales team may want to generate news for internal use at a company about a recent big sale to a particular customer. A presentation about news in the company may show this news item. Upon selection of this news item, context may be directed to the customer dimension and more specifically to the customer in the news item. The user could then view guided pages of the customer's sales, shipments, returns, and any other data by region, quarter, location, and the like because the guide pages containing this information could be accessed directly from the presentation of the news item because the news item identified the specific customer dimension value (e.g. customer name). Within the guided pages of the customer specific information, one such guided page may include entries related to customer specific news over time (e.g. counts of news stories per quarter). Selection of one of these entries may bring up a selection of news items that maybe viewed in presentation mode.

The synergistic application of the methods and systems of dynamic presentation path selection with the methods and systems of guide page navigation each of which is described herein is envisioned as resulting in an integration of business needs including: documents, data inputs, messages, workflows, projects, numbers, and the like with technology requirements including: numbers, text, video, pictures, and the like in an interface that results in flexible ways of accessing information for operating a business around core dimensions of data that is pertinent to the business operation. The result is envisioned as an interface that seamless facilitates access to all types of information for operating the business.

At least through the application of the methods and systems for generating guided pages from disparate source data, which may include processing of the source data by a central server, corporate presentations may be coordinated so as to ensure that different presenters reference corporate information that is consistent across all presentations. Therefore, the methods and systems described herein may provide the significant benefit of ensuring that presentations (or at least portions, such as specific pages, data, and the like) are synchronized against data models and centralized data and content sources. This benefit extends to enabling management to centrally manage key presentation materials and resources so as to help presenters avoid inconsistency of message. However, by the dynamic path selection capabilities, each presenter may be enabled to tailor the flow of his/her presentation for the audience at hand.

In addition, each presentation, or more particularly, each section of a presentation (which may include a collection of closely related pages, and the like) may be linked through the guided page techniques that relate back to core dimensions through the data models, business rules and other techniques described herein. In this way, presentations may link to each other to organize the presentations themselves. Such linkages may become a meta-presentation that enables each presentation to work along side each other, as opposed to conventional linear presentations that can be individually modified without consideration for impact to others. In an example of inter-presentation linkages, a set of presentations for a user group meeting may result in creating a type of "glue" between individual presentations that results in a company-wide resource of material that can be used to educate customers.

Figure 43:
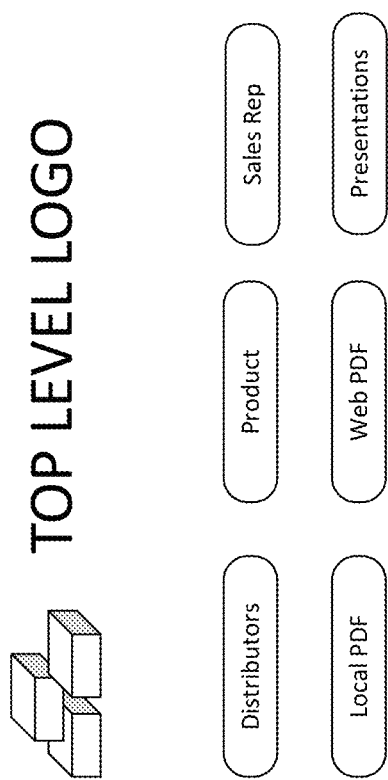
FIGS. 43-52 depicts various aspects of dynamic presentation path selection.

Referring to FIGS. 43, various presentation slides that facilitate dynamic path selection are depicted. In particular, slide 48 shows some of the features described herein. A left arrow allows for directly linking to the previously presented slide even if the previously presented slide is not linearly the previous slide. The previous slide might have been a slide about technology generally or the like. Other selectable elements along the bottom of the figure implement the dynamic path selection described herein. Each of "opportunity" "di mobile", "knowledge", and "workflow" may link to a slide somewhere else in the presentation. In this example "opportunity" links to slide 49, "di mobile" links to slide 48, "knowledge" links to slide 51 and "workflow" links to slide 52. In this way, a presenter can select any of these topics to discuss with the audience from the single technology slide 50.

Figure 50:
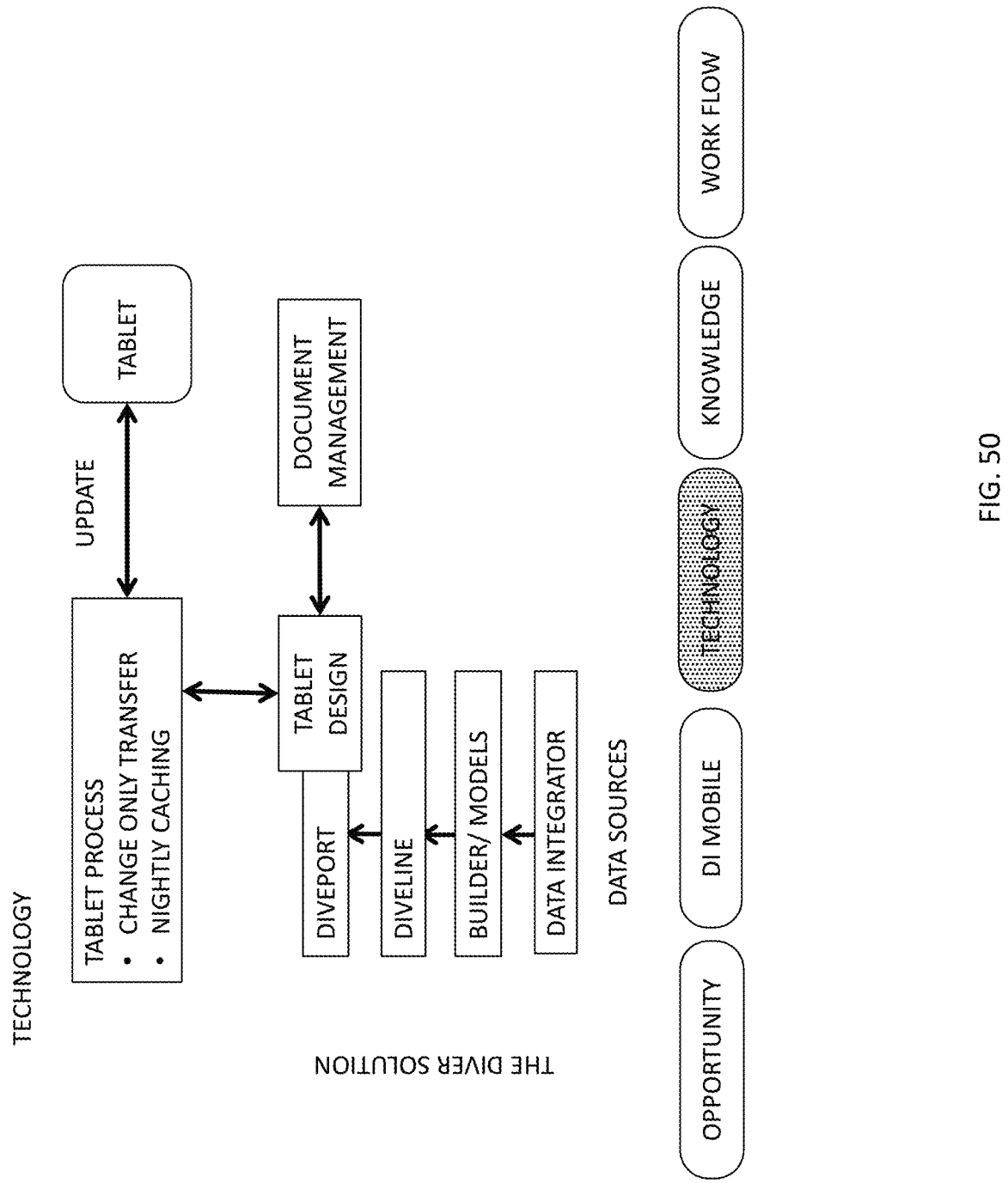
Figure 51:
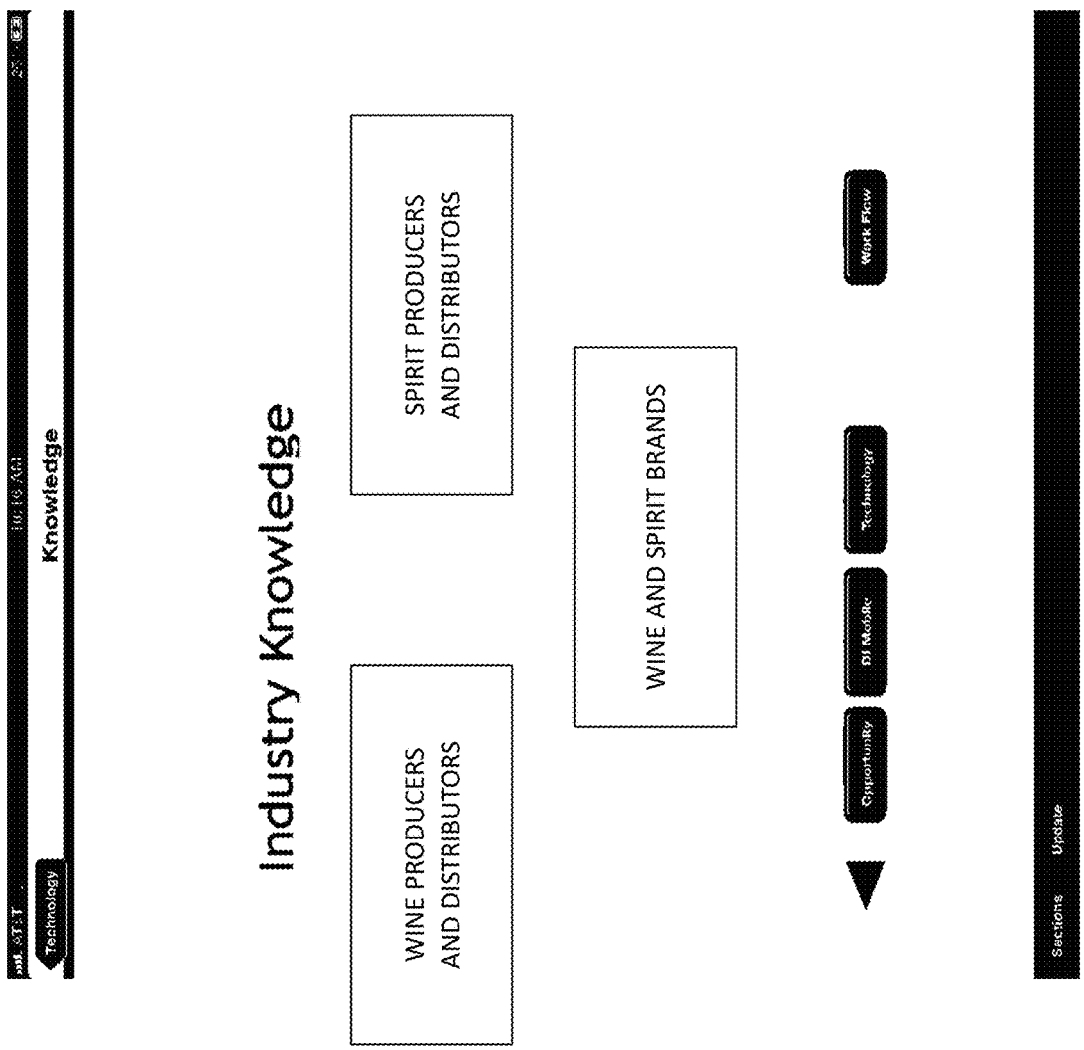
Figure 52:
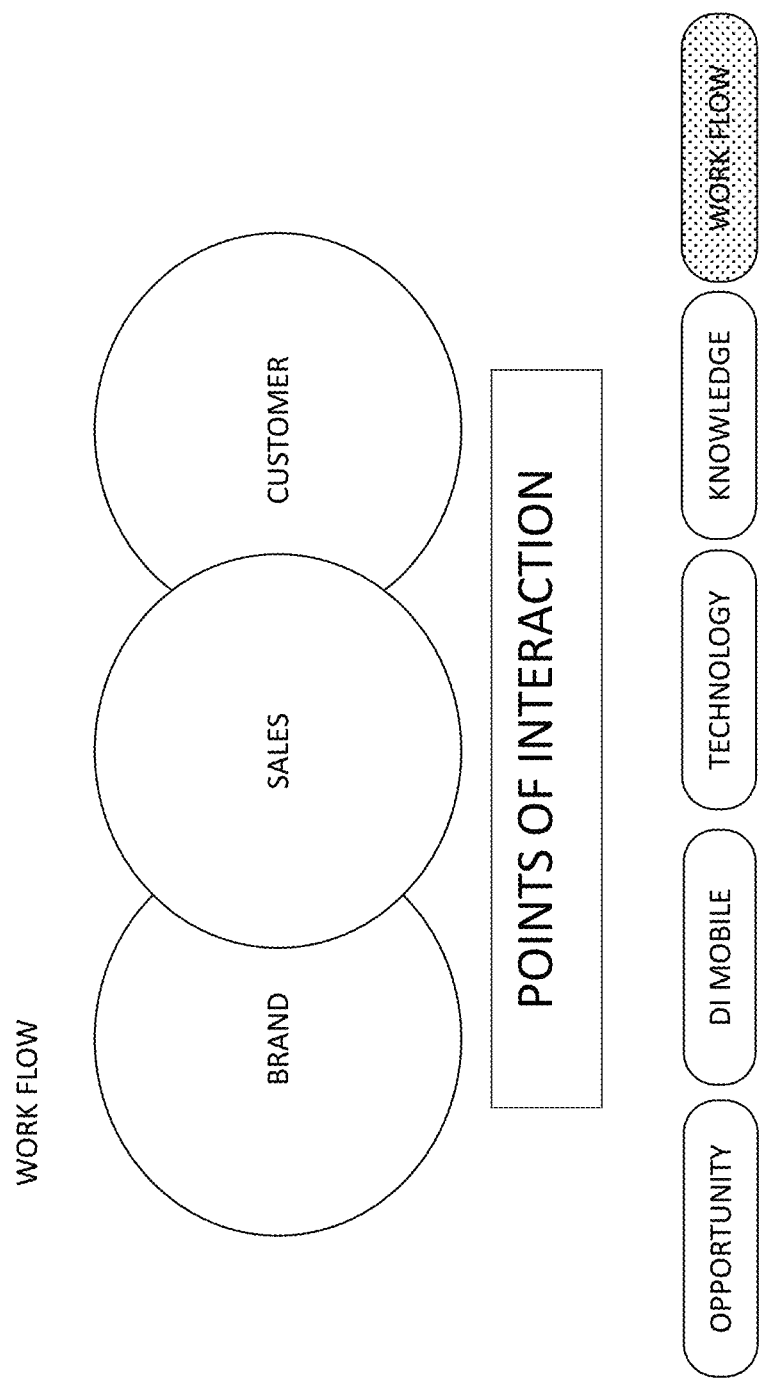

FIG. 50 may also depict how core technologies grouped as "The Diver Solution 6.4" that harvest data from data sources can interact with "IPAD Design" technologies that interact with "IPAD Process" and "Document Management" to deliver updated guided pages on a regular basis.

FIG. 43 depicts an exemplary top level showing a selection of dynamic paths to follow.

Figure 44:

FIG. 44 depicts an exemplary guided page view of distributors that may be suitable for use in a presentation that may be presented when the "Distributors" tab is selected in FIG. 43.

Figure 45:
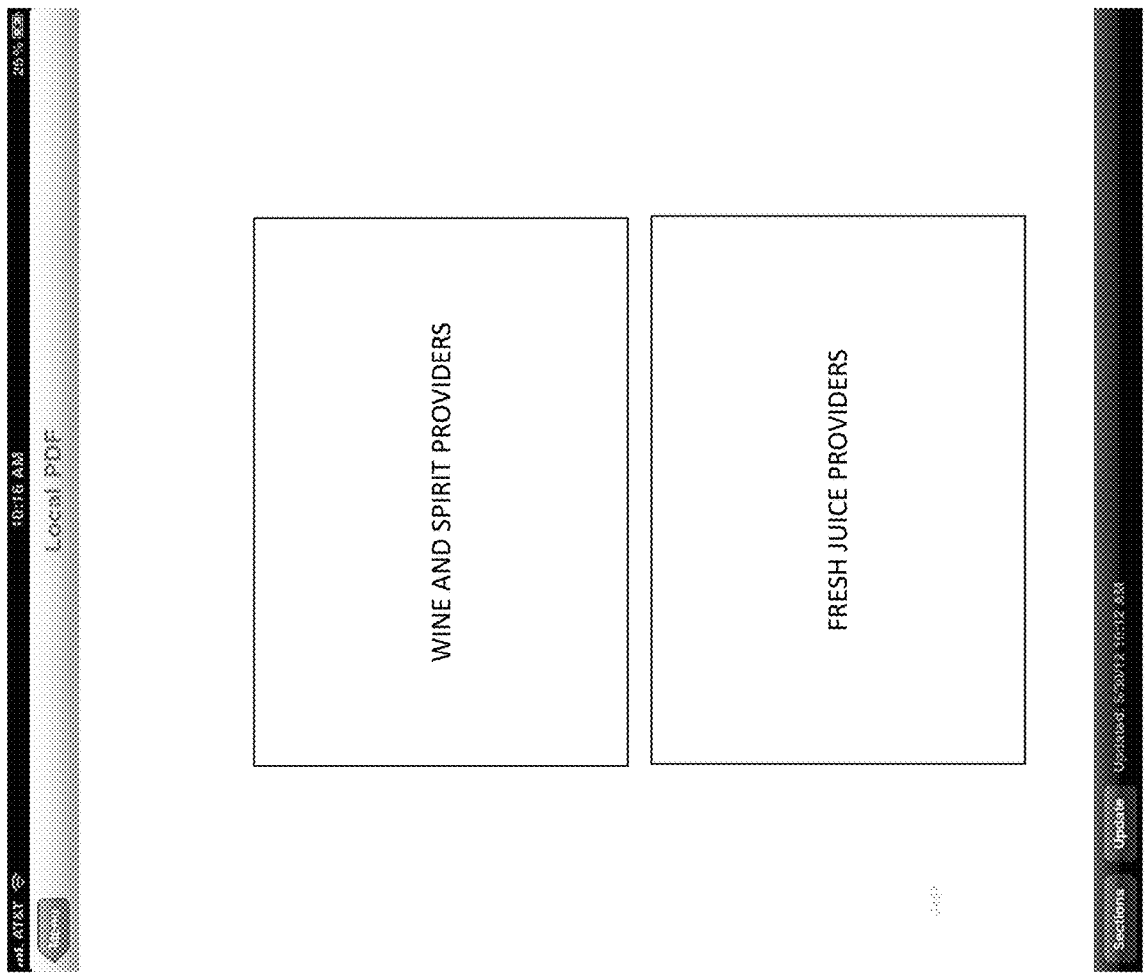
Figure 46:
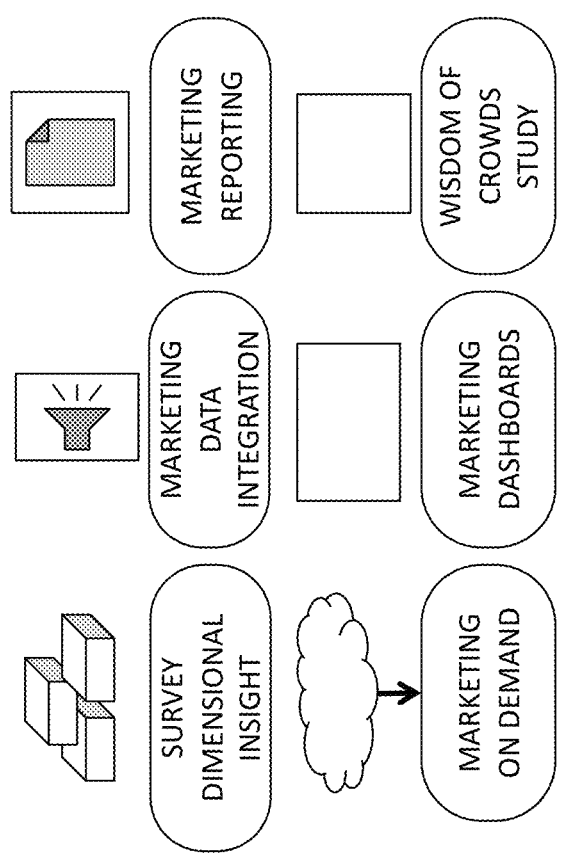

FIG. 45 depicts an exemplary slide of product logos that may be presented when a "Product" tab is selected in FIG. 43.

Figure 47:
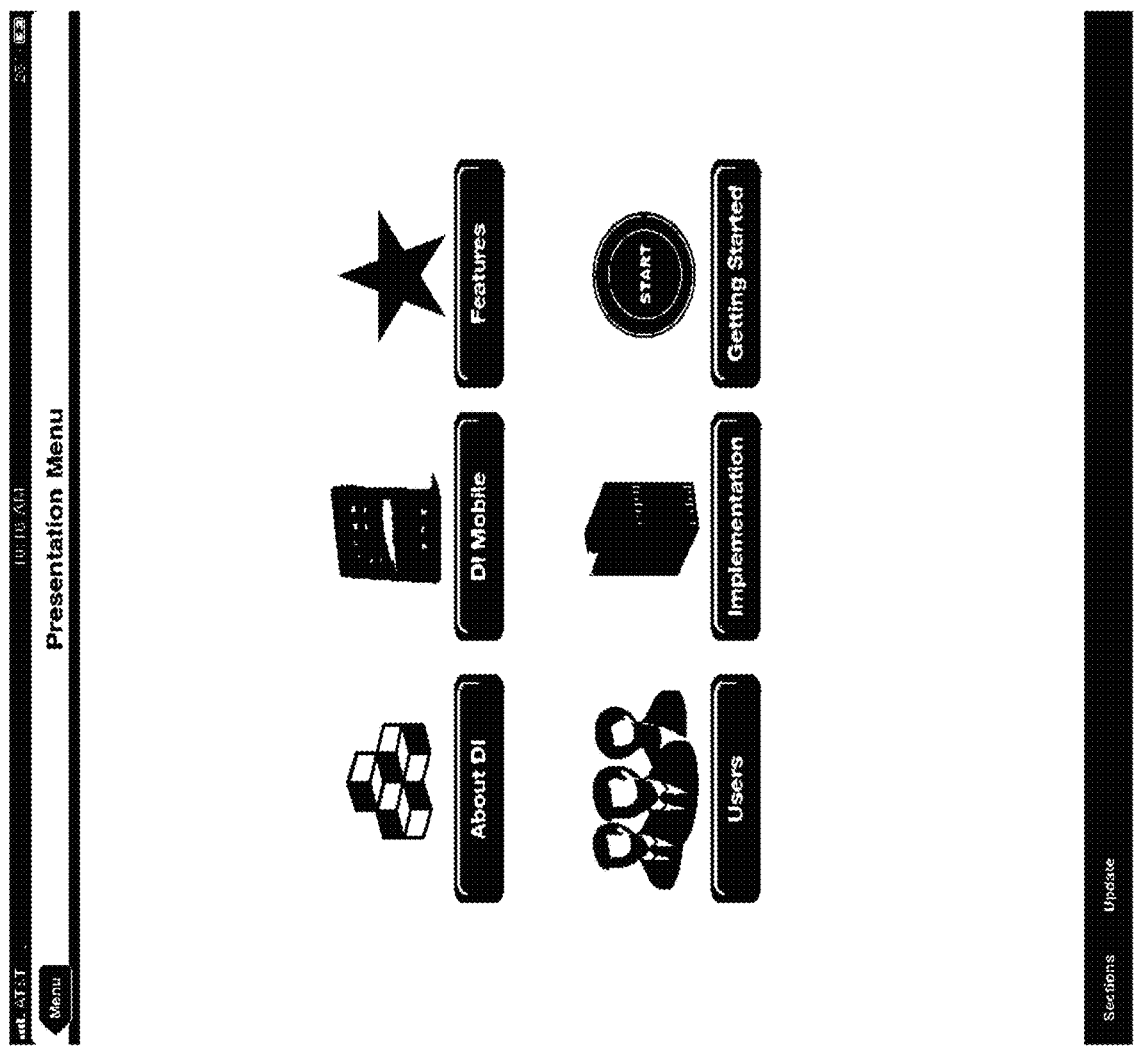

FIG. 47 depicts an exemplary slide of Web PDF data that contains links to other non-linearly presented data.

Figure 48:
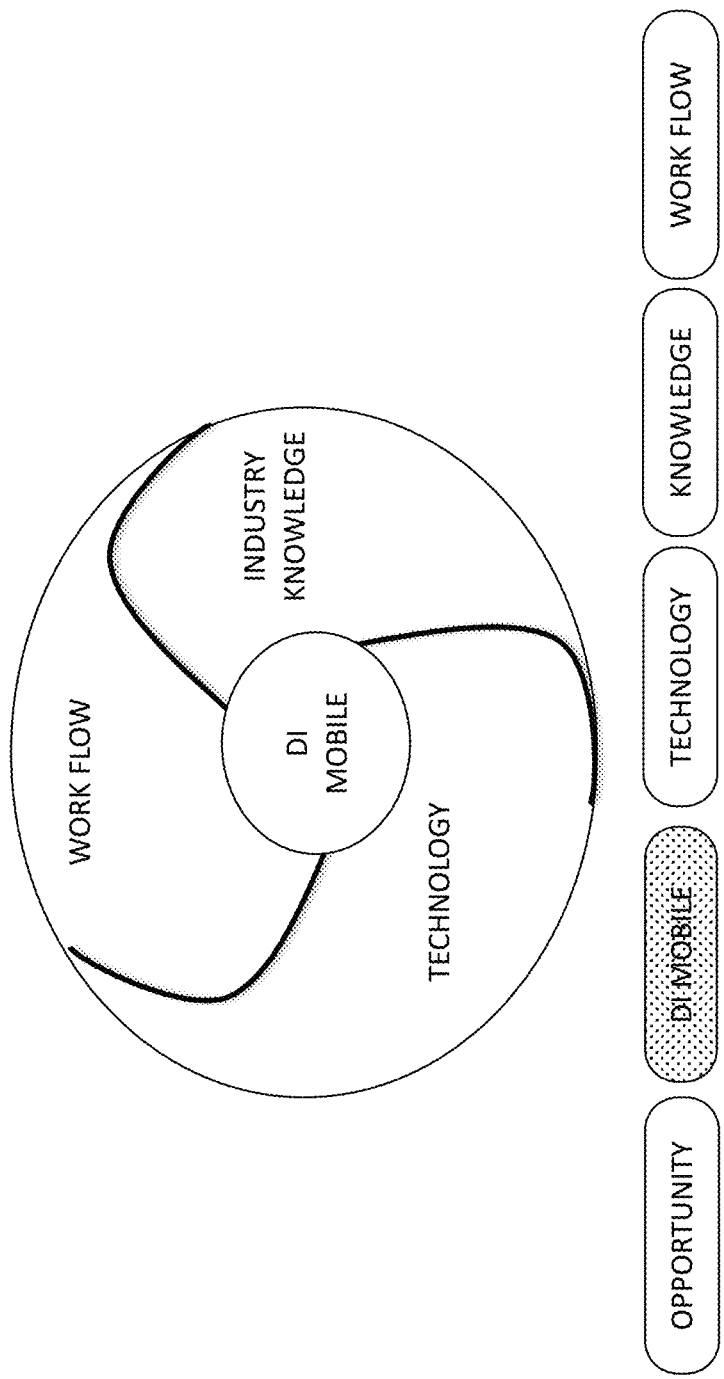
Figure 49:

FIG. 48 depicts an exemplary presentation menu slide that may be presented by selecting the "presentation" tab in FIG. 43.

Methods and systems described herein may include dynamically navigating a presentation that comprises a set of guided pages of content wherein groups of presentation pages are linked to other groups of presentation pages through association with a set of core dimensions that are determined during a data discovery process and that are common to the presentation pages. The presentation may include content pages, data pages, and hybrid pages wherein actionable elements in the presentation pages link to other presentation pages based on the core dimensions.

Methods and systems described herein may include automatically linking a plurality of presentations that are organized around a set of common core data dimensions that are extracted from disparate source data related to operation of a business.

Information Leaping

The methods, systems, technology, and techniques of guided page navigation described herein may be applied to presentation type page navigation to facilitate information leaping. Information leaping may generally be characterized as quickly moving from one information domain to another information domain. In the context of page type navigation, information leaping may be characterized as rapidly moving from a first spot in a presentation of information to another related spot that may not be physically close to the first spot (e.g. may not be the previous or next slide in a presentation). The guided page navigation disclosure herein may facilitate such information leaping in business intelligence-related presentations through various techniques related to determining a set of possible destinations associated with information on a given presentation slide, selecting a subset of the possible destinations, and enabling links to the selected subset of possible destination (e.g. tabs, selectable content, and the like) on the given presentation slide that rapidly shift the information focus (e.g. by presenting related information) when selected. In essence, information leaping may require techniques that facilitate determining in advance where each link of active content and menu item (e.g. tab) will leap to so as to arrive at a right place.

Unlike a conventional presentation format that enables linear forward/back information viewing with limited direct access (e.g. based on a table of contents), a presentation environment configured with information leaping facilitates accessing any content within a presentation in as little as 2 to 3 taps/clicks. Two navigation related aspects of the present embodiments of information leaping that facilitates this great accessibility to information, are the use of active content within a presentation format, and the use of preconfigured tabs that facilitate rapidly changing a view of information presented in a given presentation slide. Another aspect includes specific presentation page types, such as access, central, and list page types. A third aspect includes cross technology conversion that facilitates converting a conventional linear progressing slide presentation (e.g. .PPT format) into a bookmarked presentation environment that is further adapted for viewing on an electronic display device, such as a tablet or smartphone.

Information leaping may facilitate success in a situation in which a presenter is posed a question and within a few clicks (e.g. two or three) leap from a current presentation slide or information view to another information view that is directly related to the posed question. Because the presenter quickly navigates to a desired information area based on a posed question, the viewer may recognize or conclude that the movement to the new information is not purely through a canned process that shows generic information.

Like conventional linear progression slide presentation, information leaping capable presentations that may be enabled by the guided page navigation methods and systems described herein may facilitate rapid access to various other types of media (e.g. images, video, live streaming, documents, and the like) as embedded items, or as externally accessible items that may employ media-specific viewers, and the like. Information leaping to/from various media types may be accomplished through accessing active data items, menu items, and the like.

Generating a Presentation that Facilitates Information Leaping

Generating a presentation that supports information leaping may include various process steps, such as data gathering, organization, and the like. A portion of the steps that may be included relate to cross technology conversion of presentation information. In an example of generating an information leaping capable presentation, process steps may include creating a conventional set of presentation slides (e.g. using Microsoft Powerpoint™), saving the slides to a portable document format (e.g. .PDF) document, applying guided page navigation techniques to convert/generate bookmarks (e.g. Acrobat compatible bookmarks), generating a tab for each bookmark and inserting an information relevant subset of tabs to be presented with (e.g. at the bottom of) each presentation page, and providing access to the finalized presentation. Access may be by downloading the presentation to a device, accessing the presentation from the cloud with a device, and forwarding the presentation via email attachment. The step of generating tabs from bookmarks may include using a software program that is adapted to extract bookmark metadata from a .PDF automatically generated table of contents. A user of such a software program may manually organize the tabs and associate the tabs with content on each presentation page.

Indicators

Figure 55:
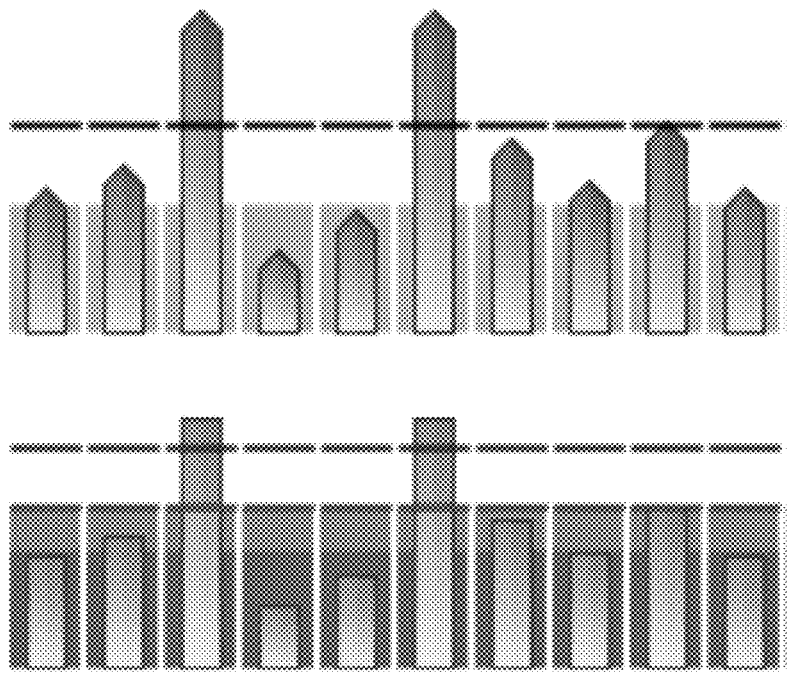
Figure 56:
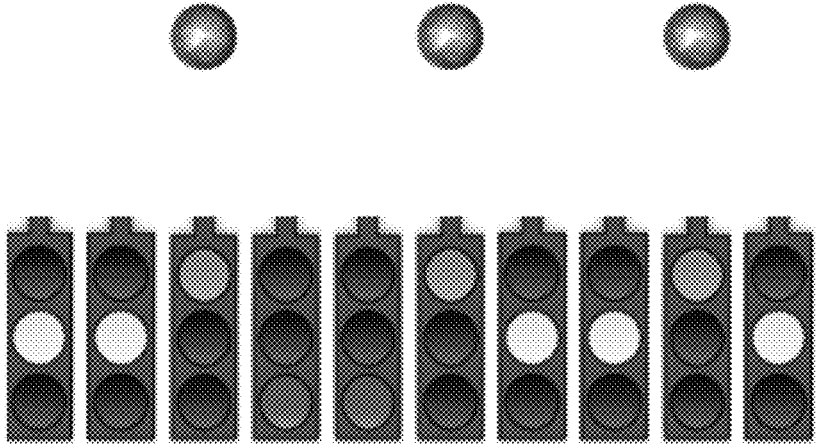
Figure 58:
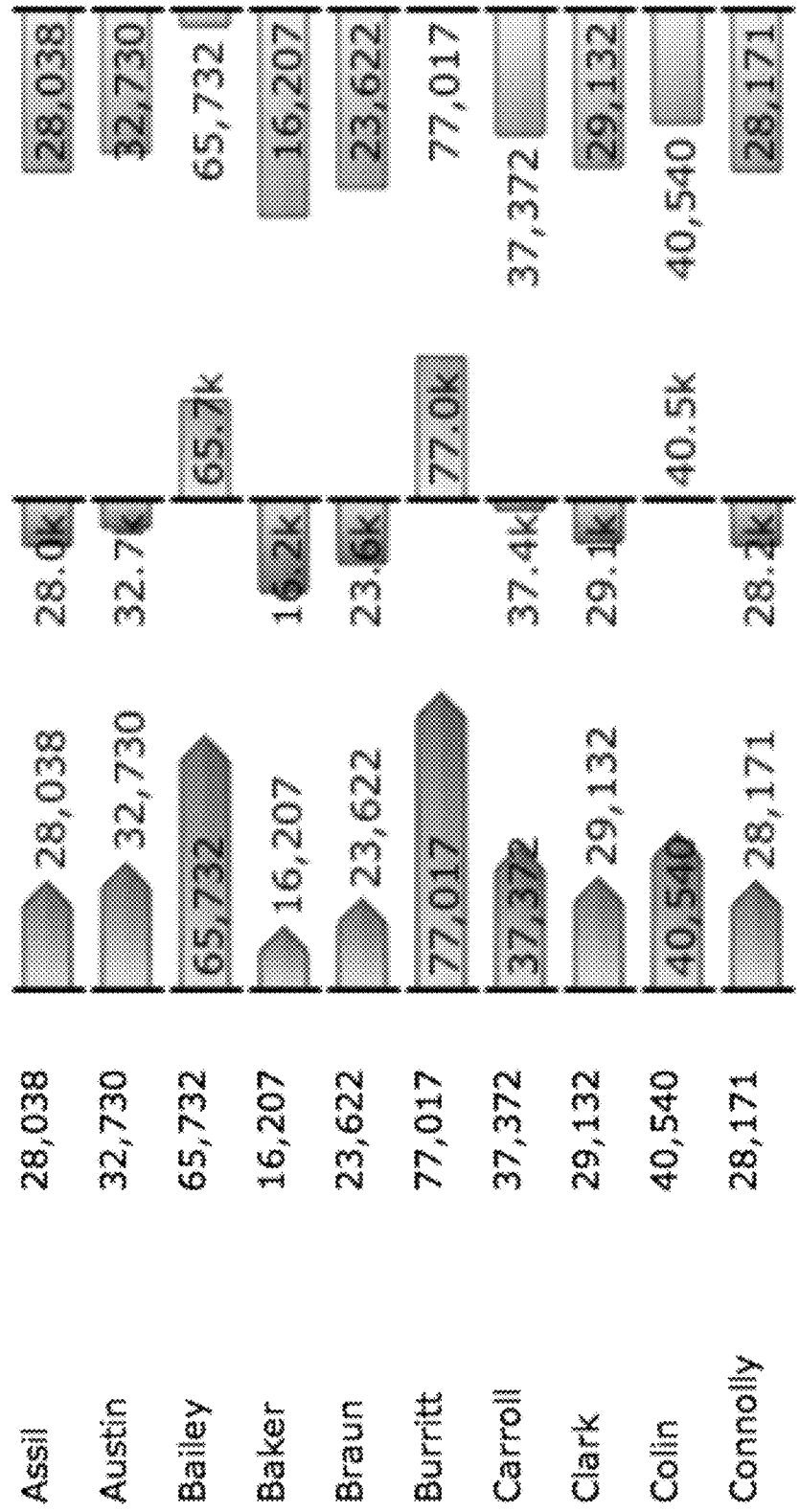
Figure 59:
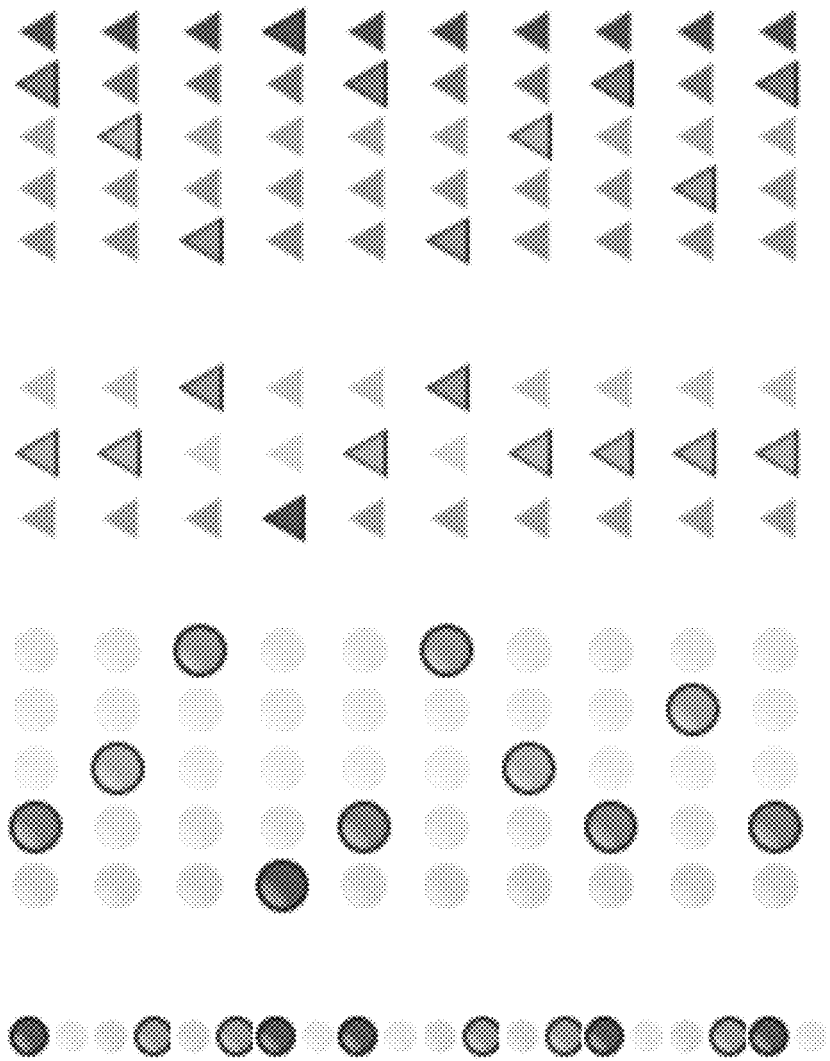
Figure 60:
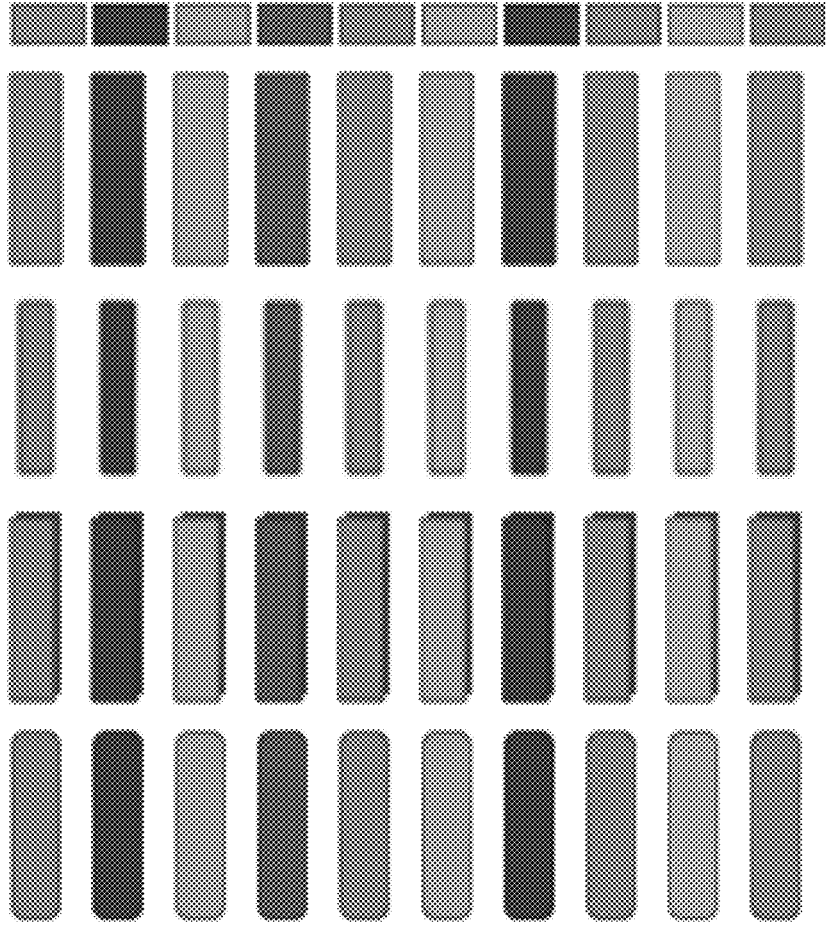

A cell may contain an alphanumeric item and/or an indicator. Indicators may take on a range of colors, patterns, shapes, logos, icons, labels, characteristics, and the like. Examples of indicators are depicted in FIGS. 53 through 61 and are described here. An indicator may be a graphical element that is used to represent an alphanumeric value, a numeric value or range graphically. An indicator may also consist of a differentiator for a cell entry, such as a particular color or the like. FIG. 53 depicts using color as indicator that is based on a comparison of a cell content to a reference, such as whether the value is above the reference. Color indicators in a first cell may be determined by cell content in a related cell. An indicator may consist of an alert, which may be a colored icon where the color is based on a set of thresholds on a numeric value as shown in FIG. 54. An indicator may consist of a bullet graph as depicted in FIG. 55, where numeric values are used to define the bullet length, a threshold displayed as a line, and a threshold displayed as a bounding box. An indicator may consist of an image or set of images that is present or chosen based on a numeric value as depicted in FIG. 56. An indicator may consist of a slider, which is a graph (typically aligned on a line) with an alphanumeric numeric value displayed as text and positioned within a range (represented by the ends of the line) based on its value relative to the range as depicted in FIG. 57. An indicator may consist of a plus-minus graph, where a positive or negative value is displayed as a graph and colored based on whether it is positive or negative as shown in FIG. 58. An indicator may consist of a racetrack, where a set of stop/go "lights" or colored icons is chosen based on the value in the cell as depicted in FIG. 59. An indicator may consist of a rectangle, where a rectangle is displayed with colors based on a set of thresholds for the numeric value as shown in FIG. 60. An indicator may consist of an arrow whose color and direction is set as a function of the value of a cell as shown in FIG. 61. Other colors, shapes, and meanings of indicators are contemplated and included herein.

Column Expansion

An embodiment may include an interface for displaying additional columns or rows using an expand capability. These additional columns or rows may relate to the expanded column or row, allowing deeper analysis by providing context to the numbers in that column to improve understanding.

FIG. 62 displays a tablet matrix of cells, including columns with attribute data and expandable columns whose header includes a chevron icon ( ) indicating that the representation of the data in the column may be expanded or altered in some way. Tapping on an expandable column header brings up a menu (FIG. 63) comprising various options including "Sort Up", "Sort Down", "Graph Column" and "Expand."

Figure 64:
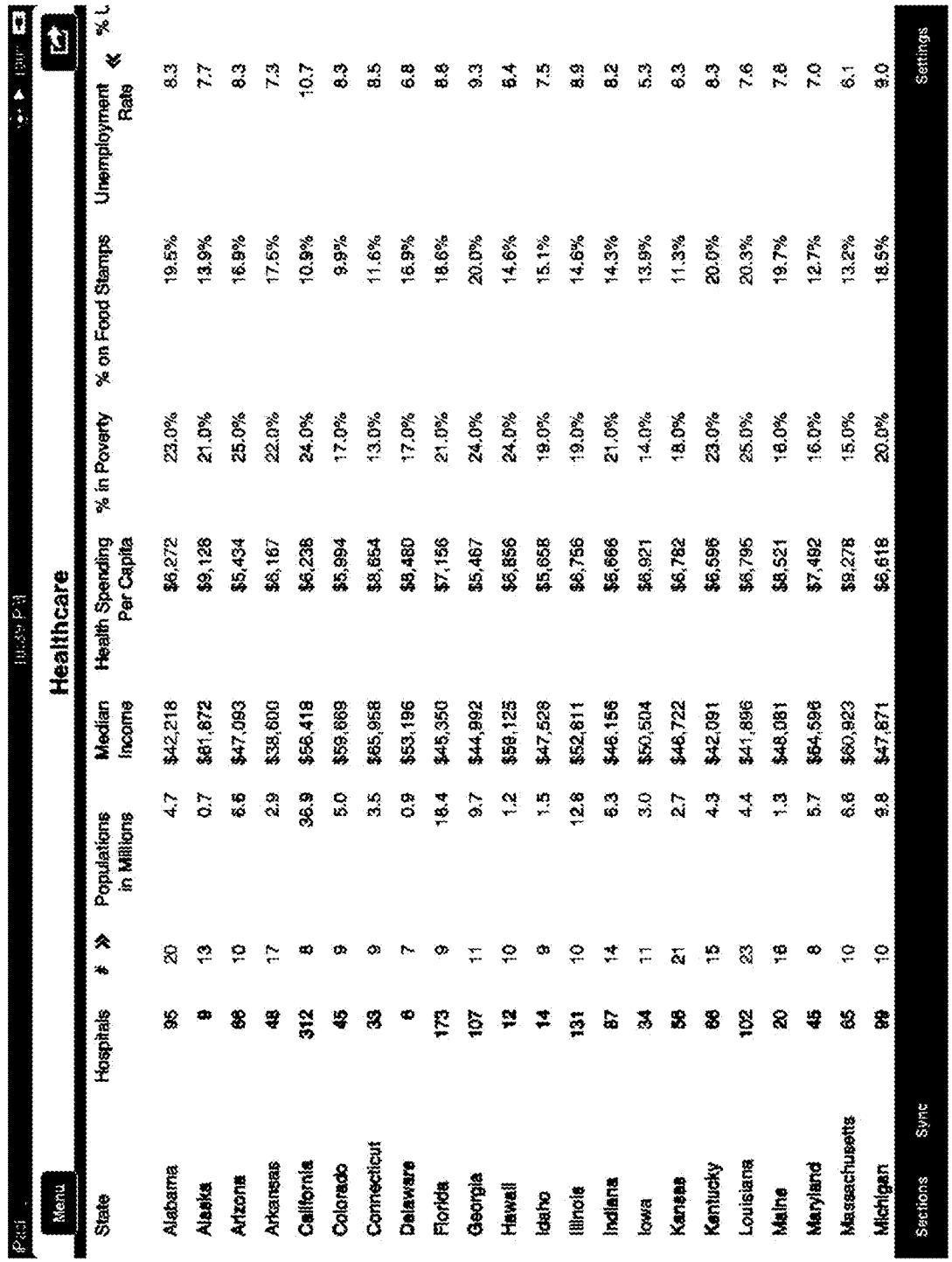

Selecting "Expand" from the menu (FIG. 63) results in an additional set of columns being displayed (FIG. 64) which provide additional data related to the selected column. The example (FIGS. 62-64) shows a column labeled "Populations in Millions" being selected and expanded. The resultant display (FIG. 64) in the example includes additional columns of statistics such as "Median Income", "Health Spending Per Capita", "% in Poverty", and "% on Food Stamps" and "Unemployment Rate." The additional columns provide extra information that does not need to be present in the initial display.

Figure 65:
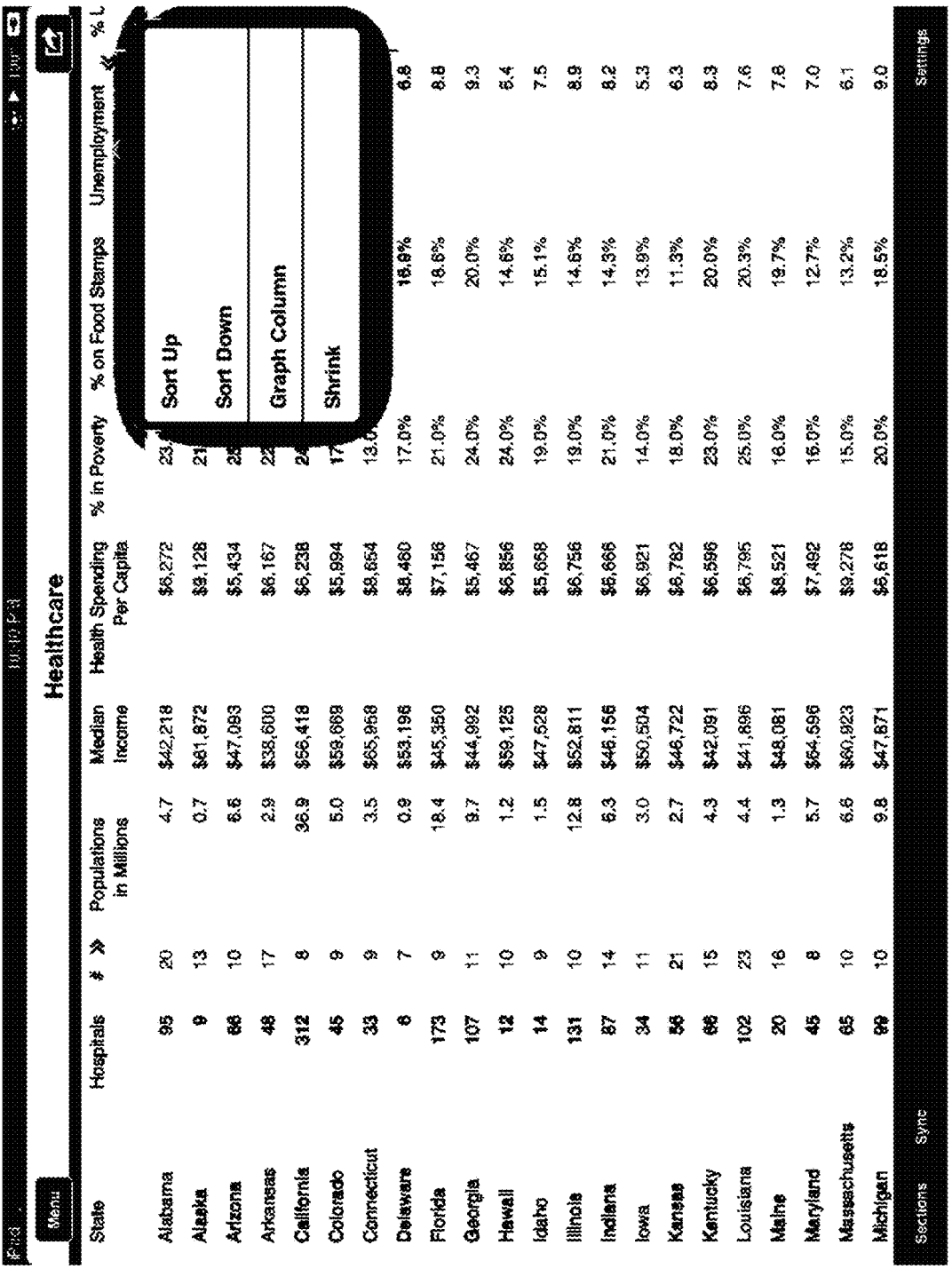

The last of the expanded columns, "Unemployment Rate" in the example (FIG. 64), includes a reverse chevron icon («) indicating that the representation of data in the column may be shrunk or altered in some way. Selecting the header with the reverse chevron brings up a menu (FIG. 65) comprising various options including "Sort Up", "Sort Down", "Graph Column" and "Shrink." Selecting "Shrink" from the menu (FIG. 65) results in the additional columns disappearing, reverting back to the original display (FIG. 62).

Figure 66:
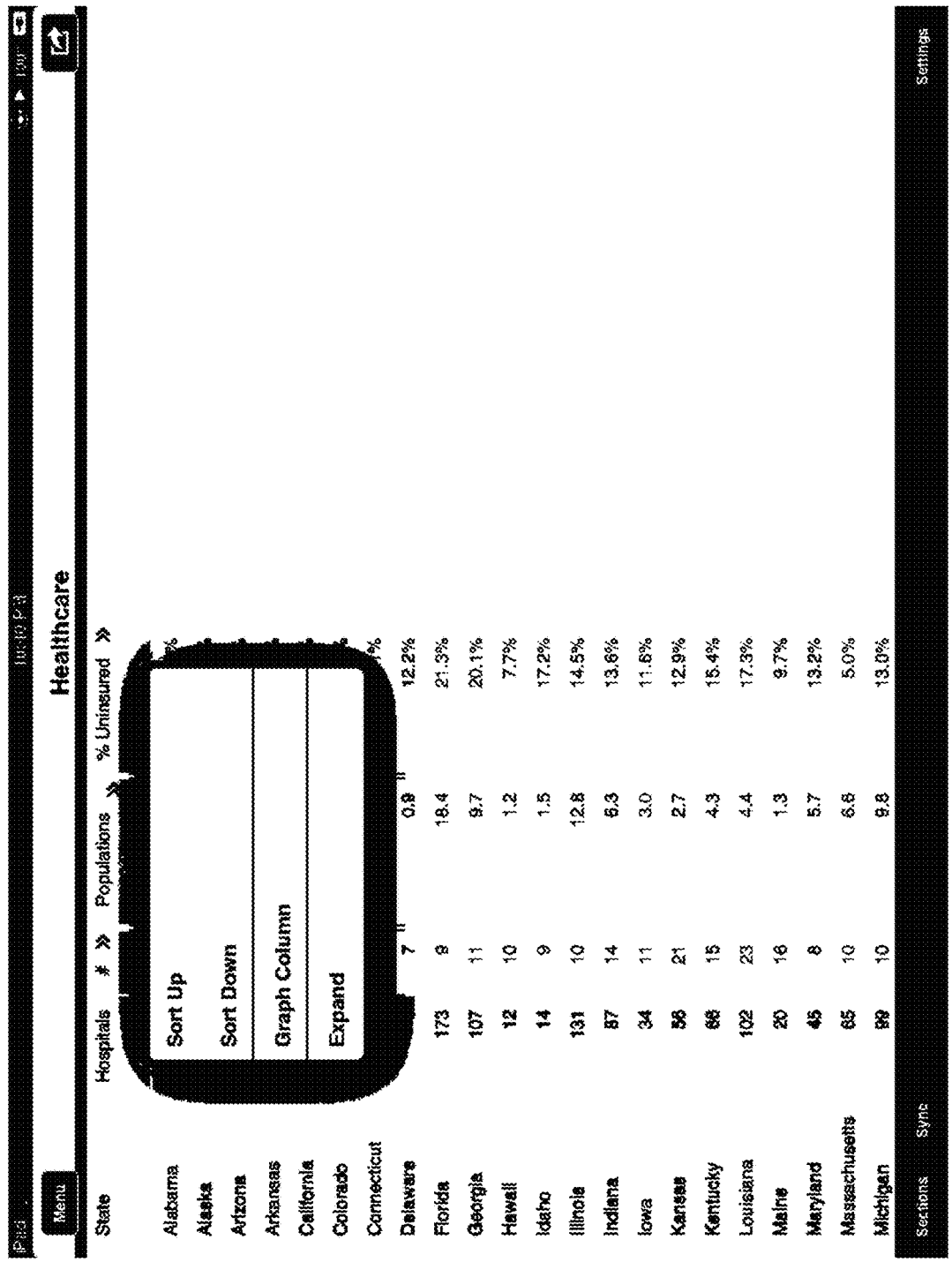
Figure 67:
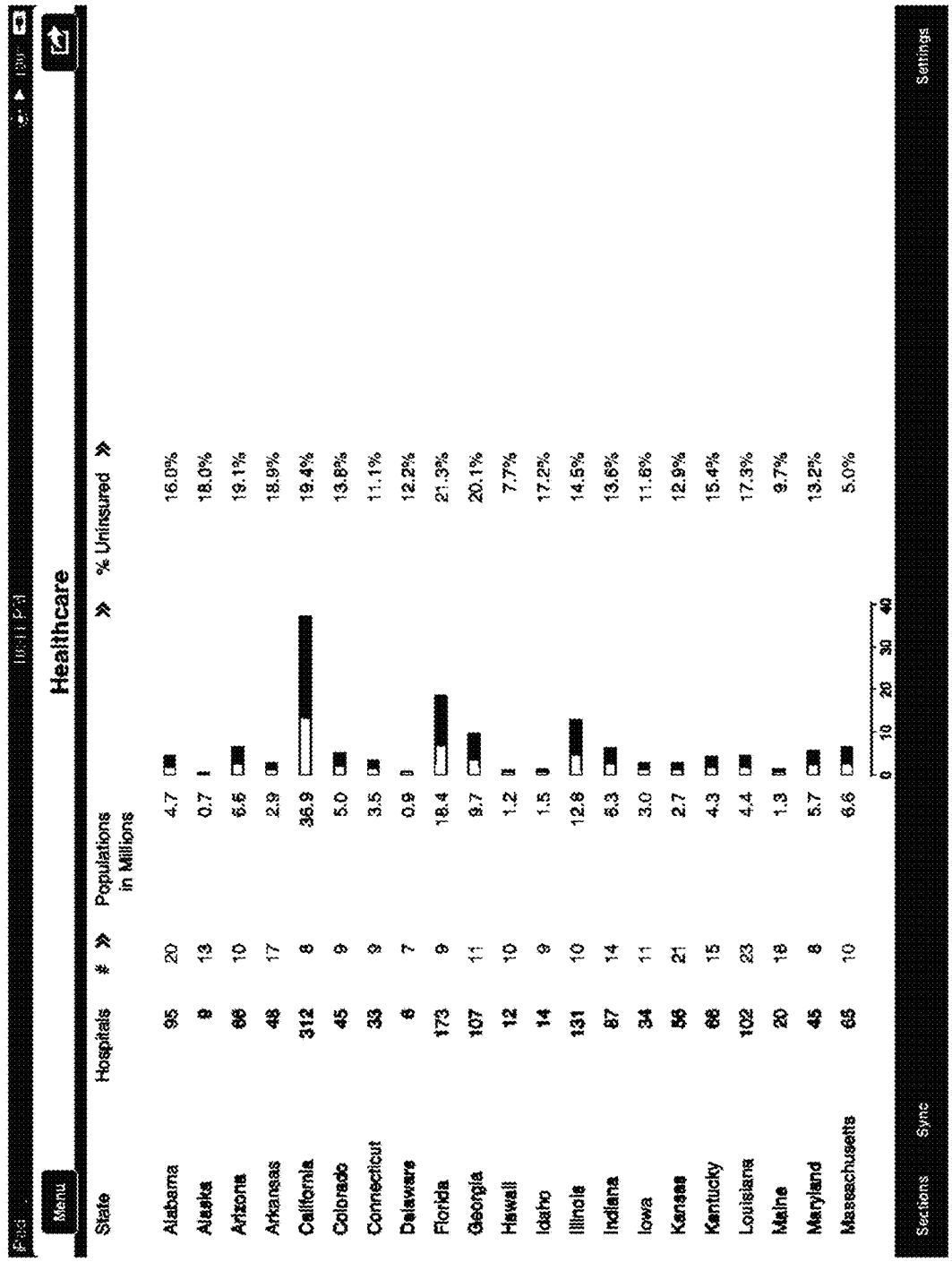

Selecting "Graph Column" from the menu (FIG. 66) results in the appearance of an additional column next to the selected numeric column. In the additional column a graphical representation of value appears (FIG. 67) providing a visual representation of the numeric data. This option can be enabled by default for any numeric column. This allows a graphical representation to be available for numeric columns in the interface without additional setup.

Figure 68:
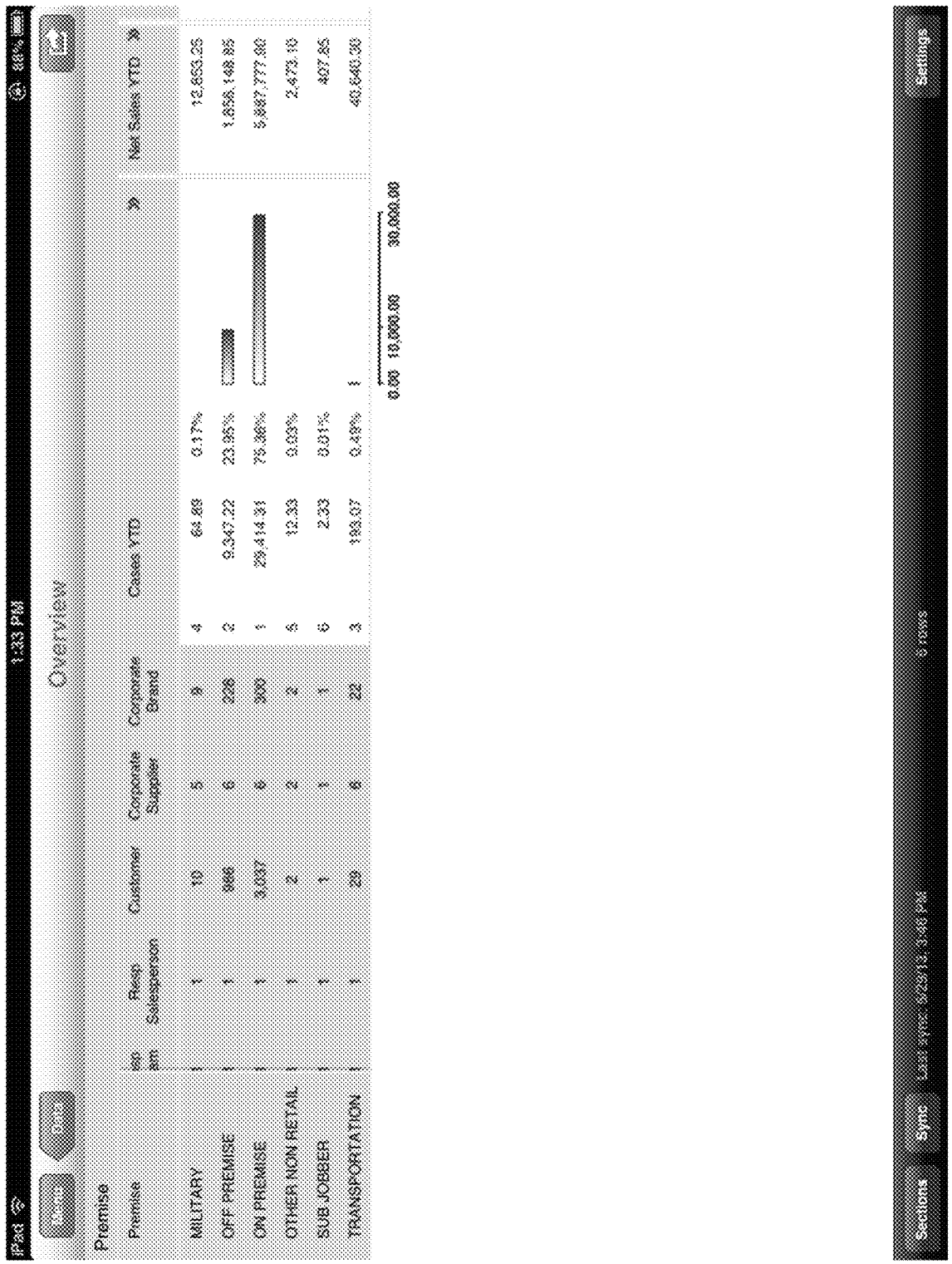

In another embodiment, tapping on an expandable numeric column header brings up a menu showing additional options including "Rank Column" and "Percent Column." Similar to "Graph Column," these selections result in the introduction of additional columns providing another way of looking at the same numeric data (FIG. 68). "Rank Column" results in the addition of a column showing the numerical rank of the row's value relative to the other values in the column. "Percent Column" results in the addition of a column showing the % of the total column value contributed by that row's value.

Figure 69:
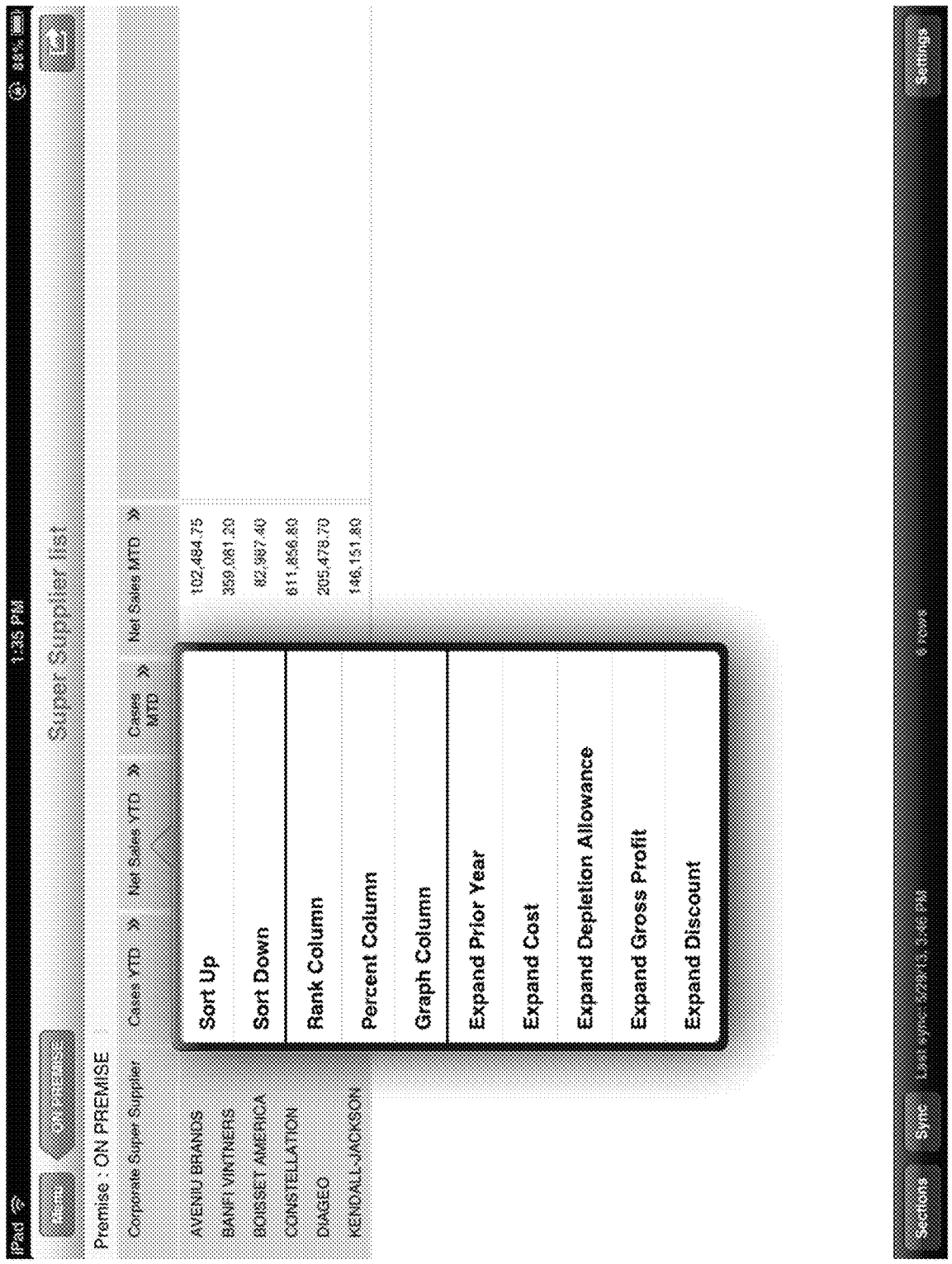

Numeric expandable columns may be expanded along a variety of dimensions such as time as in "Expand Prior Year" and related numeric metrics resulting in the display of additional, rather than just transformed, related numeric data. In the example (FIG. 69) "Net Sales YTD" may be expanded to show a variety of selectable related numeric metrics such as "Expand Cost", "Expand Depletion Allowance", Expand Gross Profit" and "Expand Discount." Selection of "Expand Gross Profit" results in the display of new columns (FIG. 70) including "Gross Profit YTD", Gross Profit LYTD", and the year on year changes such as "Gross Profit YTD Diff and "Gross Profit YTD % Diff."

Expansion of numeric columns in the time dimension may include showing the same data over different time spans or different time intervals. In one example, a column of sales for a year can be expanded into multiple columns of sales, one for each month of the year. Alternately, a column such as "Net Sales YTD" may have an option to "Expand Prior Year" (FIG. 69) whose selection would result in the addition of a column of prior year YTD sales at the same point in the earlier years.

The interface may also be enhanced so that columns that have been added through expansion can be expanded themselves into additional columns. This forms a tree of expanded columns based on the original column, with each expandable column forming a node of this tree. This allows the user to navigation through data columns through column expansion.

The schema by which numeric columns may be expanded to show additional columns of information is straightforward. In one embodiment (FIG. 71) the title of the initial expandable column is followed by a plurality of multiple row groups. Each group of rows comprises a menu title such as "Expand Prior Year" and the columns of data to be displayed upon selection.

Photograph Entry and Use

An embodiment may include the ability to take, upload photos and associate them with data being displayed. For example, when displaying a list of products, there may be the ability to display photographs of these products, their location in a store, and any advertising displays related to them. The mobile device may allow the end-user to take these photographs, and upload them the next time the device is connected to the back-end server.

Figure 73:
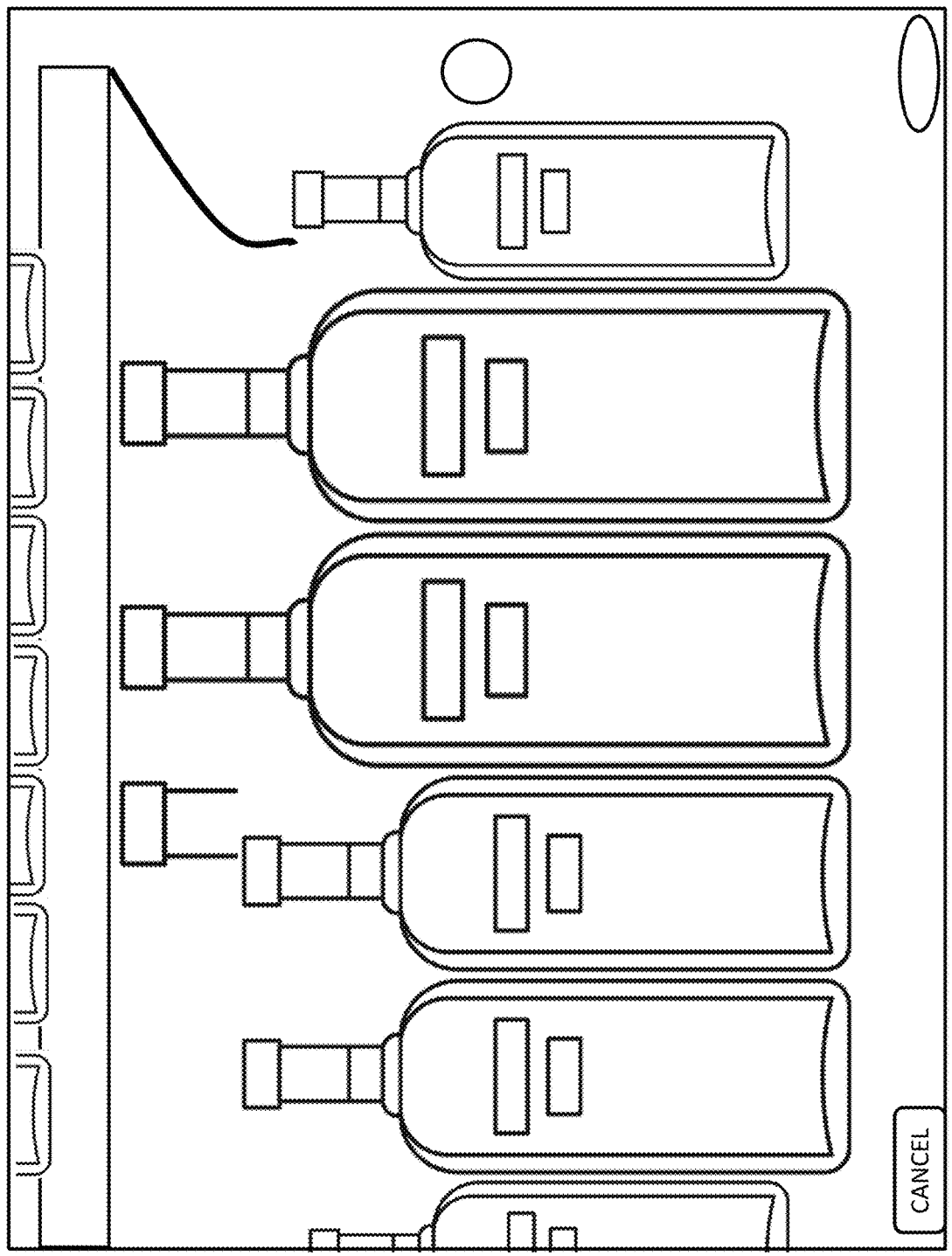

FIGS. 72 through 77 demonstrate the use of an interface for taking and uploading photographs. FIG. 72 displays a tablet matrix of cells, with elements being able to respond to a photo request as click-actions. In this embodiment, icons with a picture of a camera can be tapped to bring up a standard photo taking display as depicted in FIG. 73. The system may be configured to have other display elements, such as a missing image, capable of being tapped to take a photo. After the user takes a photo, the photo is stored locally so that it is ready for upload to a back-end server at a later time. By storing the photo locally, many photos can be taken in rapid succession, such as for different products, without having to wait for individual uploads to complete in between photo shots.

Figure 75:
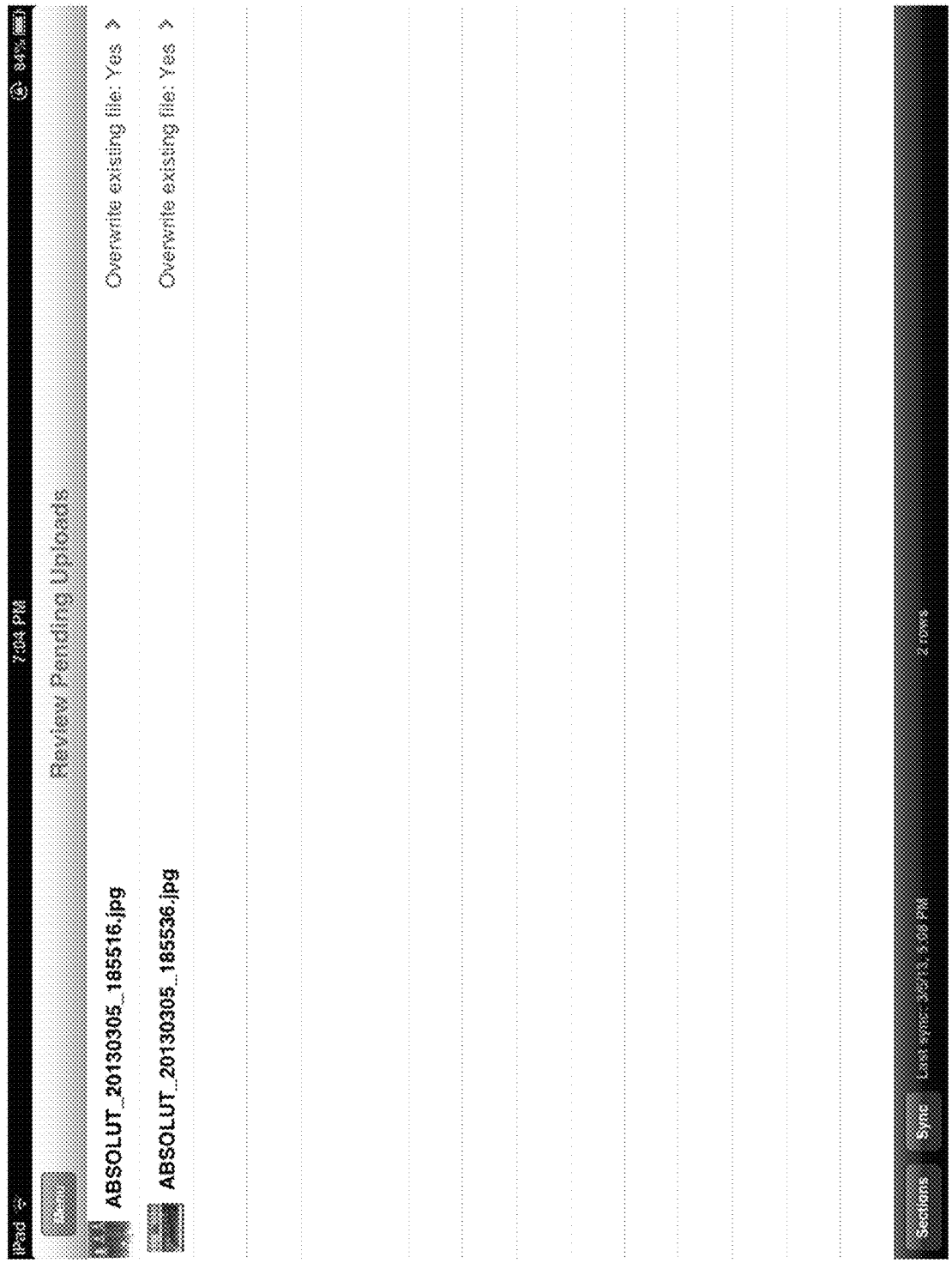
Figure 76:
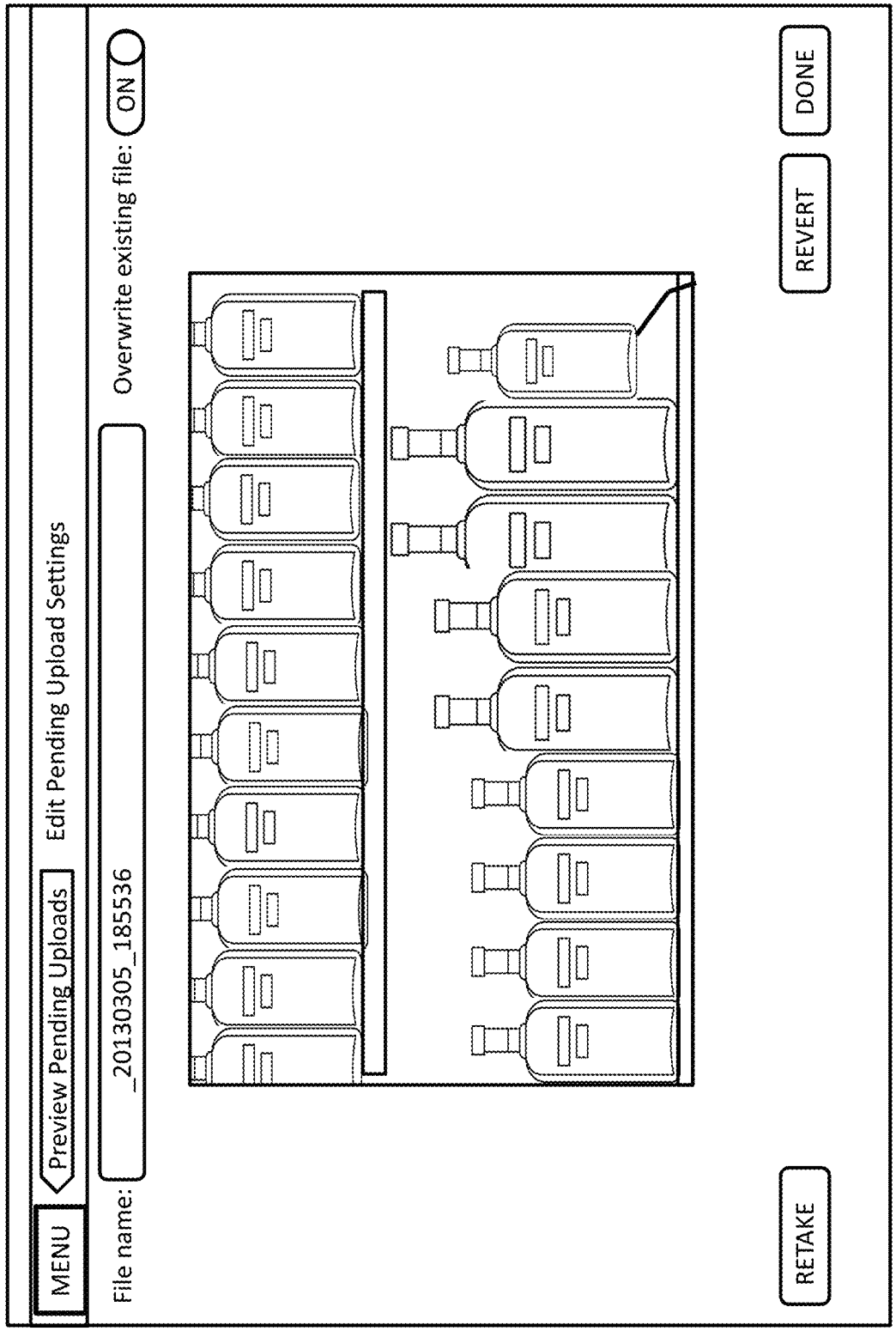
Figure 77:
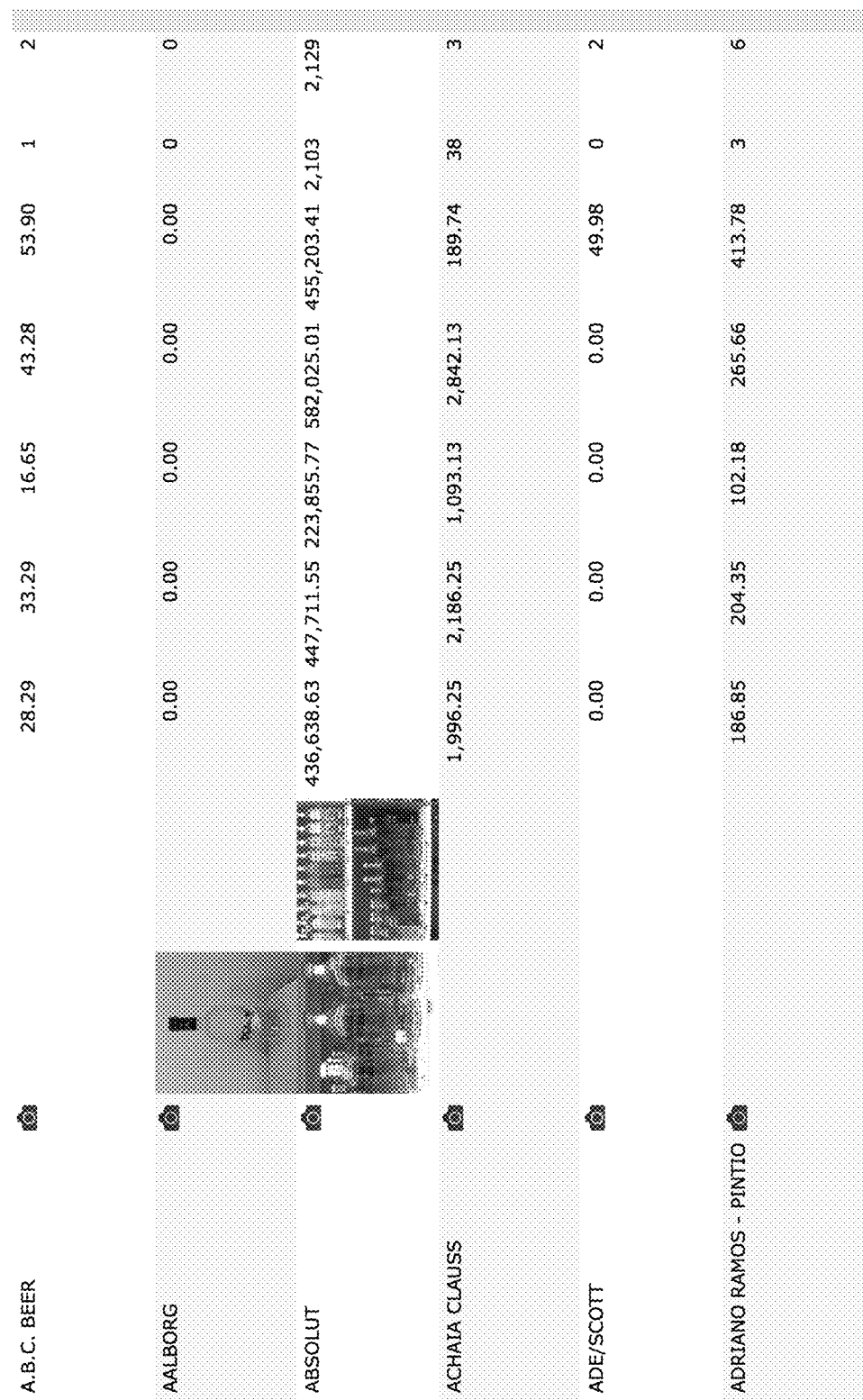

After the user has taken a number of photographs, they can switch to the Review Pending Uploads screen by selecting the menu item depicted in FIG. 74 to view and edit photographs, which are pending. Upon selection of the Review Pending Uploads menu items depicted in FIG. 74, a screen listing photographs that are waiting to be uploaded may be displayed as is depicted in FIG. 75. By clicking on individual photo list entries the user can access an Edit Pending Upload Settings interface as depicted in FIG. 76 to change photograph parameters, such as the file name, edit meta data that may be displayed in the listing of photographs, and the like. The Edit screen may also include save options, such as to allow overwriting an existing file.

Once the user has editing any pending uploads, the user can tap the sync button and upload the pending photos to the server, where the photographs can be attached to data, for display in a tablet matrix, such as that depicted in FIG. 75.

The photographs that are taken may be tagged with metadata identifying the original data element touched to take the picture, so that the server will be able to associate the photograph with that data element. This metadata may be displayed in the photograph list and pending upload displays.

Photographs, while in some ways may simply be another form of content, may provide context and scope (e.g. depth) of information that may augment alphanumerical data. Photographs are useful for collecting details that exist at a point in time during a transient process, such as production, retail sales, service delivery, and the like. For these and many other reasons they may be beneficial to operation of a business. However, without proper linkage and ways of associating photographs to each other and to the important business data that facilitates operating a business, their benefit can be missed. Therefore, by using the methods and systems described herein for linking data and other content items (e.g. photographs, video, publications, reports, and the like) to develop guided navigation pages for operating a business, value and benefits of photographs to a business operation may be substantively increased.

Exemplary scenarios in which photographs may be beneficial, when properly combined with operational business data, may include retail store fronts, shelf allocation, product placement, insurance claim handling, quality control and improvement, equipment maintenance, production line disturbance analysis, returned/damaged materials assessment, injuries, and many others. By taking a photograph and linking it with a range of data dimensions, including central dimensions as described herein, the methods and systems for operating a business based on guided navigation among information screens, deeper understanding of transient events may benefit. Photographs may also provide evidence of service delivery (e.g. signage installation), performance over time (periodic photographs of returned materials), and the like.

By combining photographs with linkable elements, such as central dimensions and various data domains, photographs that are collected and tagged as linkable content items may address handling of exceptions, such as during production. In an example, photographs of a break down of a production machine on a factor floor may be linked to a machine dimension, a product dimension, a customer order dimension, a preventive maintenance dimension, a service claims dimension, an enterprise resource planning dimension (e.g. production planning), and the like. Therefore when an equipment service provider is using the linked guided page methods and systems described herein he may select data items related to a customer's service requirements (e.g. factor visits to repair equipment) and gain access to the photographs associated with a customer, a machine, a service contract, production cycle data, an in-service date, a production machine lot code, and the like. In this way, if the same equipment is serviced at several different customers sites, commonalities among the customers (e.g. machine type, time in-service, etc.) may be leveraged to determine equipment failures through the use of photographs taken when an equipment failure occurs.

Another exemplary use environment for photographs may include product returns. A photograph of a returned product may be linked to a wide range of business operation items, such as a product part number dimension that can tie into a company's ERP system, a production lot code dimension, a production line/machine dimension, a production batch dimension, a raw material dimension, a customer and/or type of customer dimension, and the like. In addition a library of photographs may be collected and analyzed through association with various dimensions that may be linked to the photographs in the library. When analysis of a return is performed, photographs from the analysis may be added to the library and linked to these and other central dimensions.

While photographs may not have any inherently linkable information, merely linking a photograph to a data dimension (e.g. production lot) may, through the existence of associations between a production lot dimension and many other dimension and domains, many of which are described herein above, a photograph may take on a large number of valuable attributes and may be accessible from a large number of dimensions. As noted above a returned item serial number associated with a photograph, may facilitate linking the photograph to a batch of raw materials received from a supplier, thereby potentially increasing effectiveness of communications with the material supplier.

Other use environments for the methods and systems related to photograph use described herein may include inventory management, product placement, OSHA related compliance and reporting, human resource compliance data for accidents, existence or maintenance records of safety signage, any kind of service claim, and the like. A time series of photographs may be quite useful in substantiating sales revenue numbers, and the like.

The methods and system for configuring guided pages that are described in this document include methods and systems that may be used for configuring a set of guided pages for operation of a business activity based on a workflow for the activity, industry expertise, and a multi-domain, multi-dimensional, columnar-based data set derived from source data that may be relevant to the business activity. The columnar-based data set may be derived through a data processing engine, referred hereinto as "Spectre" that may facilitate building the data set from the data sources using a highly efficient computing methodology.

Data and formatting information for each guided page in the set of guided pages may be preconfigured and stored in one of a plurality of guided page caches that may reside on a server and on a client device, such as a tablet-based computing device. In this way, a referring guided page of the set of pages my present in the tablet-based user interface, active elements that may facilitate (via user clicking in the tablet-based user interface) access to a next or following guided page that may be selected from the set of guided pages. Likewise, based on user interaction with an active element of a presented guided page on the tablet-based computing device, data needed to produce a next guided page may be dynamically generated through a server-based operation of Spectre described herein as a "Dive". Unlike the preconfigured guided pages, a Dive may operate Spectre through a data query-like function to use a highly computation resource efficient process to analyze the columnar-based data set to produce the data needed for the next guided page. In this way, a set of guided pages may not require that all data needed for such guided pages be preconfigured and made available to a guided page generation capability on the tablet-based computing device.

In addition, each page of the set of guided pages may be organized around one or more industry-specific data dimensions. In addition, the columnar-based data set may be structured for rapid access by the Spectre data processing facility to generate a portion of the set of guided pages. In addition, at least one of the one or more industry-specific data dimensions may be a core dimension. At least one of the one or more industry-specific data dimensions may be a dynamic dimension.

The methods and systems for guided page generation described herein may include preparing a columnar-based multi-domain business intelligence data set, from a plurality of sources of data that can be independently formatted, by processing the data from the plurality of sources with a data calculation engine that organizes the columns to align with user specified and/or automatically determined dimensions that are associated with a workflow of a business and populating the columns with data that relates to each of the dimensions from each of the plurality of sources of data. The columnar data set may be prepared through a process of steps that may include parsing source data, harmonizing source data formats, normalizing strings of the source data per language of a locale or industry specific jargon, performing binary encoding and packing of number values, preparing labels that may act as links for attributes to data entries, sorting strings, and the like.

The Spectre engine may reference a semantic knowledge plan, referred hereinto as a "c-plan" that may indicate various data analysis functions and summary computations to be performed when accessing the columnar data to produce data for one or more guided pages in a set of guided pages. A c-plan may comprise a library of common data query expressions to add semantic knowledge to the columnar data base. A c-plan may be utilized in a guided page set production mode to facilitate the Spectre engine predicting requests for each client device based on prior "dive" requests from any of a plurality of client (e.g., tablet-based) devices. Prior dive request may be from the specific tablet-based device, another user, another party in a similar business or situation (e.g., requests for a first wine and spirits client may be predicted based on prior requests made by a second wine and spirits client). Prediction of dive requests may be based on changes to source data sets. Such predictions may derive from machine learning of the types of source data changes that tend to prompt more dive requests.

Such prediction of requests may result in generation of optimized, machine-level code for highly efficient computation of columnar data set query data results. The c-plan may further be useful for facilitating ad-hoc dive request query execution and synchronizing of server and tablet data stores and result caches. As an example of ad-hoc dive request query execution, a user may, such as through selecting an active element in a guided page, generate a request to a guided page formatting tablet function that requires accessing data that is specific to the request. In sequence, the client query result cache is first checked for data that may satisfy the specific request. Next the request may be transmitted to the server where the server query result cache may be checked for corresponding data. Lastly a server calculation using the Spectre engine that may reference the c-plan to access relevant data in the columnar data set may be performed and cached on the server. This server-generated result may be transmitted to the client in response to the query and stored in the client (e.g., tablet) result cache.

Spectre performs columnar data set generation (e.g. building or production operations) and analysis of the columnar data it has generated using highly efficient processing mechanisms, including query optimization and machine code optimization and execution. Generating a plurality of guided navigation pages may be performed by the methods and systems related to Spectre described herein in response to a user inquiry to provide guided navigation pages to satisfy data viewing requirements of a workflow of a business. This may be performed by processing data with a processor that accelerates page generation operation through utilization of native machine memory caching of similar c-based data. In addition to caching the columnar-data, the user inquiry includes logical data access instructions that are converted into machine-specific code to further improve computer performance. The machine execution of a user query may be optimized to group query functions into common execution threads based on usage of common data sets by different functions, and to group common calculations across query functions.

Machine memory caching may be optimized with columnar database since similar data is physically proximal in a columnar data set; therefore accessing columnar data results in similar data also being accessed and stored in machine memory cache. The result is improved computer performance. Machine code compiled query and calculation expressions further improves performance of a server or other computer executing the Spectre methods and systems described herein at least by more directly using the computer's native processing capabilities. Dive requests (e.g., queries) may be analyzed to optimize machine execution further, such as by determining subsets of calculations that are common for query functions; and grouping query functions into common execution threads based on usage of a common data set by more than one query. It is note that dive queries may have many more expressions than typical SQL database queries; therefore query function analysis and optimization may have unexpected measurable benefits compared to prior art data base query processing techniques. This is evidenced at least in that machine code query compilation is atypical in relational database use deployments.

Additionally, generation of a dedicated database for generating guided pages, e.g., a Spectre generated columnar data set or database further enhances dive request execution since the dedicated database is structured/optimized/tailored for diver operation. This is in strong contrast to most existing business data intelligence solutions that rely on third-party generated databases. Such reliance reduces complexity for these solutions, but increases processor load and execution time.

Spectre further enhances the performance of a computing system on which it is executing through reduction of per-user machine resource overhead. In an example, per-user machine resource overhead reduction may comprise stateless query execution that may access query-specific data in a native machine cache memory, wherein the data is stored in the machine cache as a result of execution of accessing data in a columnar database that is proximal to the query-specific data. In an example of a stateless query engine, all query-specific state information can be disposed of after the query is run (e.g., does not persist in memory). In a further detailed example, only query results and any machine native memory management/caching results stay in memory; such as a result table and the columnar-based data set itself that is cached by the native memory management capabilities of the server.

An exemplary deployment environment of Spectre may be in combination with a visual data integration configuration user interface that is adapted to facilitate automatically suggesting guided page data query functions, such as by visually presenting data processing functions as graphical elements rather than merely drop down lists of commonly used query functions that are prevalent in text-based interactive development editors (IDEs).

Functions for producing data for use in sets of guided pages that may be performed or enhanced by Spectre include production build of a columnar-based data set; grouping; time series, multi-tab, dimension count, multi-model, and the like. In an example a time series engine that targets summary descriptions (e.g., revenues computed over many time ranges) to generate sets of queries that build on common data usage may benefit from query analysis and machine code optimization capabilities of Spectre that are described elsewhere herein.

Unlike prior embodiments for generating guided pages that rely extensively on human definition of dimensions due to a practical limit on the number of dimensions that can be handled effectively with most deployments, Spectre facilitates dynamic dimension definition due to its efficient operation that is independent of the number of dimensions in a data set. Spectre effectively scales its performance with the data set size and number of dimensions. This lends Spectre to be an effective data evaluation tool for businesses trying to determine what dimensions of the various data sources that are required to perform various workflows may be most useful. Since there is no limit on the number of dimensions that can be processed, Spectre itself is an excellent tool to facilitate discovering what dimensions are important to a client/business function, and the like. This flexibility allows users, such as individual group managers or the like to configure local or process flow-specific data sets, even if a dimension that is important to the user has not previously been defined when the data set was originally set up. A method of business process relevant dimension discovery can include generating a guided page client data set with a very large number of dimensions, evaluating how guided pages using those dimensions are employed by users, and configuring a production "dive" c-plan based on that evaluation.

The capabilities, functions, and features of the methods and systems related to use of a Spectre-like data processing engine are further described in the following exemplary embodiments.

Figure 78:
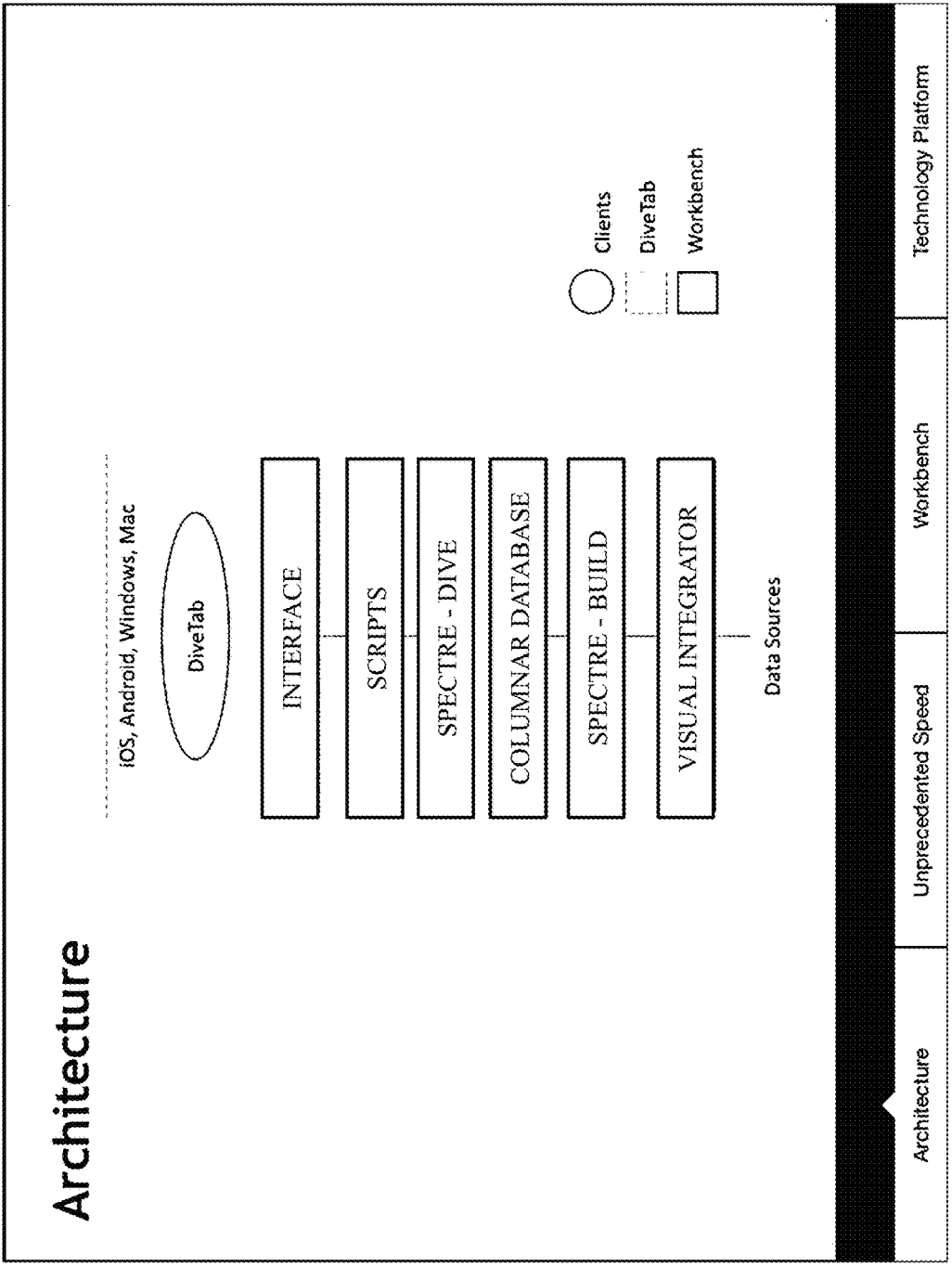
FIG. 78 depicts a block diagram of an embodiment of a columnar-based data processing system for generating guided pages.

Referring to FIG. 78, an architecture that incorporates the Spectre data analytics and processing engine described herein is depicted. Data sources are processed through a data integrator to address differences in formatting, and the like. This integrated data is further processed by the Spectre engine to build a columnar database that is suitable for the highly efficient data processing and guided page generation functionality described herein. This columnar data set, depicted as "C-Base" can be processed by scripts to deliver data through an appropriate interface to a client-based embodiment of a guided page application, here depicted as "DiveTab".

Figure 79:
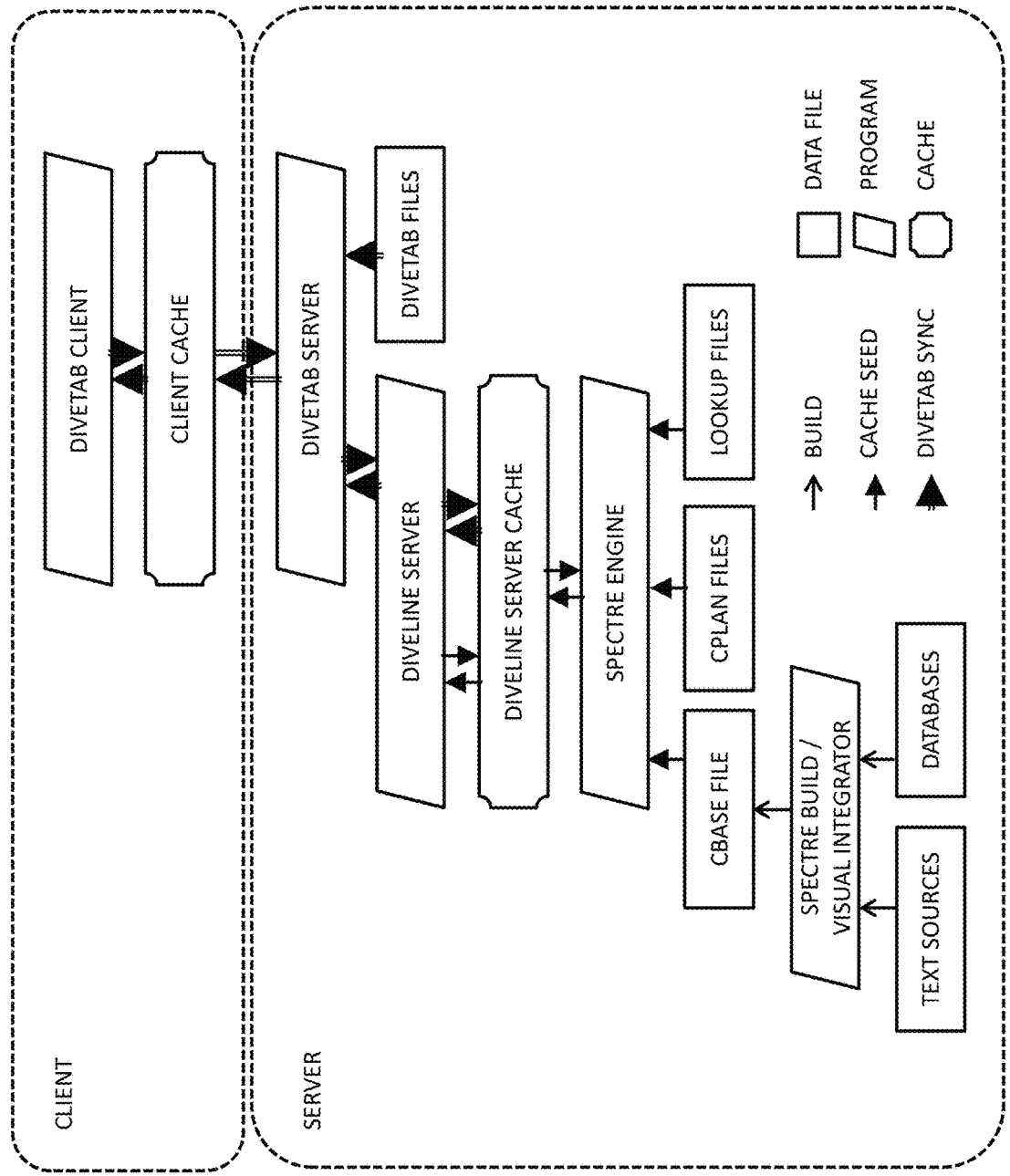
FIG. 79 depicts a data flow diagram of an embodiment of the system of FIG. 78.

Referring to FIG. 79, a data flow diagram for a Spectre-based deployment is depicted. Data sources, such as databases and text sources are received by an embodiment of Spectre that builds a columnar data set as described herein. The Spectre engine further processes the columnar data set along with c-plan files and other guided page configuration related files (e.g., lookup files). The output of this further processing may comprise query cache on a server on which Spectre is hosted (e.g., Diveline server cache). A dive request server operating on the server may communicate with the query cache and a client device interface server (e.g., Divetab Server) to satisfy queries and synchronization operations with client devices. Data brought over from the server may be stored in a client query result cache that may be the first resource accessed when an active element in a referring guided page is accessed for producing a next/follow-on guided page. At least three types of data operations are depicted. Build operations are performed by the Spectre engine to generate the columnar data set. The Spectre engine performs cache seed operations to generate query result data for storage in a server cache. Sync operations are performed between a client device (e.g., a tablet-based device with a guided page application) and the server.

Figure 80:
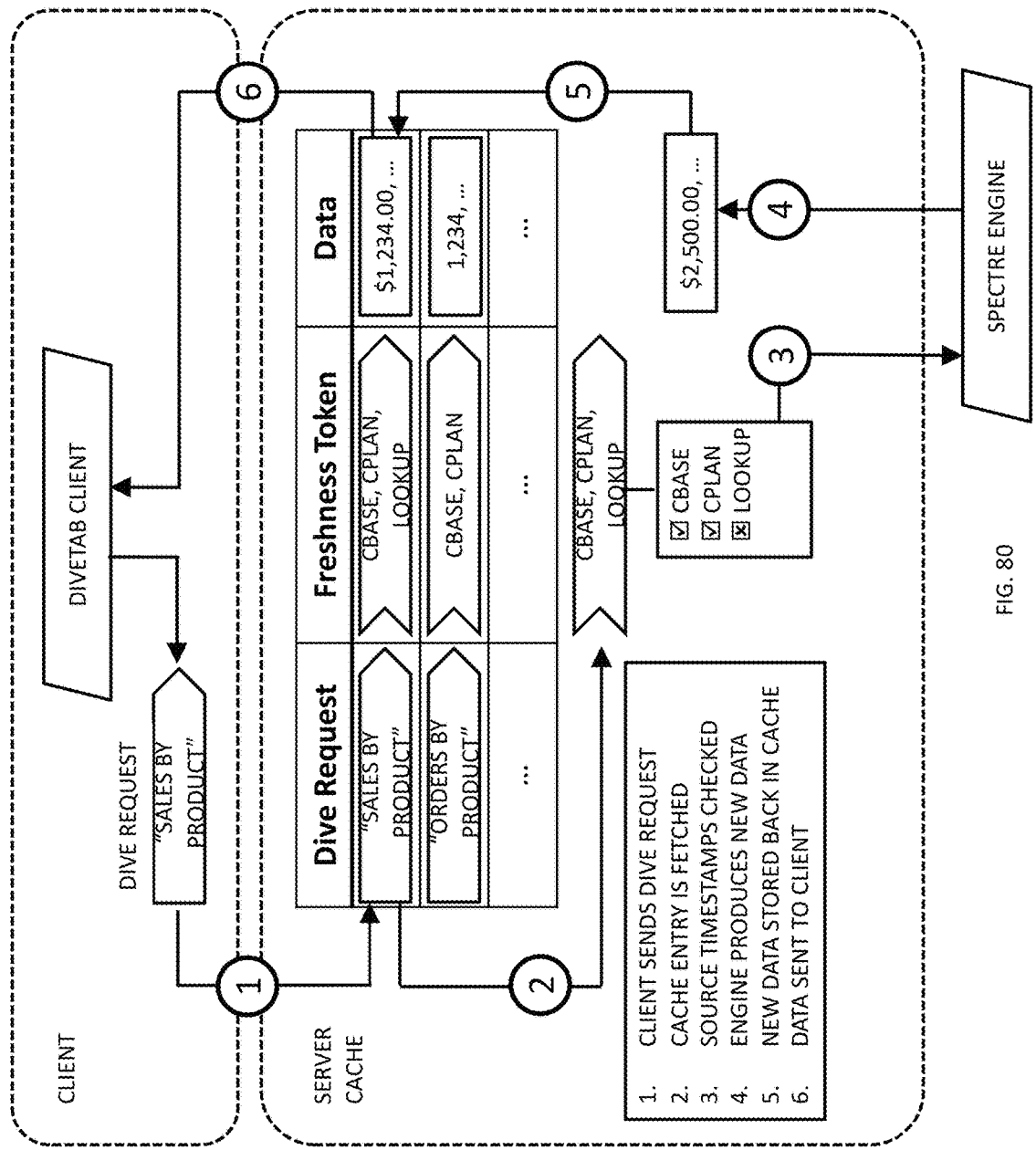
FIG. 80 depicts a server cache lookup function of the data flow of FIG. 79.

Referring to FIG. 80, an exemplary data flow diagram representative of a server query cache lookup is depicted. In step 1, a client guided page application sends a dive request to a server. In step 2, the request is analyzed and a cache freshness token is evaluated. If the token indicates that the server cache data may not be acceptable to meet the dive request of step 1, the Spectre engine is activated to perform the query. In step 3 the query cache token time stamps are evaluated. Here the result indicates that the columnar data set (CBASE) and c-plan (CPLAN) token elements are acceptable, but the lookup token is not. In step 4, the Spectre engine produces updated query results that are stored in the server cache during step 5. The client application, and associated guided page is updated with the Spectre generated query results in step 6.

Figure 81:
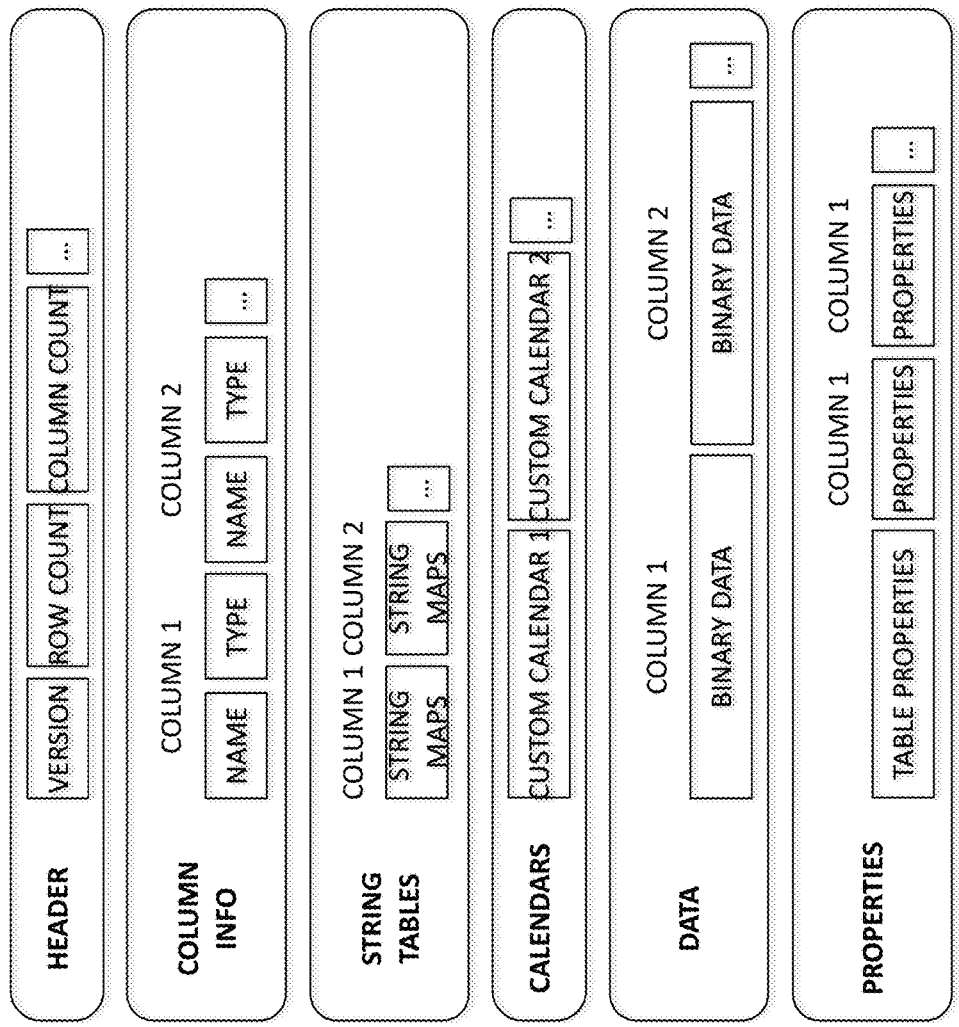
FIG. 81 depicts a block diagram of a columnar data set generated and employed by the methods and systems described herein.

Referring to FIG. 81, an exemplary columnar database embodiment is depicted. A columnar-based data set may include a header, column information, string tables for mapping indexes into result string values, calendars, data, and properties. In the example of FIG. 4, column 1 may include a name and type. Data in column 1 may include certain strings, custom calendars, binary data, properties, and the like. Similarly scoped data may be found in columns, 2 through N.

Figure 82:
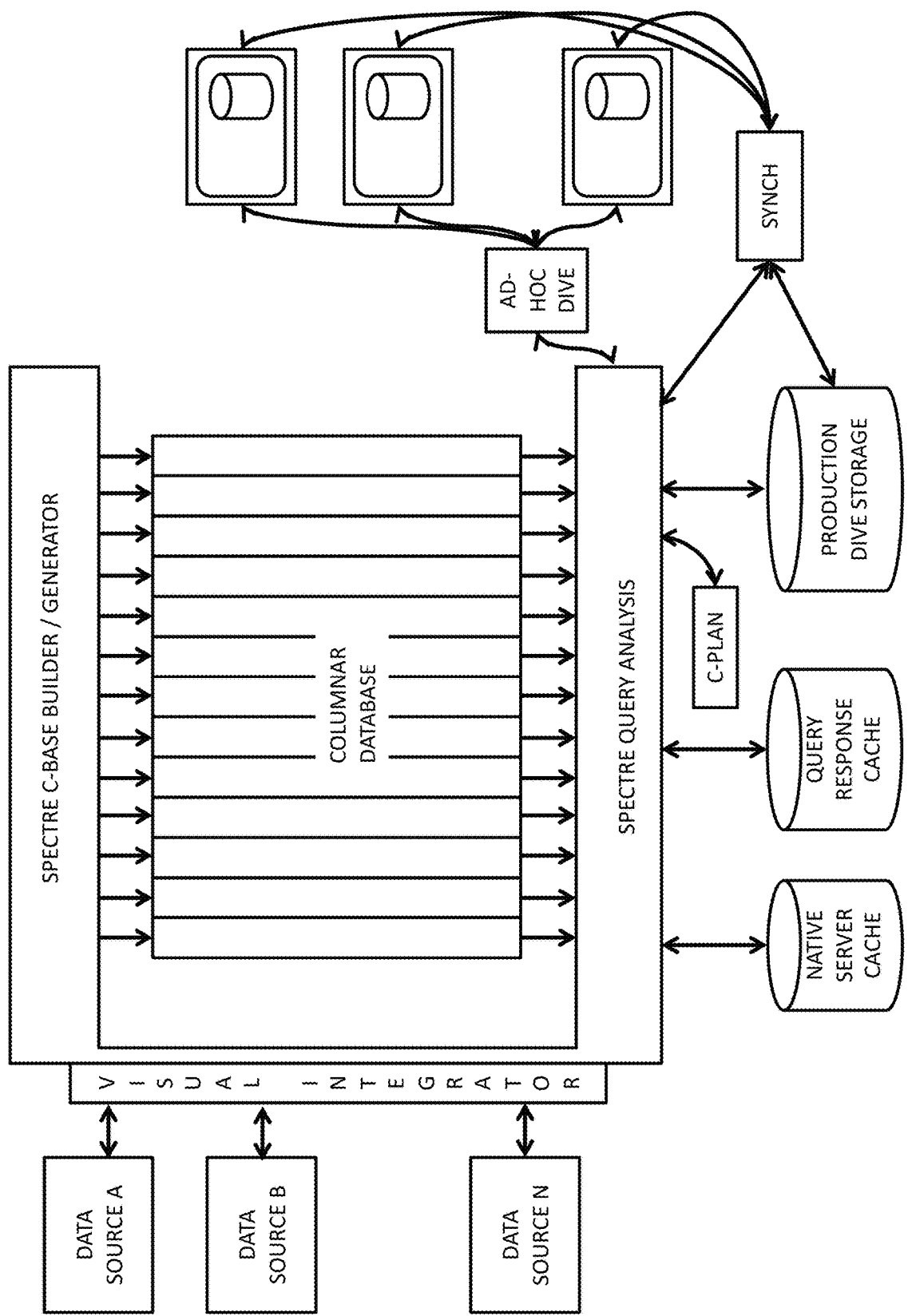
FIG. 82 depicts a block diagram of a deployment of the current methods and systems.

Referring to FIG. 82, an alternate view of an embodiment of a Spectre-based deployment is depicted. In this embodiment, the elements depicted and described in FIGS. 1 and 2 herein are represented, along with a native server cache, production dive storage, and multiple client devices. Also depicted is a logical ad-hoc dive interface between the query analysis capabilities associated with the Spectre engine and a logical synchronization interface.

Figure 83:
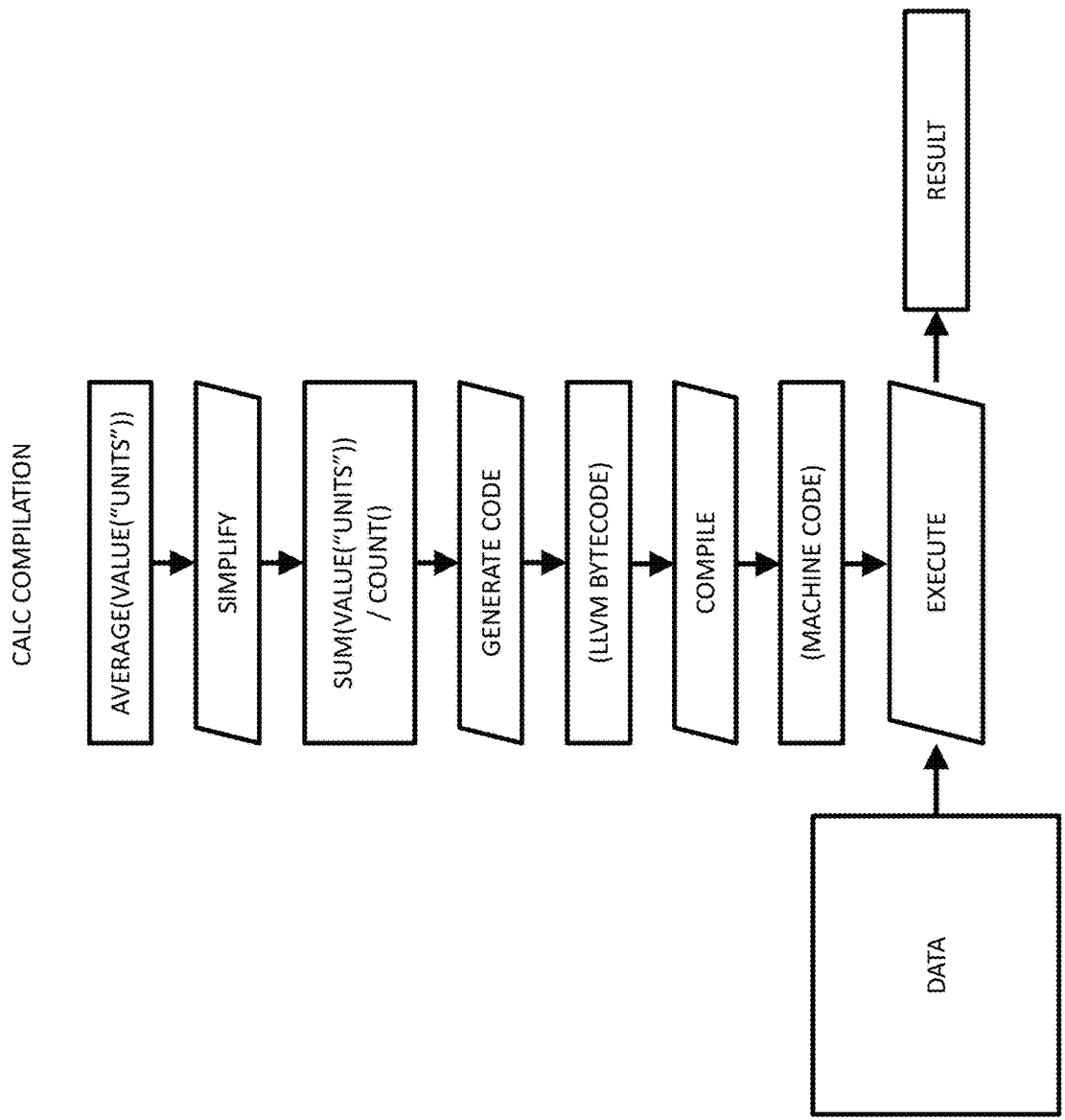
FIG. 83 depicts a flow diagram for optimizing data queries.

Referring to FIG. 83, an example query analysis and machine code generation flow chart is depicted. In the example of FIG. 83, an "AVERAGE" query function is analyzed. First the query function is simplified. The simplified function is processed through a code generation facility. The generated code is compiled for the particular target server processor to produce highly efficient machine code. Lastly the target processor executes the machine code.

Figure 84:
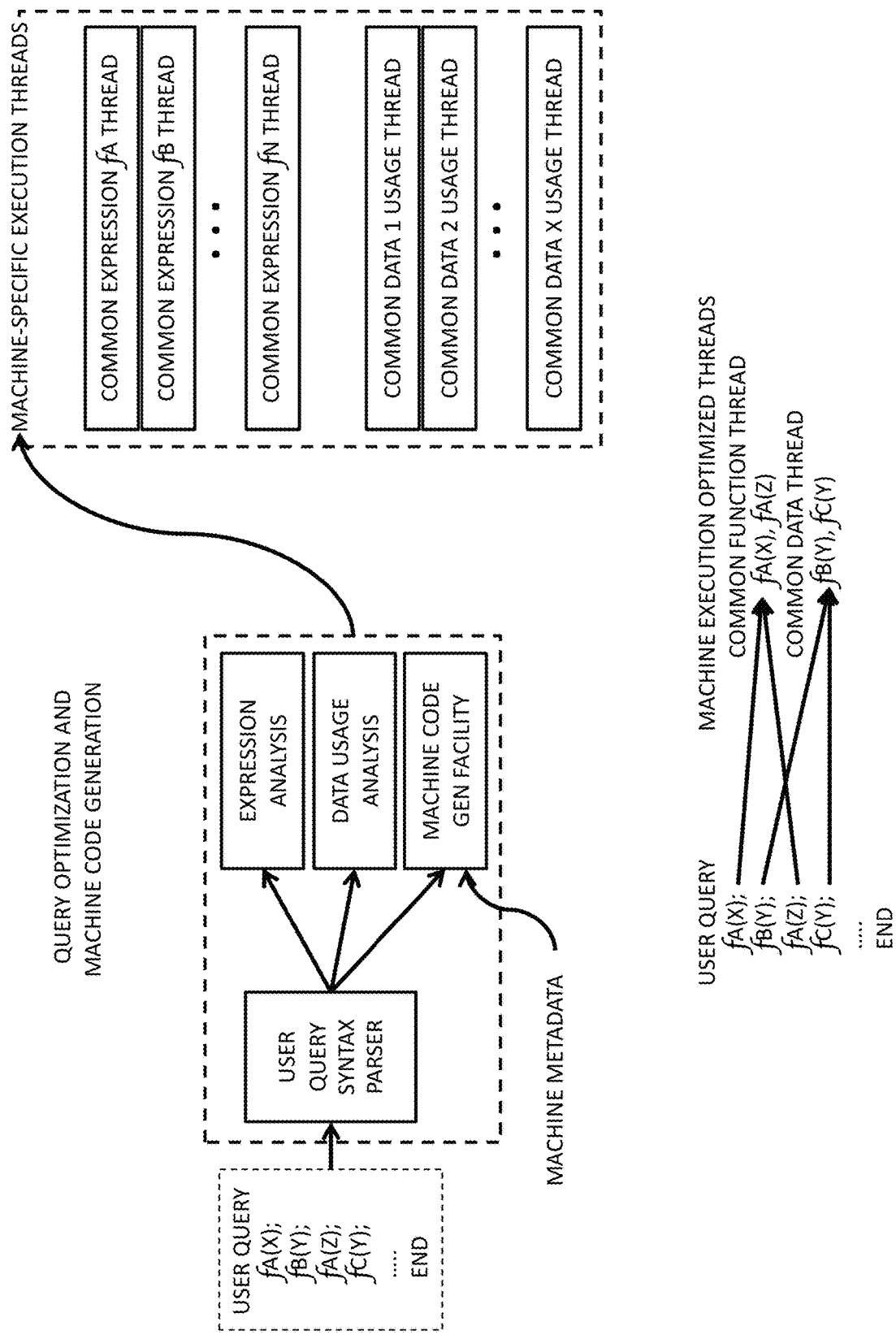
FIG. 84 depicts an alternate view of optimizing data queries.

Referring to FIG. 84, alternate embodiments of the query analysis and optimization capabilities described herein are depicted. In the embodiment of FIG. 84, a user query is optimized through parsing, followed by expression analysis, data usage analysis, and machine code generation. Machine code generation may be targeted to a particular machine through machine metadata that may describe the particular machine (e.g., a compiler reference). The result may include a plurality of machine code executable threads that may be organized to group common expressing in a single machine executable thread and to group expressions that access common data into a single machine executable thread.

Below is an exemplary columnar data set build algorithm that builds a columnar database called "demo_drl.cbase" with seventeen columns from text input file "demo_drl.txt".

```
build {
  text-input "demo_drl.txt" {
  column "Order Num" type="string"
  column "Date" type="date"
  column "YearMo" type="period" calendar="gregorian
     month" format="YYYY/MM"
  column "Quarter" type="period" calendar="gregorian
     quarter" format="YYYY/Q"
  column "Customer" type="string"
  column "Customer Name" type="string"
  column "City/State/Zip" type="string"
  column "SIC Description" type="string"
  column "Salesperson" type="string"
  column "Sales Region" type="string"
  column "Product Family" type="string"
  column "Product Name" type="string"
  column "Units" type="integer"
  column "Cost" type="fixed100"
  column "Revenue" type="fixed100" format="$ #, #0.00"
  column "SIC Code" type="string" required-
     dimension="SIC Description"
  column "Address1" type="string" required-
     dimension="Customer"
  }
  output "demo_drl.cbase"
}
```

Below is an algorithm of an exemplary c-plan using the columnar database "demo_drl.cbase". This algorithm produces time series summaries of five items over a year-to-date time range.

```
cplan {
  input "demo_drl.cbase"
  calc "Order Count" 'dimcount("Order Num")'
  calc "Customer Count" 'dimcount("Customer")'
  time-series {
  date "YearMo"
  // Anchor at the end of the last month we can find in the
     cBase
  anchor 'periodend(max(value("YearMo")))'
  summary "Units"
  summary "Cost"
  summary "Revenue"
  summary "Order Count"
  summary "Customer Count"
``` ranges {
year-to-date
}
}
}

Below is an algorithm of an exemplary dive (client data query) of the columnar database generated by the algorithm above based on the c-plan algorithm above. The dive is to request three columns of data within a "Sales Region" dimension.

dive {
cplan "demo_drl.cplan"
window {
dimension "Sales Region"
column "Order Count"
column "Units YTD"
column "Revenue"
}
}

Figure 85:
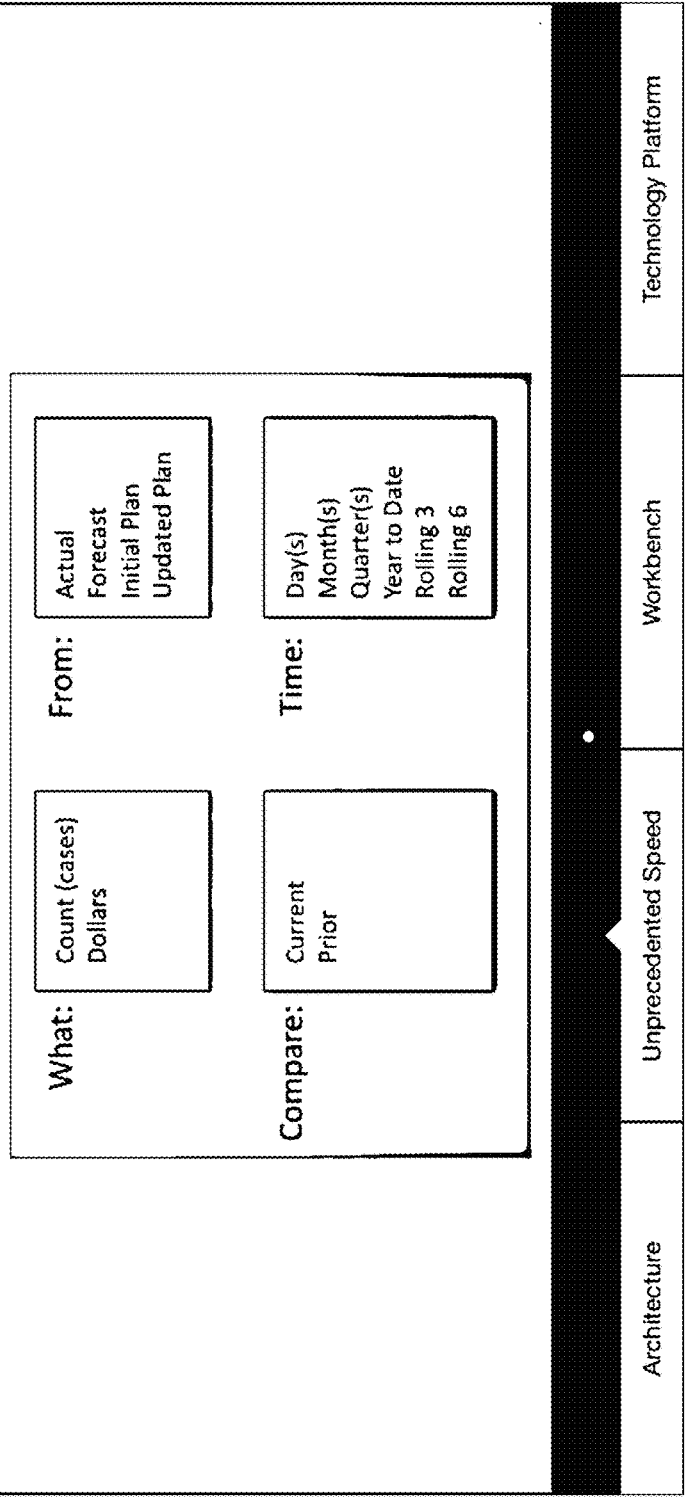
FIG. 85 depicts a c-plan for a fast time series computation.

An exemplary embodiment of a fast time series c-plan is depicted in FIG. 85. A time context compare generator may generate a time series for a point in time to produce a plurality of values, a comparison (e.g., a difference or delta), and a measure of the comparison (e.g., a percentage of the difference). In the fast time series c-plan example, a wine and spirits distribution data set may be queried to count cases and dollars from a plurality of data sources including actual results, forecast results, an initial plan, and an updated plan. The c-plan may perform comparisons of a current and prior time periods selected from a set of time periods including days, months, calendar quarters, year to date, rolling 3 time units (days, months, and the like), and/or rolling 6 time units.

Guided Page Type Relationships

Figure 86:
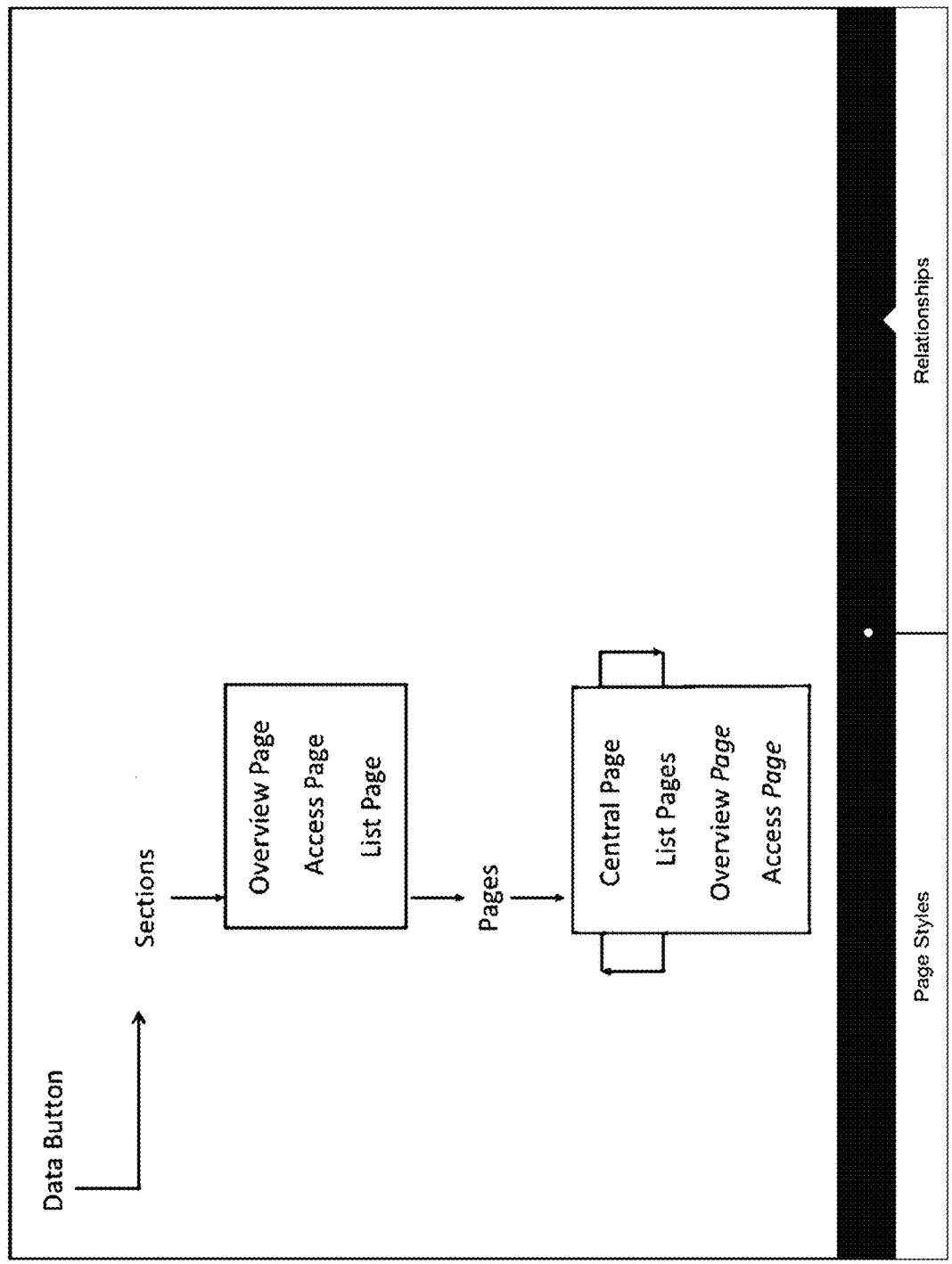
FIG. 86 depicts relationships of select guided page types.

Guided pages may be configured in an informal hierarchical structure as depicted in FIG. 86. An active element in a guided page, such as a data element may preferably direct a user to a first page in a section, such as an overview page of a section. Pages within sections may be directly accessed. Such pages may include an overview page that may link to list pages, a plurality of access pages that link to central pages, and a plurality of list pages that may link to other list pages or central pages. Pages that are accessed within a section may include a central page that shows all relevant information about a dimension, list pages that list dimension values off of a dim-count. Typically only one central and one list page is prepared per primary dimension. Overview pages and access pages may also be accessible within the pages of a section.

Guided Page Toc and Qv Location

Figure 87:
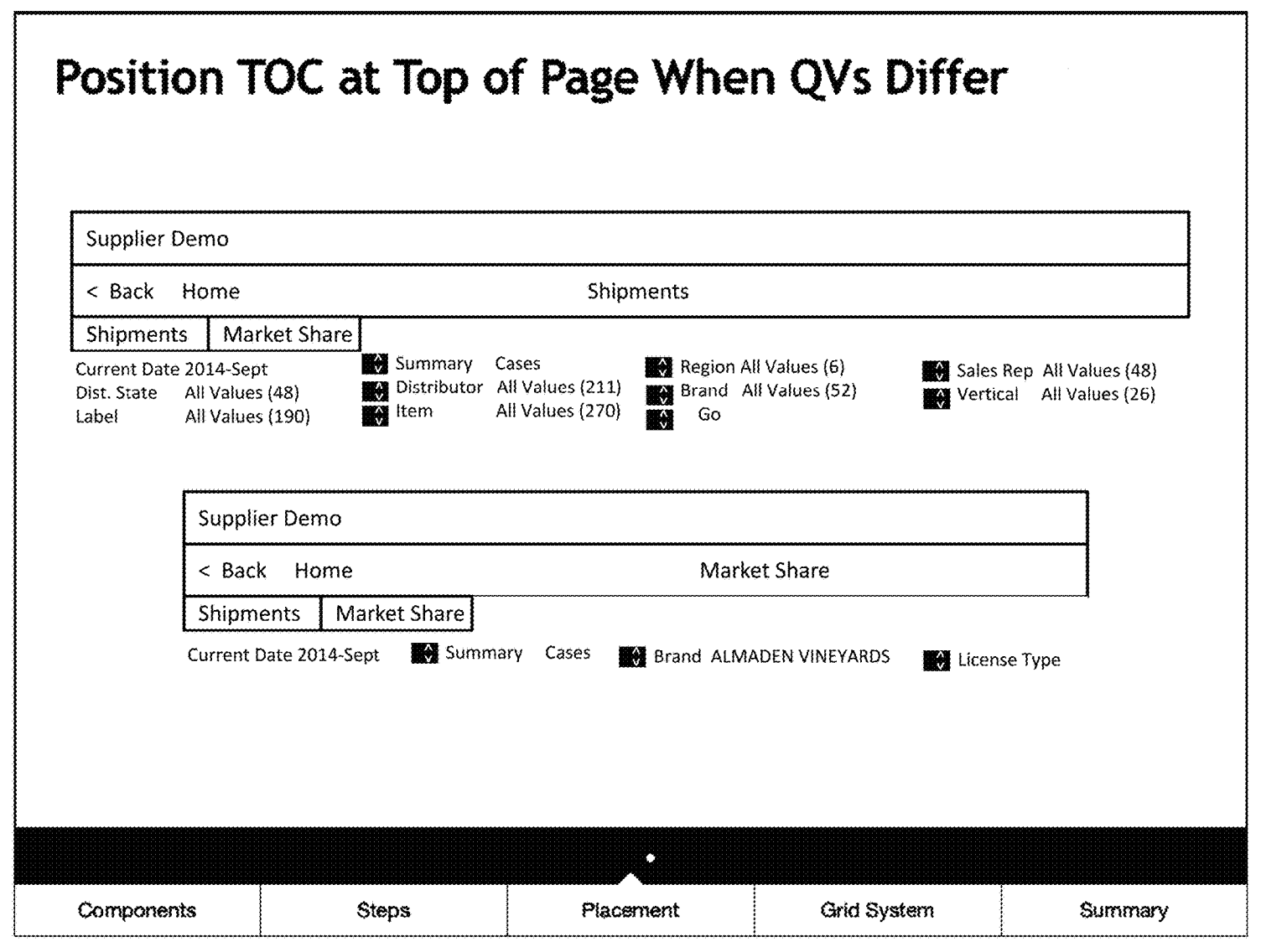

Exemplary guided pages that are configured with differing table of content positioning based on an association of the query values used to generate a current page and query values used to generate companion pages in a set of pages. In an example FIGS. 10 and 11 depict different table of content positioning. In FIG. 87, a table of content is placed at a top of a guided page when query values differ from page to page.

In the example of FIG. 87, a first guided page query value is based on shipments and a second guided page query value is based on market share. Therefore, the table of content is presented at the top of the guided page above the query value. This connotes to the user that while the two guided pages share a common top line content reference, the query values, and therefore the content of each page is different.

In the example of FIG. 88, a set of guided pages share query values so the query values are positioned above the table of content. This connotes to the viewer that the set of guided pages share common query values but present different content within those query values.

Multi-Column

The methods and systems of columnar-based data set generation and use via a highly efficient data analytics engine that leverages native machine capabilities, such as native machine caching of proximal data in the columnar data set and machine code generation and execution of optimized data query functions may facilitate dynamic expansion of data presented in a single guided page that represents dimension counts for a plurality of instances of a given dimension. Unlike prior art business intelligence analysis and viewing implementations that could not produce details of summary totals of dimension counts (herein "dim-count") without having to regress through the data generation process to original source data or pre compute pages with all possible breakouts of dim-counts, the Spectre-based data processing capabilities described herein provides a dynamic, near real-time dim-count breakout capability.

In an embodiment, the methods and systems described herein for guided page generation and use may comprise one-click dim-count expansion and display of a guided page by a user clicking a multi-column active element in a referring guided page to produce a dim-count expanded view of the referring guided page data in a next guided page.

A multi-column capability may be embodied in a matrix that presents a plurality of data domains in a first column and a count of all occurrences of a dimension for each data domain in a second column; each data domain row is split into multiple rows that represent unique combinations of each data domain and a unique instance of the dimension so that the second column shows only a total of occurrences of each instance of the dimension for the specific combination of data domain and dimension instance.

Alternatively, a multi-column capability may be embodied in a matrix that presents a plurality of instances of a first dimension and a count of all occurrences of a second dimension for a first domain instance in a second column, each first dimension instance row is split into multiple rows that represent unique combinations of each first dimension and a unique instance of the second dimension so that the second column shows only a total of occurrences of each instance of the second dimension for the specific combination of first dimension and second dimension.

In an alternate embodiment, a dim-count matrix may be presented in a guided page that may include column headings that comprise dimensions of the data and rows that comprise domains of the data. A multi-column function may take any dimension that is displayed as a column heading and create rows that represent unique combinations of each row domain with the selected dimension so that the number of rows formed per original domain row equals the dimension count (dim-count) in each cell in the multi-domain activated dimension column. Further in this embodiment the dim-counts for all of the other columns in each original row are divided properly to the resulting individual combination rows so that the total of dim-counts in the resulting combination rows equals the dim-counts in the original non-combined row.

A multi-column capability logically involves separating a dim-count, which is a summarized count of data elements that are identified by a dimension (and likely further identified by some other data aspect, such as another dimension or a data domain) into counts for its individual data elements. In an example a dim-count represents premium sales per salesperson. The data elements that are used to compute the dim-count are customer sales, so the dim-count is a total of premium sales across all customers to whom a premium sale has been made. The dim-count represents one or more premium sales to one or more customers. Some premium sale customers have received multiple premium sales, whereas others may have received only one premium sale. Therefore, separating the individual dim-count into its individual customer elements results in a premium sale count for each customer.

Leaping from a dim-count to individual elements that make up the dim-count may require having access to the individual elements. In the present embodiments, such access may be provided efficiently and with low computational overhead through an ad-hoc query of the columnar data set using the Spectre query optimization and machine code execution capabilities.

Figure 89:
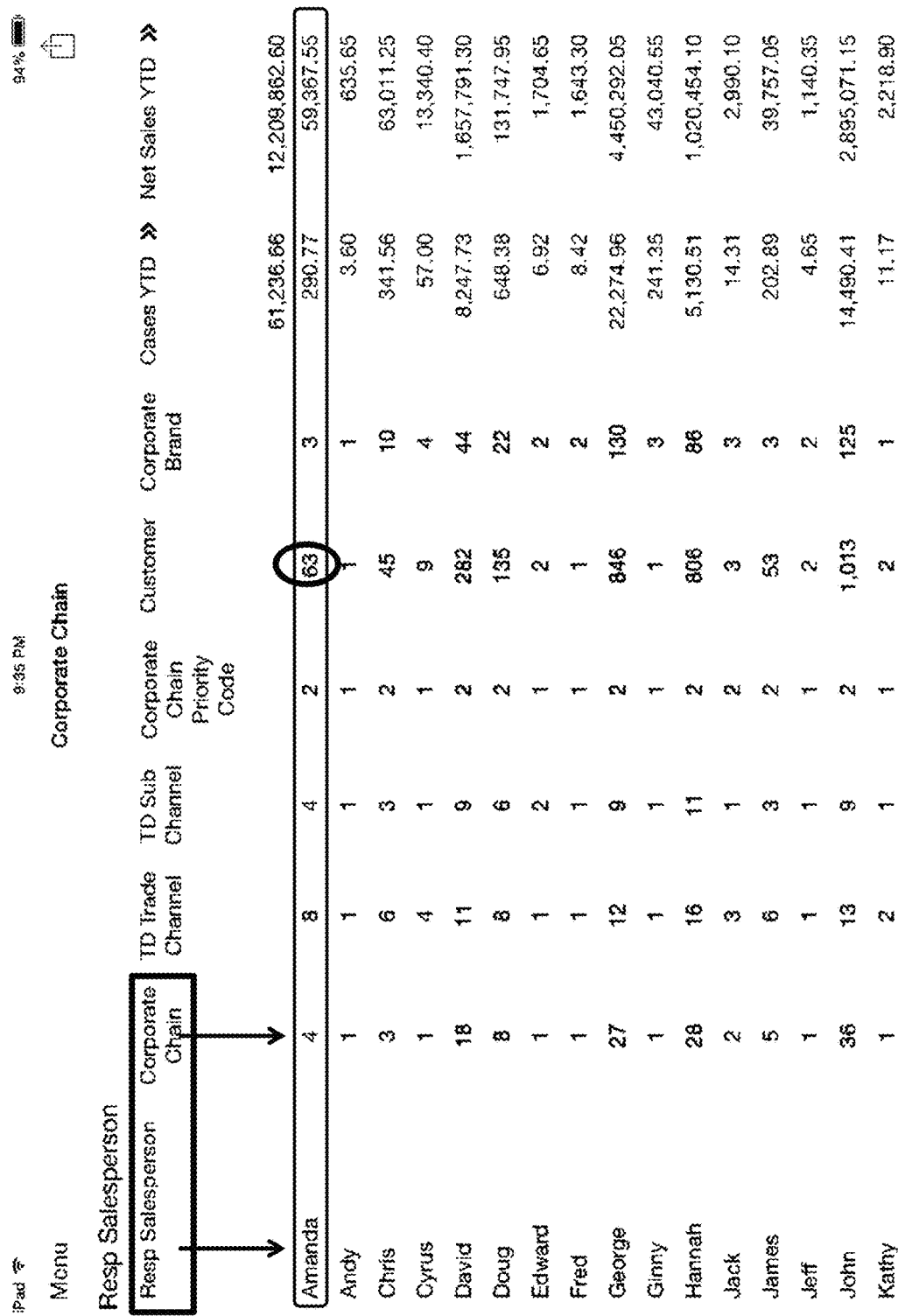

Referring to FIG. 89, a guided page of responsible sales persons is shown. Various dim counts for dimension, such as corporate chain, TD trade channel, TD sub channel, Corporate chain priority code, customer and the like are presented in this guided page. Note that for sales representative Amanda, the total corporate chain dim-count is 4 and the total customer dim-count is 63.

Referring to FIG. 90, a multi-column/dim-count breakout function is activated for the corporate chain dim-count.

Referring to FIG. 91, a resulting guided page is produced that breaks out the corporate chain dim-count to show 4 separate rows for sales representative Amanda, one for each of the four dim-counts from the referring guided page of FIG. 89. Further note that the total customer count of 63 is properly allocated over the four individual corporate chains.

Subsets

A computing architecture comprising a plurality of client devices and at least one server device that facilitates presenting processed portions of a multi-domain data set in a client electronic display may present requested portions through a multi-domain data set filtering process or by accessing a preconfigured duplicate of the requested portion of the multi-domain data set. The following disclosure describes techniques for automatically operating in one or both approaches based on a data set synchronization status between one of the plurality of client devices and the at least one server.

In response to a user of a client electronic display device selecting a point of entry, such as a business workflow-specific dimension indicator that may be disposed as a column heading in the electronic display or such as a data domain indicator that may be disposed as a row heading in the electronic display a guided page processing engine be adapted to flexibly present any subset of the multi-domain data set. As noted above one approach is to perform filtering of the multi-domain data set to retrieve the desired portion/subset. Another approach is to access a stand-alone data set that comprises a predetermined portion (e.g., a domain specific subset) of the multi-domain data set.

An active data filtering technique to limit the data that is presented in the domain-specific subset of the multi-domain data set can be activated through merely selecting a domain indicator (e.g. a row heading) in a presented guided page. Once a standalone data subset is available for the selected domain indicator, the system may automatically determine whether to use an active data filtering technique or to directly access the standalone data subset in response to a user selecting a domain indicator for an available standalone data subset. Alternatively, a user my explicitly indicate that the standalone data subset should be accessed, such as by selecting an icon representing the desired domain.

Techniques for determining when and how to generate and access a standalone subset of a multi-domain data set can be embodied in a variety of inventive forms. One such form may be embodied as a method of synchronizing a client with a server to convert a multi-domain data set filtering technique on the client to a data sub-set access technique on the client after synchronization. A synchronization parameter may be configured to identify if a user has indicated that a subset that is presented on a guided page should be configured as a separate data subset during synchronization. The data subset synchronization process may involve a user assigning a subset designation to any guided navigation page that is being presented in the electronic client interface. The dimension, domain, and other narrowing parameters that are applied to generate the guided navigation page may be captured and applied during an upcoming synchronization of the client with a server. Once a user has designated a guided navigation page content to be synchronized as a subset, until the synchronization is performed any time a user selects the same subset (e.g., by selecting a subset icon that is created when the user designates a guided page to be saved as a data subset), the resulting page will be generated by applying a filter to the multi-domain data set available on the client that filters the multi-domain data set based on the dimension, domain, and any other parameters associated with the designated subset.

Another technique related to using synchronization to generate a data subset may facilitate presenting domain-specific data from one of a first data set comprising data associated with a plurality of data domains (e.g., comparable to the multi-domain data set described elsewhere herein) and a second data set that is specific to the presented domain. The presenting using the first or second data sets may be in response to a user indication of the presented domain, and may be based on a sync status of the first data set. As noted above, until the multi-domain data set that includes all of the data needed to generate the separate sub-data set has been synchronized, each time a user selects an icon representing the indicated subset, a filtering approach is applied. However, once the first data set is synchronized after a user indicates a subset, a guided page that represents the indicated subset can be generated by filtering the synchronized multi-domain data set or by directly accessing the stand-alone data set that is generated during the synchronization process.

A guided navigation page engine may optionally, after a synchronization event that produces a stand-alone data subset, maintain information about each stand-alone data subset so that whenever a request for data contained in the subset is made by the user (e.g., the user makes a sequence of data selections that are identical to the selections made to produce the guided page from which the subset was initially indicated), the stand-alone data subset may be used instead of the multi-domain data set.

Generating a stand-along data set that contains only the portion of a larger multi-dimensional data set during synchronization is automated in the synchronization process. One approach for this automated action is the synchronization process produces a filter-like request to the server-based data processing engine and captures the results in a stand-alone data set. Another approach is the synchronization parameters for the subset are applied during synchronization as a request for a client-ready data set that contains only the specified subset (e.g., the domain specific subset).

Another embodiment of synchronization-enabled subset processing may include presenting parameter-specific data as either a filtered output of a parameter-agnostic data set or as an unfiltered output of a parameter-specific data set based on an indication of a user request for a subset and a status of synchronizing the parameter-agnostic data set with a server. Here, the parameter-agnostic data set may be comparable to the multi-domain data set described elsewhere herein. Alternatively, the parameter-agnostic data set may itself be a subset of a potentially larger multi-domain data set. A sequence of user selections in presented guided navigation pages may be aggregated (and optionally further processed) to form a subset parameter that can then be applied during synchronization as described elsewhere herein.

Another embodiment of synchronization-enabled subset processing may include a method of generating a plurality of data sets (e.g., by a server in response to a client synchronization request that includes at least one subset request). The plurality of data sets may include a multi-domain data set and at least one domain-specific subset of the multi-domain data set. Generating the plurality of data sets coordinated with guided navigation page data set synchronization between a client and a server may be in response to a synchronization request from a client device, wherein the synchronization request indicates the at least one domain. Synchronization and/or a server-based data processing engine may perceive the at least one indicated domain as a stand-alone data subset request.

Yet another embodiment of automated processing of subset requests through synchronization may include limiting client device-specific user access to domain-specific data from a multi-domain data set either by configuring a domain-specific filter for the multi-domain data set or by accessing a domain-specific data set; the choice of which approach to take being based on a synchronization status of the client-specific device. As noted above, an architecture of computing devices may include a plurality of client devices (e.g., tablets, surfaces, lap tops, mobile phones, and the like) that may, from time to time, synchronize a guided navigation page data set between the server and the plurality of client devices individually. Each synchronization action may include client-side parameters that impact the generation of domain-specific data sets that are then synchronized with the client device. Therefore, a user may have access two otherwise identical client devices, both being synchronized to the same level of synchronization. However, if one of the devices was synchronized with a domain-specific/data subset-specific subset generation parameter and the other was synchronized without this parameter, only one of the two devices would have a domain-specific data set synchronized to it.

A technique of multi-domain data set filtering noted in the embodiments above may simply temporarily limit access to a filtered subset of the larger data set when producing a domain-specific guided page. Because a filtering approach allows for a guided page engine to access the entire multi-domain data set (including data set content that may not be uploaded to the client device), a user may navigate outside of a domain that he has specified through data selections that narrow a presented page to a specific domain by selecting a point of entry, menu items, and the like that breaks the domain-specific nature. In this way, a user is not limited in any way to view only data within the domain that he has specified.

Accessing the same domain-specific data via a domain-specific data subset avoids the user inadvertently accessing data outside of a specific domain simply by only having available data of the specific domain. Further accesses and movement through interactions with selectable elements in the guided navigation pages being presented to the user are necessarily limited to the data available in the domain-specific data subset.

Figure 92:
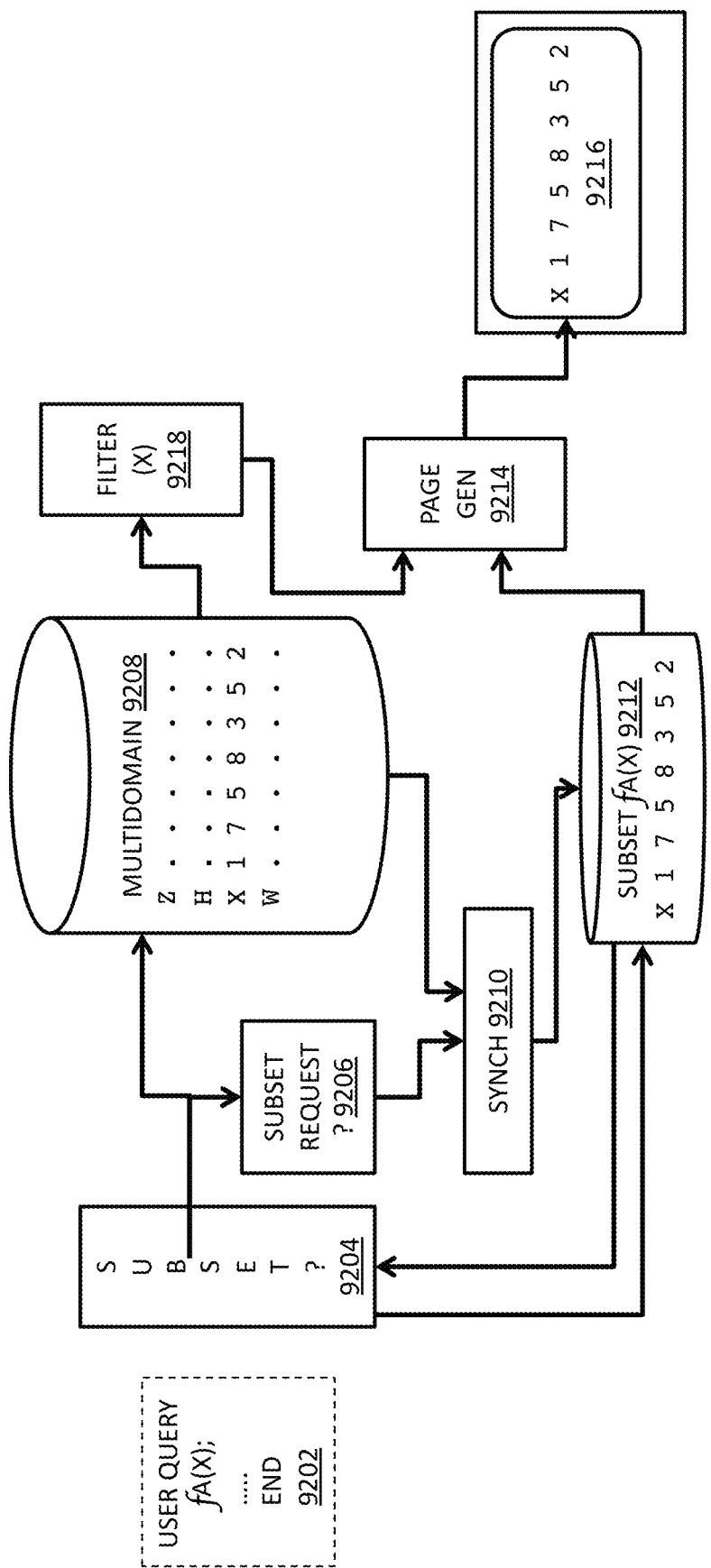

Referring to FIG. 92, an exemplary architecture is depicted that may support the subset-related embodiments described herein. A user query 9202 may be provided, such as by a user selecting a series of active elements (e.g., domains, dimensions, points of entry, menu items, data values, and the like) on one or more sequentially presented guided navigation pages. The user query 9202 may be processed by a subset status facility 9204 to determine if a subset that maybe indicated in the query (e.g., the user may explicitly select an icon representing a subset) is accessible as a separate data subset. The query may be processed through to the multi-domain data set 9208 and/or may be further processed by a subset assignment facility 1506 to determine if the user has requested that a subset be assigned to the query.

If a subset has been assigned to the query, but the subset has not yet been created, a subset synchronization parameter is configured and used by a synchronization facility 9210 at a subsequent synchronization action to generate a stand-alone data subset 9212 for the assigned subset. Although synchronization is performed between a client and a server, because a data subset is a logical copy of (although may be generated distinctly from) the multi-domain data set 9208, the synchronization facility 9210 is logically depicted between the multi-domain data set 9208 and the data subset 9212. Synchronization between a client and a server is more thoroughly described elsewhere herein and this logical depiction can co-exist therewith in embodiments.

If a data subset 9212 is available to the client device, such as by synchronization as described herein, a page generation facility 9214 may receive all data for generating a subset-specific guided navigation page 9216 from it. If a data subset 9212 is not available, output from filter 9218 may be processed by a page generation facility 9214 to generate a subset page 9216.

In an alternate embodiment data subset 9212 may be stored in a cache of generated page information on the server (e.g., accessible to the Spectre data processing engine) when the filtered view is generated during a data query by the client through the server. Synchronizing the client with the server may cause this generated page information to be cached on the server for use by the requesting client. Synchronization may also cause the same data to be stored on the client guided page application cache. Therefore if a user of a client device effectively generates a compatible query to the same data (e.g., through explicit recitation of the query, or through a sequence of guided page accesses while the server cache is maintained, the data will be served from the server cache rather than requiring the data to be generated with the Spectre engine again. After synchronizing the client and server, the data can be present on the client as a separate subset file that can be accessed by the client without dependence on a server or server connection.

Figure 94:
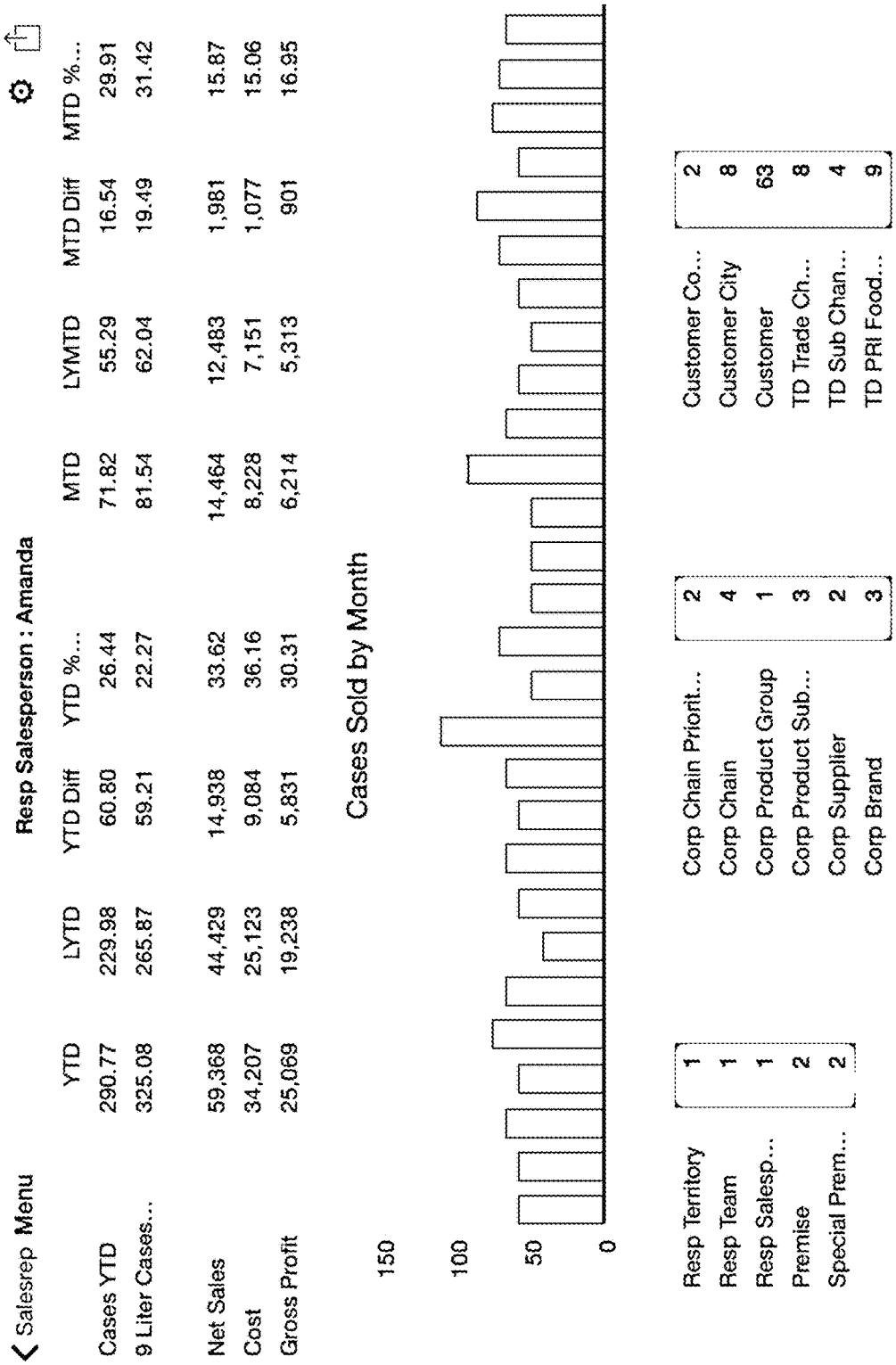
Figure 95:
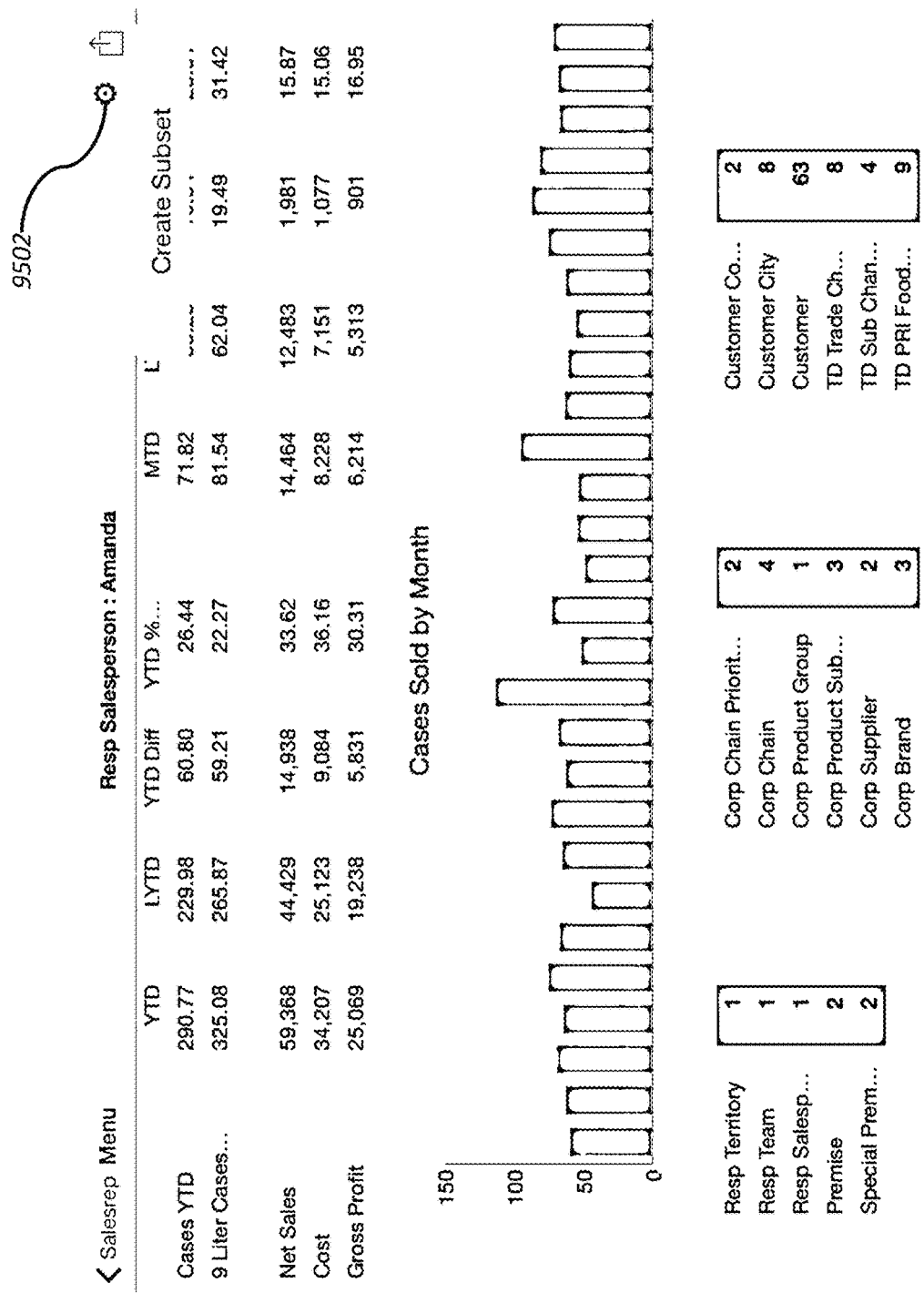
Figure 96:
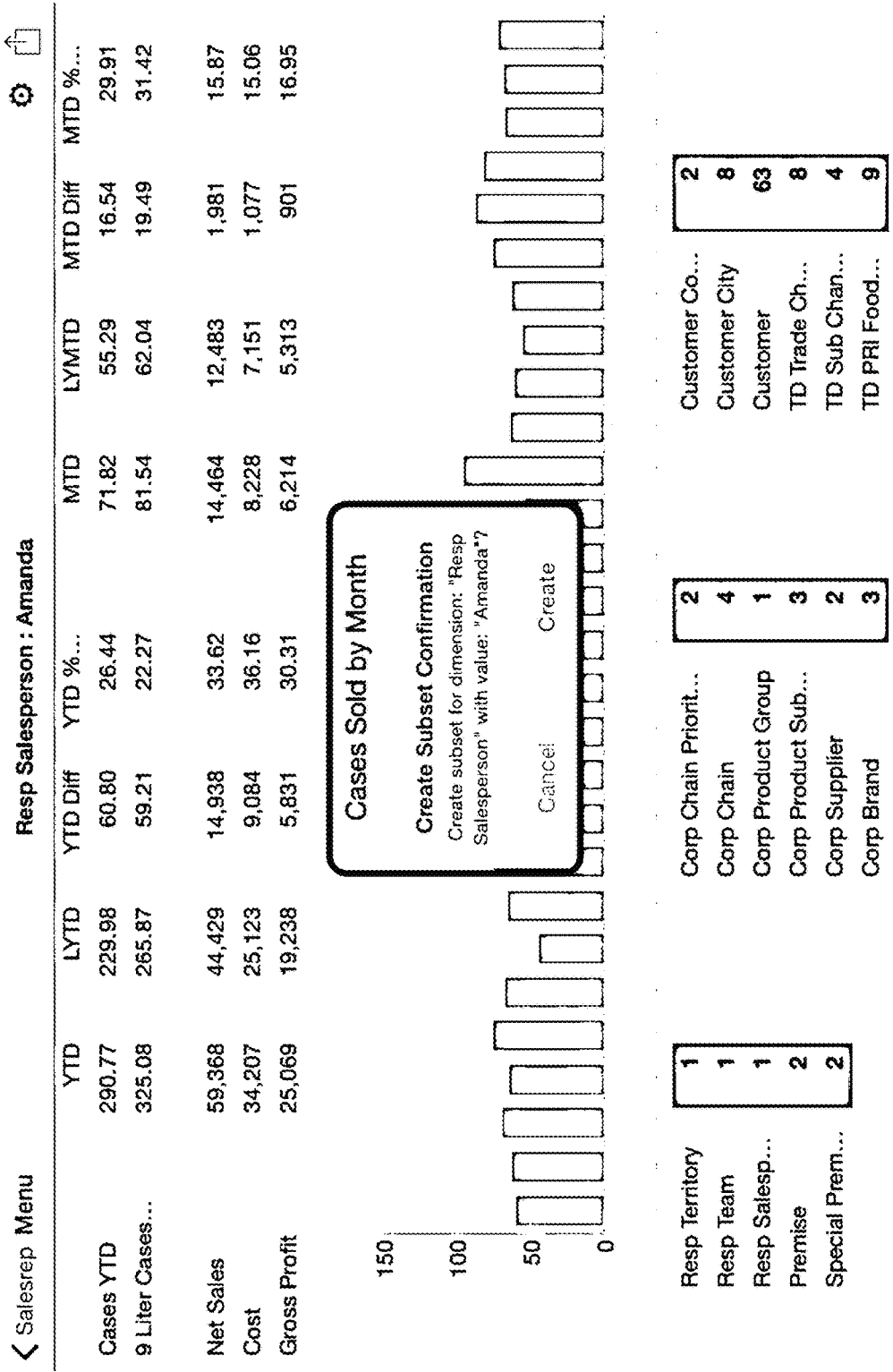
Figure 97:
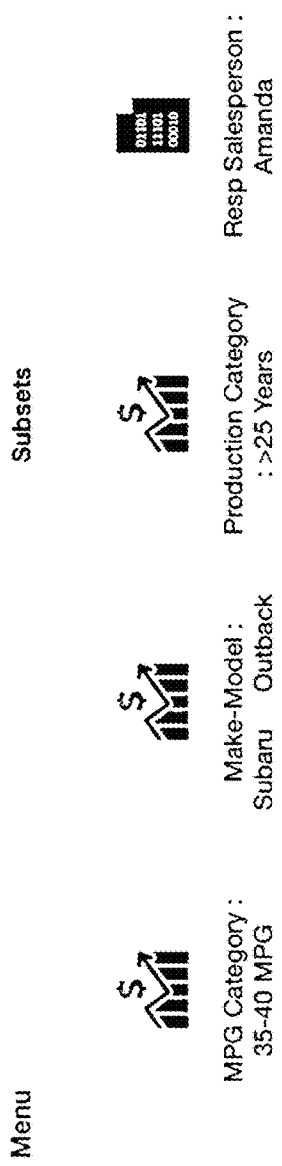

FIGS. 93-97 depict screen shots related to embodiments for generating and accessing data subsets. FIG. 93 depicts a guided navigation page 9302 in which a user has selected a particular active element 9304 "Amanda" as a responsible sales person. FIG. 94 depicts a resulting guided navigation page for Amanda as responsible sales person. The data within such a domain may be captured as a subset. This action is depicted in FIG. 95 that shows a subset creation icon 9502 being selected on the guided navigation page of FIG. 94. In response to the user selection of the subset icon 1802, a confirmation screen is presented to the user as depicted in FIG. 96. Upon confirmation, a subset icon that represents the subset parameters associated with the guided navigation page from which the subset was requested is generated. FIG. 97 depicts a menu of subsets that have been assigned, including those that have not yet synchronized and those that have been synchronized. Accessing one of these subset icons may result in either accessing the corresponding data subset that has been synchronized or sending a request to the server to provide the data identified by the subset parameters as a filtered output of a server-based version of the multi-domain data set.

A method of data subset usage in a guided navigation page client environment may include, storing in a processor accessible memory at least one user selection of an active guided page generation element presented in a first guided navigation page that is presented on a client device electronic display; presenting a subset creation icon on a second guided navigation page that results from the user selection of an active guided navigation page generation element; receiving a confirmation from a user to generate a subset based on the second guided navigation page and the stored at least on user selection; generating an active subset use element and adding the active element to a subset selection guided navigation page; in response to receiving a user selection of the active subset use element performing one of accessing a stand-alone data set that comprises data associated with a data domain of the second guided navigation page and accessing data representative of the second guided navigation page from a server by sending a request for the data over a network; generating a version of the second guided navigation page based on the accessed data; and presenting the generated second guided navigation page in the client device electronic display. Wherein accessing data representative of the second guided navigation page from the server comprises checking if the stand-alone data set is accessible to the processor of the client device. Wherein accessing data representative of the second guided navigation page from the server comprises checking if a data that corresponds to the data representative of the second guided navigation page or the second guided navigation page is accessible by a processor of the client device in a client-device processor accessible memory.

Filter/Multi-View

In the methods and systems of guide page generation and operation on a tablet-based device and the like, filtering of data may be performed to facilitate presenting domain or dimension-specific views of the columnar data that is built by the Spectre engine, also as described herein. One such embodiment of presenting domain-specific and/or dimension-specific views comprises making both a filtered and unfiltered view available in a guided page. This embodiment may effect a multiple view capability of a data source in a single guided page and therefore is referred hereinto as multi-view pages.

In an embodiment, a guided navigation page may be generated for presentation on a client device in which aggregated data for a plurality of data domains of a multi-domain data set is presented in a first displayable tab of the page and domain-specific data for a user-identified domain of the plurality of data domains is presented in a second displayable tab of the page, wherein the second tab represents a filtered view of the data in the first tab. Further, updates to the data presented in the first tab (e.g., aggregated multi-domain data from a columnar data set that is generated using the Spectre engine and/or related capabilities such as a c-plan and the like as described herein) that impact the filtered view may result in corresponding changes to the second tab. Additionally, the first tab may itself represent a first filtered view of the columnar data. Even further, the data in the first tab may represent data that has been filtered multiple times from a source data set. Alternatively, the data for the first tab and/or for the second tab may be sourced from a stand-alone data subset that is generated through a server-client synchronization operation. Generating and using stand-alone data subsets are described elsewhere herein.

Multi-view data in a first tab and second tab may be related to each other in that each may represent a different view of common source data, with a second tab representing a more narrowly filtered view of the first tab. However, both tabs may represent multi-domain and/or multi-dimension data so that a second tab represents multiple domains but is nonetheless a filtered view of data in the first tab.

Selecting active elements, and the like in each of the first and second tabs may activate different follow-on guided pages. In an example, a first page that represents data for a plurality of responsible salespersons may include an active element for each salesperson that represents the total number of customers for the salesperson. Selecting this active element may generate a resulting guided page that shows the customers for the specific salesperson. A filtered second tab may show data for a plurality of responsible salespersons but filtered for a specific geographic region. Selecting a corresponding active element in the second tab may result in producing a guided page that lists the suppliers represented by the data in the active element that are limited to the specific geographic region.

Other embodiments of multi-view pages may include calculated comparison of data in the first and second tabs. This may include a first tab being unfiltered, a second tab being filtered, and a third tab being the calculated comparison of the first and second tabs.

Another embodiment of a multi-tab view page may comprise more than two tabs, each showing refined filtering so that a third tab may represent a filtered view of a second tab that may represent a filtered view of a first tab.

In yet another alternative multi-view guided page embodiment, a first tab may represent first domain-specific data as a filtered view of a Spectre engine generated columnar data set, and a second tab of the guided page may represent second domain-specific data of the same columnar data set, wherein the first and second domain-specific data may have a common dimension. In this embodiment, a dimension specific view of the columnar data set may be presented in two distinct domain-specific views on separate tabs of a single guided page.

Figure 99:
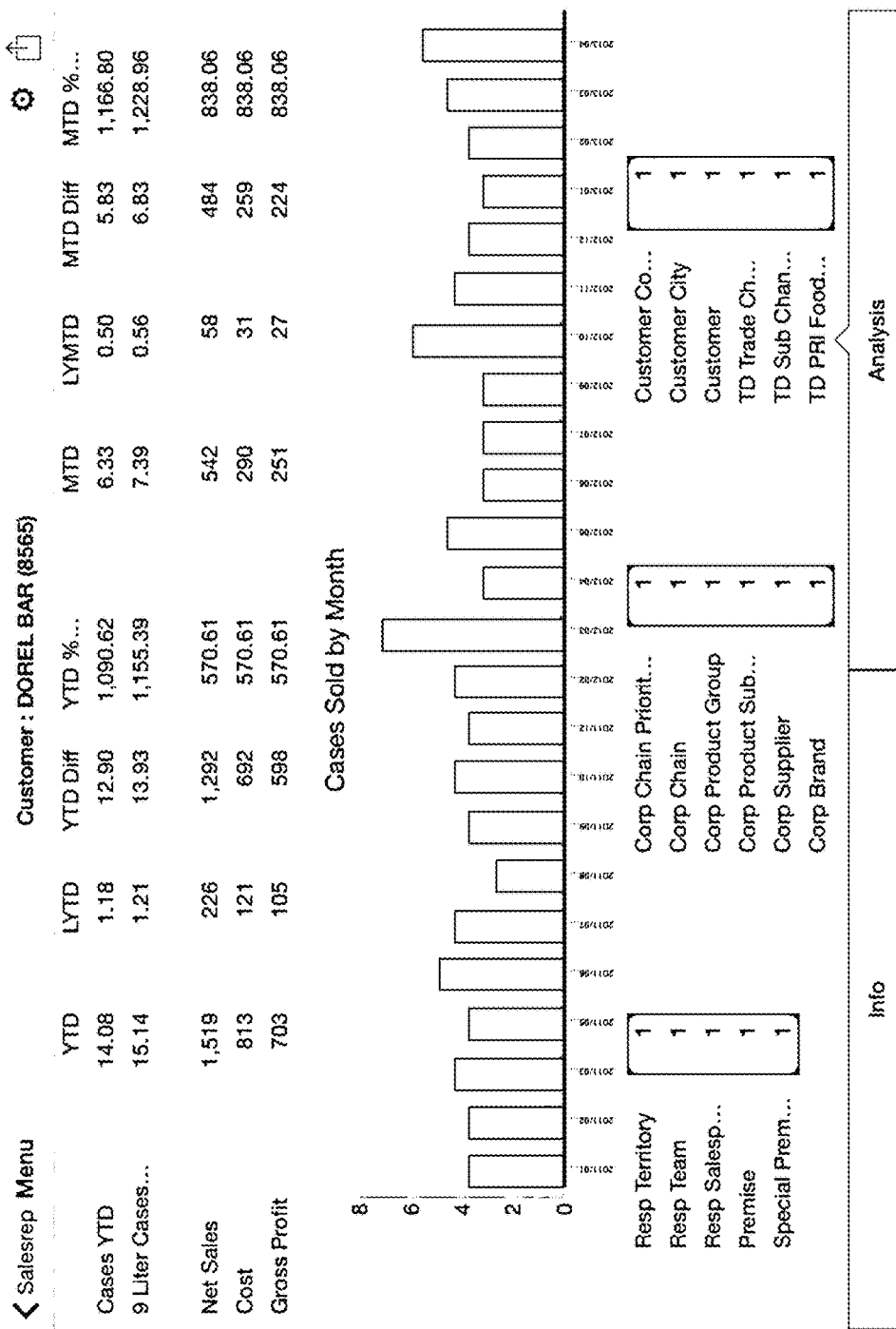

Referring to FIGS. 98 and 99, two tabs of a multi-view guided page are depicted. FIG. 98 depicts an information tab of a specific customer for a specific sales representative. FIG. 99 depicts an analysis tab for the same customer/sales representative.

Figure 100:
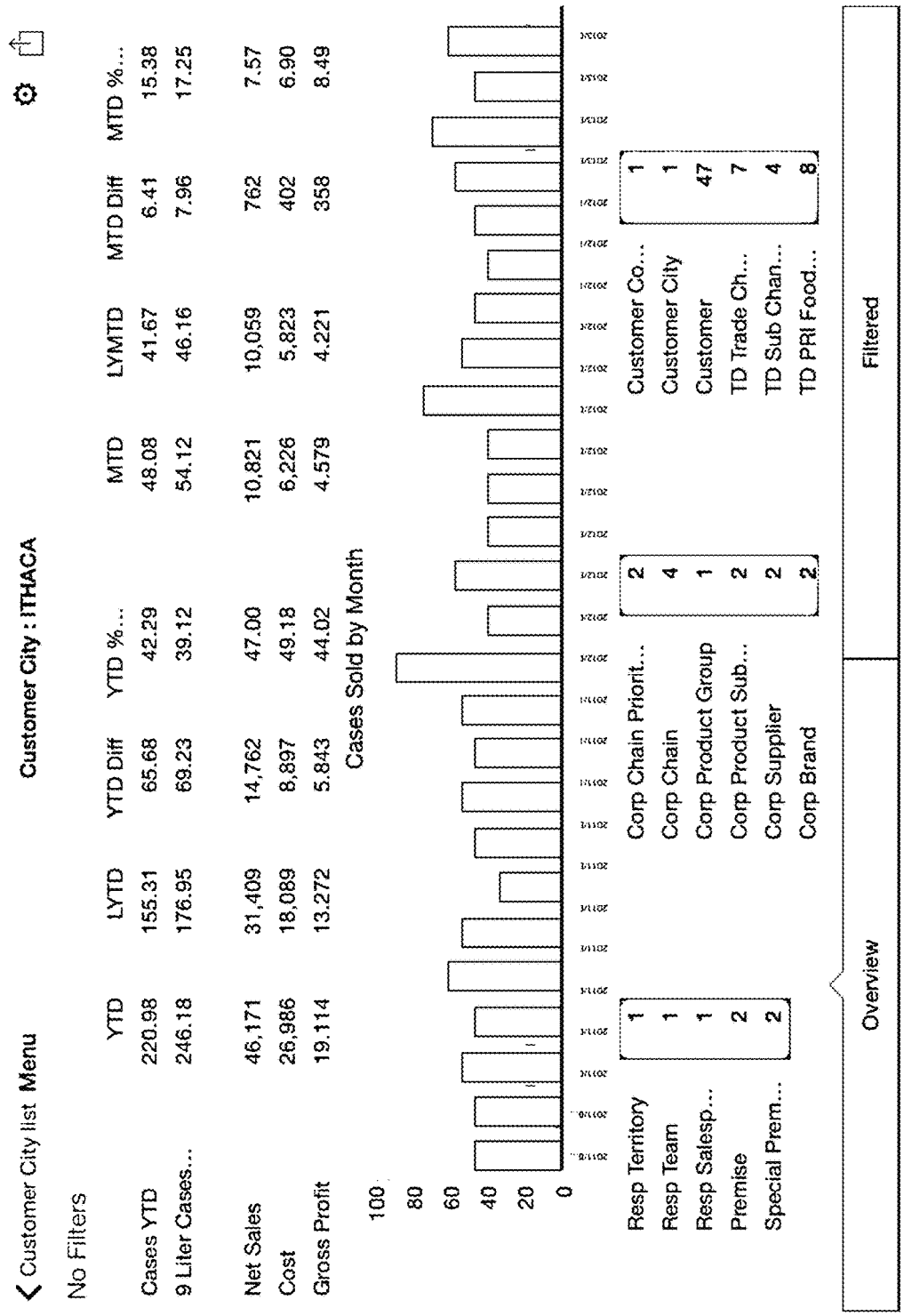
Figure 101:
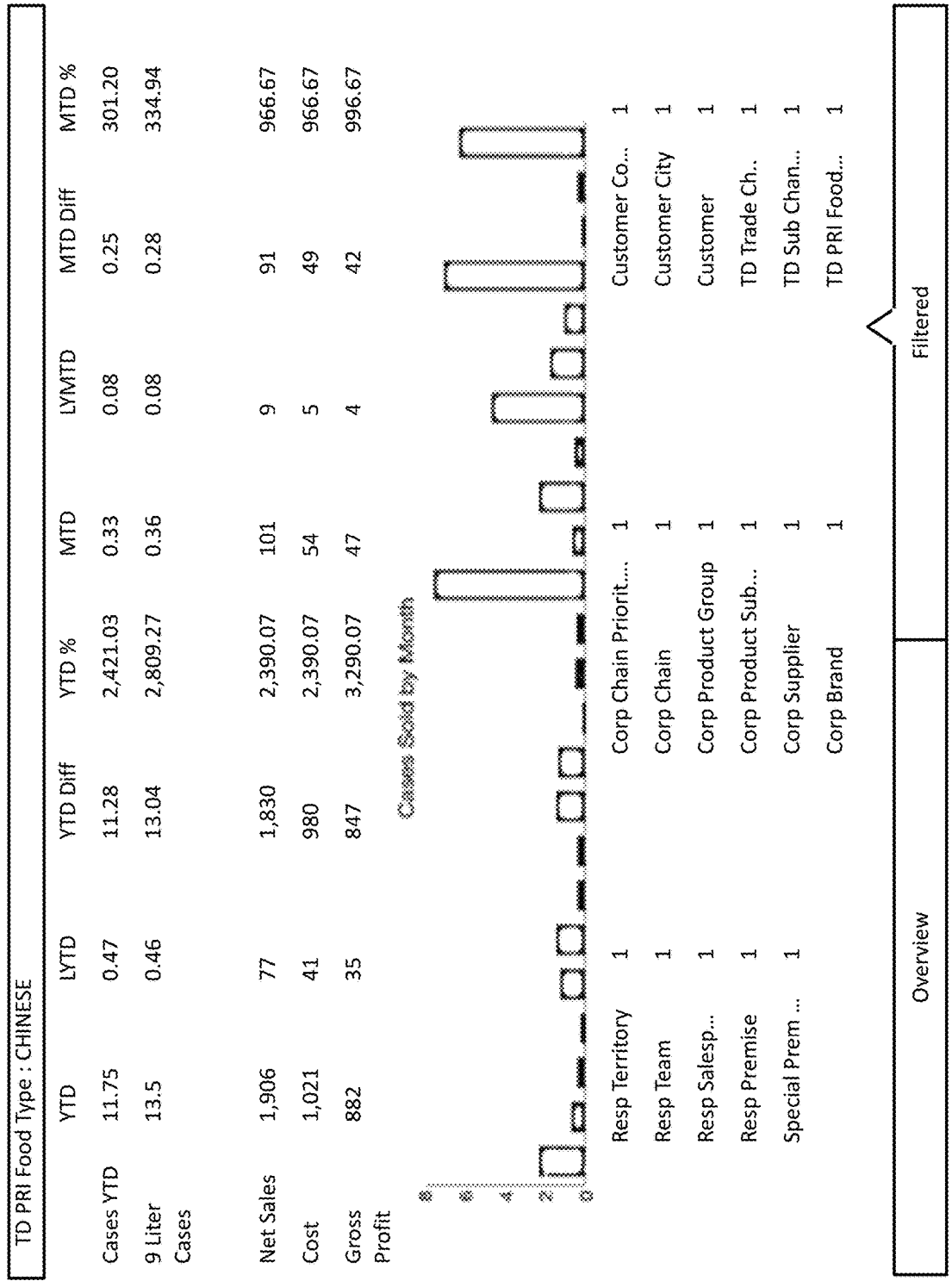

Referring to FIGS. 100 and 101, two tabs of an alternate embodiment of a multi-view guided page are depicted. FIG. 100 depicts an overview of a corporate brand for a supplier dimension. FIG. 101 depicts a filtered view of a specific corporate supplier within the corporate brand view of FIG. 100.

Machine Embodiments

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated in their entirety by reference.

The invention claimed is:

1. A method for automated discovery of dimensions of a data set that are relevant to continuing a plurality of business workflows, the method comprising:

configuring a columnar array of data sourced from data sources representing a plurality of domains, the data in the columnar array organized by a set of dimensions for continuing the plurality of business workflows, wherein each dimension of the set of dimensions is common across at least two domains of the plurality of domains;

generating sets of data from the columnar array for configuring guided navigation pages that include actionable elements that correspond to one or more dimension of the set of dimensions;

monitoring use of dimensions in the set of dimensions for generating guided navigation pages from the sets of data;

determining at least one dynamic dimension of the set of dimensions based on an aspect of the monitored use;

configuring a semantic request response plan that facilitates generating a guided navigation page for the at least one dynamic dimension; and in response to a user selection of an actionable element in a first guided navigation page associated with the at least one dynamic dimension, generating a set of guided navigation page configuration data for continuing a corresponding business workflow by automatically activating the semantic request response plan that corresponds to the at least one dynamic dimension, wherein generating the set of guided navigation page configuration data is further based on domains of the data sources indicated by the user-selected actionable element in the first guided navigation page.

2. The method of claim 1, wherein determining at least one dynamic dimension includes use of a machine learning system to identify a set of candidate dimensions.

3. The method of claim 1, wherein the set of dimensions includes core dimensions for which summaries are automatically generated and dynamic dimensions for which summaries are generated responsive to a user selection thereof.

4. The method of claim 1, further including generating a plurality of target guided navigation pages responsive to user interaction with a plurality of guided navigation page-disposed interactive elements configured to link a second domain of the plurality of domains to a first domain of the plurality of domains by a dimension that is common to the first and second domains.

5. The method of claim 1, wherein the aspect of monitored use reflects user interaction with actionable elements in the set of guided navigation pages.

6. The method of claim 1, wherein the aspect of monitored use is an indication that a dimension used for generating guided navigation pages is an industry-specific data dimension.

7. The method of claim 1, wherein the semantic request response plan calculates data summaries based on the dynamic dimension.

8. A method for automated discovery of dimensions of a data set that are relevant to continuing a plurality of business workflows, the method comprising:

organizing data from data sources representing a plurality of domains in the data set based on a set of dimensions for continuing the plurality of business workflows, wherein each dimension of the set of dimensions is common across at least two domains of the plurality of domains;

monitoring use of dimensions in the set of dimensions in a set of guided navigation pages that include actionable elements that correspond to one or more dimension of the set of dimensions;

determining at least one dynamic dimension of the set of dimensions based on an aspect of the monitored use;

configuring a semantic request response plan that facilitates generating a guided navigation page for the at least one dynamic dimension; and in response to a user selection, in a first guided navigation page in the set of guided navigation pages, of an actionable element associated with the at least one dynamic dimension, automatically generating, through application of the semantic request response plan, a set of guided navigation page configuration data that is based on domains of the data sources presented in the first guided navigation page.

9. The method of claim 8, wherein determining at least one dynamic dimension includes use of a machine learning system to identify a set of candidate dimensions.

10. The method of claim 8, wherein the set of dimensions includes core dimensions for which summaries are automatically generated and dynamic dimensions for which summaries are generated responsive to a user selection thereof.

11. The method of claim 8, further including generating a plurality of target guided navigation pages responsive to user interaction with a plurality of guided navigation page-disposed interactive elements configured to link a second domain of the plurality of domains to a first domain of the plurality of domains by a dimension that is common to the first and second domains.

12. The method of claim 8, wherein the aspect of monitored use reflects user interaction with actionable elements in the set of guided navigation pages.

13. The method of claim 8, wherein the aspect of monitored use is an indication that a dimension used for generating guided navigation pages is an industry-specific data dimension.

14. The method of claim 8, wherein the semantic request response plan calculates data summaries based on the dynamic dimension.

15. A system for automated discovery of dimensions of a data set that are relevant to continuing a plurality of business workflows, the system comprising:

a columnar array of data sourced from data sources representing a plurality of domains, the data in the columnar array organized by a set of dimensions for continuing the plurality of business workflows, wherein each dimension of the set of dimensions is common across at least two domains of the plurality of domains;

a set of guided navigation pages that include actionable elements that correspond to one or more dimension of the set of dimensions; and a set of instructions that when executed by a computer processor cause the processor to:

monitor use of dimensions in the set of dimensions in the set of guided navigation pages;

determine at least one dynamic dimension of the set of dimensions based on an aspect of the monitored use;

configure a semantic request response plan that facilitates generating a guided navigation page for the at least one dynamic dimension; and respond to a user selection, in a first guided navigation page in the set of guided navigation pages, of an actionable element associated with the at least one dynamic dimension, by automatically generating, through application of the semantic request response plan, a set of guided navigation page configuration data that is based on domains of the data sources presented in the first guided navigation page.

16. The system of claim 15, wherein the aspect of monitored use reflects user interaction with actionable elements in the set of guided navigation pages.

17. The system of claim 15, wherein the aspect of monitored use is an indication that a dimension used for generating guided navigation pages is an industry-specific data dimension.

18. The system of claim 15, wherein the semantic request response plan calculates data summaries based on the dynamic dimension.

19. The system of claim 15, wherein the aspect of monitored use is a count of unique dimensions in the set of dimensions.

20. The system of claim 15, wherein the aspect of monitored use is an impact of a dimension for continuing at least one of the plurality of business workflows.

* * * * *